United States Patent [19]

Miller et al.

[11] 4,223,385
[45] Sep. 16, 1980

[54] CONTROL OF WORKPIECE HEATING

[75] Inventors: William R. Miller, Monroeville, Pa.; Clarence E. Peck, Williamsville, N.Y.

[73] Assignee: Westinghouse Electric Corp., Pittsburgh, Pa.

[21] Appl. No.: 944,496

[22] Filed: Sep. 21, 1978

Related U.S. Application Data

[63] Continuation of Ser. No. 184,161, Sep. 27, 1971, abandoned.

[51] Int. Cl.$^3$ .................... G06F 15/46; G05B 23/19; C21D 11/00; F27B 9/40
[52] U.S. Cl. .................................. 364/472; 266/96; 364/477; 432/51
[58] Field of Search ............... 364/477, 472, 107, 557, 364/300, 469, 506; 266/87, 80, 90, 96, 99; 432/11, 12, 45, 49, 51

[56] References Cited

U.S. PATENT DOCUMENTS

| | | | |
|---|---|---|---|
| 3,548,171 | 12/1970 | Kodz | 266/5 T |
| 3,604,695 | 9/1971 | Steeper | 266/5 T |

OTHER PUBLICATIONS

Brower—"Controlling a Complete Hot Strip Mill", Control Engineering, Oct. 1963, pp. 57–63.
Lodics, "A Computer Runs a Hot Strip Rolling Mill", Control Engineering, Apr. 1969, pp. 89–93.

Primary Examiner—Joseph F. Ruggiero
Attorney, Agent, or Firm—R. G. Brodahl

[57] ABSTRACT

The present control system and method for a slab heating furnace is operative in relation to a predicted travel time of a theoretical control slab in the charge zone of the furnace and a predicted travel time of a theoretical control slab in the heat zone of the furnace as based upon the cycle time of an associated rolling mill. This operation is in relation to a desired distribution of heat content supplied by the charge zone and heat content supplied by the heat zone, and in consideration of a related temperature profile within each slab, for the determination of a temperature control setpoint for the charge zone and a temperature control setpoint for the heat zone such that a desired total heat content is provided within each slab before it enters the soak zone of the slab heating furnace. There are periodically calculated the updated heat content values for each slab in every operating furnace for this determination of temperature control setpoints, and a correction in temperature setpoint is made when the calculated heat content is different than the desired heat content for the slabs in a controlled heating zone. A slab is not permitted to be discharged from a given furnace until that slab has been properly heated in relation to desired heat content, desired surface temperature and desired time interval in the soak zone.

43 Claims, 55 Drawing Figures

CHANGES IN TEMPERATURE VS. TIME

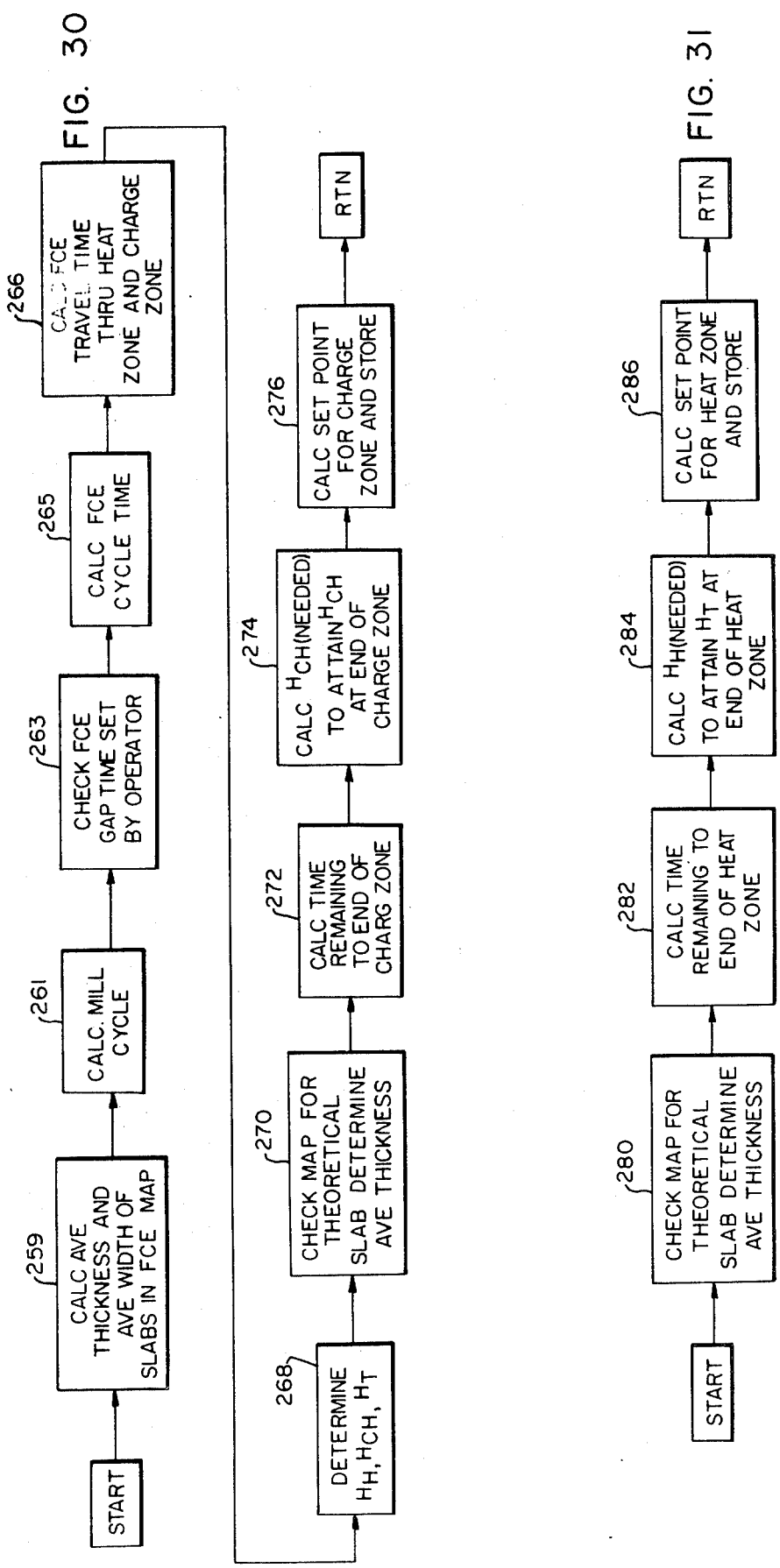

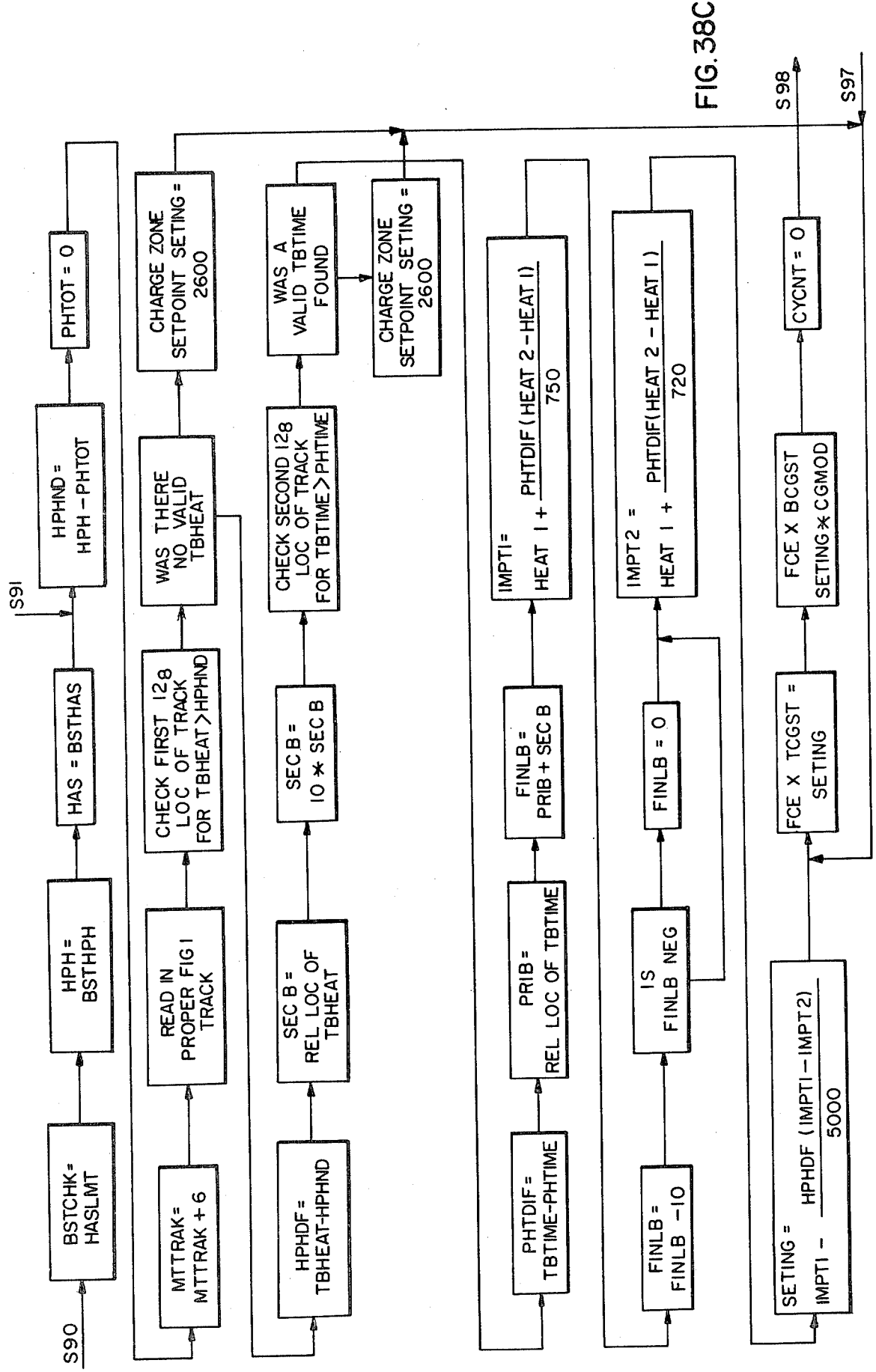

CONTROL OF WORKPIECE HEATING

This is a continuation of application Ser. No. 184,161, filed Sept. 27, 1971, now abandoned.

CROSS-REFERENCE TO RELATED APPLICATION

Reference is made to the following concurrently filed and related patent application which is assigned to the present assignee:

Ser. No. entitled "Digital Computer Control of Workpiece Heating" and filed by C. E. Peck and W. R. Miller. This application has been abandoned.

BACKGROUND OF THE INVENTION

The application of a programmed digital computer control system and method for the control of slab heating, particularly for operation in conjunction with an associated hot strip mill, is desirable because of the potential economic saving of considerable dollars. The heating of slabs involves the use of very large amounts of heat energy and the related production of very large total tonnages of steel when integrated over a calendar period such as one year. Improvements in overall consumption of fuel and in scale loss of the metal can be realized and evaluated into dollar figures which far outweigh any investment required to appy such a computer control system. In addition, improvements in slab heating furnace operation and in better overall control of product quality can be realized. The cost advantages and savings in dollars are multiplied to a greater extent as the number of furnaces provided to match the rolling capacity of the associated rolling mills is higher in number and the resultant control actions necessaary to obtain properly heated slabs are sufficient in magnitude to go beyond the ability of a human furnace operator to handle the wide variety of situations which can arise. The availability of high speed programmed digital computer control techniques permits very fast analysis of monitored changes in operating conditions and the desired resultant corrective furnace control operations to follow changes in rolling mill operation faster and more efficiently.

This invention pertains to the operation of a slab heating furnace and, more particularly, to controlling the operation of a slab reheat furnace used to heat metal slabs in preparation for rolling in a hot strip rolling mill.

To satisfy the demands of hot strip mills, it is necessary to heat slabs to a desired temperature in continuous furnaces, which heat is supplied to each slab on both its upper and lower surfaces as it passes through predetermined heating zones of the furnace. Generally, the slabs are transported in a direction opposite to that of the flow of the heated gases, with the furnaces being divided into predetermined heating zones wherein each heating zone has its own temperature controller for the firing rate of the one or more burners in each of the heating zones. For example, in the conventional five heat zone pusher furnace, three heating zones are utilized and conventionally these are called preheat or charge, heat and soak.

The preheat or charge zone is most generally the largest of the three heating zones, both in terms of physical size and in amount of heat added to the slab; it has separate burner systems for the upper and lower slab surfaces. The heat zone which follows the charge zone than heats the slab to the desired rolling temperatures using a similar burner system. When the slab surfaces have reached a desired temperature, the slabs are then transported into the soak zone for the purpose of providing a uniform temperature profile distribution throughout the slab.

Because of the continuous nature of material passage through these furnaces, it is highly desirable to approach an operating condition wherein the steady state heated slab output of the furnace substantially matches the heated slab input requirements of the associated rolling mill. Also, it would be advantageous to provide optimum operating conditions in the slab heating furnace to provide the most economical and satisfactory operation of the whole associated process. In addition to economic advantages, improvements in furnace operation and better overall control of heated slab quality will be realized as compared to the prior art conventional and existing modes of furnace operation.

It is desired to provide a uniformly heated slab at the proper value of rolling temperature for a wide variety of slab sizes, mixes of grades of slabs, and rates of individual slab movement. Wide fluctuations and sudden changes in firing rates for the respective zones should be minimized in meeting the demands of the associated rolling mill. The soak time requirements in the soak zone for each slab should be set at a minimum consistent with maximum production and minimizing of skid marks, by assuring that the slab has the required total heat content before entering the soak zone area of each furnace. Minimum furnace temperatures should be provided corresponding to the slab tonnage rates being demanded by the rolling mill and the average slab thickness proceeding through each zone of each furnace. It is desired to distribute firing rates between individual firing zones for most efficient utilization of provided heat energy, and multizone continuous furnaces are designed with this capability in relation to variation in demand of the associated rolling mill. The slabs should be protected from damage due to excessive heating, scaling, and so forth when demands by the rolling mill for heated slabs change rapidly. Increased life and lower maintenance on individual furnace refractories can be realized by minizing effects of changes in demand for heated slabs. A control system and method should be provided that is flexible and expandable to permit furnace response to zone temperatures measured and operational feed back from key locations in the associated rolling mill; for example, slab temperatures measured in relation to the initial pass through an early stand of the hot strip rolling mill. The control approach should be applicable to any multizone controlled continuous type slab heating apparatus, such as a pusher, walking beam or roller hearth types of furnaces, or to combinations of these types, and also be applicable to combination fuel fired and electric furnace systems.

A previously filed patent applicaion, Ser. No. 705,506 and filing date Feb. 14, 1968, was filed by the same inventors to conver an earlier control system for slab reheat furnaces, which included sensing the physical movement of the slabs as well as monitoring of mill pace time and temperature sensing devices for providing temperature feedback signals related to the upper and lower surface temperatures of the slab. This application has been abandoned.

A digital process control computer can include a central integrated process control or setup processor operative with a software sequentially stepped instruction program which is entered into and stored within the storage memory unit of the computer, and including associated input and output equipment such as generally described in an article entitled "Understanding Digital Computer Process Control" by B. H. Murphy, which appeared in Automation for January 1965, pages 71 to 76, and in an article entitled "Small Control Computers—A New Concept" by F. G. Willard which appeared in the Westinghouse Engineer for November 1964 at pages 174 to 179. Two other articles of interest here in regard to the programming of a process control computer should also be noted; one was published in the January 1965 Westinghouse Engineer at pages 13 to 19 by Paul E. Lego and the other was published in the 1966 Iron and Steel Engineer Year Book at pages 328 to 334 by J. S. Deliyannides and A. H. Green. Each computer processor is associated with predetermined input systems not specifically shown, which typically include an input system which scans process signals representing the status of various process operating conditions, a conventional analog input system which scans and converts process analog signals and operator controlled and other input devices and systems which could include paper tape, teletypewriter and dial input apparatus. Various kinds of information are entered into the computer control system through information input devices including for the example of a slab heating furnace, the desired slab heat content $H_T$, grade of slab being heated and so forth as well as hardware oriented programs and control programs for the programming system and so forth. The input system interfaces the computer control system with the process through the medium of measured or detected signals. To effect desired output control actions, control devices are operated directly by means of an output system or by means of analog signals derived from the output system through a digital to analog converter. One such control action outputs from the computer control system the temperature setpoint for each heating zone which are applied to the respective temperature controllers to determine the desired operation of the heating zones. The previously determined slab heat content values for each heating zone are stored in memory along with the calculated values of other selected operational parameters. A suitable output display can be provided for operation with the computer control system in order to keep the process operator generally informed about the process operation and in order to signal the operator regarding an event or condition relative to any particular furnace which may require some action on his part. The use of an on-line digital computer control system requires that one or more models relating to the controlled process be stored in the memory unit of the computer to enable predictive operation and control of the process and adaptive control of the process relative to updating information obtained from actual operation of the process.

SUMMARY OF THE PRESENT INVENTION

The control arrangement shown is operative to adjust for each furnace the zone temperature setpoint of the respective temperature controller for each heating zone, based upon updated heat content calculations of the individual slabs in the slab map for that furnace so that the slabs leaving a given zone have achieved a heat content reference value which will produce a slab suitable for subsequent rolling by the associated rolling mill when the slab is discharged from the furnace.

For any given temperature setpoint, each heating zone temperature controller varies the firing rate for its respective heating zone to maintain the provided temperature setpoint condition. The updated heat content calculations of the slabs in the furnace map within the computer memory will vary the provided setpoint as required in order to obtain the required heat content to each slab as it leaves each controlled firing zone.

In effect, this provides heat content calculation control operation in conjunction with the conventional analog setpoint temperature controller of each zone firing system. A correction in setpoint occurs when the calculated heat content deviates from the required reference heat content for any particular slab in each zone being controlled.

The heat content calculations are determined in relation to the following variable inputs in relation to an established mathematical model: 1. the measured effective furnace temperature adjacent the furnace wall in the controlled zone, 2. the total elapsed time that each slab is in each controlled zone, 3. the established size and location of the slab in the respective zone, and 4. the calculated surface temperature of the slab. The heat transfer rates into a given slab are related directly to the measured true values of the respective heating zone effective furnace temperatures, and the actual heating rates obtained by empirical test observations indicate that the heating of a slab can be calibrated in terms of a dependable measurement of the effective furnace temperature. This can be done by means of thermocouples or closed end radiation tubes located adjacent to the inside surface of the furnace wall at a location outside of the direct flame and exposed to the gas envelope resulting from that flame and used to control the firing rate for the furnace zone. A mathematical model is provided to predict changes in the heat content of each slab in relation to this temperature measurement for obtaining a control operation for slab heating that is consistent and reproducible. The slab heat content control here described is not dependent on the measurement of slab surface temperature, although this would be desirable. Up to the present time, attempts to obtain consistent, reliable and reproducible measurements of the slab surface temperature have not been successful due to conditions inside the furnace at the local measuring point such as the amount of scale on the slab, and the flame characteristics, and so forth. Instead, the slab surface temperature is determined by calculation in accordance with the present teachings.

The following principal steps are performed in the present approach to the slab heating process control here described. First, the process control computer has stored in its memory a slab map for each heating furnace that is controlled. At any given time, this slab map shows the location and size of each slab in the respective controlled heating zones of that furnace. Also related to results from a mathematical slab heating model, the process control computer determines the heating status of each slab as related to the heat content of the slab and surface temperature of that slab at its respective location. This heating status determination establishes a time-temperature history of that slab as it progresses through the furnace. Secondly, each slab in each of the various furnaces is updated with respect to heating status and location with the map changes due to the discharge of a slab from that furnace. Thirdly, and independent of slab discharge, each slab is updated at periodic time intervals such as every three minutes for a given furnace with respect to heating status. Fourthly, based on the established time-temperature history and the known location of each slab, the process control computer adjusts the temperature setpoints of the various control heating zones to correspond to determined changing conditions. Fifthly, some of the principal changes in operating conditions which require evaluation and decisions relative to changes in temperature setpoints may be classified in the following categories, and temperature controlling setpoints are adjusted as required to meet these conditions; (a) The furnaces can deliver properly heated slabs on demand as required by the associated rolling mill. Under this condition, the demands of the rolling mill are assumed to be equal to or are less than the capacity of the combination of slab heating furnaces. The corresponding required temperature control setpoints will follow these changes in demand up to the maximum permissible capacity of the respective furnaces. The control operation will adjust temperature setpoints for variable tonnage rates, variable slab sizes and fluctuations in time intervals between delivery of each slab to the rolling mill due to variation in time required by the associated rolling mill to roll the various slabs. (b) With the furnaces operating at maximum capacity and the associated rolling mill demands being greater than furnace capacity, the furnaces are limiting the total process operation rather than the rolling mill. Slabs should not be permitted to be discharged until each slab has been properly heated, in relation to sufficient heat content, sufficient surface temperature and sufficient time in the soak zone. (c) Rolling mill operational delays as distinguished from regular mill operation changes at variable tonnage rates are analyzed and temperature control setpoints and resultant firing rates are gradually reduced. The control operation is set up to adjust temperature setpoints and resulting firing rates for unexpected delays in slab rolling of either short or long durations, and also is set up to adjust temperature setpoints on a planned basis as related to a planned delay of a known duration, especially those which are relatively long.

The present control system and method will evaluate operational conditions, make decisions and adjust temperature control setpoints for practically any known variations in operating conditions whether through limitation by furnaces or by the associated rolling mill or by planned or unplanned delays in the operation of the associated rolling mill.

DESCRIPTION OF THE DRAWINGS

FIG. 30 is a showing of the system flow chart for the charge zone temperature setpoint determination subroutine program;

FIG. 31 is a showing of the system flow chart for the heat zone temperature setpoint determination subroutine program;

FIGS. 38A, 38B, 38C, 38D and 38E are a showing of the programmer flow chart of the program to calculate for each of the charge zone and the heat zone the temperature setpoint based upon the average heat content of a slab in the theoretical control area thereof.

GENERAL DESCRIPTION OF A PREFERRED EMBODIMENT

Figure 1:
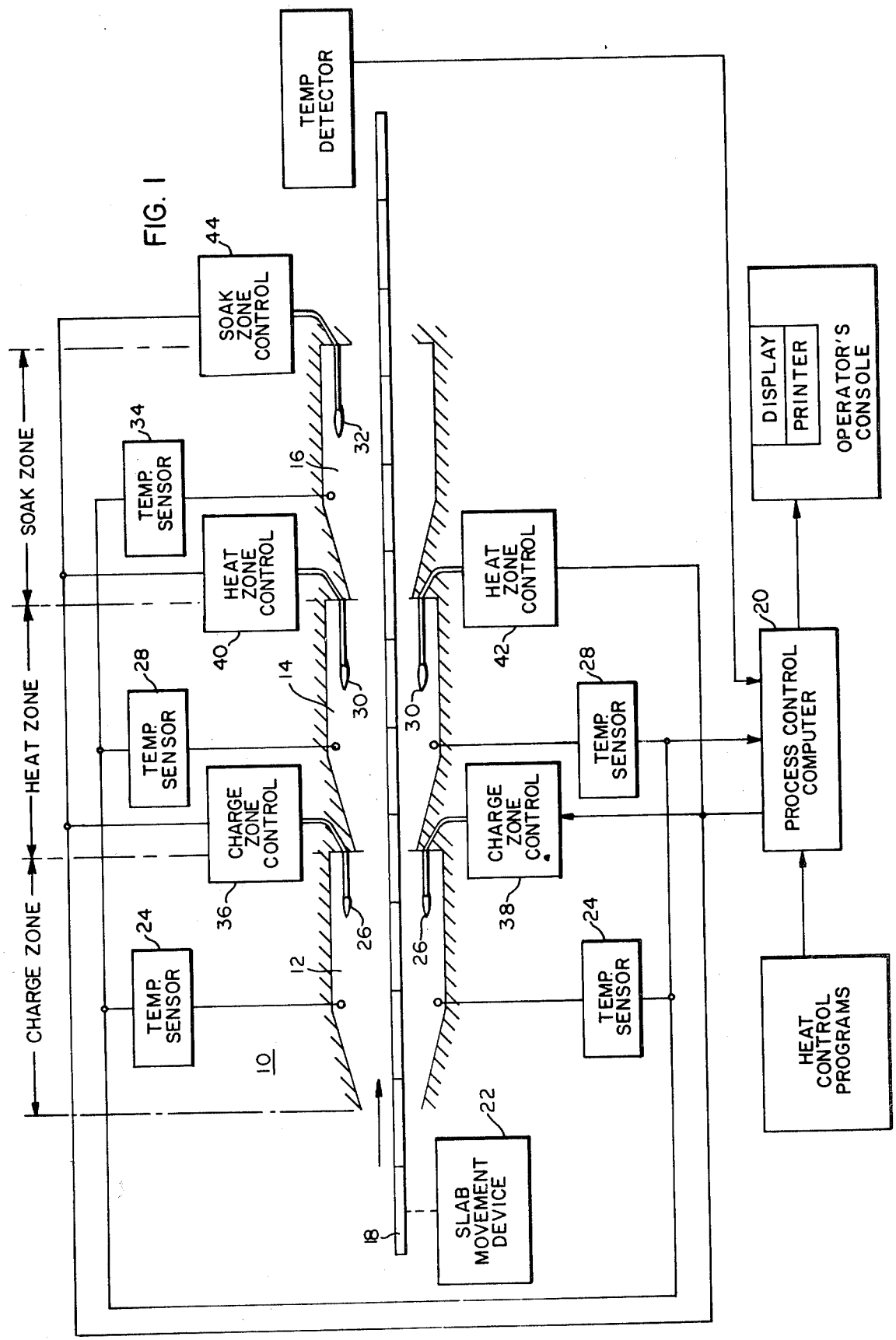
FIG. 1 is a diagrammatic showing of a slab heating furnace operative with a process control computer.

The present control system and method is operative to obtain the desired heating of each slab before permitting delivery of that slab from a furnace for rolling. For this consideration, the furnace is defined as a multizoned continuous type with a charge zone or preheat area where slabs are charged into the furnace and start absorbing heat, a heat zone following the charge zone in which the remaining desired amount of heat is added before the slab enters the final soak zone. It is desired that the heat content of the slab and a related surface temperature, both of which are periodically updated by the mathematical model portion of the present process control, should correspond to established reference values when reaching the exit of the heat zone and just before entering the soak zone. Sufficient time should elapse in the soak zone to achieve the desired amount of temperature equalization and to eliminate or minimize skid marks to a level acceptable for proper rolling in the associated rolling mill. In addition, the present control system and method will provide for an efficient division of the desired total heat content of each slab between that portion added in the charge zone and the remaining portion added in the heat zone; this means that a high percentage of the available energy in the heat zone should be utilized at all times, and that major variations in firing rate should preferably be confined to the charge zone whenever the furnace capacity is varied to meet the demands of the associated rolling mill. This division of heating load will give higher firing efficiency and lower overall fuel requirements for heating over a wide variety of operating rates in the respective furnaces.

Some of the functional operations of the control system and method are as follows:

I. Prediction of slab travel time required to move an additional and entering slab through each furnace.

II. Periodic updating of heat content of each slab in the furnace corresponding to actual elapsed times and to actual existing effective furnace temperature conditions.

III. Prediction of required temperature setpoints of the various heating zones temperature controllers.

IV. Before a slab is discharged from the furnace, certain evaluations and decisions are made as to whether it has been heated to the required heat content, surface temperature and whether it has had sufficient time in the soak zone.

For the prediction of slab travel time, after each discharge of a slab from a given furnace, calculations are made of the time required to roll the slabs now in each furnace as shown by the updated furnace map. These calculations are based on estimates related to the determinated rolling mill capacity or pace time, and indicate the time necessary for the slabs now entering the same furnace to travel through the furnace.

Superimposed on this calculated time is an arbitrarily selected smaller gap time increment which is set by the furnace operator by means of a suitable selection device. This has the effect of modifying the theoretical established mill pace estimates to values more in line with observed actual conditions. The furnace operator can introduce flexibility into the operation in this manner, by changing the gap time when he knows that certain changes are coming which are related to operation of the associated rolling mill and which cannot reasonably be anticipated or programmed as part of a regular process control pattern for predicting the normal mill capacity or demand operational rolling times. In practice, the operator will not find it necessary to change this gap time very frequently. Actual desired changes may occur only a few times in an eight hour turn. In addition, failure by the furnace operator to properly utilize gap time settings in this manner does not materially affect the functioning of the bore described control system and method since there will still be provided heated slabs suitable for rolling in the associated rolling mill. This gap time corrects for errors in predicting $T_{CH}$ (rem), $T_H$ and $T_H$ (rem) based on an ideal mill cycle time for an average thickness slab in the theoretical control area of the furnace and the mill operating at optimum conditions of operation. The actual mill operation will probably be less than this optimum operation. The furnace operation, over a period of actual furnace operation, will be able to establish a workable guide chart of suitable gap times in relation to the movement of slabs through the furnace and the sizes of those slabs, to better determine what this gap time should be for a desired furnace operation and not result in objectionable hunting of the temperature control setpoints. Once a given furnace operation is properly tuned, and this is somewhat of a startup function, with gap times established in relation to the desired actual furnace operation, the adjustment of gap time thereafter should become rather infrequent.

In addition to the manual setting of gap time by the furnace operation, a computer determined gap time can be provided to be in relation to the actual slab movement through the furnace by a difference comparison between the mill capacity and the slab discharge rate, provided a known delay is not present. Also, another furnace malfunction indication that the computer can sense that this gap time should be adjusted is the occurrence of excessive changes such as 50° F., being scheduled by the heat control programs in the temperature control setpoints. The calculation of slab travel time in relation to the slab map and selection of a gap time as described above, specifically defines the time the entering slab is predicted to be in the various zones of the furnace.

The next step is to predict the various furnace zone temperature control setpoints. The predicted times and corresponding predicted temperature setpoints will produce a heated slab with the required heat content and temperature profile as it is discharged from the furnace. This assumes that conditions corresponding to these predicted values will be maintained as the entering slab moves through the furnace. While the slab progresses through the furnace, many deviations from the predicted times in the various zones may occur due to mill delays or changes in mill pacing. This deviation from the predicted values may be sufficient to require changes in zone setpoints. The provided control operation will evaluate changes in such conditions and adjust temperature control setpoints to achieve proper heating and desired heating of the slab.

In general the present control system and method are operative in relation to the determination of three selected travel times as predicted by the provided control model. These are (1) the travel time for a theoretical average thickness slab in the control area of the charge zone to move through a predetermined control portion of the charge zone of each furnace, (2) the travel time for the above slab to move through the total heat zone of each furnace and (3) the travel time for a theoretical average thickness in the control area of the heat zone to move through a predetermined control portion of the heat zone of each furnace.

The effect of deviation of predicted travel times from actual time due to mill pacing and due to delays when the slab heating operation is furnace limited, should be considered. If the associated rolling mill actual demand is such that the predicted time is too slow, for example the furnace gap time selection is set for too large a value, then the operation with respect to the rolling mill if it keeps proceeding in this manner will be limited by the available heated slab output of the furnaces. Also, if the predicted temperature setpoints corresponding to the predicted times are lower than required, unless furnace is already operating at capacity, then delays in the delivery of properly heated slabs to the associated rolling mill will occur due to insufficient heating. The control system and method will try to raise the provided temperature control setpoints, up to the limit of furnace capacity, but the correction may be starting from a lower level than that corresponding to the correct gap time. in this regard, the amount of setpoint correction necessary to compensate for incorrect gap time settings are normally small unless the gap time settings are considerably larger than they should be. The operator can quickly learn to avoid the latter settings as he observes the operation of the control system over a large range of heated slab production rates. When the operation does become furnace limited and results in insufficient heat content of a given slab, there can be provided an indicating light at the furnace operator's station to show this condition and it also is possible to incorporate into the overall control technique a delay of the next discharge of a slab until the desired heat content and other conditions are fulfilled, unless overriden by the furnace operator. Unless the furnaces are already operating at capacity, the corrections required for the furnace limiting conditions consist of increasing the temperature control setpoint and or decreasing the predicted time by making the furnace gap time smaller.

When the slab heating operation is rolling mill limited, if the actual rolling mill pacing is such that the predicted time is too fast, or the gap time is set too small, then the predicted temperature setpoints corresponding to the predicted slab travel times are higher than required. This results in the charge zone taking more of the total slab heating load than normally intended and larger deviations of the provided temperature setpoint in the charge zone. The corrections required for this condition are to lower the temperature control setpoint and/or increase the predicted time. The control system and method will lower the temperature setpoint but the correction starts from a higher travel than that corresponding to the correct gap time.

When there occurs unexpected delays in slab heating operation, these are related to unexpected interruptions in the flow of slabs from the combination of furnaces to the rolling mill which may arise due to troubles with the rolling mill or with the furnaces. The times involved for this type of delay may vary from a relatively short period to quite long periods depending upon the reason for the stoppage. When such an unexpected delay occurs, the control system keeps functioning to periodically update the change in heat content of each slab in the respective furnaces, and as the total heat content is gradually increasing, the control system will function to gradually reduce the zone temperature setpoints with the resultant gradual decrease in firing rates in relation to each slab being heated. After an unexpected delay occurs, the reason for the delay and the nature of the delay may require that a planned and related furnace delay control be initiated. This is desirable if a long delay is expected and a prediction can be made of the duration of that delay. During any type of delay, the control system keeps functioning to periodically update the heat content status of each slab in the respective furnaces, unless an indication is made that a given furnace will be out of service as compared to a delay in the process operation. When there occurs expected or planned delays in slab heating operation, the reason for these delays should be known and can be planned ahead in the provided furnace control schedule, such that furnace operation can be adjusted in anticipation of such a planned delay. A separate type of program is used to adjust the furnace operating conditions in relation to expected delays. The corrective action consists of lowering the zone temperature control setpoints on a predetermined functional basis related to the predicted length of the delay, also to hold these setpoints at predetermined minimums for exceedingly long delays and to re-establish proper temperature setpoints after the delay terminates. For the determination of zone temperature control setpoints, the mill pace calculation and the established gap time determine the time period that a given entering slab will be in each of the furnace heating control means. The total desired heat content $H_T$ for proper rolling of that slab must be attained in the slab before it enters the furnace soak zone, since it is assumed that the soak zone is not used to add any additional heat content but is used to equalize temperatures by redistributing the heat energy already in the slab. The total desired heat content $H_T$ for that slab is a precalculated and furnace operator supplied input value to be used as a reference for comparison to the calculated actual heat content $H_A$ contained in the slab before it enters the soak zone. The total desired heat content $H_T$ is used as a reference and is calculated from the known temperature rise of the slab necessary to attain proper rolling temperature, for example, 70° F. to 2350° F. With the times in the respective heating zones determined and with the total reference heat content $H_T$ known, the next step is to properly proportion the increments of heat added in the various zones of each furnace to attain the total reference heat content $H_T$, in accordance with the relationship $H_T = H_H + H_{CH}$, where $H_H =$ that portion of the heat control contributed by the heat zone and $H_{CH} =$ that portion contributed by the charge zone.

Figure 2:
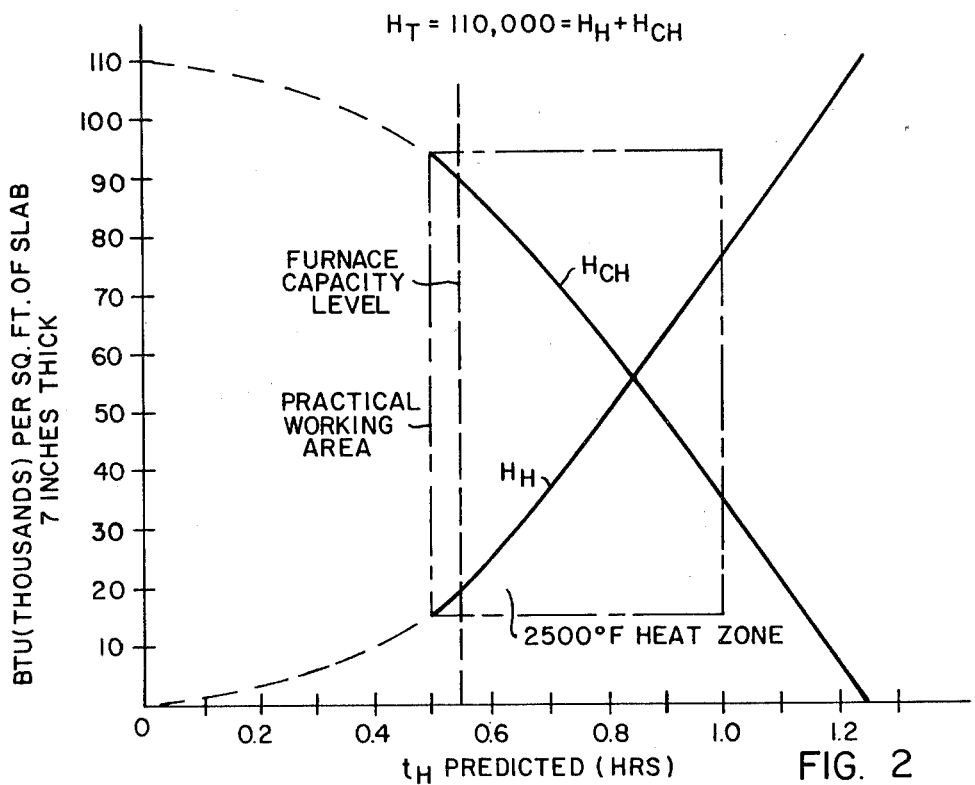
FIG. 2 is a curve plot showing the division of slab heating between the charge zone and the heat zone in relation to predicted travel time for an average seven inches thick slab in the theoretical control area of the furnace heat zone. This curve plot is used to determine the heat content $H_H$ supplied by the heat zone and the heat content $H_{CH}$ supplied by the charge zone to this average slab.

The desirable distribution of $H_H$ and $H_{CH}$ is to utilize the heat zone capacity at some predetermined percent of its maximum firing rate, and the $H_H$ corresponding to this, when subtracted from total heat content $H_T$ leaves the heat content $H_{CH}$ to be supplied by the charge zone. To obtain this desirable distribution, a curve such as shown in FIG. 2 is empirically established for each given slab thickness to show the value of $H_H$ corresponding to the predicted time in hours for the slab to travel through the heat zone and utilize the capacity of the heat zone at about 80% of its maximum rating. A considerable amount of empirically obtained basic data is required to determine the values of $H_H$ versus time shown in FIG. 2.

When the value of $H_{CH}$ is known from derived empirical information, such as illustrated by the curve of FIG. 2, it is possible to determine the present actual heat content for each slab in the map in the charge zone, and how much additional heat content $H_{CH}$ (needed) is still needed for that particular slab to attain a heat content value of $H_{CH}$ when that slab reaches the exit of the charge zone. This additional heat content needed will determine the required charge zone temperature control setpoint. The location of the slab or slabs in the theoretical control area chosen to determine the amount of heat which must be added and the related temperature setpoint is usually about one half way through the charge zone.

The periodic calculation and updating of the heat content of each slab in the furnace permits determination of the amount of heat content in the slab as it leaves the charge zone and as it enters the heat zone. This heat content is used as a basis for determining the amount of heat to be added in the heat zone $H_H$ (needed) during the time interval remaining in the heat zone, and the required temperature setpoint for the control of the heat zone is determined on this basis.

Similar updating calculations are made periodically for slabs entering the soak zone and some small adjustments of temperature setpoint can be made in the soak zone if necessary. However, the required heat content and surface temperatures are desired to be contained in the slab before it reaches the soak zone. The slab heating model and the furnace control model included in the overall process control system and method contain all of the necessary curves and equations, and so forth, to determine the desired slab heat contents and the temperature setpoints for the various furnace heating zones. These models may be readily modified as apparent to persons skilled in this art for the particular furnaces used in the slab heating process. In addition, the process control system and method have flexibility to perform optional functions where the slab heating process requires it, such as (1) Furnace temperature setpoints can be adjusted to compensate for differences in temperature which may be measured at preferred locations of the associated rolling mill. This requires reliable measurement of the slab surface temperature in the rolling mill location, and (2) Furnace temperature setpoints can be adjusted as a function of the grade of steel where temperatures can be related to grade, such as stainless steel versus low carbon grades, and so forth.

As stated previously, any changes in the temperature setpoints are based on: (1) Existing heat contents of each slab in furnace map as periodically updated, (2) Predicted time for entering slabs to travel through the furnace based on estimates of mill rolling time and a gap time which can be varied by the furnace operator. If each slab moved through the furnace at a rate corresponding to the predicted time intervals remaining in the various zones, then the predicted and actual conditions of heating zone temperatures would be the same and no alteration from predicted values would be required. However, actual conditions may or may not correspond to predicted conditions. Also independent of predicted values, the actual updated picture of the heat content of each slab as it progresses through the furnaces is required in order to make the correct operating decisions. The process control system and method analyzes conditions before each slab discharge, and based on the updated information corresponding to actual conditions, makes decisions and dictates actions related to the following considerations; (1) A predetermined and sufficient time is desired for each slab to remain in the soak zone, (2) The heat content of each slab at end of the heat zone and before entering the soak zone should be at a desired reference level to produce a heated slab suitable for rolling, and (3) The predicted times for each slab remaining in the charge zone and each slab remaining in the heat zone and the actual updated heat contents of slabs at certain key locations should determine any change as needed in the respective temperature setpoints.

DETAILED DESCRIPTION OF A PREFERRED EMBODIMENT

Referring now to FIG. 1 a five zone slab reheat furnace 10 is shown having three control zones designated as the charge zone 12, the heat zone 14, and the soak zone 16. A slab enters at the charge zone 12 and moves in the direction of the arrow until it is ultimately discharged at the exit of the soak zone 16 at a predetermined and desired heat content and surface temperature. There are a plurality of slabs 18 in the furnace at any given time, as generally shown, which travel at the same rate through the furnace although this rate may change from time to time depending on conditions to be discussed later. As any particular slab passes through the series of controlled heating zones, its ultimate heat content will depend upon the time spent in each such zone and the temperature setpoint for that zone. Most modern furnaces permit the varying of temperature and heating rates within a given heating zone thus causing the heat content supplied to a slab traveling through that zone to be related to both the speed of travel of that slab through that zone as well as the effective furnace temperature of that heating zone.

A process control computer 20 is utilized to monitor and control the slab heating furnace operation in accordance with predetermined operating characteristics and adaptive techniques to provide a desired heat content, desired surface temperature and predetermined time in the soak zone for each slab discharged from the furnace. A number of conventional analog input-output devices provide communication between each controlled furnace and the process control computer 20. The signals from all the analog input devices are converted through suitable analog to digital converters for use in the process control computer 20 and all digital output signals from the process control computer 20 are converted through suitable digital to analog converters to provide a proper and desired operation for each slab heating furnace.

A slab movement device 22, such as a well known pusher mechanism, is positioned at the entry of the furnace to move the slabs through the furnace at a rate determined by the process control computer 20. Temperature sensors 24 are provided respectively in the upper and lower portions of the charge zone for sensing the effective furnace temperature and temperature feedback signals to the process control computer 20 which are indicative of the respective upper and lower effective furnace temperatures of the charge zone 12. Furnace heating is provided by well known burners 26 which are oriented in the charge zone 12 to pass the resulting hot gases in a direction opposite to that of the slab movement. The heat zone 14 of the furnace similarly has temperature sensors 28 in both the upper and lower portion of the heat zone 14 of the furnace and burners 30 to provide heat to the respective upper and lower portions of the heat zone. The final zone or "soak" zone 16 has a set of burners 32 in the upper portion of the soak zone and a temperature sensor 34 for sensing the effective temperature and providing a corresponding feedback signal to the process control computer 20.

The temperature control for each of the respective heating zones in the furnace is by respective temperature controllers which provide a reference temperature setpoint relative to each individual heating zone in accordance with the slab heat content required in that particular heating zone of the furnace. Thusly, the charge zone has a temperature controller 36 to determine the effective furnace temperature in the upper portion of the charge zone 12 and a temperature controller 38 similarly operative with the lower portion of the charge zone 12. The heat zone has temperature controllers 40 and 42 operative with the respective upper and lower portions of the heat zone 14. The soak zone 16 has a temperature controller 44 for controlling the effective furnace temperature of the heat zone 16. A temperature detector 46 is provided at the exit of the furnace and may be positioned after a chosen stand of the rolling mill to provide an indication of the surface temperature of the slab as the slab is being rolled by the rolling mill.

The process control computer 20 is operative to output the determined temperature setpoint references to the primary furnace control instrumentation system, i.e. the respective heating zone temperature controllers. One way of doing this, for example, is to have each temperature setpoint reference from the process control computer 20 transmitted by timed closure of suitable contacts for each setpoint position of a respective temperature controller. In this case two different sets of contacts would be required for each heating zone temperature controller, with a first set of contacts to raise the temperature setpoint and a second set of contacts to lower the temperature setpoint. Selected contact closure of the proper duration would energize a reversible stepping motor in the controller to establish the desired setpoint setting, with the contact selection and duration of closure determined by the process control computer 20.

The computer is operative with the mathematical model to change setpoints of the temperature controllers to make decisions as to changing temperature of the respective heating zones of the furnace in relation to such conditions as changes in the slab map as to width, thickness, and so forth, and changes in the rate at which slabs are moving through the furnace as influenced by the demands of the rolling mill for slabs, mill delays, and the like.

Figure 5:
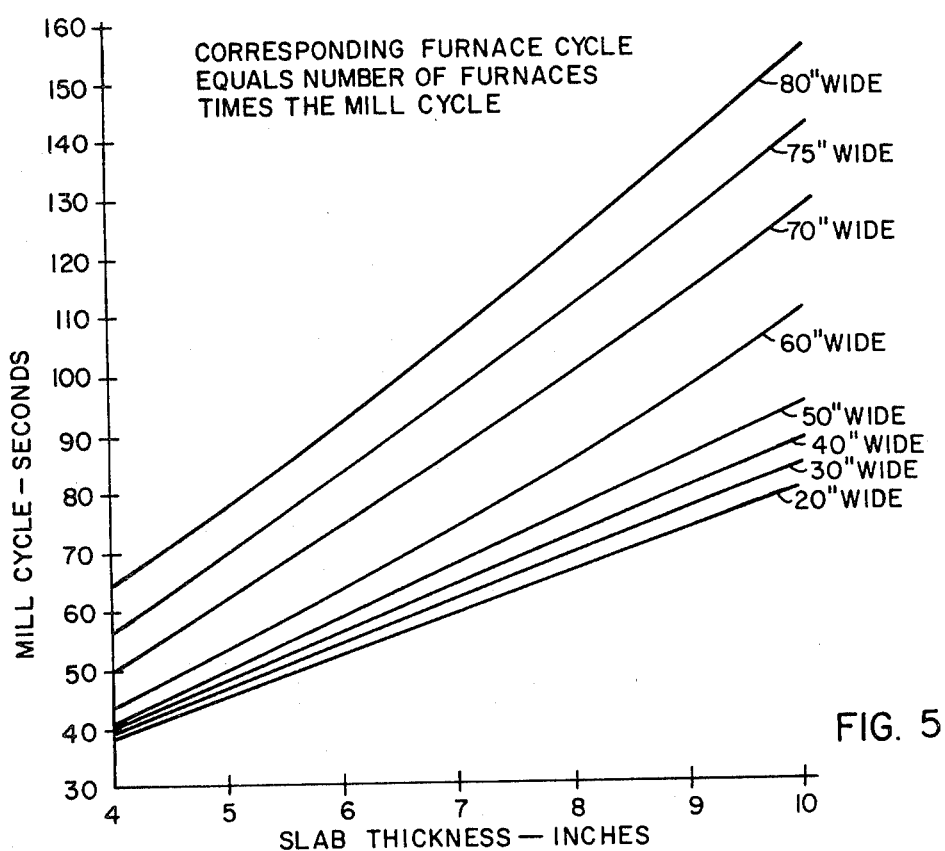
FIG. 5 is a composite curve showing of the operational characteristics for a typical 80 inch modern hot strip mill. The curve is used to determine the average rolling mill cycle time interval between the demands for heated slabs and is related to the capacity of the rolling mill to handle heated slabs at this rate.

The curve plot shown in FIG. 5 is used to determine the predicted time required in the furnace for slabs to be delivered to meet the rolling mill demands as related to the operating characteristics of the particular associated rolling mill, with the rolling mill capacity, and the rolling mill pacing being some of the factors involved. A typical rolling time interval curve for a modern 80 inch hot strip mill is shown in FIG. 5. The average time interval between delivery of the average slab is derived from this curve and is related to the capacity of the rolling mill to handle slabs at this rate. In utilizing the information obtained from the curve of FIG. 5, the slab map of the furnace is surveyed by the process control computer, and the thickness of each slab in a given furnace is added together and this sum is divided by the number of slabs in the furnace in order to obtain the average slab thickness to be used in relation to the curve of FIG. 5. The width of each slab in the same furnace is added together and this sum is divided by the number of slabs in the furnace in order to obtain the average slab width to be used in relation to the curve of FIG. 5. The average mill cycle per slab is then obtained from the curve. This represents the time interval for the associated rolling mill to receive and roll successive average slabs, when the rolling mill is operated at its design capacity, and this is the same as the time interval between discharge of each slab from the combination of the furnaces. When the mill is operating near its design capacity, the ability of the furnaces to feed the rolling mill at this rate may be limited by the furnace capacity to provide properly heated slabs, for example, the new 80 inch hot strip rolling mills which are supplied by a combination of three furnaces rated at a nominal 250 tons per hour may be furnace limited on the wider or on the thicker slabs such as 60 inches wide or wider and 8 inches thick or thicker. In order to compensate for this and other unusual operating conditions, the predicted time interval between each discharge of the average slab from the combination of furnaces as determined from the curve of FIG. 5 can be altered by the use of an operator setting device which can be used to adjust and vary when necessary, the gap time between successive slab discharges from each of the furnaces. With this operator setting device, the predicted time for discharge of a heated slab from each furnace can be brought more in line with actual process operational conditions when these conditions are known by the experience of the operator to be considerably off normal. As explained previously, this gap time can also be adjusted by the computer being programmed to adjust this gap time setting to correspond to the sensed process operation conditions. It should be here noted that the predicted time and added interval of gap time are numerical values used in determining the travel time of each slab through a furnace. The actual slab discharges from the furnace may take place on demand by the rolling mill, unless the furnace operator intervenes, or unless the control method is set up to prevent discharge of a slab until the desired heat content is obtained. The sum of the predicted time as determined by the demand of the associated rolling mill and obtained form the curve of FIG. 5 and the gap time setting by the operator or computer represents the predicted time between successive discharges of the average slab from the combination of furnaces to the mill, and each furnace would have a predicted slab travel time as determined by the number of furnaces in operation.

To further illustrate this determination of predicted slab travel time through a furnace, assume for purpose of example, that three pusher type furnaces are feeding heated slabs to the rolling mill, and the average width of the slabs in a given furnace is 55 inches and the average thickness is 7 inches. The curve of FIG. 5 indicates a rolling mill cycle of 70 seconds between these successive slabs being delivered to the rolling mill. If three furnaces are operating, then each furnace would be required to deliver such a slab every 210 seconds. The operator may, for example, set a gap time in the order of 10 seconds in addition to the rolling mill cycle time of 30 additional seconds in addition to the furnace cycle time per slab from each furnace when using three furnaces. The time between discharge of each slab from a given furnace is then predicted to be 240 seconds. Also, assuming a five heating zone pusher type furnace with an effective hearth length of 111 feet, then the velocity of the average 55 inch wide slab through this furnace, based upon discharging a heated slab from the furnace every 240 seconds, is 68.8 feet per hour. The furnace capacity level to provide properly heated slabs as shown by FIG. 2 for an average 7 inches thick slab would appear to be limited to 61.2 feet per hour, which corresponds to a slab discharge rate of 269 seconds for each slab from the furnace if slabs are 55 inches wide or 89.3 seconds per slab to the rolling mill when using three furnaces. Thusly, in this example, the predicted time based on the rolling mill capacity is such that furnace capacity is exceeded, and if heated slabs are discharged at a rate corresponding to this rolling mill capacity for the same average size of slab, the present control system and method including the programmed slab model and furnace control model will indicate after some elapsed time that slabs are not being heated to rolling temperature with the furnaces operating at their capacity and that the actual discharge rates will have to be reduced to match the furnace capacity in order to have the slabs heated sufficiently. The provided control programs can indicate when the slabs in a given furnace do not have sufficient heat content and a discharge of those slabs can be prevented either directly or by alarming the operator to take appropriate action. The reason for using a calculated predicted time which can be readily adjusted by the furnace operator gap time setting will become more apparent as further steps in the operation of the present control system and method are described. If the rolling mill cycle plus the operator established gap time setting varies considerably from the actual available furnace capacity, either above or below the normal rating of the furnace, then the output temperature control setpoints will vary over a wider range around the desired temperature setpoint which corresponds to the actual operational conditions. These output changes above and below the actual desired temperature setpoint can be narrowed down to relatively small amounts by adjustment of this operator provided gap time. In other words, even though the predicted times may for one reason or another depart considerably from the actual time required corresponding to the existing furnace operating condition, the control programs will function to indicate the temperature setpoint required, but variations above and below this setpoint can be minimized by adjusting gap times corresponding to conditions reasonably within the capability of the furnace. In general, wide departures of predicted time from the actual time occur when the mill cycle based on mill capacity exceeds the available furnace capacity. This occurs on the wider, thicker slabs where existing installed furnace capacity is limited compared to the possible installed mill capacity. It should also be noted, that mill capacity is an ideal condition figure and many variations in everyday practical operation related to expected and unexpected mill delays reduce the ideal mill capacity to levels where the existing and installed furnace capacity can better meet the demands of the rolling mill.

Figure 6:
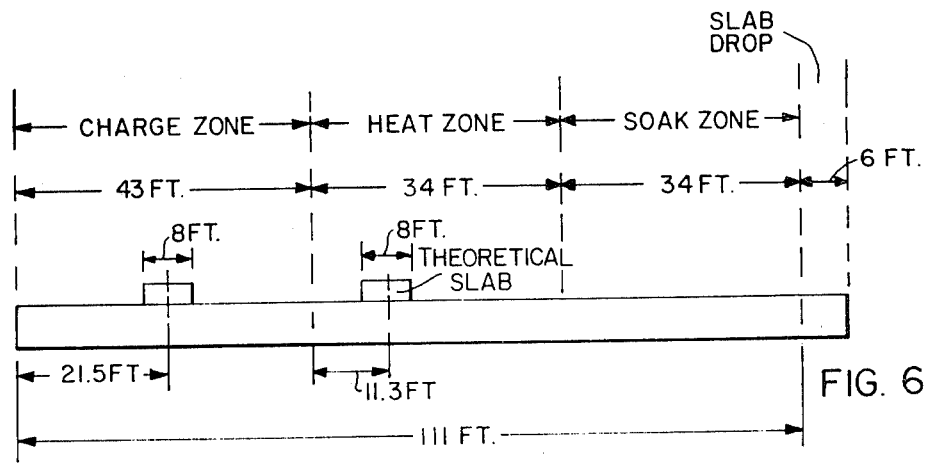
FIG. 6 is a schematic showing of the typical layout of a slab heating furnace including three controlled heating zones.

For determining the heat content of the average slab corresponding to predicted time of that slab in a particular heating zone of the furnace, the predicted mill cycle time plus gap time previously set by the operator can be used to calculate the amount of time required to move a given slab through the heat zone 14 of the furnace. A schematic showing of the principal dimensions of a typical five zone pusher type slab heating furnace is shown in FIG. 6, with the dimensions being typical so these dimensions will be used in the following example. If the average slab, as available from the furnace slab map, is 48" wide and 7" thick and of sufficient length to cover about 85 percent of the furnace hearth, then from the curve on mill cycle time shown in FIG. 5, it can be determined that the rolling mill could roll this slab at a rate of one slab about every 66 seconds. With a combination of three furnaces in operation, this corresponds to 198 seconds of slab heating time per furnace. If the furnace operator sets the gap time per furnace to 42 seconds, or 14.0 seconds per slab discharged to the rolling mill, this gives the value of 198 second plus 42 seconds or 240 seconds for each furnace cycle time and this gives 80 seconds per slab discharge to the rolling mill with three furnaces in operation, because this time interval is necessary to stay within the limits of normal furnace capacity. With 240 seconds per slab and a slab width of 4 feet, the average rate of slab movement through the furnace if 60 feet per hour. Since the furnace heat zone length is 34 feet, as shown in FIG. 6, this gives the predicted total slab travel time $t_H$ in the heat zone of 0.57 hours. From the curve plot of FIG. 2, the total amount of heat $H_H$ added in the heat zone for a predicted time $t_H$ of 0.57 hours is approximately 21000 B.T.U. per square foot of slab and corresponding to this, the total heat content which must be added in the charge zone $H_{CH}$ is approximately 89000 B.T.U. per square foot of slab. This is assuming for this example that $H_H$ plus $H_{HC}$=110,000 B.T.U. per square foot of slab, which corresponds to the predetermined desired total heat content $H_T$ of the average 7 inches thick slab before the slab enters the soak zone of the furnace. This heat content $H_T$ would be such that the slab has attained an average temperature of 2300° F. which should be suitable for rolling in the associated rolling mill. The values shown in FIG. 2 are based on utilizing the heat zone at about 80% of its maximum capacity and at an operating temperature of 2500° F. for the furnace of this example. The heat zone is maintained at this capacity for maximum efficiency in utilization of fuel, and the remaining desired heat content required in the slab will be added by the charge zone, with the effective furnace temperature of the charge zone being controlled over the range necessary to do this up to that corresponding to the maximum permissible charge zone temperature for the particular furnace involved.

The determination of temperature setpoint in the charge zone of the furnace is in relation to a theoretical average 7 inches thick slab in the theoretical control slab area of the charge zone. In order to determine a desired change in the controller temperature setpoint of the charge zone, it is necessary to evaluate the heat content status of a selected theoretical control slab at some predetermined location part way through the charge zone, and compare this with the desired heat content required when the slab leaves the charge zone. The theoretical control slab location and composite width of this theoretical control slab is defined in this example as 96" wide and the center line of this theoretical control slab is located on half way through the charge zone as shown in FIG. 6. The determination of the time remaining for this theoretical control slab to reach the exit of the charge zone is based on the velocity of the slab movement previously determined, and specifically in this example the time remaining $t_{CH}$ equals about 0.72 hours, based on a velocity of 60 feet per hour and on a length of charge zone of 43 feet. Thusly, the time remaining $t_{CH}$ (remaining) for the theoretical control slab to travel from a halfway point in the charge zone to the exit of the charge zone is 0.36 hours. To determine the remaining heat content $H_{CH}$ (needed) which must be added to the heat content currently existing in the theoretical control slab in order to reach the required reference value of heat content $H_{CH}$ of the slab as it exits from the charge zone, it is first necessary to determine the heat content currently existing in the theoretical control slab, which is the periodically calculated heat content value stored in the slab map of the furnace and obtained by the Schmidt method to be later described. This in turn is based on the sensed effective furnace temperatures and the actual elapsed time that the slab has been in the furnace up to the location of the theoretical control slab area. For example, if the heat content calculation indicates that the heat content of the theoretical control slab at its location is 50,000 B.T.U. per square foot of slab, then the $H_{CH}$ (needed) is 89,000 minus 50,000 or 39,000 B.T.U. per square foot of slab. By now going to the curve plot in FIG. 3 for $H_{CH}$ (needed) of 39,000 B.T.U. per square foot of slab and for the time remaining $t_{CH}$ (rem) in the charge zone of 0.36 hours, this determines the temperature control setpoint for the charge zone to be 2450° F.

To illustrate the effect of a delay, suppose the theoretical control slab described above does not keep moving due to a delay in the operation of the associated rolling mill, and during the delay period the updated heat content calculation becomes 61,000 B.T.U. per square foot of slab. The predicted time $t_{CH}$ (rem) has not changed and the required heat content $H_{CH}$ of 89,000 B.T.U. per square foot of slab at the exit of the charge zone has not changed. The value of $H_{CH}$ (needed) becomes 89,000−61,000 or 28,000 B.T.U. per square foot of slab, and the time remaining $t_{CH}$ (rem) is unchanged at 0.36 hours. Referring again to the curve of FIG. 3, the new required temperature setpoint is now approximately 2400° F. If the delay would continue, the heat content of the theoretical control slab at this location in the charge zone would increase, and the resulting temperature setpoint required for the charge zone would gradually decrease with this trend reversing after the slabs started moving again at the end of the delay period.

Figure 4:
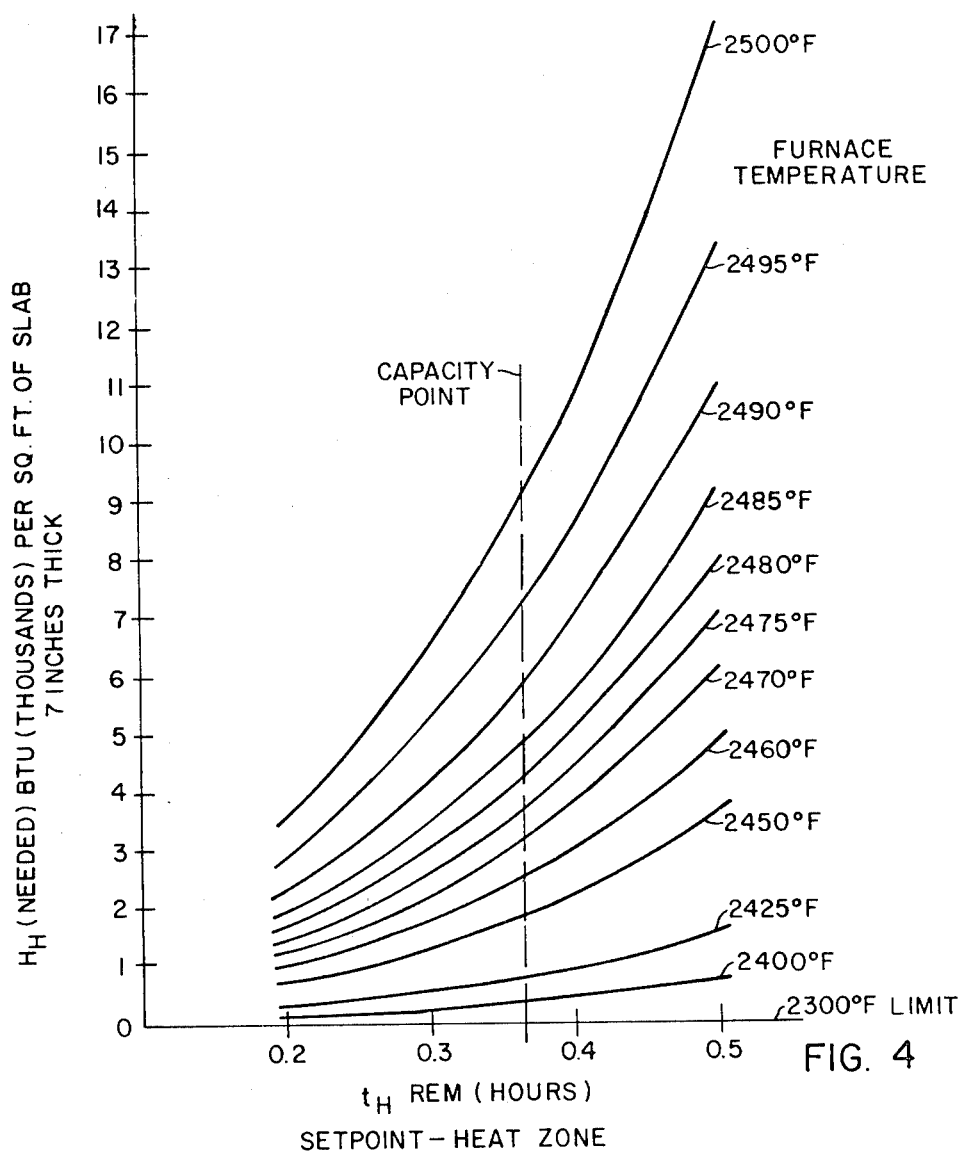
FIG. 4 is a curve plot showing the heat content that is still needed for an average seven inches thick slab in the theoretical control area of the furnace heat zone in relation to the predicted time remaining for that slab in the heat zone. This curve plot is used to determine the temperature setpoint for the heat zone.

In relation to the curve plot shown in FIG. 4, and for the determination of temperature setpoints in the heat zone of each furnace, it is desired to control the slab heating operation in relation to the location of theoretical control slab in the heat zone of the furnace. Similar to the heat control operation for the charge zone, it is necessary to evaluate the heat content status of the theoretical control slab some predetermined location in the heat zone and compare this with the heat content required when the slab leaves the heat zone. When this slab arrives at the exit of the heat zone, it should contain the required heat content $H_H$ before entering the soak zone, since very little heat energy is to be added in the soak zone. The location and average width of a theoretical control slab is defined in this example as 96" wide and the center line of this control slab is located one third of the way through the heat zone, as shown in FIG. 6. The time remaining $t_H$ (rem) for the control slab in the control area of the heat zone to reach the exit of the heat zone is based on the velocity of the slab movement as previously determined. Specifically, in this example the remaining time in the heat zone $t_H$ (rem) equals about 0.57 hours, based on a slab velocity of 60 feet per hour and on a length of the heat zone of 34 feet. Thusly, the time remaining $t_H$ (rem) for the control slab to travel from one third of the way in the heat zone to the end of the heat zone is 0.38 hours. For determining the remaining heat content $H_H$ (needed) which must be added to the heat content currently existing in the theoretical control slab in order to reach the required reference value of heat content $H_T$ of the slab as it exits from the heat zone, the heat content currently existing in the theoretical control slab is the calculated value obtained by the Schmidt method to be subsequently described, which in turn is based on the sensed effective furnace temperatures and the actual elapsed time that this slab has been in the furnace up to the location of the theoretical control slab area in the heat zone. Assuming that the latter calculation indicates that the heat content of the theoretical control slab is 104,000 B.T.U. per square foot of slab, and the required heat content at the exit of the heat zone is 110,000 B.T.U. per square foot of slab, then $H_H$ (needed) is 110,000 minus 104,000 or 6000

B.T.U. per square foot of slab. From the curve of FIG. 4, for $t_H$ (rem) of 0.38 hours and $H_H$ (needed) of 6000 B.T.U. per square foot of slab, the temperature control setpoint for the heat zone is approximately 2490° F. Continuing the example, suppose that the control slab at its location one third of the way through the heat zone is stopped for a time period due to a delay in the delivery of heated slabs to the rolling mill; while in this position and during this delay, the updated heat content calculation gives a result of 108,000 B.T.U. per square foot of slab. The predicted time remaining in the heat zone has not changed, so the $t_H$ (rem) is still 0.38 hours, and the required total heat content $H_T$ of 110,000 B.T.U. per square foot of slab has not changed, and therefore $H_H$ needed is now 110,000 minus 108,000 or 2000 B.T.U. per square foot of slab. From the curve plot of FIG. 4, the temperature setpoint for the heat zone is now determined to be a new value of approximately 2450° F. If the delay would continue, the heat content of the slab at this location would increase and the resulting setpoint would gradually decrease to a lower level, with this trend reversing as soon as the slabs started moving again at the end of the delay period.

Figure 3:
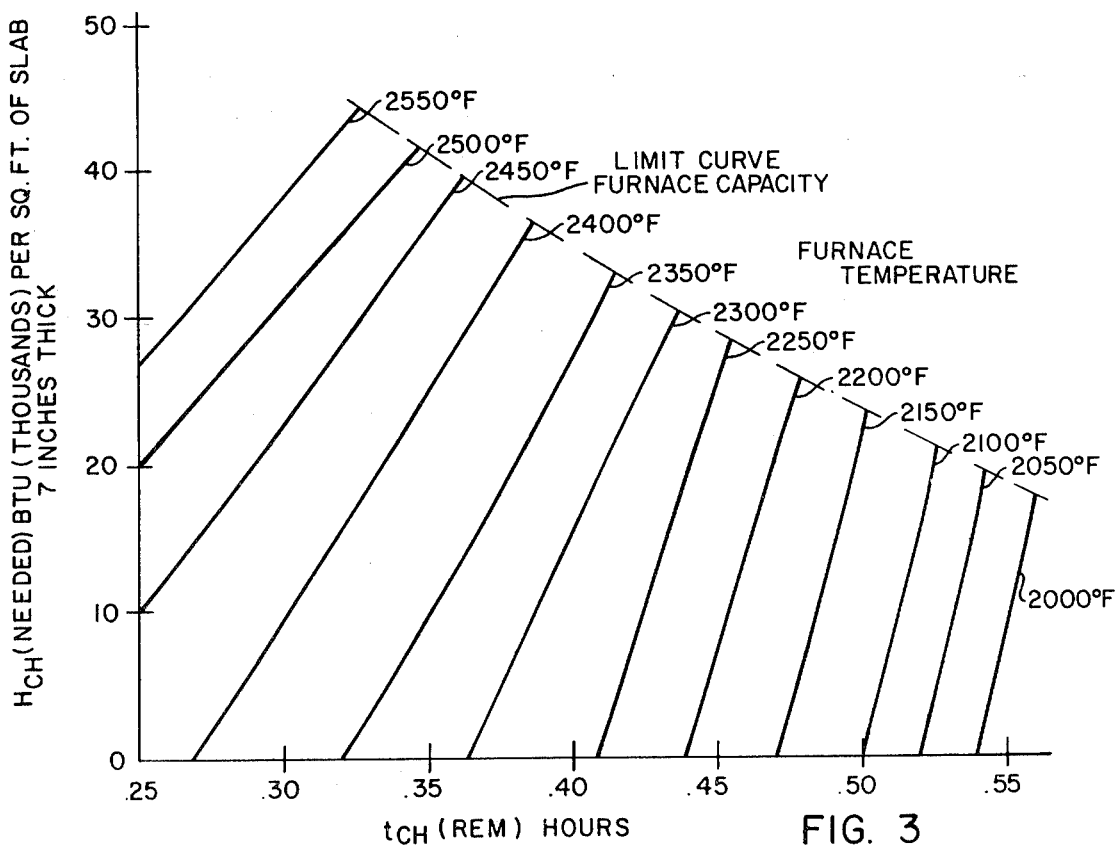
FIG. 3 is a curve plot showing that heat content that is still needed for an average seven inches thick slab in the theoretical control area of the furnace charge zone in relation to the predicted time remaining for that slab in the charge zone. This curve plot is used to determine the temperature setpoint for the charge zone.

Thusly, for determining changes in temperature setpoints, the three curve plots as shown in FIG. 2, FIG. 3 and FIG. 4 are used in relation to each other to determine the changes in the required temperature setpoints as furnace operating conditions vary. The curves shown are typical of those which are incorporated into the illustrated instruction program listing shown in Appendix A and the associated data files shown in Appendix B, and similar curves are derived for each incremental average control slab thickness using one inch steps, with the process control computer programs being operative to extrapolate the desired values in between these one inch steps of thickness. The derivation of each of these curve plots for any given thickness involves a substantial amount of empirical data analysis of monitored changes in the heat content of typical slabs being heated, and in general, the information contained in these curve plots is generated from a key family of curves for each slab thickness which shows the heat content of the slab as a function of time and effective furnace temperature, with a typical set of the latter family of curves being shown in FIG. 7. The heat content curves are generated from known time and temperature relationships established in relation to scheduled incremental changes in slab temperature profiles with time for various effective furnace temperature conditions. These studies were empirically made in various ways, such as the application of the Schmidt method to be later described, and the results were checked against actual operational data and actual heating rates which were obtained in the operation of actual furnaces such that the overall slab heating results provided by the present control system and method are known to be in line with actual furnace operating experience. Once the here described control programs are generated and applied to a given slab heating furnace system, the provided results can be altered if desired to fit actual performance of that furnace system by applying a readily established factor of correction to the key curves, for example, the results from the curve plots shown in FIG. 2, FIG. 3 and FIG. 4 could be multiplied by an operator supplied factor "f" equal to 0.998 or 1.002, to bring the predicted temperature setpoint values in line with the actual operating slab heating furnace practice and to correct where necessary any slight differences in the operation of individual furnaces to be controlled.

DESCRIPTION OF SCHMIDT METHOD OF DETERMINING THE HEAT CONTENT OF EACH SLAB AS IT MOVES THROUGH THE FURNACE

The making of decisions to change the control temperature setpoints depends upon the determination of the heat content of each slab in a given furnace as related to time in that furnace and the sensed effective furnace temperature as the slab moves through the respective heating zones of that furnace. The method employed for this determination based on the algebraic equivalent of a graphical method known as the Schmidt method, which graphical method was developed by E. Schmidt, as described in the publication by A Foppls Festschrift, p. 179, J. Springer, Berlin, in 1924. A detailed fundamental description of the method is given in the publication Industrial Furnaces, Vol. I., Appendix I, by W. Trinks, John Wiley & Sons, New York. The method of determining the heat content of a workpiece positioned within a heating zone suitable for use with the present control system and method is not intended to be limited to the Schmidt method here described. If desired, a more sophisticated differential equation approach may be preferred, or any other well known analytical method of determining the time versus heat content relationship of a workpiece positioned within such a heating zone.

The here described method as applied specifically to slab heating is operative such that at any given point in time, "t", the incremental heat added to the slab in the time interval "Dt" is related to the following:

(a) TF(°F.); the surrounding and effective furnace temperature which radiates heat to the slab.

(b) TS(°F.); the surface temperature of the slab.

(c) C. (B.T.U., FT., Thick/°F., sq. ft., hr.); the thermal conductivity of the slab material, which varies with the temperature of the slab.

(d) CM (B.T.U./lb., °F.); the specific heat of the slab material, which varies with the temperature of the slab.

(e) kT (B.T.U./sq. ft., hr., °F.); the instantaneous overall heat transfer coefficient, which measures the rate of heat transmission between the furnace and the surface of the slab. This coefficient is defined as a direct relationship between the temperature difference between the effective furnace temperature TF and the slab surface temperature TS; whereas the actual rate of heat transfer which is practically all by radiation, and is a function of the difference between the fourth power of the absolute temperature of the furnace and the fourth power of the absolute temperature of the slab surface. This heat transfer coefficient kT is a derived value, and depends upon the heat transferred by radiation and it changes with the furnace temperature and the slab surface temperature. The concept of kT as an overall heat transfer coefficient is necessary to establish and utilize key points in calculations of heat content with the Schmidt method.

Other nomenclature used when carrying-out the calculations is summarized as follows.

Q (lbs./ft.$^3$) density of slab material, and is assumed to be constant as slab is heated.

L (Ft.) is ½ of the slab thickness.

DS(Ft.) is the width of each lamina into which the slab is divided. For good accuracy, the ½ slab is divided into at least 4 lamina as indicated in FIG. 8.

TS(KN)°F. represents the surface temperature of the slab in the new temperature profile "N" at the end of time increment Dt. For example, TS (K1) is the surface temperature for profile "1", and so forth.

T(KM,I)°F. is the designation for a particular temperature in the new temperature profile at the end of time increment Dt., where $t_1$ = total elapsed time in hours which established the previous profile and $t_2$ = total elapsed time in hours to establish the next profile and Dt=$t_2 - t_1$. The subscript "KN" represents a particular profile and the subscript "I" represents the location of the temperature point in the profile. For example, T(KO,O) means that "KO" portion of the subscript represents the temperature in the initial profile "O", and the "O" portion of the subscript represents the location at lamina boundary "O". The lamina boundaries are shown in FIG. 8. T(KO,1) represents the temperature in the initial profile "O" at lamina location "1". T(K1,O) represents the temperature of profile "1" at lamina location "O". T(K1,1) represents the temperature of profile "1" at lamina "1". T(K1,2) represents the temperature of profile "1" at lamina location 2. T(K100,4) represents the temperature of profile "100" at lamina location 4, and so forth. Information for each new temperature profile corresponding to the passage of time increment "Dt" is based on the previous profile. The various steps to be followed and the relationships used to establish the heat content for a particular temperature profile are shown in detail by the following examples. The pattern of the calculations shown is the basis for the slab heat model program which is used to update the heat content status of each slab in the furnace as time elapses and as the slabs are moved through the furnace.

Figure 8:
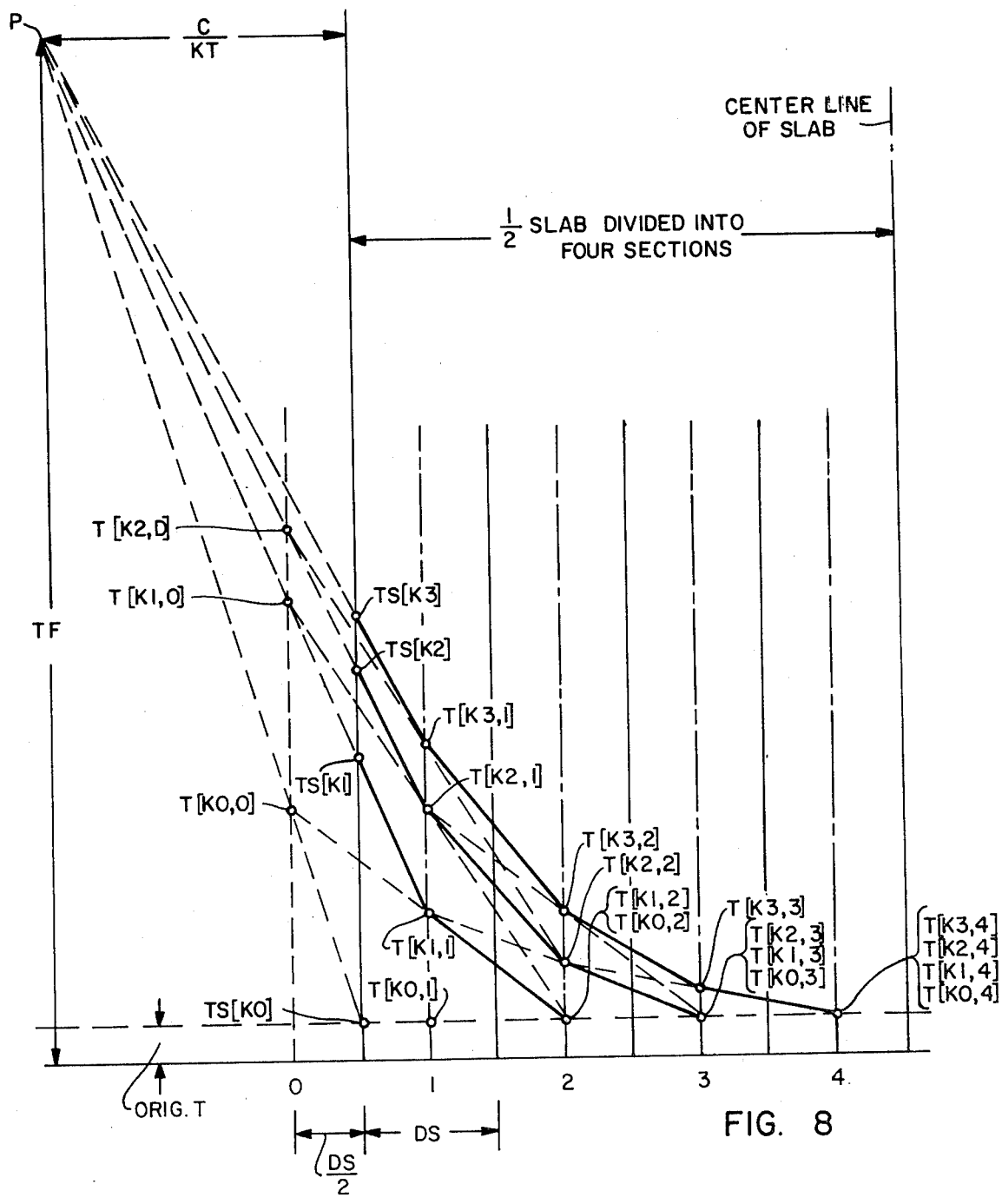
FIG. 8 is a curve plot to illustrate the Schmidt method of determining the heat content of a slab in relation to time and effective furnace temperature as the slab moves through a furnace.

For the calculation of profile "KO", and in reference to FIG. 8, the first step is to determine the profile interrupt $$T(K0,0) = \frac{(TF - \text{orig } T)}{M}\left(\frac{DS}{2}\right) + \text{orig. } T.$$

which equation is derived from the geometry of similar triangles shown graphically in FIG. 8.

Figure 9:
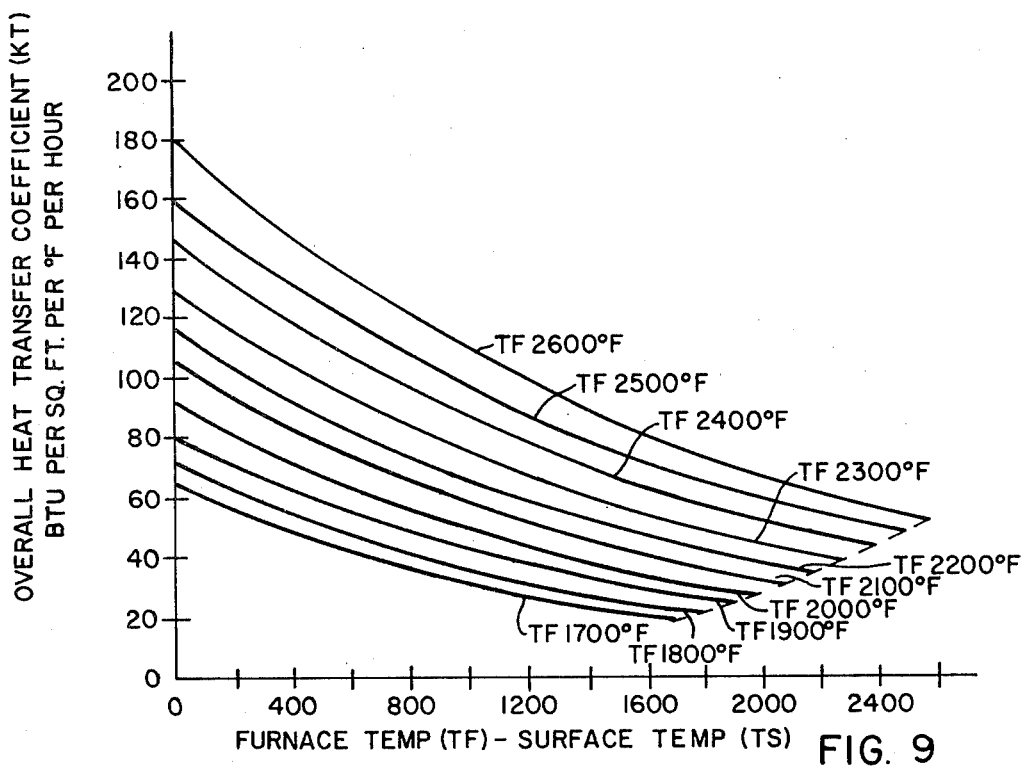
FIG. 9 is a curve plot to illustrate the variation in heat transfer to the surface of a slab as it travels through a furnace.

M=C/kT; C=33−0.01TS(K,O); TS(K,))=50° F.
Orig T=50° F.; DS/2=0.0363 ft.
C=32.5; kT=30.7 from FIG. 9, showing kT values for various effective furnace temperatures and temperature differences between furnace and slab surface.

TF=effective temperature for radiation of heat to slab at entrance section to furnace. In this example TF=2040° F.; the heating zone temperature controller setpoint is set for 2500° F., but the effective furnace temperature is lower at the entering area. TF varies to indicate changes in the temperature profile of the effective furnace temperature in the area where the slab is located in the furnace, and as the slab moves further, the effective furnace temperature will approximately equal the setting of the temperature setpoint supplied to the controller.

$$T(K0,0) = \frac{(2040 - 50)}{1.06}.0363 + 50 = 118.2° F.$$

$$TS(K0) = 50° F.$$

$$T(K1,1) = \frac{T(K0,0) + T(K0,2)}{2} = 84.1° F.$$

Note that T(K1,1) is a point or profile "K1" which is derived from information available from profile "KO".
T(KO,1)=orig T=50° F.
T(KO,2)=orig T=50° F.
T(KO,3)=orig T=50° F.
T(KO,4)=orig T=50° F.

Note that profile "KO" is in reality the original temperature profile of the slab before heat is applied and the calculation of T(KO,O) is a necessary construction point to derive a point on the first temperature profile "K1". In other words, lamina location point "O" is a fictitious ½ lamina DS/2 extending beyond the actual slab surface. The various intercepts on lamina location point "O" are all necessary points used to determine the intercept of the succeeding temperature profile point on lamina "1".

The second step is the calculation of profile "K1" as follows:

(a) Calculate T(K1,1) from information calculated above for Profile "KO".

$$T(K1,1) = \frac{T(K0,0) + T(K0,2)}{2} = 84.1° F.$$

(b) Calculate TS(K1) TS(K1)=TF−GM, with this equation being derived from the geometry of similar triangles shown in FIG. 8.

$$G = \frac{TF - T(K1,1)}{M + \frac{DS}{2}}; M = \frac{C}{kT}$$

C=33−0.01TS(KO)=33−0.01×50=32.5
kT=30.7, as obtained from FIG. 9 showing the kT valus.

$$M = \frac{32.5}{30.7} = 1.06; \frac{DS}{2} = .0363 \text{ ft.}$$

$$G = \frac{2040 - 84.1}{1.06 + 1.0363} = 1782$$

TS(K1)=2040−1782×1.06=150° F.
(c) Calculation of T(K1,0)

T(K1,0)=TF−G(M−DS/2)

It should be noted that this equation is derived from the geometry of similar triangles as shown graphically in FIG. 8.
M=C/kT;       C=33−0.01TS(K1)
 C=33−0.01×150=31.5
kT=32.2 from FIG. 9, showing kT values
M=(31.5/32.2)=0.978

$$G = \frac{TF - T(K1,1)}{M + \frac{DS}{2}} = \frac{2040 - 84.1}{.978 + .0363} = 1928$$

T(K1,0)=2040−1928 (0.978−0.0363)=224° F.
(d) Calculation of Remaining Profile "K1"

$$T(K1,2) = \frac{T(K0,3) + T(K0,1)}{2}$$

$$= \frac{50 + 50}{2} = 50° \text{ F.}$$

$$T(K1,3) = \frac{T(K0,2) + T(K0,4)}{2}$$

$$= \frac{50 + 50}{2} = 50° \text{ F.}$$

T(K1,4)=T(K0,3)=50° F.
(e) Summary of "K1" profile
  TS(K1)=150° F.
  T(K1,1)=84.1° F.
  TS(K1,2)=50° F.
  T(K1,3)=50° F.
  T(K1,4)=50° F.
(f) Calculation of Dt; the time intervals at which the temperature points on the profile are attained.

Dt=0.5(DS)² Q(CM)/2

The time interval Dt required for a given point on an existing temperature profile to reach the new temperature at the same corresponding point (at the same location of slab) can be calculated from the above Equation shown for Dt. It should be noted that the time interval is dependent upon the specific heat and the thermal conductivity of the material, both of which vary with the temperature of the slab. For this reason the time interval Dt required to establish new points on the temperature profile is a variable and the new updated profile calculated does not represent this profile was attained with a common time interval. This does not cause any problem in interpreting the result of an updated heat content calculation, since the time at which the surface temperature reaches its new calculated value is the value used for measuring elapsed time, because the calculation of heat transferred into slab is calculated from the change in surface temperature rather than using temperature changes inside the slab. The time interval Dt required to raise the surface temperature from Profile "K0" to Profile "K1" is determined as follows:

Dt=0.5 (0.0726)²×490×(CM/C)

CM (Specified Heat)=0.12+(0.16/1300) TS(K0)

TS(K0)=50° F.

CM=0.12006

C=33−0.01 TS(K0)=33−0.01×50=32.5

Dt=0.5 (0.0726)²×490×(0.12006/32.5)=00476 hrs.

The time interval required to raise the temperature of profile point T(K0,1) to corresponding point T(K1,1) is also 0.00476 hrs. since T(K0,1) is also 50° F., and so forth.

It is therefore noted that the time interval required to raise the temperature from one profile point to the next corresponding profile point uses CM (specified heat) and C (conductivity) values based on the temperature of the existing profile point.

In calculating the time intervals,
  CM=0.12+(0.16/1300) T(KN,I), where T(KN,I) is less than 1350° F.
  CM=0.43−(0.1/900) T(KN,I), where T(KN,I) is equal to or greater than 1350° F., and this provides for the change in state of steel as it passes from magnetic to the non-magnetic condition.

Also C=33−0.01 T(KN,I)

Following the above equations will give the time interval Dt required to update a point on the temperature profile.

(g) Calculation of Heat Content

The incremental heat content added as the temperature profile of the slab changes from an existing profile to a new profile is calculated from the equation $$DH = .173 \, Ae \left[ \left( \frac{T_1 + 460}{100} \right)^4 - \left( \frac{T_2 + 460}{100} \right)^4 \right] Dt$$

Where
  DH=incremental heat content added in B.T.U. per square foot of slab for a given thickness.
  A=radiating area to slab, and since the slab is heated from both sides, A=2 sq. ft.
  e=overall effective emissivity to radiate heat from the effective furnace wall to the surface of the slab. This is dictated by experience with the actual furnaces used, and in this case e=0.8.
  $T_1$=effective radiating temperature of furnace wall to the slab (°F.). This corresponds to the heating zone temperature setpoint setting as dictated by the furnace being used.
  $T_2$=surface temperature of slab, which was defined previously as TS(KN) (°F.).
  Dt=time interval (hrs.) to transmit heat corresponding to DH.

Applying this equation to profile "K1", where $T_1$=2040° F. and $T_2$=TS(K1)=150° F. and DT=0.00476 hrs.

$$DH = .173 \times 2 \times .80 \left[ \left( \frac{2040 + 460}{100} \right)^4 \right] -$$

$$\left[ \left( \frac{150 + 460}{100} \right)^4 \right] (.00476)$$

DH=0.277 [392,000−1395] (0.00476)=515 B.T.U.

To clarify the determination of successive temperature profiles beyond the initial profile, the second complete profile "K2" will be shown in detail and in reference to FIG. 8 of the drawings.
(a) Calculate T(K2,1)

T(K2,1)=T(K1,0)+T(K1,2)/2=224+50/2=137° F.

(b) Calculate TS(K2)

TS(K2)=TF−GM $$G = \frac{TF - T(K2,1)}{M + \frac{DS}{2}} \, ; \, M = \frac{C}{kT}$$

C=33−0.01 TS(K1)=33−0.01×150−31.5
kT=32.2, from FIG. 9 showing kT value
M=31.5/32.2=0.978
G=(2040−137/0.978+0.0363)=1875
TS(K2)=2040−1874×0.8=210° F.

c) Calculate $T(K2,0) = TF - G\left(M - \frac{DS}{2}\right)$ $$G = \frac{TF - T(K2,0)}{M + \frac{DS}{2}} \; ; \; M = \frac{C}{kT}$$

C=33−0.01TS(K2)=33−0.01×210=30.90 kT=33.2, from FIG. 9 showing kT values
M=(30.9/33.2)=0.931
G=(2040−137/0.931+0.0363)=1967
T(K2,O)=2040−1967 (0.931−0.0363)
T(K2,0)=280

(d) Calculate remaining profile $$T(K2,2) = \frac{T(K1,3) + T(K1,3)}{2} = \frac{50 + 84.1}{2} = 67° \text{ F.}$$

$$T(K2,3) = \frac{T(K1,3) + T(K1,3)}{2} = \frac{50 + 50}{2} = 50° \text{ F.}$$

T(K2,4)=T(K1,3)=50° F.

(e) Summary of Profile "K2"
TS(K2)=210° F.
T(K2,1)=137° F.
T(K2,2)=67° F.
T(K2,3)=50° F.
T(K2,4)=50° F.

(f) Calculation of the time interval required to go from surface temperature TS(K1) to TS(K2)

Dt=0.5(DS)² (Q(CM)/C)

CM=0.12+(0.16/1300) TS(K1)

CM=0.12184
C=33−0.01 TS(K1)=33−0.01×150=31.5

Dt=0.05 (0726)² 490×(0.12184/31.5)=0.005 hrs.

(g) Calculation of Heat Content Increment $$DH = .173 \, Ae\left[\left(\frac{T_1 + 460}{100}\right)^4 - \left(\frac{T_2 + 460}{100}\right)^4\right] Dt$$
$$= .277 \, (392000 - 2020) \, .005 = 541 \text{ B.T.U}$$

SUMMARY

Total elapsed time from initial state to profile "K2"
  = .0047 hrs (profile "K1") plus .005 hrs. (Profile "K2")
  = .0097 hrs.

Total Heat Content from initial state to profile "K2"
  = 515 B.T.U. (Profile "K1") plus 541 B.T.U. (Profile "K2")
  = 1056 B.T.U.

As each profile is determined, Dt and DH are incrementally added to for the total. Thus, at end of accumulated time t, there is a corresponding total Heat Content H. This is the method used to obtain the heat content status of the slab as it is moving through the furnace. This method when applied algebraically and programmed into the digital process control computer permits flexibility not possible when applying the basic relationships and equations associated with the conduction of heat in a solid on variable time and temperature basis.

Many of the variables which occur in the practical application can be introduced and their effects evaluated. These are: variation in heat transfer to the surface (kT); variation in the temperature of the heat source (TF); variation in the thermal conductivity of material with temperature (C); variation in the specific heat of the material with temperature (CM). Evaluation of these variables in combination with the use of basic relationships of radiation, surface heat transfer and conduction will result in a close check of heating rates as compared to actual slab heating furnace experience.

It should be noted that the variation of the temperature of the effective furnace heat source (TF) can be refined by having the computer scan a profile of various measured wall temperatures, or effective furnace temperatures adjacent the wall, along the length of the furnace particularly in the charge zone, where it is known that the temperatures at the charge zone portion of the furnace are lower than near the heat zone portion and which also vary with the rate of furnace output. Those can be weighted or averaged into values used in the Schmidt method.

However, it should be noted that the temperature setpoint change is applied in relation to the furnace heating zone temperature sensing thermocouple device and the furnace performance is in effect calibrated as based on the heating zone temperature measuring point.

DESCRIPTION OF THE CONSTANTS OF FURNACE SYSTEM REQUIRED IN THE CONTROL MODEL

1. Furnace Dimensions

The length of the various heating zones and the designations for those zones is necessary to calculate the time in the zone for a given rate of slab movement.

The location of the theoretical control slab must be specifically defined, with this information being here selected in accordance with the showing of FIG. 6.

The width of the furnace to handle the desired maximum size of slab is utilized in defining hearth area available for slab heating and for defining heating rates.

2. Furnace Design Capacities—Heat Content References

A particular furnace is designed to deliver a certain ton per hour based on a specific size of slab. The installed heat capacity in B.T.U. per hour, and the effective heating zone temperatures at the control points, must be sufficient to attain the specified tons per hour, if the design criteria are to be met. The minimum times, and the corresponding maximum velocities of slab movement, are used in the control model to correspond to the specified design capacity of the furnace.

If the design capacities are not realized in actual practice, then the constants in the control model must be adjusted to correspond to actual operating capacities. The alternate procedure is to apply a correction factor to the constants already in the control model.

A summary of the principal constants used for one typical furnace is shown in Table I below.

TABLE I

Summary Of Furnace Capacity - Times - Heat Contents

| Slab Thickness Inches | Max. Fce. Capacity Tons Per Hour | Max. Fce. Capacity Lbs Per Sq. Ft. Per Hour | Approx. Reqd. Heat Content At Exit of Heat Zone 2300° F. Ave. Temp. | Approx. Heat Content At Exit of Charge Zone at Capacity | Ave. Velocity Ft. Per Hour at Capacity |
|---|---|---|---|---|---|
| 11 | 235 | 130 | 174,000 |  | 31.8 |
| 10 | 250 | 138 | 158,000 |  | 37.3 |
| 9 | 262 | 145 | 142,000 |  | 4305 |
| 8 | 275 | 152 | 126,500 |  | 51.3 |
| 7 | 288 | 158 | 110,000 | 90,000 | 61.3 |
| 6 | 300 | 165 | 64,800 |  | 74.3 |

The elapsed time in each zone at furnace capacity can be calculated by using the velocity figure in the table and by using charge zone length=42.5 feet, heat zone length=33.75 feet, and soak zone length=33.75 feet.

The tons per hour is based on slabs of length of 33 feet, giving a hearth coverage of approximately 85%

The time required to heat a slab is principally a function of its thickness. The time in the heating zone and the slab width determine the average velocity of slab movement. If the slabs are not of maximum length, the tons per hour will be reduced correspondingly but heating times will remain unchanged. Heat Contents are expressed in B.T.U. per square foot of slab for a given thickness and all reference heat contents are based on this, so that variations in slab length and hearth coverage do not effect the decisions and actions evaluated in the control model related to predicting a change in the temperature controller setpoint.

Also, the effective furnace temperatures in the respective heating zone, at the temperature sensing thermocouple device location are chosen to be 2500° F. for the charge zone and 2500° F. in the heat zone.

The soak zone temperatures are assumed to be 2300° F. to 2350° F., in order to maintain the heat content already in the slab as it leaves the heat zone and enters the soak zone.

In general, the specific information as outlined above is for purpose of illustration, and can be utilized in the control model for any other similar multizoned and continuous furnace. The particular design capacities, zone data, and so forth as here set forth are applied for purpose of illustration in relation to the particular furnace involved.

DESCRIPTION OF THE DETERMINATION OF THE FAMILY OF CURVES SHOWN IN FIG. 2

The use of three different sets of curve plots, such as shown in FIG. 2, FIG. 3, and FIG. 4 is the basis for determining changes in temperature controller setpoints in the charge zone and heat zone of the furnace.

The curve of FIG. 2 is derived as follows, with a numerical example being worked out as each step is given.

1. It is first necessary to define a value for the total time $t_H$ (predicted) required to travel through the Heat Zone. Assume the theoretical control slab in the heat zone is an average 7 inches thick, and the range of values for this time $t_H$ (predicted) must lie within certain limits in order to stay within the slab heating capacity of the furnace. In order to obtain the approximate limits, the time $t_H$ (predicted) corresponding to furnace capacity should be evaluated, and this is done from above Table I showing a summary of furnace constants the capacity of the furnace is 288 tons per hour for a 7 inch thick slab and the corresponding rate of slab movement is given as 61.3 feet per hour. The heat zone is 33.75 feet long, and therefore, the corresponding $t_H$ (predicted) for the theoretical control slab to travel through the heat zone is 0.55 hours. Any time smaller than this value will mean that this furnace is operating at a rate greater than the specified design capacity. In general, time values of 0.55 and larger should be the practical values used to derive points on the curve for FIG. 2. On this basis and to obtain a suitable operating point, assume $t_H$ (predicted)=0.6 hours.

2. Next, determine the total value of heat content $H_T$ which should be in the theoretical control slab as it exits from the heat zone. This is another constant in the system, and from the above Table I the required heat content for a rollable 7 inches thick slab with average temperature of 2300° F. is 110,000 B.T.U. per square foot of slab.

Figure 7:
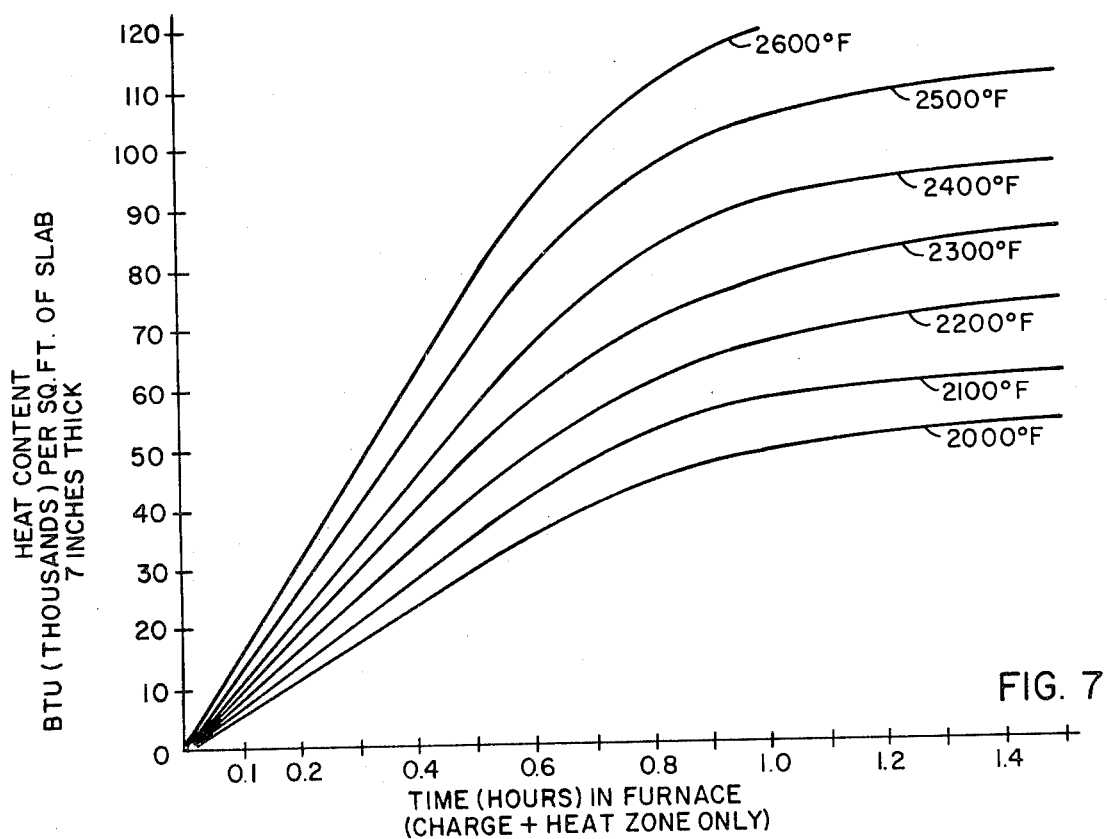
FIG. 7 is a curve plot to heat content for an average seven inches thick slab in relation to time that slab is located within a furnace of known temperature. This curve plot is used to establish the curve plots shown in FIGS. 2, 3 and 4.

3. Determine which portion of the total heat content of $H_T$ is added in the heat zone ($H_H$) and which portion of $H_T$ is added in the charge zone ($H_{CH}$), since $H_T=H_H+H_{CH}$. The distribution of heat content is determined on the basis of adding the increment $H_H$ in the heat zone by operating this heat zone at approximately 80 percent of its capacity, and supplying the remaining increment $H_{CH}$ in the charge zone at capacity or less; the basic idea in predicting this distribution as shown in FIG. 2 is to utilize the heat zone near its full firing rate as much as possible, and to vary the firing rate of the charge zone to make up the additional heat content required. This has been established in actual operation of slab heating furnaces to provide for the most efficient utilization of fuel in firing the various heating zones of a given furnace. For the above example, the approximate effective furnace temperature required in the heat zone to achieve firing rates corresponding to 80% of the heat zone capacity is taken as 2500° F. To find a point for FIG. 2 we utilize the basic heat content versus time curves for a 7 inches thick slab as shown in FIG. 7, and from the 2500° F. curve, the total time in the slab heating furnace to achieve the total heat requirement $H_T$ of 110,000 B.T.U. per square foot of 7 inches thick slab is approximately 1.25 hours. The heat content increment added in the heat zone $H_H$ is found by following the 2500° F. curve back down from a point starting at 1.25 hours until the value of $t_H=0.6$ hours is reached, that is $t_{CH}$ (predicted) is 1.25−0.6=65 hours. At this point on the 2500° F. curve of FIG. 7 the heat content is already approximately 85,000 B.T.U. per square foot of slab, and therefore $H_H=110,000-85,000=25,000$ B.T.U. per square foot of slab. Thus for 0.6 hours $t_H$ (predicted) a point on the heat zone curve of FIG. 2 is plotted as $H_H=25,000$ B.T.U. per square foot of slab, and $H_{CH}=85,000$ B.T.U. per square foot of slab and this point on the other curve is also plotted. It should be noted that $H_H+C_{CH}=H_T$ or $25,000+85,000=110,000$. Using this same technique the other points on the respective curves of FIG. 2 may be determined and the curves plotted as shown.

DESCRIPTION OF THE DETERMINATION OF THE FAMILY OF CURVES SHOWN IN FIG. 3

The curve plot shown in FIG. 3 is used to determine the temperature setpoints in the charge zone, with one such set of curves being used for each slab thickness spaced on one inch intervals as shown in respective FIGS. 11, 14, 17, 20 and 23. First, the curves of FIG. 2 have already been employed in relation to $t_H$ (predicted) and $t_{CH}$ (predicted) to determine $H_H$ and $H_{CH}$. When starting with a known average slab thickness mill cycle time and gap time, with the assumption made for purpose of example that the average thickness and average width of the theoretical control slab is 7" thick and 48" wide, the mill cycle for this slab, based on known mill capacity as shown in FIG. 5, is approximately 66 seconds per slab to the mill, or $3 \times 66$ or 198 seconds per slab discharged from each furnace, if three furnaces are in operation. Assume the gap time per furnace has been set by the furnace operator at 56 seconds, then the furnace cycle per discharged slab is $198 + 56$ seconds or 0.0712 hours per heated slab. This corresponds to approximately 14 slabs per hour, and if slabs are 48 inches (4 feet) wide, the corresponding velocity is $14 \times 4 = 56$ feet per hour. The predicted time $t_H$ (predicted) in the heat zone is then approximately 0.61 hours based on the heat zone length of 34 feet. From FIG. 2, $H_H = 26,000$ B.T.U. per square foot of each slab and the corresponding $H_{CH} = 84,000$ B.T.U. per square foot of slab. The corresponding $t_{CH}$ (predicted), which is the predicted time in the charge zone, is approximately $1.26 \times t_H$ predicted; this is obtained from the known ratio of the charge zone length (43 feet) to the heat zone length (34 feet), which then gives $t_{CH}$ (predicted) $= 0.768$ hours.

Secondly, to calculate the elapsed time to the location of the theoretical control slab in the charge zone, include in this figure any unexpected delays which result in this slab not moving from that position in relation to predicted rate of movement. From the above calculation, the total predicted time $t_{CH}$ (predicted) in the charge zone was 0.768 hours. The center line of the theoretical control slab is initially considered to be located one half way through the charge zone, and therefore, the elapsed time to center line location of the theoretical slab is one half of 0.768 hours or 0.384 hours, assuming that no additional delays have occurred.

Thirdly, to calculate the total elapsed time in the charge zone, without any delays, this value is equal to $t_{CH}$ (predicted) or 0.768 hours, and if there were any delays, the delay time would be added.

Fourthly, to calculate the time remaining $t_{CH}$ (rem) in the charge zone, subtract from the total elapsed time the elapsed time to the location of the control slab, or $t_{CH}$ (rem) $= 0.768 - 0.384 = 0.384$ hours. This is an abscissa location on the curves shown in FIG. 3 $t_{CH}$ (rem).

Fifthly, to determine the charge zone temperature required to attain $H_{CH}$ (predicted) at time interval $t_{CH}$ (predicted), and if there were any delays this delay time would be added to $t_{CH}$ (predicted), the charge zone temperature required is found on the heat content curves of FIG. 7, using $H_{CH}$ (predicted) $= 84,000$ and $t_{CH}$ (predicted) $= 0.768$ hours, such that the heating zone temperature corresponding to those values is approximately 2420° F.

Sixthly, to determine the heat content of the theoretical control slab, this will correspond to a point on the extrapolated 2420° F. zone temperature curve as provided in relation to FIG. 7, with the elapsed time corresponding to the location of the theoretical slab being 0.384 hours, such that the corresponding heat content is read from the 2420° F. temperature curve of FIG. 7 to be approximately 47,000 B.T.U. per square foot of slab.

Seventhly, to determine the remaining heat content $H_{CH}$ (needed) required in the charge zone, from $H_{CH}$ subtract the heat content of the theoretical control slab found above or $84,000 - 47,000 = 37,000$ B.T.U. per square foot of slab. This is the corresponding ordinate derived for plotting a point on FIG. 3, and the abscissa is 0.384 hours found previously. The points in FIG. 3 determined by successively going through the above procedure will fall along the dotted boundary line indicated by the designation, "Limit Curve Furnace Capacity".

Other points are determined by increasing the elapsed time that the theoretical control slab is in its location, which is the equivalent of an unexpected delay. This longer time increases the heat content of the slab while the slab stays in this location, and this means that when the slabs start moving again, the remaining heat content needed $H_{CH}$ (needed) is smaller and the required heating zone temperature setpoint to do this in the time remaining $t_{CH}$ (rem) is also reduced to a lower value.

Other points along the curves are determined in a similar manner to generate the curves shown in FIG. 3 as follows: Assume the elapsed time for the theoretical control slab is increased form 0.384 hours to a new value of 0.6 hours, and then the total time in the charge zone is $0.6 + 0.384$ or 0.984 hours. The total heat required in the charge zone remains at 84,000 B.T.U. per square foot of slab is derived previously, and by using the heat content versus time curves of FIG. 7, a determination is made of the new heating zone temperature, such that for 84,000 B.T.U. per square foot of slab and 0.984 hours in the charge zone, the zone temperature setpoint is approximately 2350° F.

For 0.6 hours elapsed time at the theoretical control slab location and 2350° F. zone temperature, FIG. 7 will give a heat content of the theoretical slab of 63,000 and the ordinate of the new point on FIG. 3 is then $84,000 - 63,000 = 21,000$ B.T.U. per square foot of slab which is $H_{CH}$ (needed), and the abscissa is 0.384 hours for $t_{CH}$ (rem) and the temperature point is 2350° F.

By using this procedure, other points for values plotted on FIG. 3 can be determined. It should be generally noted that determination of points for FIG. 3 curves from values shown in FIG. 7 may require a larger scale for FIG. 7 than that illustrated, in order to obtain sufficient accuracy for the incremental changes being established.

DESCRIPTION OF THE DETERMINATION OF THE FAMILY OF CURVES SHOWN IN FIG. 4

The FIG. 4 set of curves is used to determine the temperature setpoints in the heat zone, with one set of curves being used for each average slab thickness spaced on one inch intervals in accordance with the respective FIGS. 12, 15, 18, 21 and 24.

The derivation is worked out in accordance with the following successive steps, with a related numerical example being provded to illustrate each step.

First, use FIG. 2 to determine $t_H$ (predicted) and $H_H$, and follow the same details shown in the first step of the previous FIG. 3 determination. Then, using the same slab size, and so forth, $t_H$ (predicted)=0.61 hours and $H_H$=26,000 B.T.U. per square foot of slab.

Secondly, determine the elapsed time in the heat zone from the start of the heat zone to the location of the theoretical control slab in the heat zone, and if there is some delay it should be included in this figure. The theoretical control slab center line is initially located $\frac{1}{3}$ of the way into the heat zone and the elapsed time to this location is therefore $\frac{1}{3} \times 0.61$ hours=0.203 hours.

Thirdly, find the point of intersection on the heat content versus time curves of FIG. 7 where the total heat content $H_T$ crosses the 2500° F. curve. This time represents the total time in the charge zone plus the heat zone, and if there is delay time involved, and this delay to the latter total time and find from the curves of FIG. 7 a new intersection of heat zone temperature for the same total heat content $H_T$. $H_T$ for the average 7 inches thick slab is 110,000 B.T.U. per square foot of slab, and the total time on the 2500° F. curve required to obtain 110,000 B.T.U. per square foot heat content is 1.25 hours.

Fourthly, determine the total elapsed time in the heat zone only, including unexpected delay time if any, and this is $t_H$ (predicted) or 0.61 hours.

Fifthly, determine the time remaining in the heat zone, $t_H$ (rem), and this is the difference between 0.61−0.203=0.406 hours.

Sixthly, determine the total heat content of the theoretical control slab in the heat zone, and this is done by tracing the heat zone temperature curve of FIG. 7 back down the curve, and starting at the intersection of 1.25 hours and 110,000 B.T.U. per square foot in FIG. 7 on the 2500° F. curve, go back down the curve a time interval of 0.406 hours. This establishes a new point of intersection at 0.844 hours (1.25-0.406), and at this point the heat content of the slab is found from 2500° F. curve of FIG. 7 is 98,500 B.T.U. per square foot of slab.

Finally, determine the remaining heat content needed $H_H$ (needed), and this is equal to 110,000−98,500=11,500 B.T.U. per square foot of slab. A point on curve FIG. 4 is now determined by plotting the values for $H_H$ (needed) and $t_H$ (rem) found previously above, for example, 11,500 B.T.U. per square foot of slab is the ordinate and 0.406 hours in the abscissa and the heat zone temperature is 2500° F.

The points on FIG. 4 as above determined will follow a 2500° F. curve. Other points for other temperature curves are determined by increating the elapsed time that the theoretical slab is in its location, such as would occur during a delay, and this longer time will increase the heat content of the slab while it stays in this location. This means that when the slabs start moving again, the remaining heat content needed $H_H$ (needed) is smaller, and the required heat zone temperatures to do this in the time remaining $t_H$ (rem) is also reduced to a lower value.

For example, to determine the total time cycle including a delay, assume the elapsed time at the location of the theoretical control slab in the heat zone is increased from 0.203 hours inside the heat zone to 0.34 hours, which is an increase of 0.14 hours and the new total time is 1.25 plus 0.14 or 1.39 hours. Now to determine the new heat zone temperature, find the intersection point of 1.39 hours and heat content $H_T$ of 110,000 in FIG. 7 and find what furnace temperature corresponds to this, with the furnace temperature parameter at this intersection point being approximately 2490° F. Then, to determine the total elapsed time in the heat zone, including the delay time, this is $t_H$(predicted)+delay time or 0.61 hours+0.14 hours is equal to 0.75 hours. To determine the time remaining $t_H$ (rem) in the heat zone, this is now the difference between 0.75 hours−0.35 hours=0.41 hours, and this stays the same independent of the delay time and is equal to $t_H$ (rem) as previously determined. To determine the heat content of the theoretical slab in the heat zone, this is done by tracing the zone temperature curve (2490°) of FIG. 7 back down the curve, starting at the intersection point at 1.39 hours and $H_T$=110,000, until the time corresponding to $t_H$ (rem) or 0.41 hours is reached. This corresponds to 1.39−0.41 or 0.98 hours on curve (2490° F.) of FIG. 7, and the corresponding total heat content=103,000 B.T.U. per square foot of slab. Now, to determine the remaining heat content needed $H_H$ (needed), this is equal to 110,000−103,000=7000 B.T.U. per square foot of slab. Another point on the curve of FIG. 4 is now determined by plotting the time remaining $t_H$ (rem) in the heat zone and the remaining heat content needed $H_H$ (needed), for examole, 7000 B.T.U. per square foot of slab is the ordinate and 0.41 hours is the abscissa and the heat zone temperature parameter is 2490° F.

Using the same procedure for other delay times will determine other points to be plotted to generate the curves of FIG. 4. It should be noted that the portion of the curves used in FIG. 7 to determine values for FIG. 4 in the heat zone involve small differences, and for sufficient accuracy these portions could be plotted on a scale of greater magnitude than FIG. 7 as now shown.

DESCRIPTION OF THE DETERMINATION OF THE OVERALL HEAT TRANSFER COEFFICIENT (kT)

The incremental changes in the temperature of the surface of the slab with time are related to the rates of heat transfer between the effective furnace temperature and the slab. The Schmidt Method previously described requires a definition of the overall instantaneous rate of heat transfer, in order to determine the distance C/kT in the graphical representation as shown in FIG. 8. Since practically all of the heat is transferred by radiation, the incremental DH heat content added for a time interval Dt by radiation is:

$$DH = 0.173\, Ae\left[\left(\frac{TF+460}{100}\right)^4 - \overline{\frac{TS+460}{100}}^4\right] Dt$$

Also this same increment of heat added can be expressed in terms of an overall coefficient of heat transfer
DH=(kT)A(TF−TS)Dt, where
TF=effective furnace temperature and TS=surface temperature of the slab.
(kT)=overall heat transfer coefficient in B.T.U. per square foot, hour, degrees fahrenheit.

Equating the above last two equations and solving for kT, $$kT = \frac{0.173\, e\left(\frac{TF+460}{100}\right)^4 - \left(\frac{TS+460}{100}\right)^4}{TF-TS}$$

The family of curves for various effective furnace temperatures as shown in FIG. 9 is based on the latter equation.

DEFINITIONS OF VARIOUS TERMS USED IN THE PREVIOUS DESCRIPTIONS $t_H$ (predicted) = time in hours for the slab to travel through the heat zone of the furnace as predicted by mill cycle time and gap time settings for the average slab in the furnace as determined by survey of the slabs in the determine furnace slab map.

$t_H$ (rem) = time in hours remaining for the center line of the theoretical control slab to travel through the heat zone.

$t_{CH}$ (predicted) = time in hours, for a slab to travel through the charge zone, with the slab traveling at the same velocity as that used in determining $t_H$ (predicted).

$t_{CH}$ (rem) = time in hours, remaining for the center line of the theoretical control slab to travel through the charge zone.

Dt = interval of time (hours) between determination of each new temperature profile point in the slab as defined in the Schmidt Method.

Mill Cycle = Time (seconds) required for the average slab (thickness and width) to be rolled in the associated rolling mill at its nominal rated capacity. It is used together with a variable gap time set by the operator to predict the travel time of slabs through the furnace.

Gap Time = Time (seconds) set by the furnace operator to adjust the predicted furnace operating conditions to actual demands by the rolling mill.

$t_s$ = Time in hours that slab is in soak zone.

TF = Temperature of the effective heat radiation sources, including the furnace wall and heated gases surrounding slab, in °F.; also corresponds to furnace heating zone temperature.

TS = Surface temperature of slab in °F.

T[KN,M] = Designation for a temperature point in the slab temperature profile pattern as determined by the Schmidt Method and shown in FIG. 8. KN locates the laminar division point on the profile; N = 0, 1, 2, 3, 4. The slab from its center line is divided into four laminar divisions, as shown in FIG. 8. M equals the sequence number of each complete profile for each interval of time Dt, and starts at 0 and increases by one interval as each profile is generated.

$H_H$ = Heat content component of total heat content of a slab which is added in the heat zone, in B.T.U. per square foot of slab.

$H_{CH}$ = Heat content component of total heat content of a slab which is added in the charge zone, in B.T.U. per square foot of slab.

$H_T$ = Total heat content of a slab required to attain desired temperature necessary for rolling, with the approximate average slab temperature being 2300° F., in B.T.U. per square foot of slab. This is a predetermined reference value corresponding to the amount of heat which should be in the slab as it leaves the exit of the heat zone and enters the soak zone. All of the various temperature setoint determination curves are based on achieving this reference value, in the relationship of $H_T = H_H + H_{CH}$.

$H_H$ (needed) = Increment of needed or remaining content which is to be added in the heat zone in the time $t_H$ (rem), as the theoretical control slab travels from its theoretical location in the heat zone to the exit of the heat zone, in B.T.U. per square foot of slab.

$H_{CH}$ (needed) = Increment of needed or remaining heat content which is to be added in the charge zone in the time $t_{CH}$ (rem), as the theoretical control slab travels from its theoretical control area location in the charge zone to the exit of the charge zone, in B.T.U. per square foot of slab.

ILLUSTRATIVE MINIMUM TIMES IN SOAK ZONE

For the typical pusher type furnace, the following minimum elapsed time in the soak zone is probably desirable. These are based on velocities of slabs which are within the furnace design capacity for a given thickness of slab.

| Slab Thickness Inches | Max. Fce. Capacity Tons/Hr. | Max. Fce.q Capacity Lbs. per Sq. Ft. per Hr. | Time In Soak Zone Hrs. |
|---|---|---|---|
| 6 | 300 | 165 | 0.454 |
| 7 | 287.5 | 158.4 | 0.552 |
| 8 | 275 | 152 | 0.657 |
| 9 | 262 | 145 | 0.775 |
| 10 | 250 | 1,38 | 0.905 |
| 11 | 235 | 130 | 1.07 |

DESCRIPTION OF SOME OF THE DEVICES USED IN CONJUNCTION WITH PRESENT CONTROL SYSTEM AND METHOD

The process control system and method here described are operative in conjunction with the already provided and conventional analog temperature controllers of the furnace combustion system with its attendant instrumentation and hardware. There are some additional devices required whose main function is to indicate and control whether or not a slab is properly heated and should be discharged from the furnace. Examples of these are given below.

INSUFFICIENT HEAT CONTENT—PUSHLITE

An indicating light will show that the required heat content has not been reached when the slab reaches the exit of the heat zone and just before it enters the soak zone. The furnace discharge push will not be permitted to take place until the desired slab heat content is obtained, and this pushbutton can be used to override the action and permit a push if the furnace operator desires to do so. One such device is provided for each furnace. An insufficient heat content in the slab will also initiate a printout.

INSUFFICIENT SOAK TIME—INDICATING LITE

An indicating light will show that the slab has not been in the soak zone for a sufficient time. One such device is provided for each furnace. An insufficient soak time will also initiate a printout.

NUMBER OF SLABS TO BE DISCHARGED BEFORE START OF A PLANNED DELAY
(Thumbwheel or equivalent selector)

In relation to an anticipated or planned delay, the furnace operator can set by this device the number of slabs to to be discharged before the delay begins, or the selection can also be coded to initiate a delay immediately and can be coded to terminate a delay ahead of the scheduled termination of a delay time. One such device is provided for each furnace.

DURATION OF ANTICIPATED DELAY
(Thumbwheel or equivalent selector)

The furnace operator sets the duration of the anticipated delay in tenths of hours. One such device is provided for each furnace.

ANTICIPATED DELAY FURNACE SELECTOR SWITCH (Switch Positions) (All Furnaces) or Fce 1, Fce 2, Fce 3, and so forth.

ANTICIPATED DELAY INITIATE—PUSHBUTTON

One for each furnace. Starts the delay program.

GAP TIME (Seconds) Thumbwheel Switch

The furnace operator sets up the desired gap time interval which is added to the calculated mill cycle time for each slab in the slab map as governed by operational conditions which affect the travel time for entering slabs to go through a given furnace.

PROCESS CONTROLLER SELECTED "OFF" PREHEAT ZONE

PROCESS CONTROLLER SELECTED "OFF" HEAT ZONE

PROCESS CONTROLLER SELECTED "OFF" SOAK ZONE—EAST

PROCESS CONTROLLER SELECTED "OFF" SOAK ZONE—WEST

The last four items are required for each furnace but not necessarily as a separate device on an operating station; this function may be provided by a signal from contacts on mode operation switches already available on primary furnace combustion control instrumentation. When selected off, the process controller can function, perform and printout on demand, all control functions such as setpoint reference feedback or holding a slab due to insufficient heat or insufficient soak time but cannot actually control these functions on the furnace itself.

DIGITAL DISPLAY (TONS PER HOUR) One for all furnaces

DISPLAY SELECTOR (Select any furnace)

The last two items are optional but convenient in operation as a direct measure of furnace capacity.

TOP ND BOTTOM ZONES RATIO FIRING STATUS

No device involved, but in the primary furnace control instrumentation the zone firing has an option that provides for top and bottom zones in the charge zone and also in the heat zone sections to fire as one control unit. On this basis, the top temperature sensing units in each heating zone are the only ones used for control of the respective heating zone firing. The bottom zone firing rate is a fixed, but adjustable, ratio of the top zone firing rate in each of the heating zones (charge zone and heat zone but not in soak zone which has not bottom firing). Although separate firing control of the top and bottom sections may be provided, the usual method is to fire the top and bottom in relation to a feedback signal from a control temperature sensor device, such as a thermocouple, located in the top portion of the furnace, and set a firing ratio between the top and bottom. The reason for this practice is due to difficulties encountered in locating a control temperature sensor in the bottom area in a manner which will accurately measure and reproduce an effective furnace temperature which follows and varies directly the bottom firing rates. The status check by means of contacts in the primary control instrumentation tells the process control computer which method of firing control is being used. The following number of signals would be required.

(a) Charge Zone one for each furnace
(b) Heat Zone one for each furnace

ANALOG SIGNALS FOR TEMPERATURE SETPOINT CONTROL

The following analog type signals are required between the primary furnace control instrumentation and the process control computer. It is assumed that the signals from all primary control sensors such as temperature sensors will be converted through suitable transmitters (which are a part of the primary instrumentation) to standard D.C. voltage levels for use in the analog to digital converters at the process control computer. These analog type inputs between furnace instrumentation and process controler are as follows:

1. Charge zone temperature—Top—One for each furnace
2. Charge zone temperature—Bottom—One for each furnace
3. Heat zone temperature—Top—One for each furnace
4. Heat zone temperature—Bottom—One for each furnace
5. Soak zone temperature—Left Side—One for each furnace
6. Soak zone temperature—Right Side—One for each furnace

MILL DELAY - Indicating Light

On furnace operator station this light will be illuminated whenever there is a delay provided in the operation in any area of the mill. This light will operate in parallel to those in other pulpits and will be extinguished when all delays have been released, with one such device being provided for all furnaces.

FURNACE DATA DEMAND PRINTOUT BUTTON

This device initiates by the operator the printout on the furnace display page printer all of the data which has been classified to be printed on demand. One such device is provided for all furnaces.

COMPUTER NOT OPERATING - Indicating Light

This light notifies the furnace operator that the process control computer is not functioning to control the slab heating furnaces; it may be considered desirable to also tie this function in with alarm on the furnace annunciator since process control computer failure may not be immediately evident to the furnace operator, who may not always be located at operator's console where light is located. One such device is provided for all furnaces.

PRINTER MESSAGE - Indicating Light

This light tells furnace operator when the process control computer is outputting data to the page printer which is located in furnace control area. This light indicates each occurrence of a new message being printed.

ANALOG SIGNALS FOR SETPOINT CONTROL

The following gives a listing of analog type signals which are provided between the primary furnace control instrumentation and the process control computer. It is assumed that the signals from all primary control sensors, such as temperature sensors, will be converted through suitable transmitters (which are also a part of the primary instrumentation) to standard D.C. voltage levels for use in the analog to digital converters at the process controller. These analog type inputs between furnace instrumentation and the process control computer are as follows:

1. Setpoint reference- Charge zone - Top—One for each furnace
2. Setpoint reference- Charge zone - Bottom—One for each furnace
3. Setpoint reference- Heat zone - Top—One for each furnace
4. Setpoint reference- Heat zone- Bottom—One for each furnace
5. Setpoint reference- Soak zone - Top Left—One for each furnace
6. Setpoint reference- Soak zone - Top Right—One for each furnace

DESCRIPTION OF SYSTEM FLOWCHART PROGRAMS

It should be understood that the particular system logic flowchart programs shown in FIGS. 27 to 31 are provided merely to illustrate one suitable embodiment of the present control system and method. It should be readily apparent to persons skilled in the art of dynamic process control that many modifications can be made in relation to the selected functions and the arrangement of same as set forth in these programs.

Figure 27:
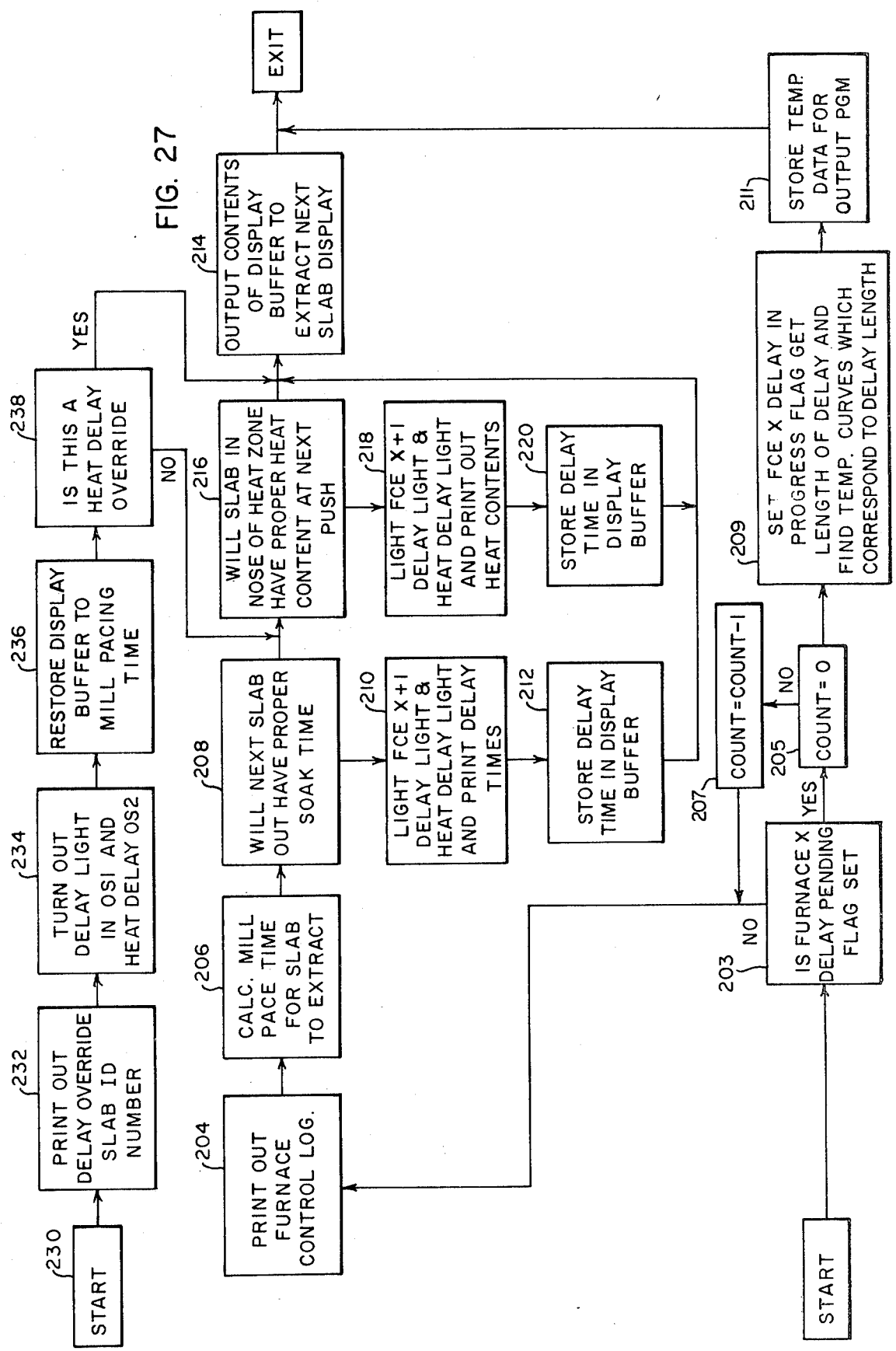
FIG. 27 is a showing of the system flow chart for the delay override program and the push to extract program.
Figure 28:
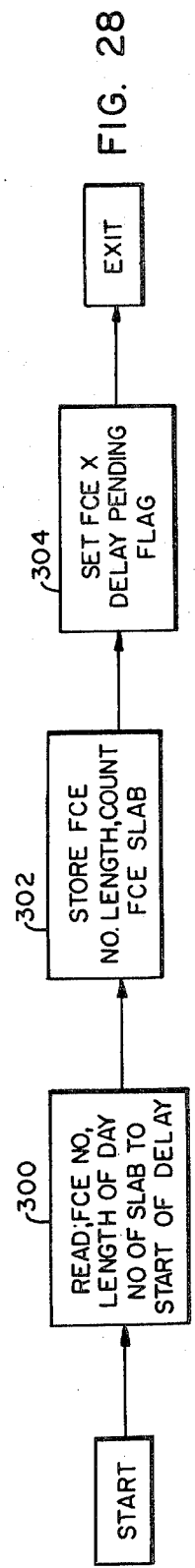
FIG. 28 is a showing of the system flow chart for the expected delay program.
Figure 29:
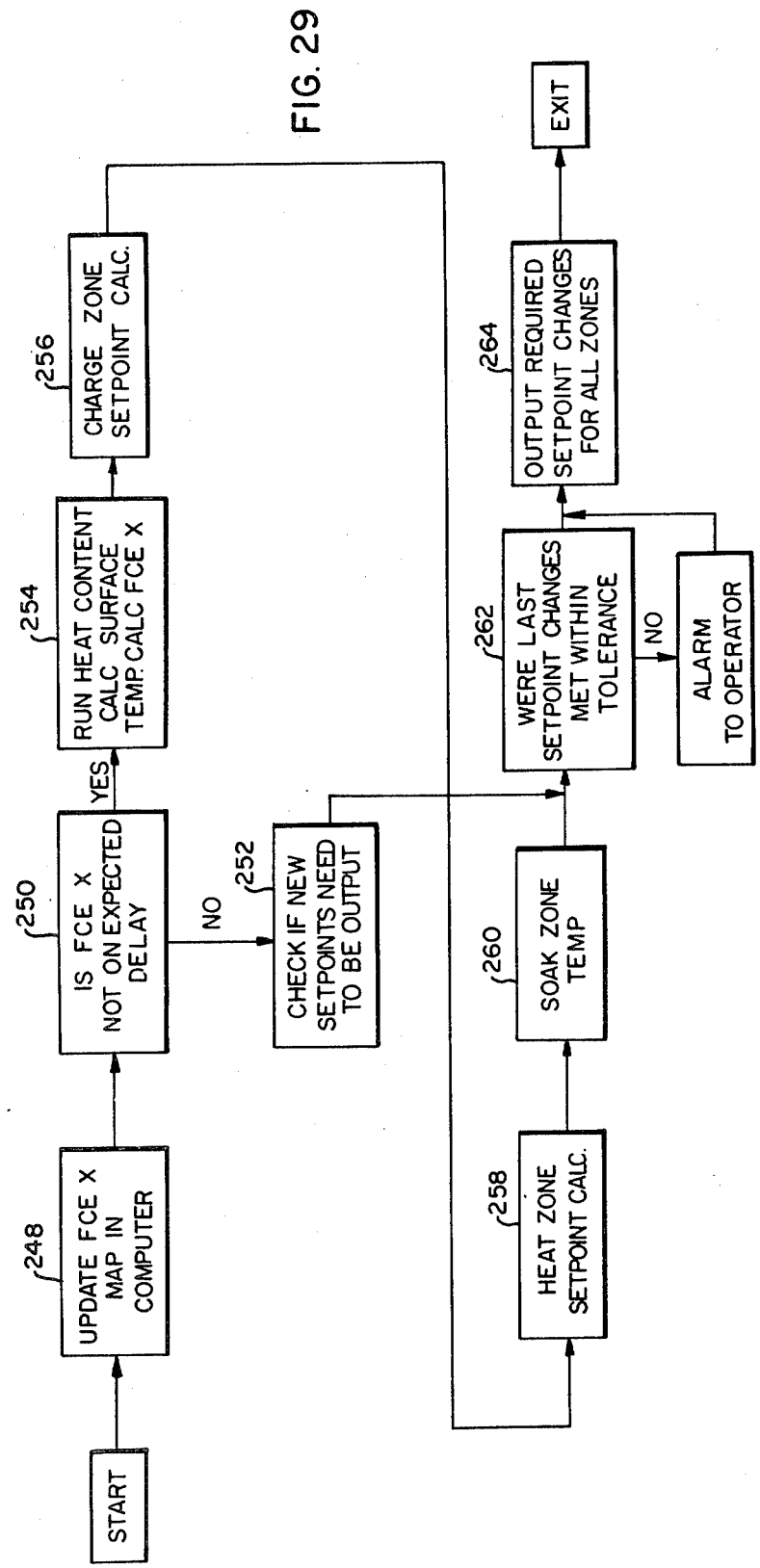
FIG. 29 is a showing of the system flow chart for the slab heat content, the charge zone temperatures setpoint and the heat zone temperature setpoint periodic determination program.
Figure 32A:
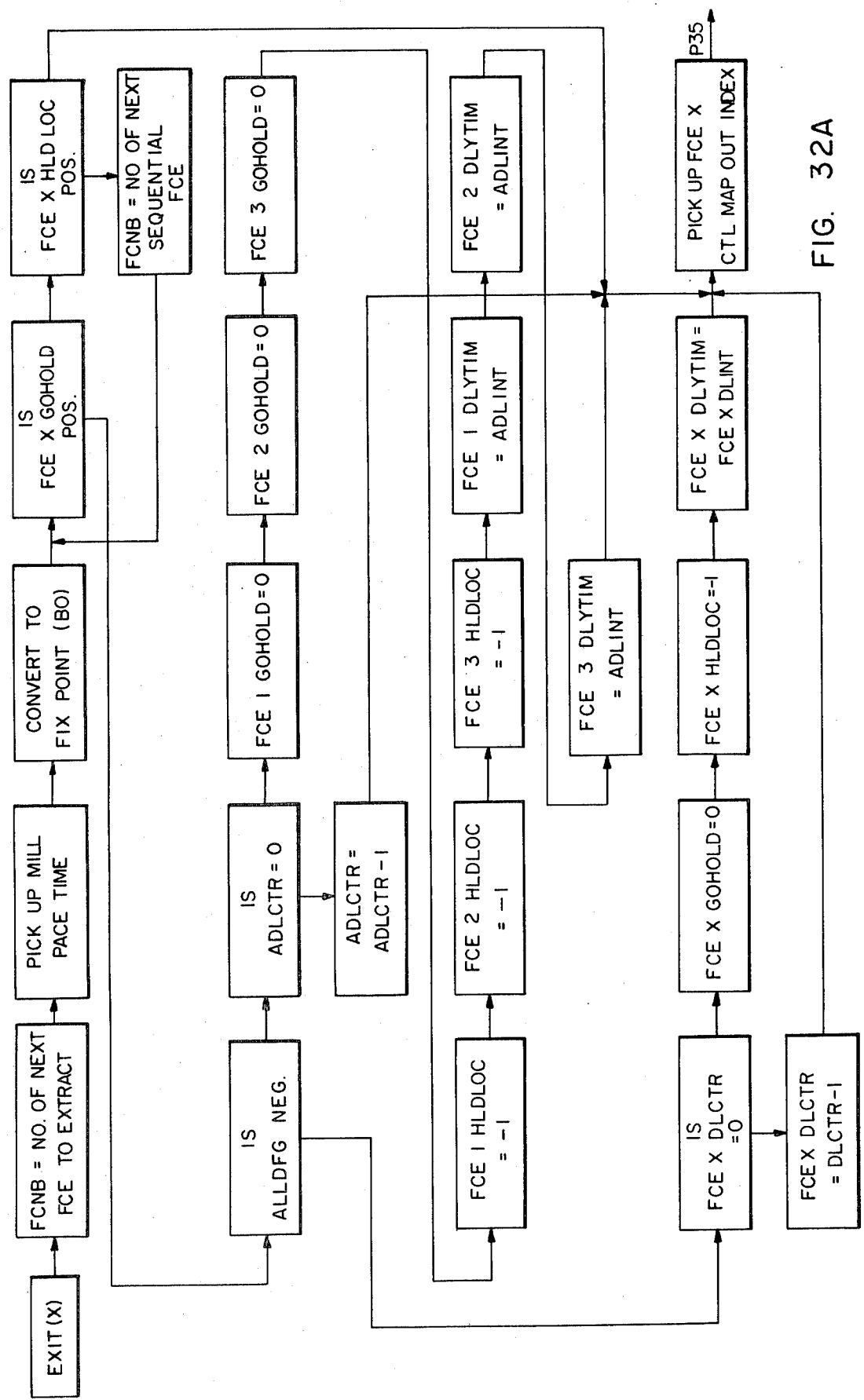
FIGS. 32A, 32B and 32C are a showing of the more detailed programmer flow chart for the delay override program and the push to extract program.
Figure 32B:
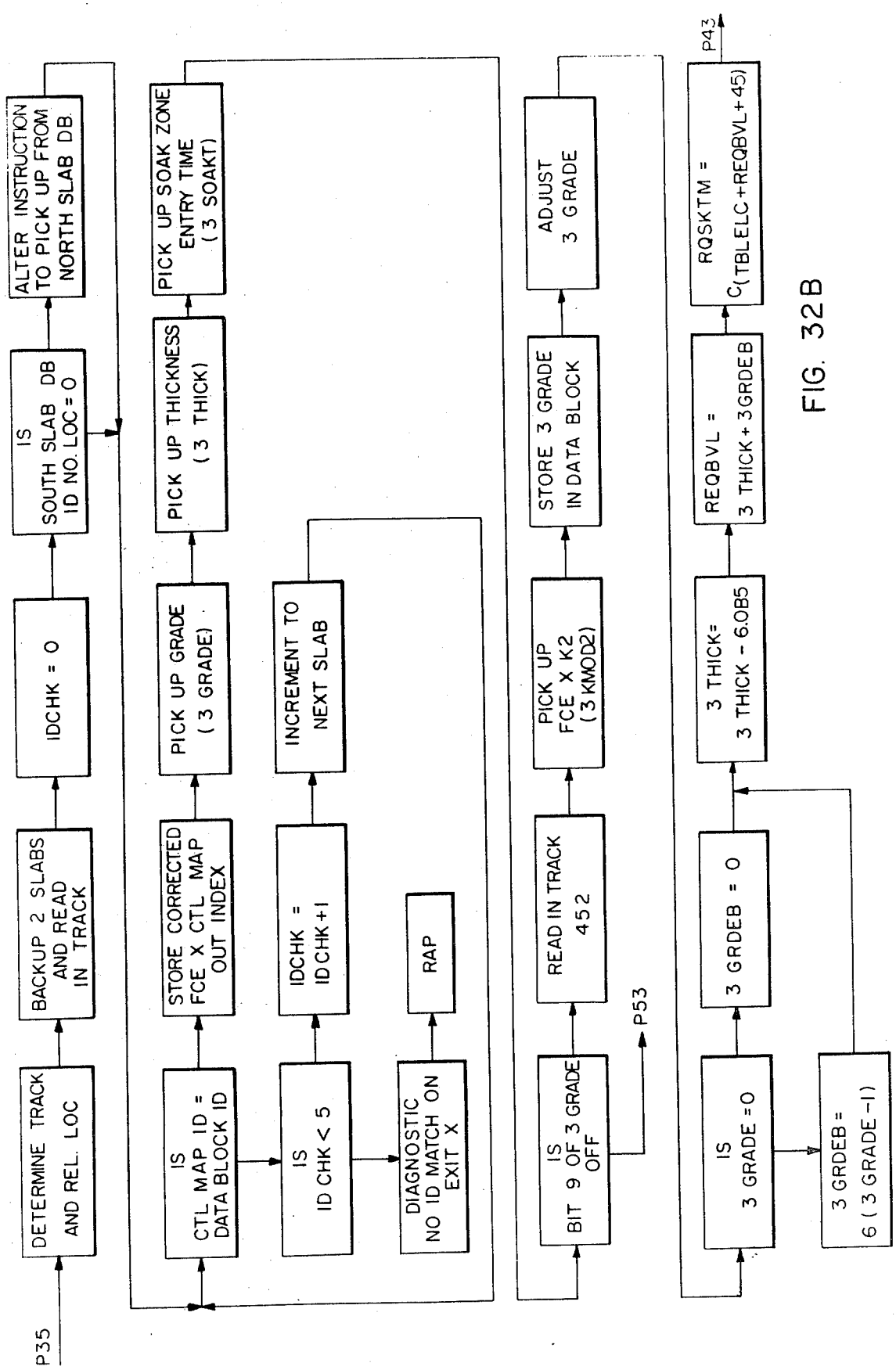
Figure 32C:
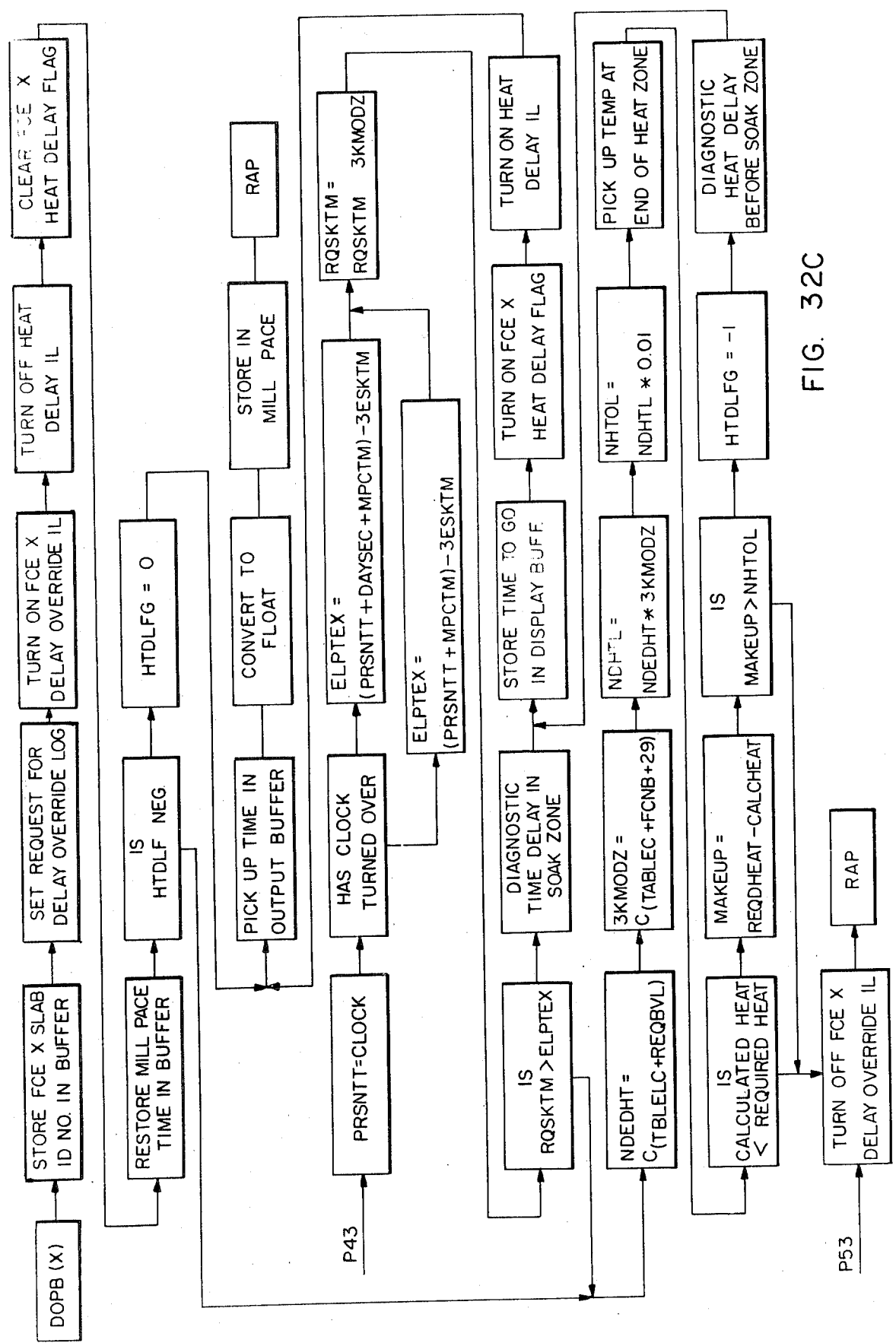
Figure 33:
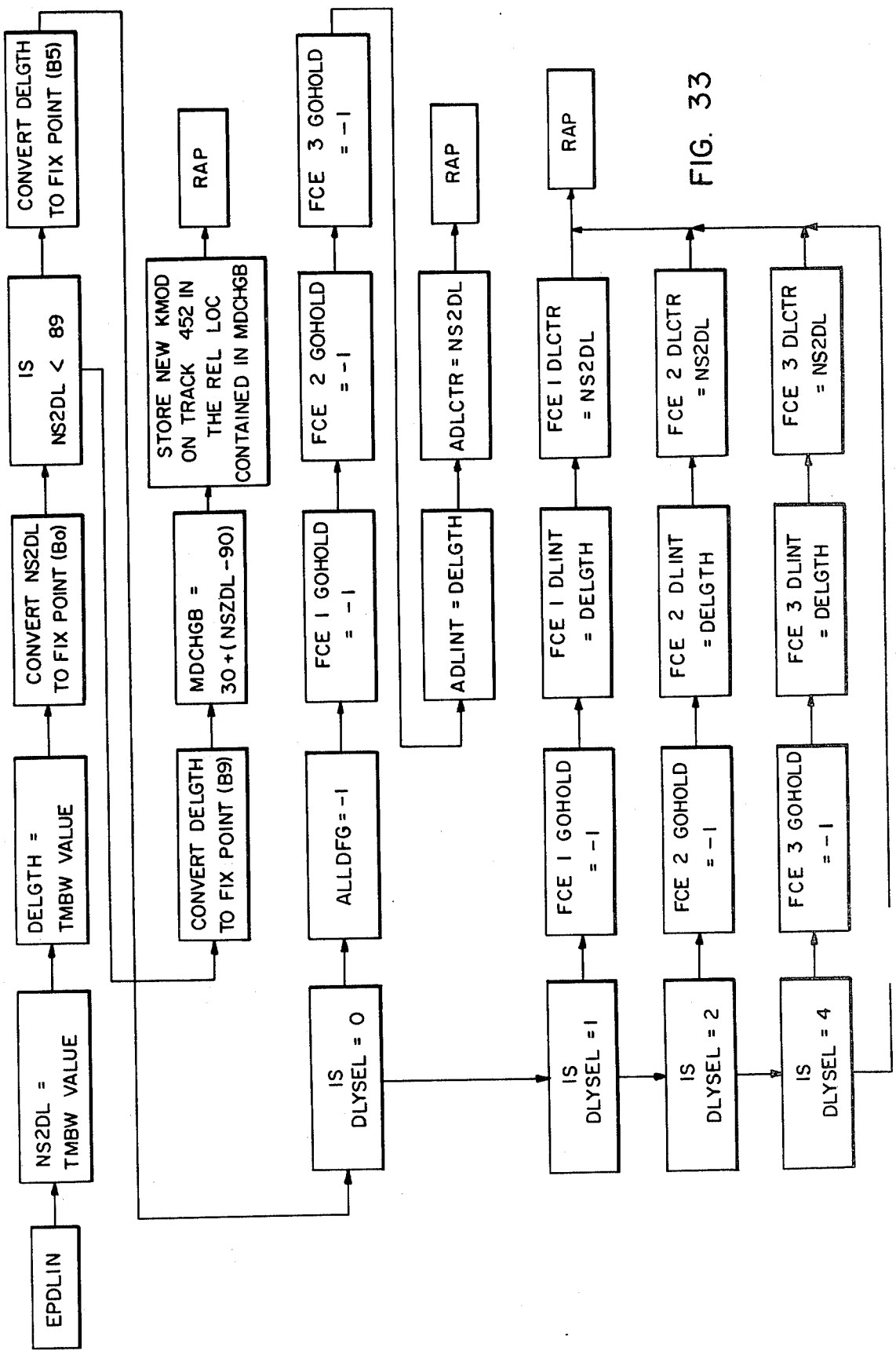
FIG. 33 is a showing of the more detailed programmer flow chart of the expected delay program.
Figure 34A:
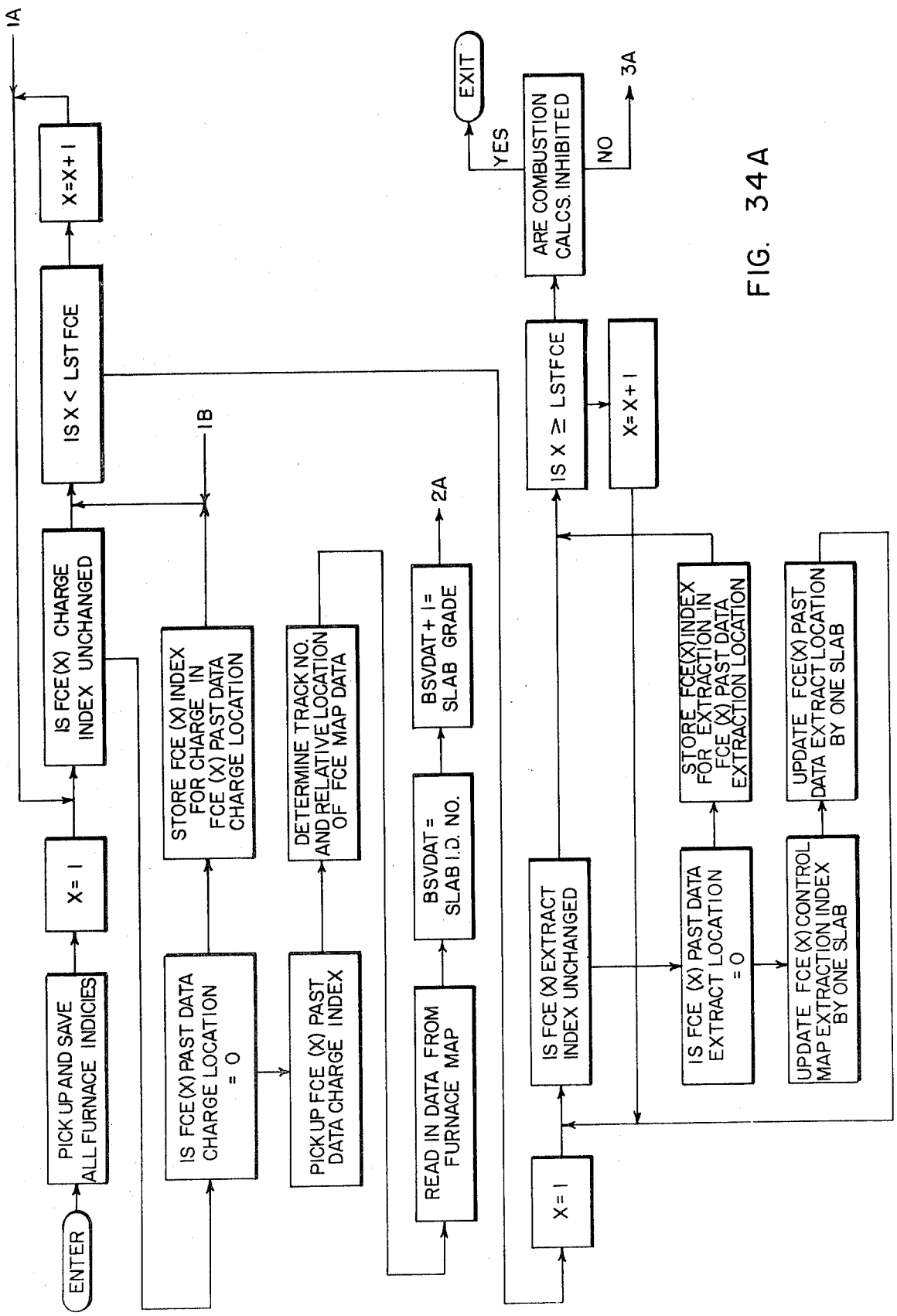
FIGS. 34A and 34B are a showing of the programmer flow chart of the program for the update of the furnace slab heat content map included within the system flow chart shown in FIG. 29.
Figure 34B:
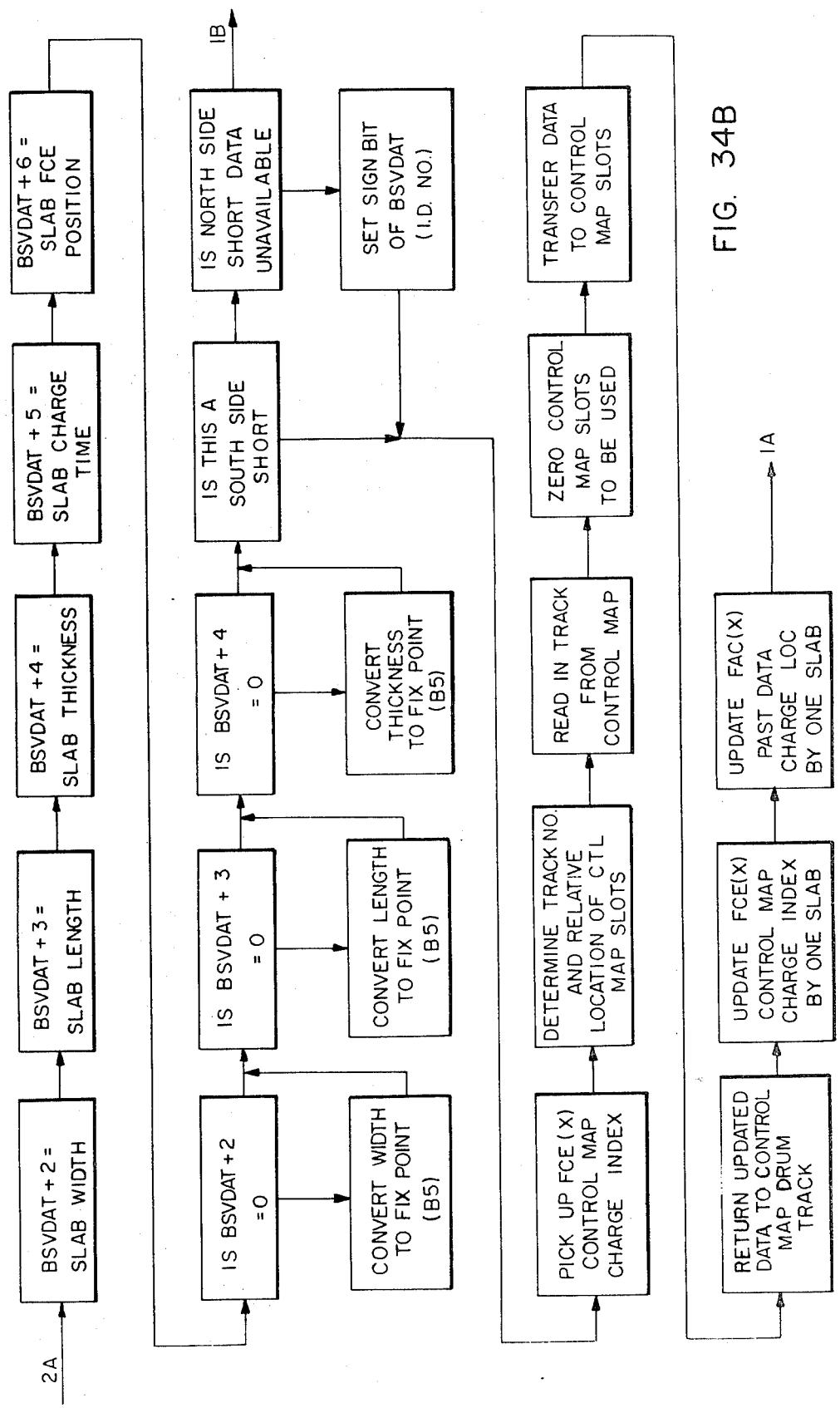
Figure 34C:
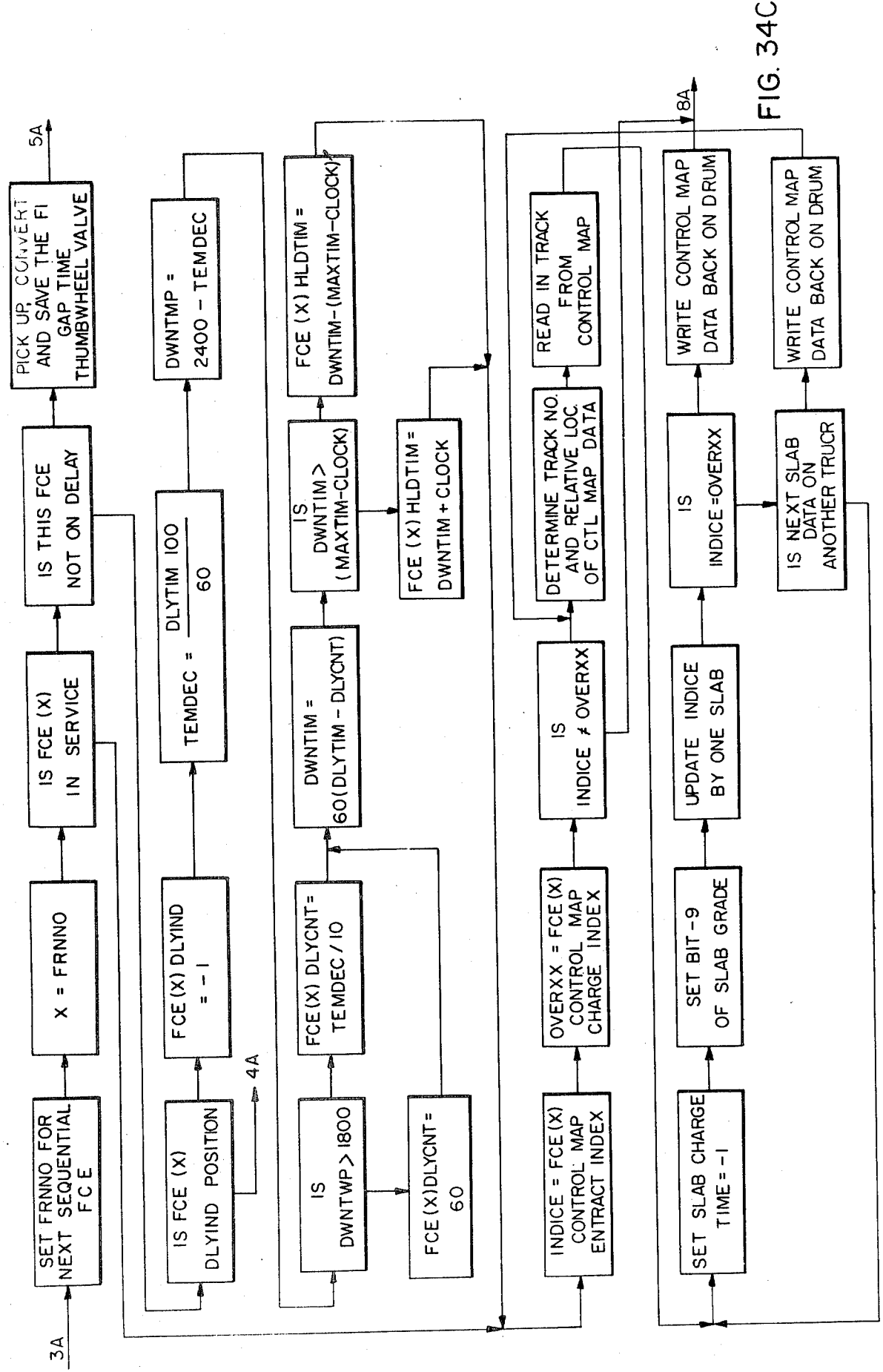
FIGS. 34C and 34D are a showing of the programmer flow chart of the program for the furnace out of service function when no updating of the slab heat content map is done and the delay logic function for controlling the heat content of the slabs during a delay time period.
Figure 34D:
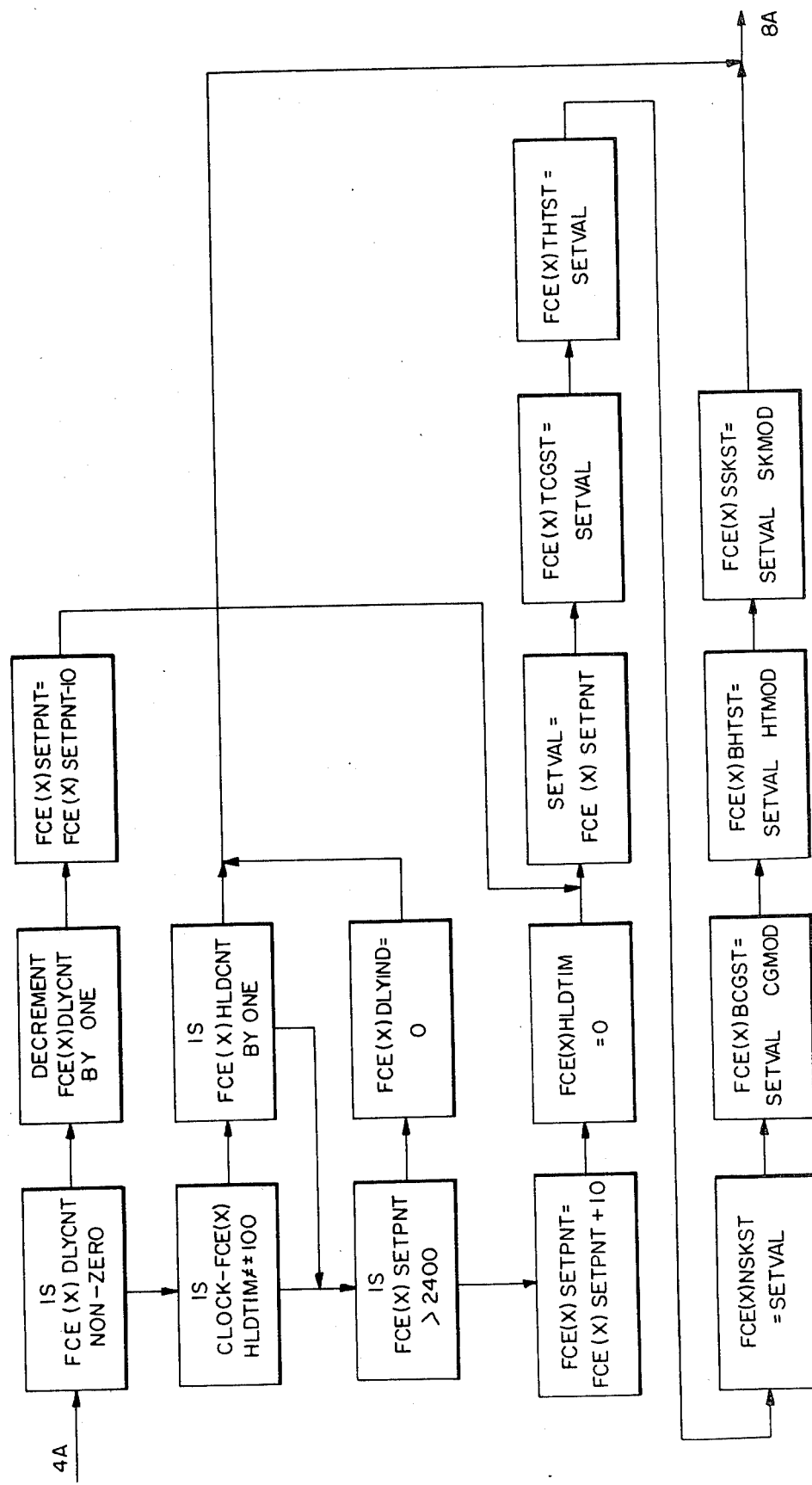
Figure 34E:
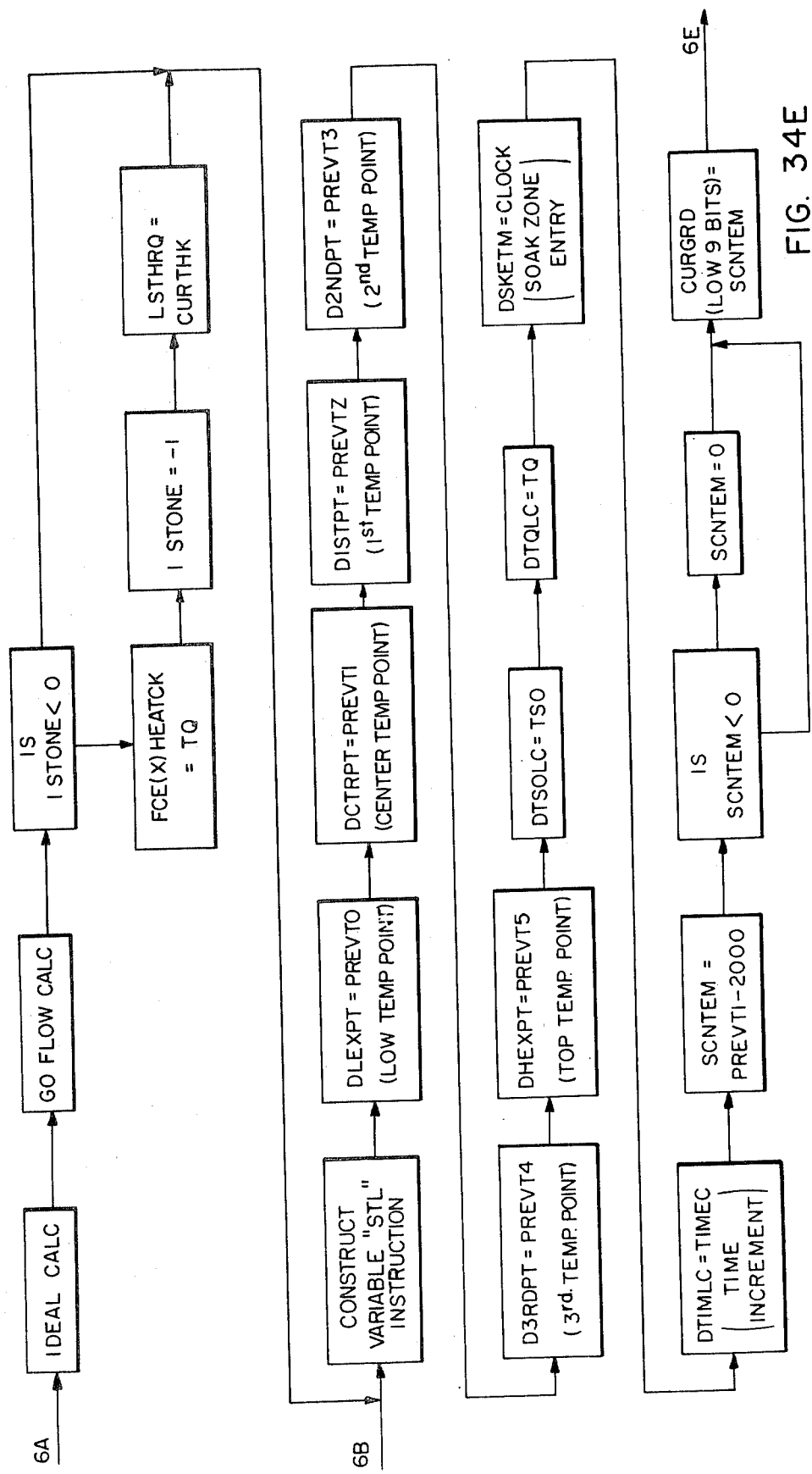
FIGS. 34E, 34F and 34G are a showing of the programmer flow chart of the program for the manipulate data and control entry to heat content in slab, mill capacity time and slab temperature profile calculation.
Figure 34F:
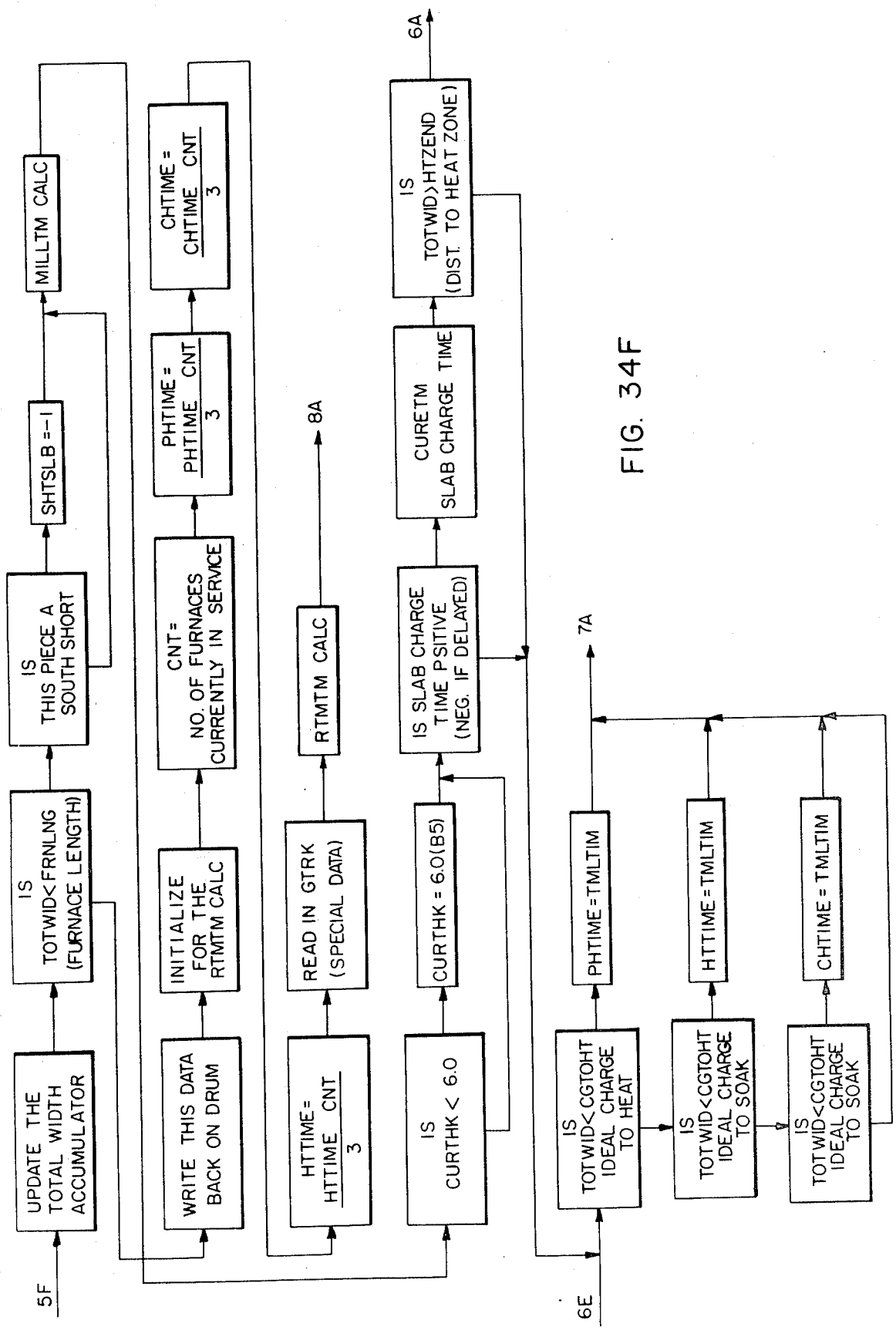
Figure 34G:
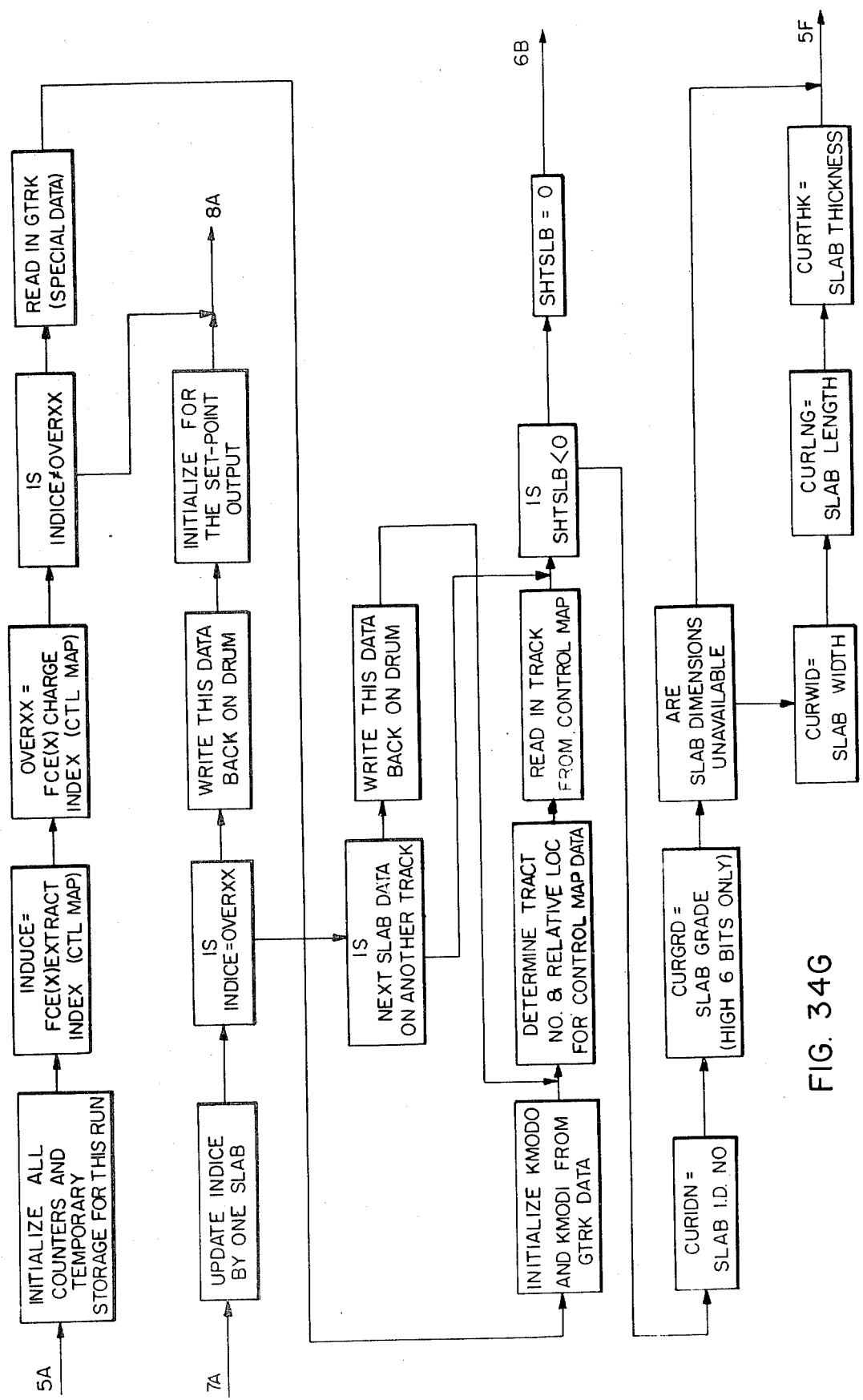
Figure 34H:
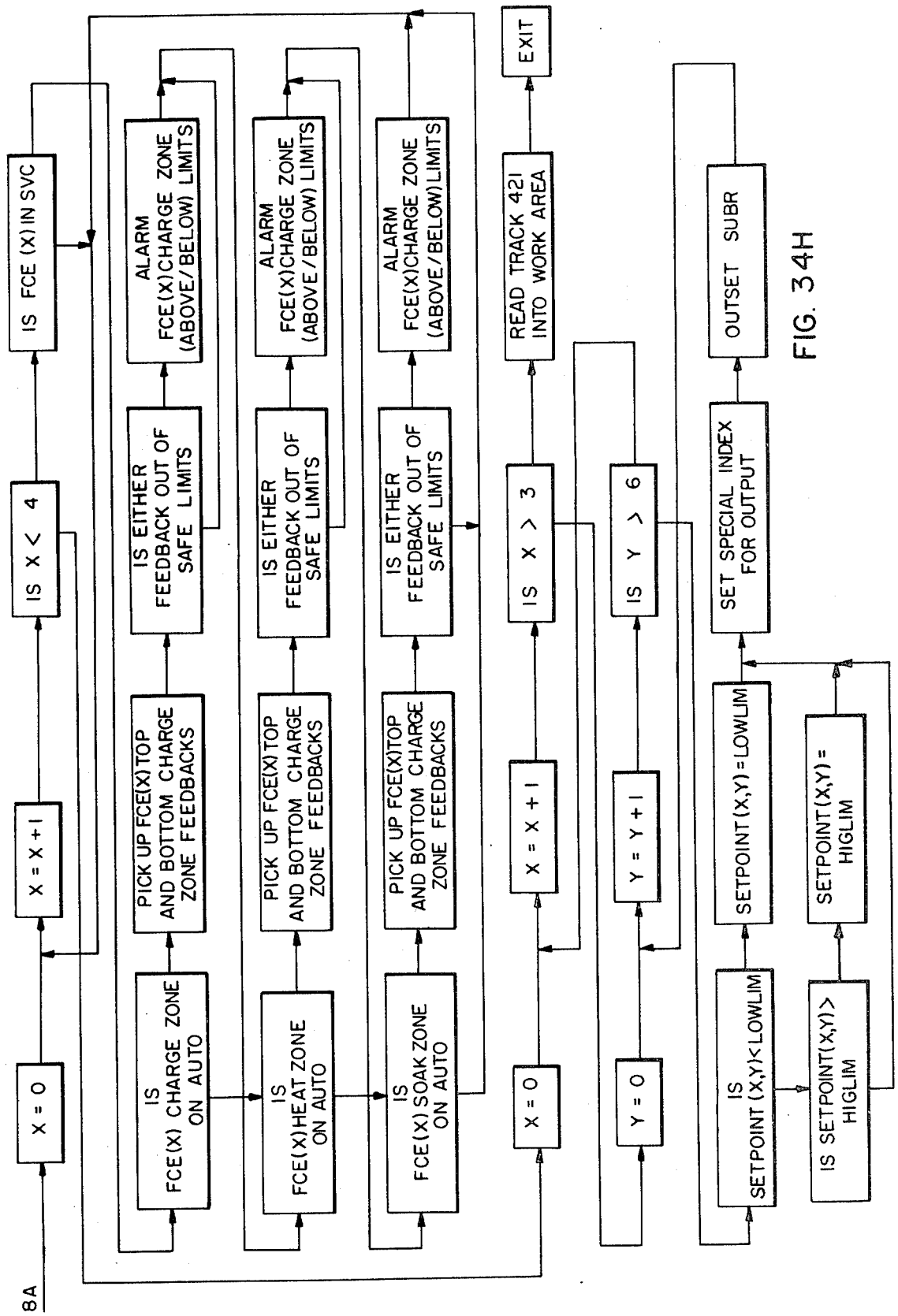
FIG. 34H is a showing of the programmer flow chart of the program for the limit check of furnace temperature feedbacks and limit of allowable change in furnace temperature for an output temperature setpoint.
Figure 35:
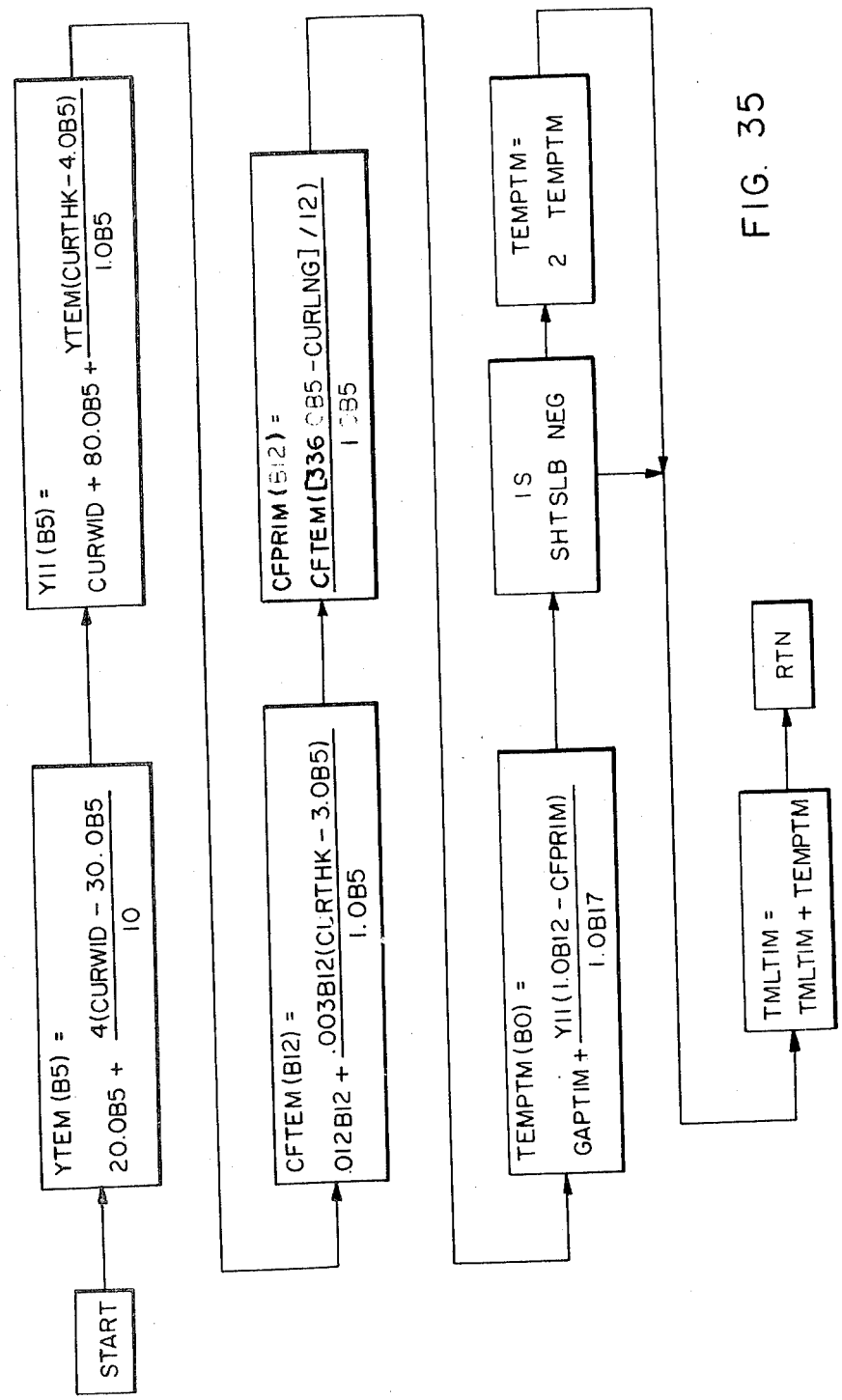
FIG. 35 is a showing of the programmer flow chart of the program for the mill time capacity calculation for determining the furnace cycle time in accordance with block 264 of FIG. 30.
Figure 36:
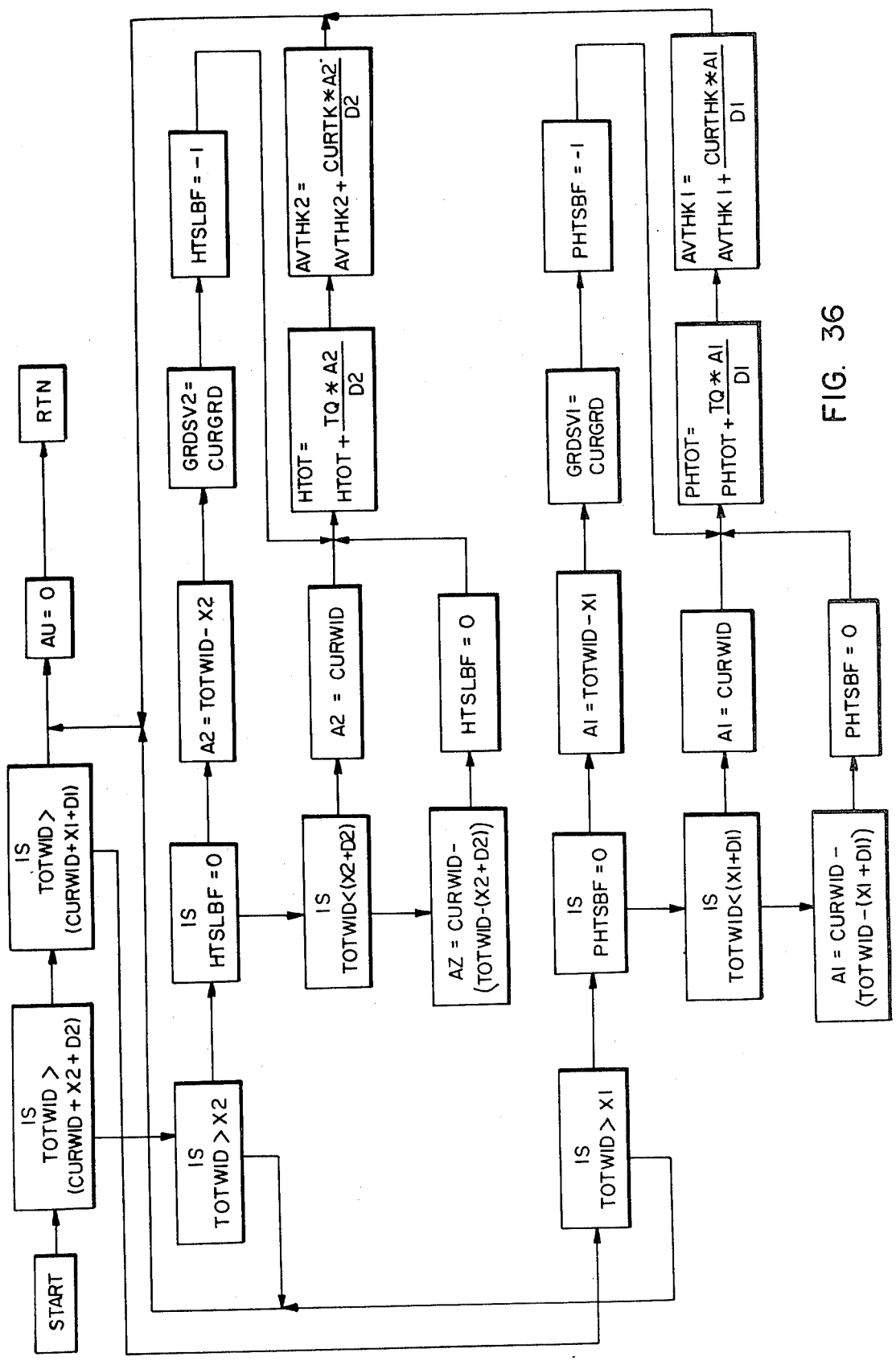
FIG. 36 is a showing of the programmer flow chart of the program for the calculation of the heat content in the average slab in the theoretical control area of each of the charge zone and the heat zone.
Figure 37A:
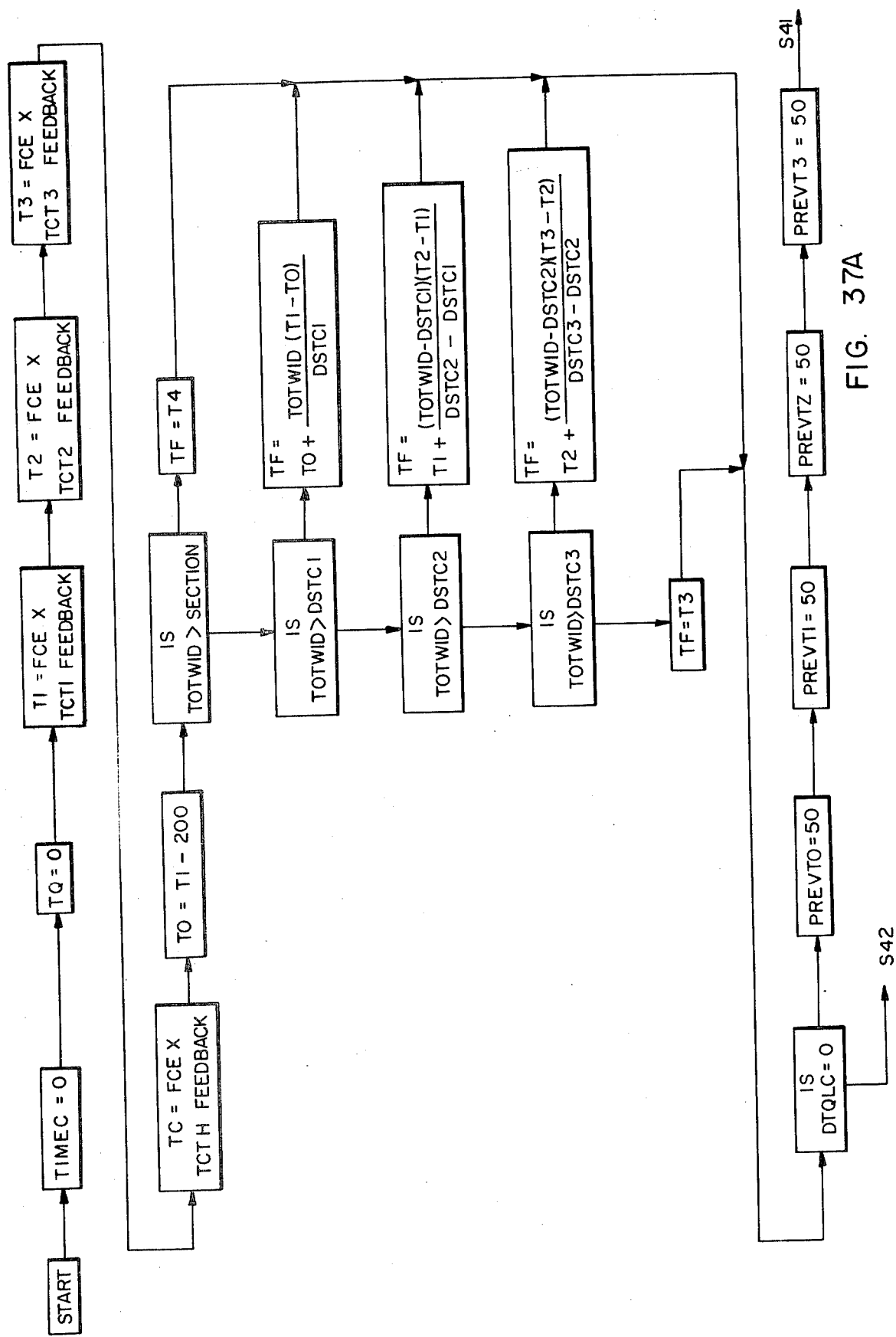
FIGS. 37A, 37B, 37C and 37D are a showing of the programmer flow chart of the program for the calculation of the temperature profile for the slabs in the furnace under consideration.
Figure 37B:
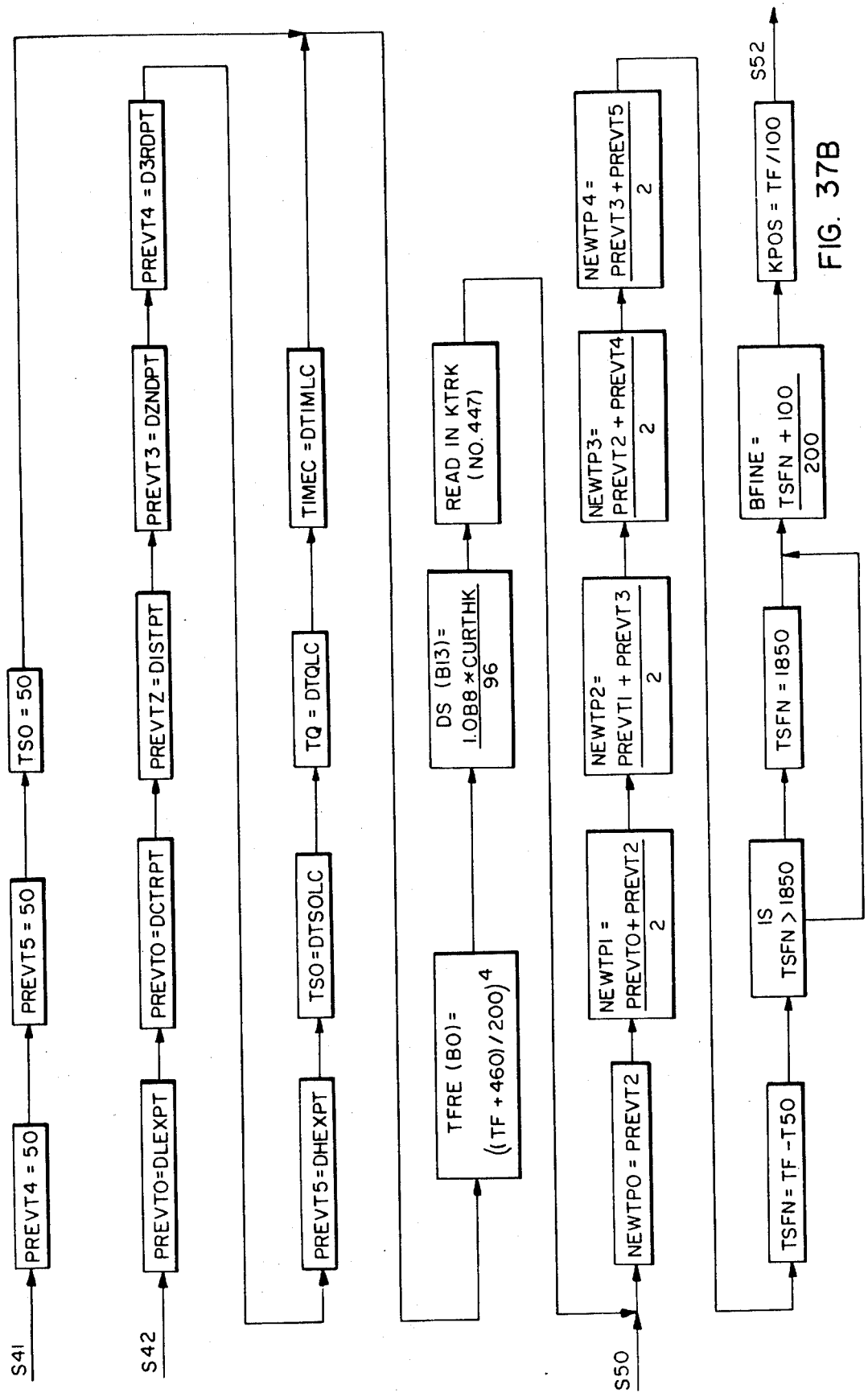
Figure 37C:
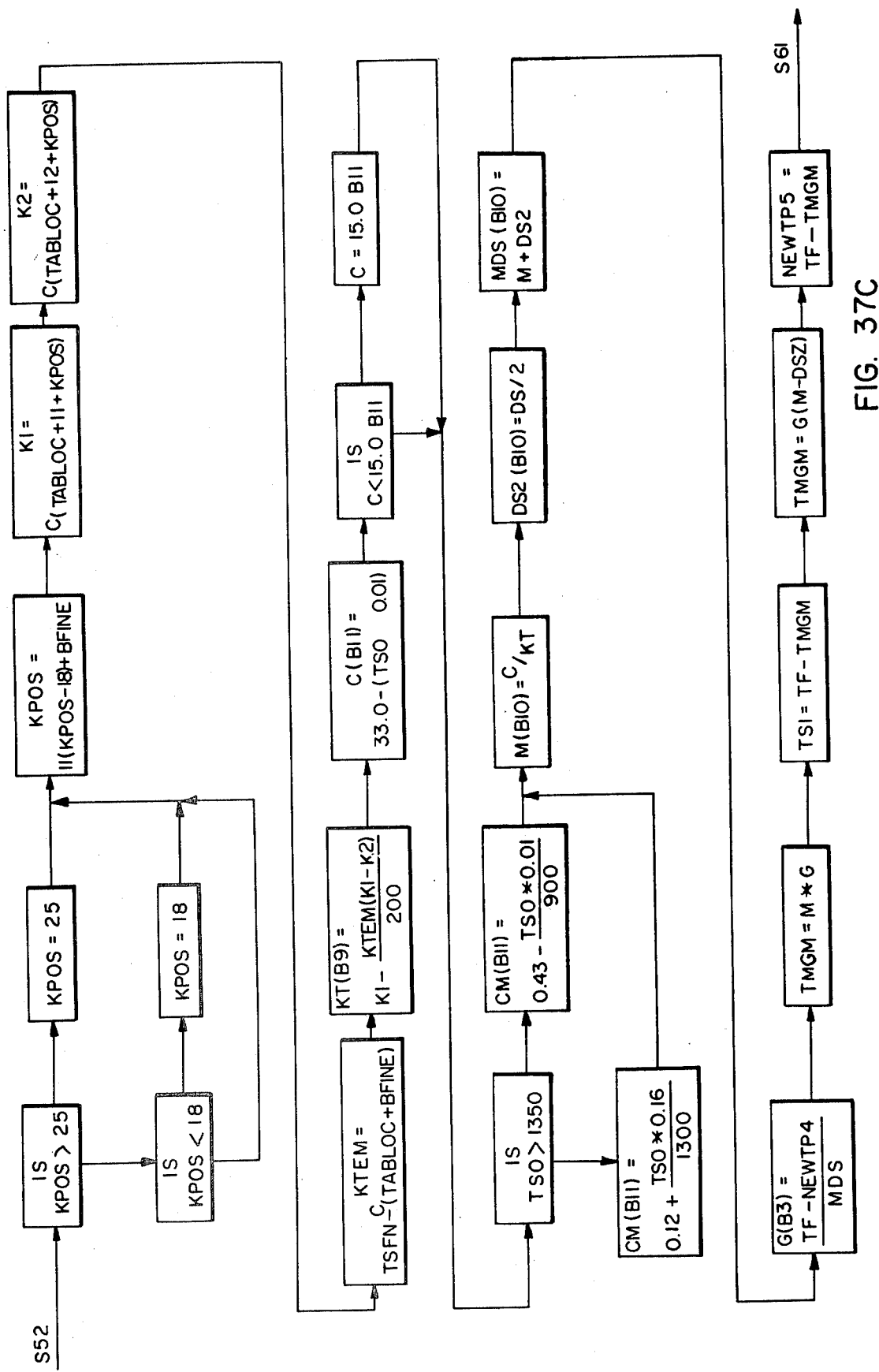
Figure 37D:
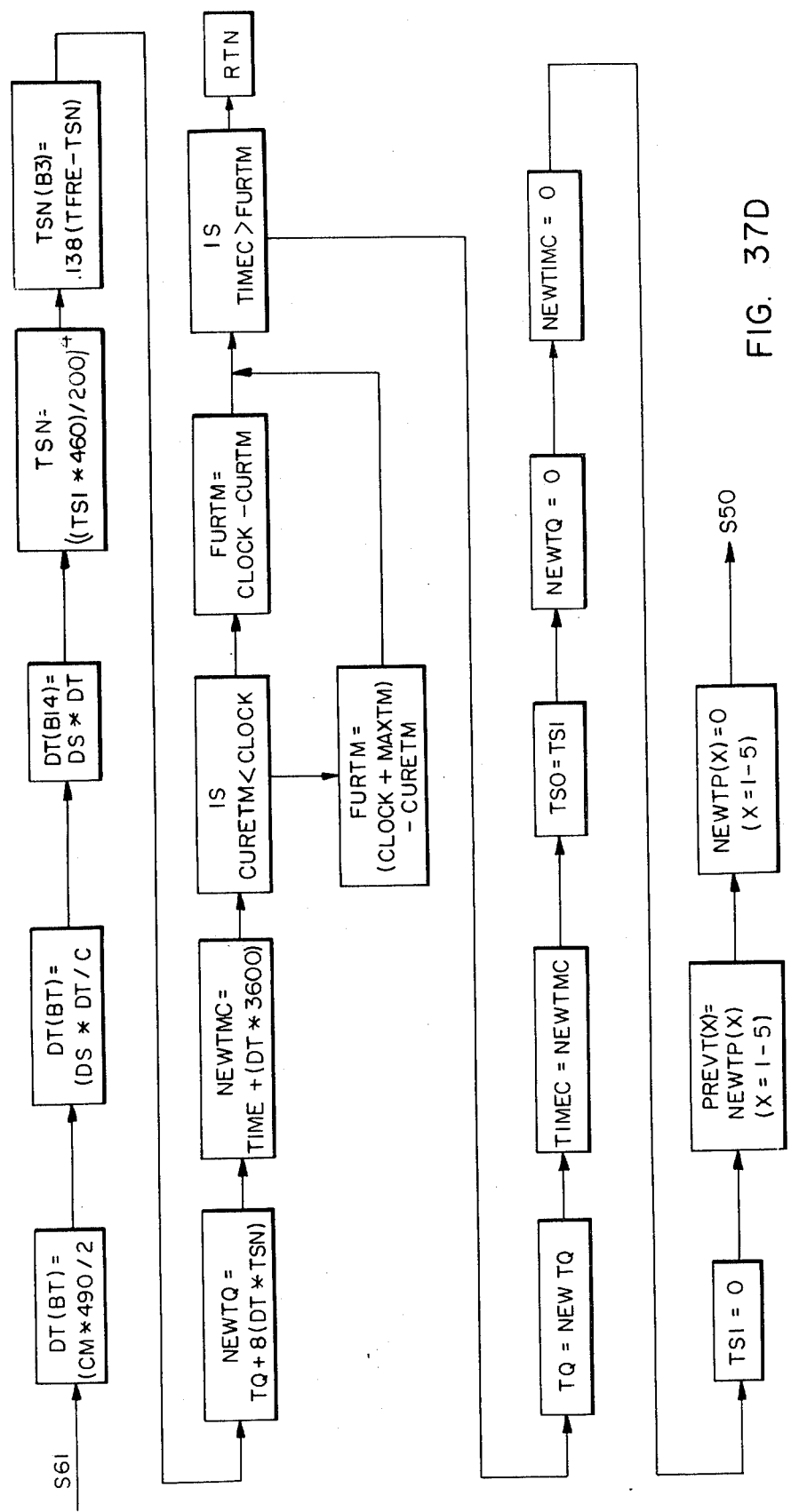
Figure 38A:
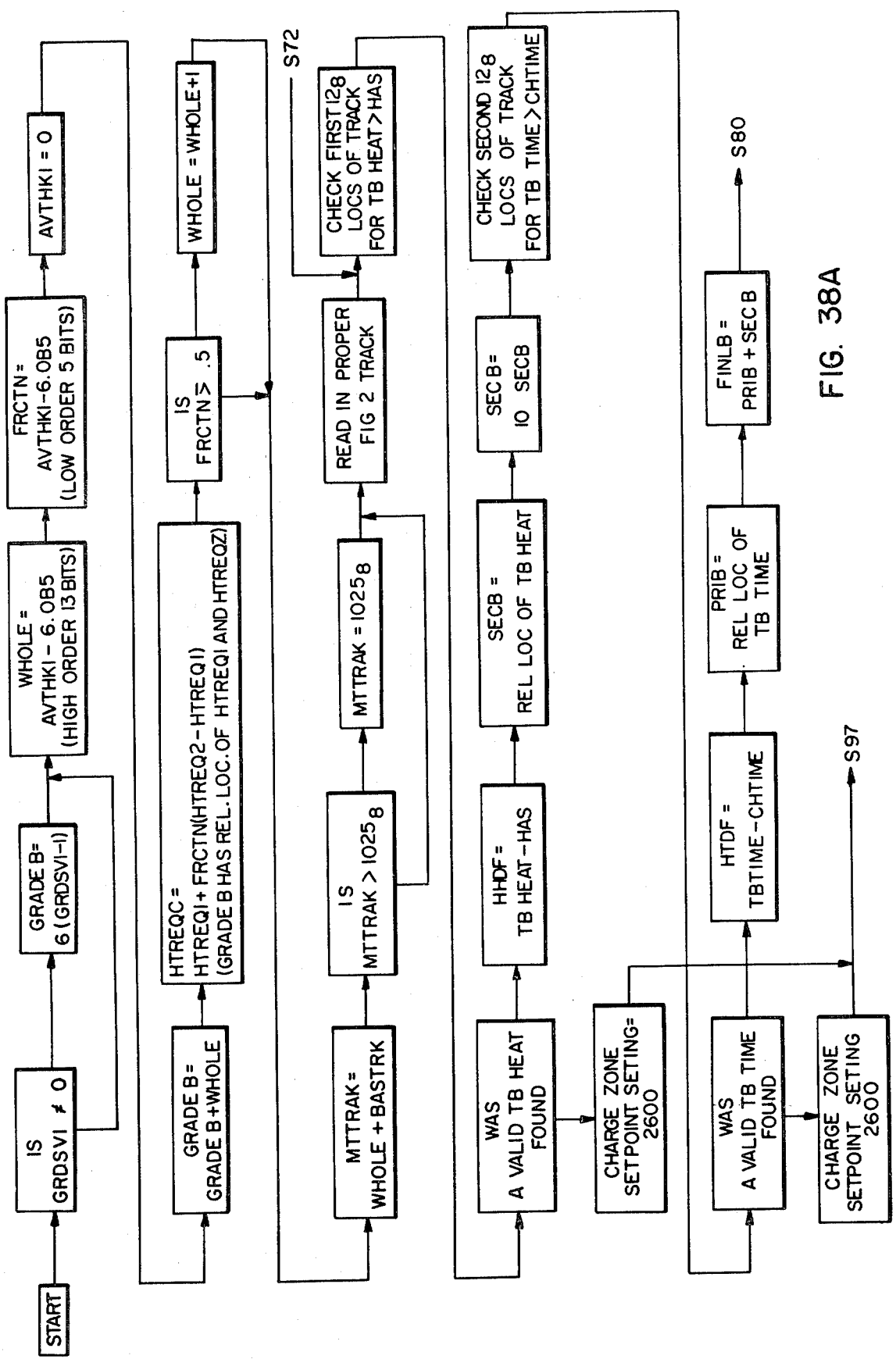
Figure 38B:
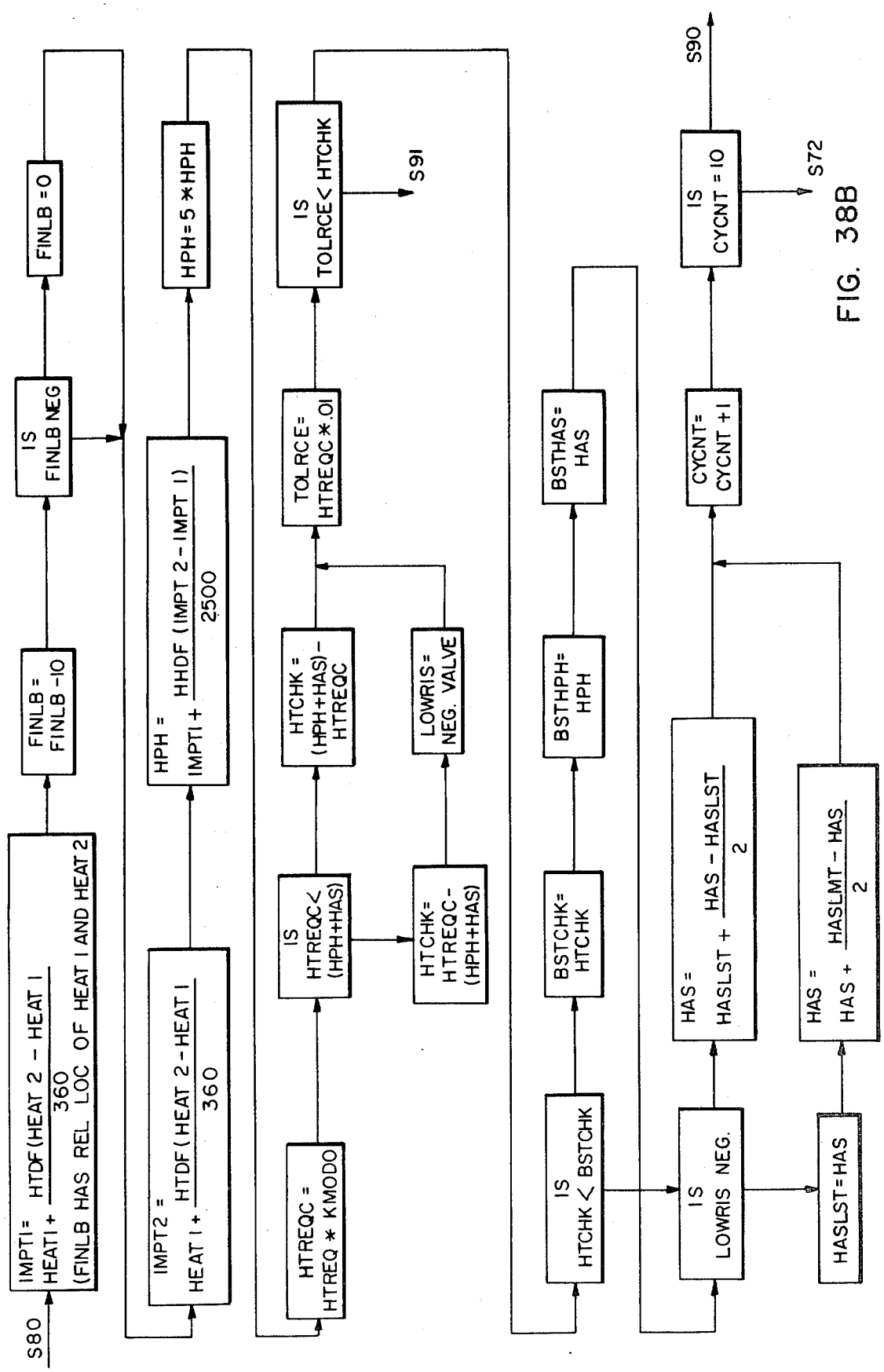
Figure 38D:
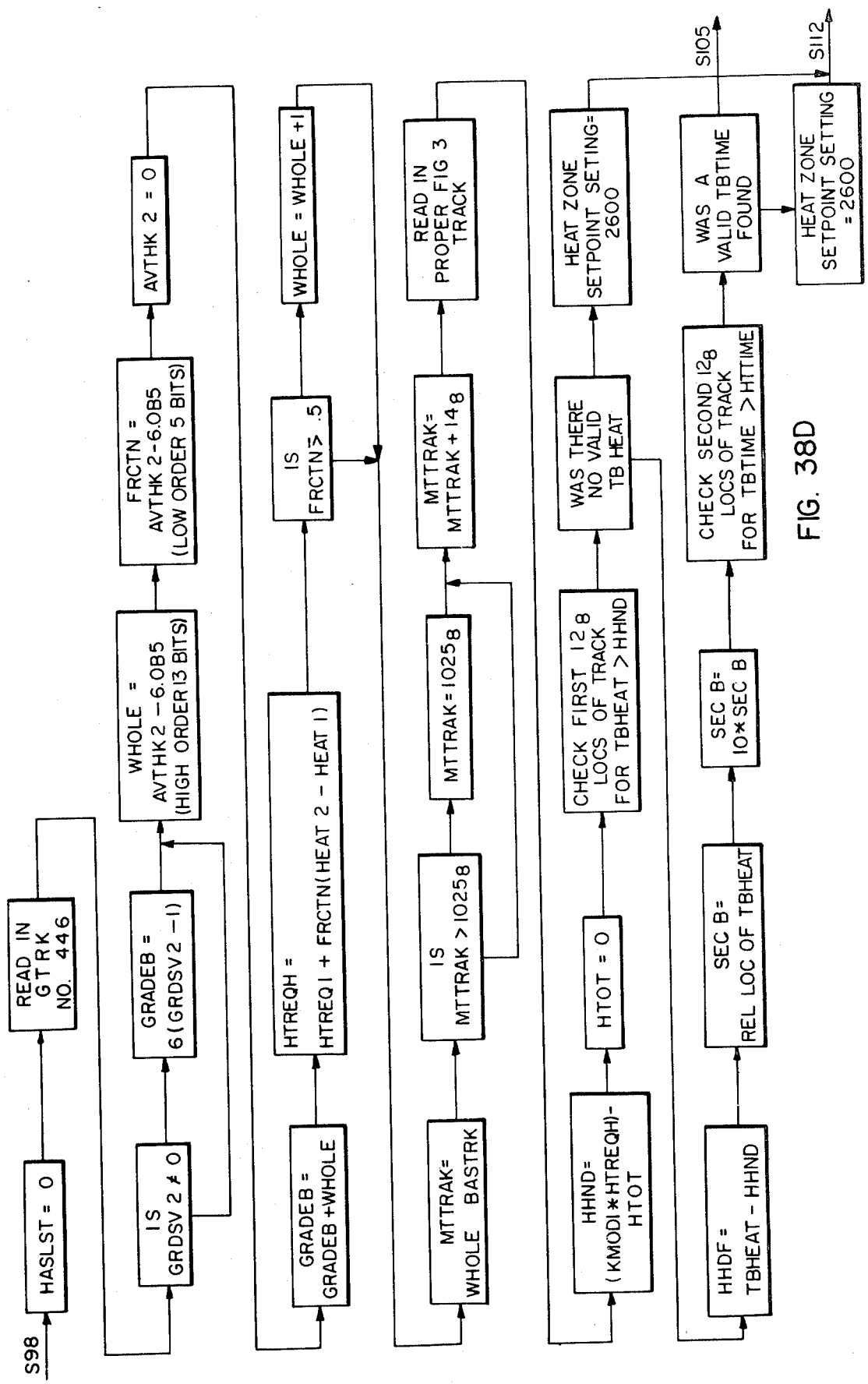
Figure 38E:
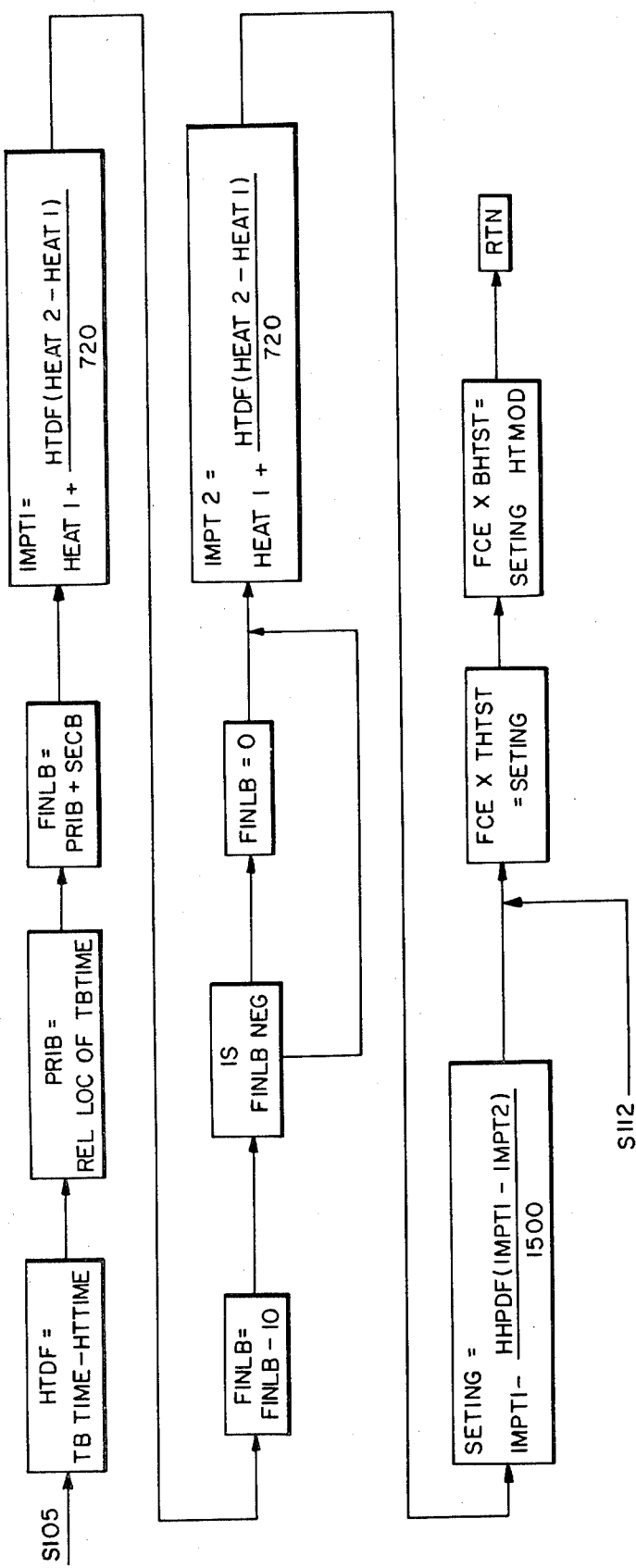
Figure 39:
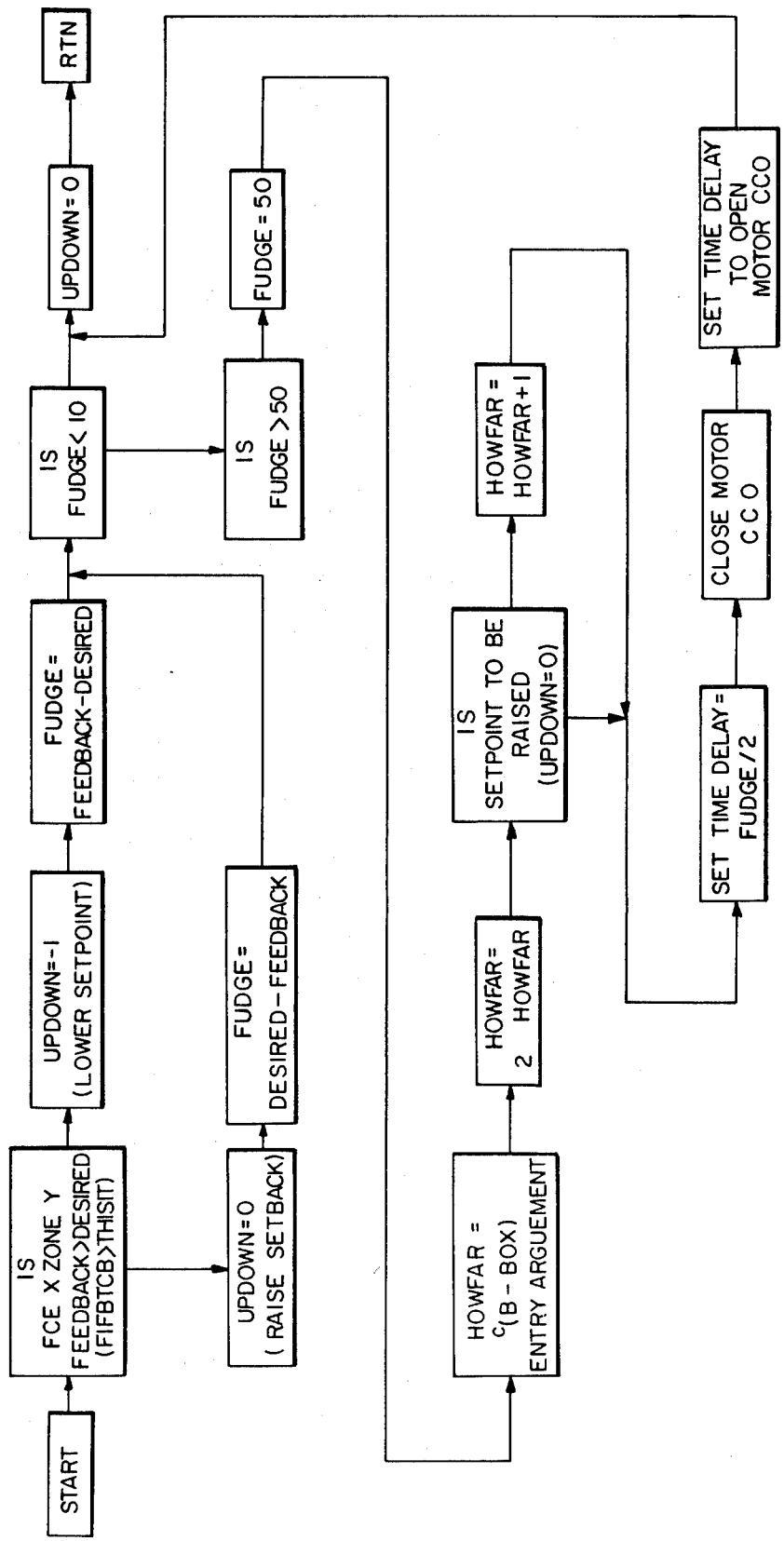
FIG. 39 is a showing of the programmer flow chart of the program provided to output the temperature setpoint to each of the charge zone, the heat zone and the soak zone of furnace X under consideration.

There are two basic heat control operations in regard to the slab heating control programs as shown in FIGS. 27, 28 and 29. One is an operator interface as provided wherein the programs react to operator provided inputs; a first of these is the delay override interrupt for furnace $X+1$ and the second of these is the push to extract interrupt for furnace X as shown in FIG. 27, and a third primary operator input is the expected delay interrupt as shown in FIG. 28. The other heat control operation is periodically undertaken in regard to the rolling mill cycle time and the number of slab heating furnaces in operation, as shown in FIG. 29. The control operation is generally described in relation to three furnaces, however more or less could be controlled, each having five heat control zones. Furnace X refers to any one of furnaces 1, 2, or 3, and furnace $X+1$ would then be the next succeeding furnace. All three furnaces supply heated slab workpieces to an associated rolling mill, which could include a roughing mill and a finishing mill.

There are two basic timing operations in relation to the heat control programs; one operation is provided when the operator has direct input control over initiating or changing what is going on in the furnace operation and the other is the timing operation that is determined by a selected time base of the clock within the process control computer and is called on periodically. The computer has its own internal clock, and every three minutes, or as often as may be desired by the furnace operator, the heat control program shown in FIG. 29 makes certain periodic updates of the information stored in the computer memory in relation to the heat content status of each slab in each furnace.

In reference to the operator inputs shown in FIG. 27, the most important operation is probably the push to extract interrupt. When this interrupt occurs, due to the furnace operator deciding to take the next slab out of a given furnace in response to the computer telling him when to do it and after it has been determined that the rolling mill is ready for the next slab and the next slab has been heated properly, the next heated slab is removed from the furnace by a suitable mechanism operative to move at least this next slab in response to the push to extract signal from the operator.

At block 203 a check is made to see if the furnace X delay-pending flag is set; if the answer is no, the program continues to block 204 and the previously described normal furnace extract program. If the answer at block 203 is yes, a check is made at block 205 to see if the count equals zero; if the answer is no at block 205, then the count is set to a count of minus one at block 207 and the program then continues to block 204 and the normal furnace extract program. If the answer to the check at block 205 is yes, this indicates that the count does equal 0, and the program advances to the next block 209 of the flow chart. This indicates that furnace X is ready to start into an expected delay, so at block 209 the furnace X delay in progress flag is set, the program gets the length of the delay, and finds the established temperature curves which correspond to that particular delay length. At block 211 the temperature data for the furnace temperature output program is stored, and this part of the program shown in FIG. 27 ends. Then at block 204 a furnace control log is printed out for the furnace operator, which has information pertinent to the slab that was just extracted to indicate its total heat content, the time it was in the furnace and such information. At block 206 a calculation is made of the mill cycle time for the next slab to extract from the next succeeding furnace $(X+1)$, and $T_{MP}$ is this time that is calculated there. At block 208 a determination is made to see if the next slab out will have a proper soak time, which is another consideration taken here to see if the slab was in the soak zone a proper length of time to allow the heat to be evenly penetrating in the slab and there is a fairly uniform temperature gradient through the slab. It is well known by persons skilled in the art of slab heating furnace operation that at certain temperatures it requires so much time for the heated slab to soak properly before it is ready to be rolled, and an empirical time factor determined by the furnace operator is provided here for this purpose.

The three minute furnace cycle for each furnace is required when the associated rolling mill could roll a heated slab every minute, and with three furnaces in operation this requires putting a slab into and taking a slab out of each furnace once every three minutes. There can be anywhere from 30 to 100 slabs being heated in each furnace, and this is dependent upon the width of each slab. A typical slab width will be anything from about 28 inches to about 75 inches or so. If the typical furnace is 100 feet long, and only 28 inch slabs were put into the furnace, this would mean roughly 40 slabs would fit in the furnace. However, some slabs can be placed end-to-end, which permits about 80 or 90 typical slabs to go into the furnace. The present heat control is operative to handle 100 slabs in each furnace as a maximum, but it would be unusual in practice to reach that maximum.

The determination at block 208 to see if the next slab will have the proper soak time is based on clock time versus the computer keeping track of the real time that the slab is positioned in the soak zone. If the answer is no, then at block 210 the delay light for furnace (X+1) is lighted. The push to extract operation is for the next furnace (X+1); if a heated slab has just been extracted from furnace X, the heat control program now is looking ahead to the next furnace X+1 in relation to the mill cycle or pace time just calculated to see if the next slab out of the next furnace X+1 will have the proper soak time by the time the rolling mill is ready for it. The furnace delay light for the next furnace (X+1) is lit when there will not be the proper soak time at the time the rolling mill will request the next slab from furnace (X+1), so the operator knows there is going to be a delay and he will not be able to take that slab out of the next furnace (X+1) when the rolling mill is ready for it because it will not be soaked long enough. The heat delay light is also lighted, and this is a delay light provided for the heater operator as compared to the furnace delay light being provided for the furnace operator, since the heater operator is located in one room and the furnace operator is located in another room. To furnish a record of this delay there is printed out a log indicating that this slab is delayed and how long it is going to be delayed and why it was delayed. The delay time is stored in the display buffer at block 212 for internal bookkeeping in the computer. At the next block 214 the contents of this display buffer is outout to the extract next slab display, which will give an indication to the furnace operator of how long the slab will be in delay.

At block 208, if the answer is yes and the next slab will have the proper soak time at the expiration of the mill cycle time, the program advances to block 216 to determine if the slab in the nose of the heat zone will have the proper heat content at the time of the next push. In other words, the determination here is, will the heat content of the slab at that time be equal to $H_T$, the total heat desired plus or minus a delta H provided by the furnace operator as a tolerance factor, in accordance with the relationship $H=H_T\pm\Delta H$. This is in relation to the next slab which will leave the heating zone of the next furnace for this determination, since this is the last time to give any appreciable chance to put more heat into that slab and once it moves out of the heat zone, the furnace is not going to be able substantially to increase this heat content. This program step is looking ahead to see whether or not a heat delay should be provided to make sure that the slab is positioned there long enough to get the proper heat content. If the answer to the question in block 216 is yes, at block 214 there is provided a display of the time to extract the next slab and this particular program ends. If the answer at block 216 is no, the program goes through a heat delay procedure similar to the one that was provided in relation to the soak time. The associated lights are lit and the logs are updated as indicated at block 218 and at block 220 the delay time is stored.

The furnace operator is given the opportunity to override the computer program generated delay time if desired, and upon his initiation the delay override program for furnace (X+1) is started at block 230. The furnace operator may decide that he wants to get a particular slab through to the rolling mill rather than delay the rolling mill to permit the proper heating of that slab. It may be that he thinks the slabs behind the one about to leave furnace (X+1) are all heated properly, and there was something unusual about the heating of this particular slab. Another reason for providing the delay override function is for debugging a control program that is not working right, and this permits the furnace operator to proceed as he may desire. The delay override program at block 232 will cause the computer to print out the fact that for an identified slab the delay on that slab has been overridden by the furnace operator. At block 234 the delay lights are turned out for the pusher operator and for the extractor operator. At block 236, the display buffer is restored to the mill cycle or pacing time to indicate what operation is desired for rolling mill and not what operation is desired for the furnace.

The pusher pulpit is located at the entrance or charge end of the slab heating furnace and includes an operator pushing the slabs into the furnace, and he is not too concerned with the details of the slab heating function. The extractor pulpit is located at the exit or the other end of the furnace, and includes an operator who takes the slabs out of the furnace and he does have some consideration in relation to whether or not the slabs are ready to roll. These operators have verbal communication between each other. When some indicated delay is for the benefit of the extractor operator, it is necessary to also inform the pusher operator what is going on because he may want to put another slab into the furnace but he cannot put one in until the extractor operator takes a slab out of the furnace.

At block 210 there was indicated a soak time delay and then at block 218 there was indicated a heat delay, and either one of these can be overridden. If for example a soak delay was previously requested and the operator overrides the soak delay, the control program at block 238 provides a check for a heat delay. If a heat delay was needed at block 216, the delay light at block 218 was turned on. Now if the furnace operator desires to override the heat delay he would initiate the delay override interrupt at block 230, and the control program at block 238 would then ask if this is a heat delay override, and if the answer is yes and the program would advance to block 214 and then turn off. Now the control operation will be in a situation where the rolling mill operation is pacing the extraction of the next heated slab and not the furnace control operation.

The expected delay program shown in FIG. 28 is utilized by the furnace operator if something like a roll change in the rolling mill is desired, and this will stop the extraction of slabs from the furnaces for a given period of time such as 10 minutes to an hour. Also, it could be used when the rolling mill is shut down for a turn, and it is only going two turns a day and at the end of the second turn the rolling mill would shut down for eight hours. The furnace operator can use the expected delay program to input this length of expected delay. When the furnace operator dials in the length of an expected delay, this will result in cutting back the furnaces for the indicated length of time. The computer memory includes some predetermined and charted heat control information based on the length of time of an expected delay and how much the control system should cut back the respective furnace temperatures accordingly, and then after a predetermined time bring those temperatures back up so that the furnaces will then be ready to operate as desired at the end of the scheduled expected delay time period. In regard to slabs that have been affected by an expected delay, it is desired to more or less ignore all the data calculated and in the respective slab maps for these slabs, because they may have been setting in the furnaces for three or four hours, in which case the heating of these slabs will even out but the available data have associated with them would not be desirable to feed back into the operation of the control program models because the models are based on the continuous flow of the slabs through the furnace and if the movement of the slabs is stopped for a couple of hours the resulting data is not desired for making control program feedback modifications.

One of the big advantages of the computer control system and method is that when a delay happens and the flow of new slabs into the furnace and the old ones out of the furnace is stopped, soon those slabs in the furnace get heated up and after a half hour or to an hour, they probably become pretty well heated. At that time it is no longer necessary to hold a given setpoint control temperature such as 2500°–2600° F. any more, and the furnace can be cut all the way back down to a setpoint temperature of about 1800° F. or so which is generally what the present computer control system will do. Thusly, for any delay from an hour up to eight hours or longer, the furnaces could be cut back down to a temperature range of about 1800° F. and held there for some length of time related to the delay and then slowly brought back up to the desired operating temperature at a controlled time prior to the furnace it is desired to take the next slab out of the furnace. The furnaces are usually not turned off completely, because it is desired to be in condition to come back up in temperature reasonably quick, so a temperature range such as 1800° F. can be selected as the temperature that the furnace would drop down to in 50° F. steps, such as 50° F. every three or four minutes. This can be just another consideration included in the total slab heating furnace control philosophy of the present heat control programs.

The expected delay program shown in FIG. 28 is initiated by the operator provided input of an expected delay interrupt. When the computer control system receives the expected delay interrupt at block 300, the computer reads three pieces of input information: the furnace number, the length of the expected delay, and the number of slabs to discharge from the furnace until the start of the delay. At the next block 302, the computer memory stores the furnace number, the length of the delay, and the count number of slabs for the slab extraction program. In the next block 304 a flag is set for the furnace X delay-pending flag, and the program stops.

In reference to the program flowchart shown in FIG. 29, at block 248 the control program updates the slap map in the computer memory concerning the heat content and surface temperature data about each slab in furnace X. At block 250 a determination is made to see if furnace X is not on an expected delay. If the answer is yes, and it is not on such a delay, then the program proceeds through the normal calculations concerned with updating all of the slab map information the computer memory in relation to the slabs in the furnace X. If the answer at block 250 is no, and the furnace is not on an expected delay, the program proceeds to block 252 to check if new setpoints need to be output from prestored data. In this way, the temperature setpoints are raised or lowered as may be desired for an expected delay condition of furnace operation.

On a typical slab heating furnace there are conventional analog setpoint temperature controllers, including a manual dial that the furnace operator can set to 2400° F. and this automatically operates the controller to control a given heating zone of the furnace at a temperature of 2400° F. Thermocouples are located in the furnace so they are not directly in the flame but give a good idea what the effective furnace temperature is around the slab, and these thermocouples provide temperature feedback signals to the individual controllers. For example, the operator can manually establish the temperature control setpoint for a desired 2400° F., or the computer control system can set this setpoint for 2400°. A switch is provided for this purpose on each controller that can be used to provide for computer control or manual control.

Referring back to block 252 of FIG. 29, this check is made to see if new temperature control setpoints need to be output, based on a prestored data. If the furnace operation is on expected delay, this path is taken to see whether or not the respective control heating zone temperatures need to be updated based on prestored data. One consideration here is setpoint change tolerance in that the program which does the actual output of the desired temperature setpoints to the furnace heating zone controllers will not put a 300° F. step change, and instead it provides a maximum change of 50° F. per minute. So the control program cycles itself every minute, and if it is desired to make a 300° F. change, the program will actually output six 50° F. steps at one minute intervals so actually it is going to take six minutes to make that change. It is possible to come through this program and want to make another change within that six minute time period, so this block 252 is providing a check to see if new temperature setpoints are needed to meet the desired temperature within a certain tolerance such as a 25° F. tolerance or maybe a 5° F. tolerance as may be desired. This tolerance comes about from another factor in that the output to the setpoint controllers cannot tell the controller to make a 300° change and the furnace zone temperature controller can only run its motor for a given length of time, such as in intervals of a 20th of a second, so the motor is turned on and it stops a 20th of a second later or 2/20th of a second later, and so forth, or a minute later but with no greater resolution than a 20th of a second. This 20th of a second then becomes the tolerance that is available for setting the temperature controllers. This is not critical to the philosophy of the present furnace heat control operation, but this is an example of one of the practical real time control constraints that must be considered.

The more normal operation of the program shown in FIG. 29 is where the furnace is not on an expected delay, so the program then proceeds to the first subroutine which is indicated in block 254 as the heat content calculation and surface temperature calculation for furnace X. The previously described Schmidt method is used as the way the heat content calculation is made through an arithmetic averaging technique. This is done for each slab in the furnace, and there may be anywhere from 30 to 90 slabs in a furnace, to update the furnace map with this information so that each slab has now an updated temperature profile and updated surface temperature and an updated heat content. The program advances to block 256, which is the subroutine for calculating the control setpoint temperature in the change zone based on the heat content information just updated in the previous subroutine block 254 and based on the known physical properties of each slab. This calculation is in relation to the illustrations of FIGS. 2 and 3. It is desirable to run the respective heating zones of a slab heat furnace at a generally constant temperature control setpoint since the various operation conditions are more predictable and more controllable, and this gives a longer life out of the furnace bricks and so forth. This charge zone setpoint calculation subroutine of block 256 is described in detail in relation to the flowchart shown in FIG. 30.

At block 258 of FIG. 29, the program goes to the heat zone temperature setpoint calculation subroutine, described in detail in relation to the flowchart shown in FIG. 31.

The program shown in FIG. 29 has now determined the temperature setpoints for the charge zone and for the heat zone of furnace X. At block 260 the predetermined soak zone temperature, which is provided by the furnace operator as an input reference soak zone temperature control setpoint, is read by the computer control system. At block 262 a check is made to see if the last temperature setpoint changes were actually met by the respective furnace heating zones within the provided tolerance. If the answer is yes, then at block 264 the now established and now desired new temperature setpoints are output to the respective zone temperature controllers. It is possible that the computer control system will get busy and not be able to turn off a given output contact in a proper time interval, such that the temperature setpoint form some controller is advanced too much; at block 262, a feedback check is provided to alarm the furnace operator if this condition should ever happen.

If it becomes desirable to shut down the furnace for some time period, such as for 8 hours, this would be an expected delay and the program shown in FIG. 29 would not run through all the heat content, charge zone setpoint and heat zone setpoint calculations on the slabs because the furnace is not being controlled. When the expected delay terminates, the furnace is full of slabs that have not been properly heated. Thusly, a flag is set on each of the data buffers associated with those slabs to indicate that those slabs were affected by an expected delay, and these flags are checked at block 250 and if set prevents the program going through the here described calculations. It is desirable to clean out the furnace and push in new slabs after an extended expected delay, before the program operation settles down and builds up all the slab map information and goes through all the routines provided for optimum control of the furnace.

In reference to the charge zone temperature setpoint calculation subroutine shown at block 256 of the program shown in FIG. 29, a detailed showing of this same subroutine is provided in FIG. 30. When this program is called, at block 259 the program calculates the average thickness and the average width of the slabs in the slab map of furnace X. At block 261 the mill cycle time is calculated based on the average width and average thickness of the slabs, since a thicker slab takes more work than a thin slab and the thicker slab becomes longer when it is rolled, which mill cycle time calculation is based on the well known information generally illustrated in FIG. 5. At block 263 a check is made on the operator input of the furnace X gap time, which is an overriding time between slabs that the operator can input for many reasons, for example if he may want to have two minutes between slabs instead of one minute between slabs going to the rolling mill. At block 265 the furnace cycle time is calculated based on the furnace control model, the mill cycle time and the gap time and the number of furnaces in operation. At block 266 there are determined the slab travel time $t_H$ (predicted) through the heat zone and the remaining slab travel time $t_{CH}$ (rem) through the charge zone. At block 268 and with these predicted time, the curves of FIGS. 2 and 3 for a 7 inches average control slab thickness are used to determine in relation to the total heat content $H_T$ the heat $H_H$ added in the heat zone and $H_{CH}$ the heat added in the charge zone. It should be here noted that $t_H$ (predicted) is the travel time for theoretical control slab in the charge zone to travel through the heat zone, whereas $t_{CH}$(rem) is the time remaining for the theoretical control slab in the charge zone to travel through the remainder of the charge zone; the control slab in the charge zone is already partly through the charge zone and it has to go all the way through the heat zone. The total heat content $H_T$ is used to divide up the total heat effort between these two heating zones.

A schematic showing of a typical slab heating furnace is shown in FIG. 6; the charge zone is 43 feet long, and in that 43 feet there is a certain heat content B.T.U. that is going to be put in the slab; the heat zone is 34 feet long, and in the heat zone there is a certain amount of heat content B.T.U. that is going into the slab. For this purpose a theoretical or control slab area is initially established as an eight foot wide section of slabs, located $21\frac{1}{2}$ feet from the entry of the charge zone or about half-way through the charge zone.

At block 270, shown in FIG. 30, the slab map is checked for the actual thicknesses of all slabs and slab portions within this control slab area, such that an average thickness is then established in relation to the actual widths of those slabs. At block 272 the time remaining $t_{CH}$ (rem) for this control slab or representative slab in the charge zone is determined in relation to the known demands of the rolling mill and the operation of the furnaces. At block 274 the remaining heat content $H_{CH}$ (needed) required in the charge zone is determined as $H_T$ minus the sum of $H_H$ and $H_{CH}$ (actual), where $H_{CH}$ (actual) is the heat content already in the control slab. Another way to say this same relationship is $H_{CH}$ (needed) is equal to $H_{CH}$ minus $H_{(actual)}$, and $H_{CH}$ is $H_T$ minus $H_H$. The amount of time this control slab will remain in the charge zone and the amount of heat needed to be put into it is what determines, in relation to the curve information of FIG. 3, what the temperature control setpoint should be for the charge zone, and this is calculated at block 276 of the flowchart. It should be understood that the present control system and method can be fine tuned in its operation relative to a given slab heating furnace by moving the theoretical control slab location within the charge zone as well as the theoretical average dimensions of this control slab as may be desired to better represent the actual heating conditions present within the charge zone of the furnace.

In reference to the flowchart program in FIG. 31, which is called as the subroutine to calculate the heat zone temperature setpoint, at block 280 a check is made of the slab map for the theoretical control slab in the heat zone to determine the average thickness of same. At block 282 the time remaining $t_H$ (remaining) for this control slab to travel to the end of the heat zone is calculated. At block 284 there is calculated the heat content $H_H$ (needed) to obtain the desired total heat $H_T$ in this control slab at the end of the heat zone. At block 286, using FIG. 4 and based on the $H_H$ (needed) and the $T_H$ (remaining), the heat zone temperature control setpoint is determined.

Pages 1 through 4 contain macro definitions used within the program. Pages 5 through 17 contain constants and data location used within the program. Page 18 contains a small subroutine called NEWFRM used within the program. Pages 19 through 22 contain additional constants and temporary locations used within the program. Page 23 begins up-data furnace map program.

For the program shown in FIGS. 27 and 28, the furnace operator has director input control over the operation of the slab heating furnace, whereas the program shown in FIG. 29 is operative off of a time clock within the control computer, and is periodically bid by the control computer. This period can be in the order of one minute to every three minutes, and for the example of three furnaces in operation, every three minutes can be selected in regard to the heat flow calculation for each furnace, with the program making periodic updates of certain information such as heat content and surface temperature in relation to each slab contained within a particular heating furnace. The more frequent this updating is done by the control computer, this should result in a better control of the furnace operation; however, the duty cycle of the control computer must be considered, and a compromise between the desire to frequently update this information on one hand as compared to the desire of minimizing the duty cycle requirement of the control computer on the other hand must be established. The desired resolution of the final control system operation is determinative of how frequently this updating of furnace slab heat treatment information is made. The operator input portion of the here described furnace heat control philosphy is probably the less important when compared to this periodic updating of the slab heat content and furnace heating zone control information.

In reference to the operator input flowcharts shown in FIGS. 27 and 28, probably the most important opertor input is the push-to-extract interrupt for furnace X. This relates to a furnace operator decision to take the next slab out of the furnace. If desired, the push-to-extract interrupt could be automatically provided by the computer control system upon sensing that a previous slab has entered the first stand pass of the associated rolling mill, for example, and it is now time for another slab to be supplied to the entry tables leading to the rolling mill. The operation of the here described control system is such that the control computer tells the operator to provide the push-to-extract interrupt signal for the next slab ready and available to be supplied to the rolling mill, and the control computer does not care from which furnace it is supplied. The slab map in the computer memory for each of the furnaces enable the computer to determine which slab, in the combination of the heating furnaces, is ready and should be the next selected slab to be supplied to the rolling mill. This decision is based upon the rolling mill capacity program and furnace control considerations. Not only does the rolling mill have to be ready to receive the next slab, but the next slab has to be heated properly, such that, in effect, a determination is made when both the actual extraction of the next slab is desired and the supply of that slab workpiece to the input of the rolling mill is to be provided. The provision of the push-to-extract interrupt program is provided such that the operator can make this decision when another slab is needed to be extracted from one of the available furnaces and supplied to the rolling mill. After a push-to-extract interrupt by the operator for a particular furnace, such as furnace X, is provided, the computer goes through the storage information for that particular furnace, and updates the slab map information relative to all of the remaining slabs residing in that furnace. This updating includes the information that one slab has been removed from furnace X and another slab is now entering furnace X, and updating the temperature and heat content status information for each slab in the furnace, and so forth. Known relationships are established between the temperature of each slab and the desired period of time required for that slab to be positioned in the soak zone at that temperature level, since this is a more or less empirical time factor relationship that is provided for the desired operation of the slab furnace and the subsequent rolling mill. A typical value here for this soak time may be in the order of 10 minutes for the usual desired temperature level of the slab. A rolling mill will typically take a slab about once every minute; and for this reason, a three minute periodic update for the combined operation of three slab furnaces would provide an information update for one of the furnaces about every time that a workpiece is removed from each of the furnaces. Thusly, a slab is put into and removed from each furnace about every three minutes; and the information update for that same furnace at the same time period relationship should provide a desired operation of the furnace control program.

GENERAL CONSIDERATIONS

The term effective furnace temperature as here used is in relation to the radiation and reradiation of heat energy into a slab within a given heating zone from all effective heat sources within the furnace such as the furnace walls, the flame, the hot gases surrounding the slab and so forth. The bulk of this slab heating is probably by direct radiation from the heated furnace wall, and this is why the effective furnace temperature TF is sensed by a thermocouple or total radiation device within each heating zone, which device is positioned adjacent the furnace wall in a location outside the direct flame from the burner. This effective furnace temperature TF is used in relation to the slab heating model such as shown in FIGS. 8 and 9, and empirically it should be recognized tha other heat sources such as the surrounding hot gases and the flame itself are also included. The slabs come out of the furnace soak zone in relation to how fast the rolling mill can accept those slabs, so that if the rolling mill is accepting a heated slab every minute, and only one furnace were in operation, then a slab would leave that furnace every minute and thus all the slabs would move by an amount corresponding to the width of the removed slab. Thickness is the primary consideration in relation to heat content control of the slabs, but it is also necessary to know how long it will take a given ideal or representative control slab of a determined average thickness to move through each of the charge zone and heat zone, and that becomes then a function of the width of the slabs leaving the soak zone. But with two furnaces in operation, the speed at which the slabs come out of each furnace is not just a function of how fast the rolling mill accepts slabs from each furnace, but generally the rate of slab movement would be cut in half out of each furnace because now a first slab will be supplied by one furnace, then the second slab will be supplied by the other furnace and so forth. With three furnaces in operation, the slab movement through each furnace would generally be cut into a third.

The mill capacity model for the rolling mill includes a rate of rolling limit which has a width factor, because wide slabs require more horsepower to roll than do narrow slabs. An additional consideration is a mill limit in relation to the rolling of 80 inch slabs as opposed to 20 inch slabs since the former would tend to heat up the drive motors more. The purpose here is to try to find out how fast the rolling mill is going to accept successive slabs, and this then influences, along with the number of furnaces in service, how long the time interval is that it will take a slab to move from one part of a given heating zone to another part of the furnace, and this involves predicting what the rolling mill is going to require.

In general, it is desired to get each slab up to a certain predetermined heat content by the time it gets to the entrance to the soak zone of the furnace, because no substantial heat is desired to be added to the slab in the soak zone. The soak zone allows the temperature profile within the slab to even out from being hotter at the surface and cooler at the center to being uniformly heated throughout. Thusly, at the time each slab enters a furnace, it is assigned a desired heat content upon leaving the end of the heat zone and entering the beginning of the soak zone. The slab model establishes the actual heat content of the slab as it passes through the furnace. The heat control program is operative to distribute the heating of the slabs in the most efficient manner, and will correct any deviation from this. The heat control program includes a limiting point in the control of the heat zone where the control operation has the option to delay the slab movement of the furnace if the slabs do not have as much heat as is required, and the furnace operator has the ability to override this delay operation if he so desires. When a given slab does not have 100% of the desired heat content when that slab is scheduled to leave the heat zone, the computer will alarm this situation to the operator. At the noze or end of the heat zone, the computer makes a final check to see whether or not the slab has the desired predicted value of heat content. If it does not and it is less than 100%, the heat control program will stop the slab movement and an internal flag is set to indicate this has been done and a message is printed on a typewriter for the benefit of the furnace operator; also, there is a printout of the discrepancy to show how much heat content the slab is actually lacking. This gives the furnace operator the opportunity to see if the margins are not too great such that they should roll the slab anyway and override the computer delay and take that slab out. There is a similar time delay provided in the operation of the soak zone which is based on the consideration that the soaking function is strictly a matter of time and a determination is made as to when the slab is evenly heated in relation to how long the slab has been in the soak zone; if the furnace is being pushed too fast for some reason and with slabs of varying thicknesses being positioned throughout the furnace, these conditions are taken care of by the final override control operation in relation to time in the soak zone. For example, if the slab is set for 10 minutes in the soak zone and it has actually been there only 5 minutes when a request is made to supply a slab to the rolling mill, the heat control program delays the slab for five more minutes in the soak zone before permitting the slab discharge. The operator can override this consideration, if he ascertains that it is better off to go ahead and roll a particular slab that is not completely soaked in this regard. The operator does this overriding by simply pushing a delay override interrupt control button, and the computer then resumes normal operation as though the desired temperature, heat content and soak zone time limitations have been satisfactorily met.

The slab heating model is provided in part because it was not reliable to measure the temperature of the slab directly, with a device like a radiation pyrometer looking at the slab because of scale on the slab and like considerations. The slab model is based on well known slab heating technology in relation to the heating of slabs that has been going on for the last 20 years or more. The slab model is operative in relation to a predetermined control area of the slab rather than an entire slab, and the length of the slab does not come into consideration because the model makes the assumption that the slab is heated uniformly across the whole length of the slab. The heat content of the slab in relation to a theoretical control area in a given heating zone is considered, with a control volume of the slab being established by the known average thickness of the control slab area, such as a square foot of surface area. In effect the heat control program is looking down on top of the slabs in the charge zone, for example, to see a square foot of surface area and the heat control volume is established by the effective average thickness of the slabs in this theoretical control area. The known properties of the steel in this control area is considered in the slab model also, and such things as variation of thermal conductivity and specific heat as a function of temperature of the slab are considered.

An additional control parameter is brought into the heat control program after a slab leaves the furnace and enters the rolling mill, such as after the first pass through a roll stand, to provide an indication of the quality of the heat control operation; this would then be a feedback control signal into the furnace model to give an indication of the actual delivery slab temperature. This actual temperature sensing is done with a radiation pyrometer in the rolling mill where it is practical to get a fairly good reading of what the slab temperature is, since much of the scale has been removed from the slab surface at that location.

Figure 25:
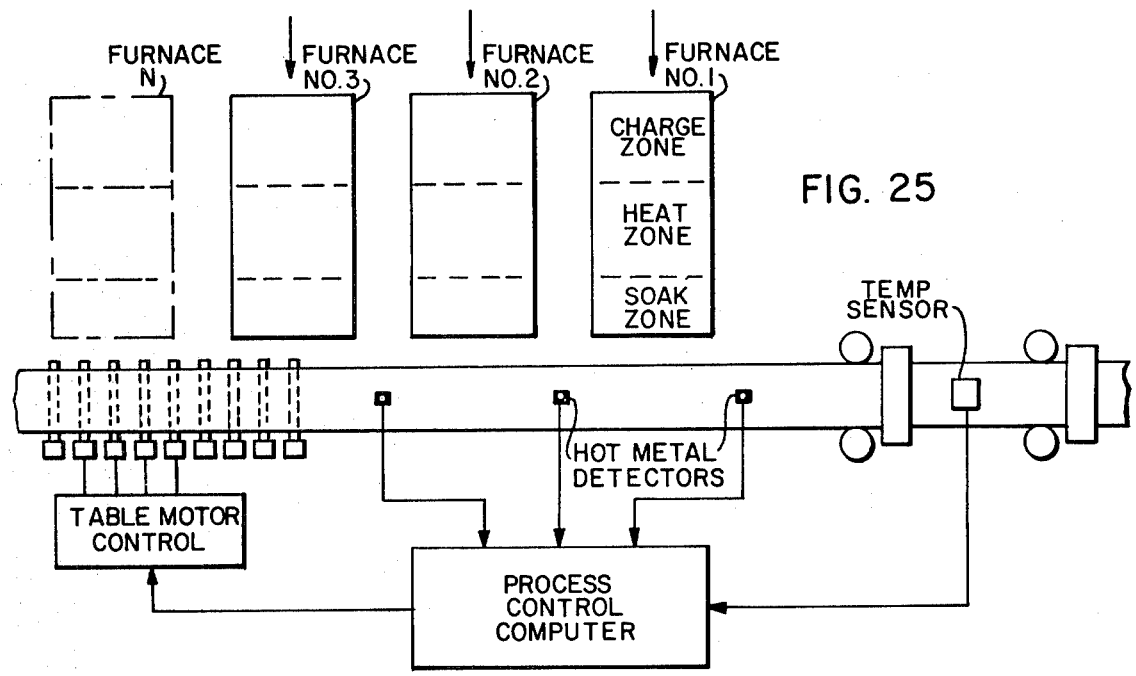
FIG. 25 is a schematic showing of N furnaces discharging heated slabs onto the run out table taking those slabs into the associated rolling mill.
Figure 26:
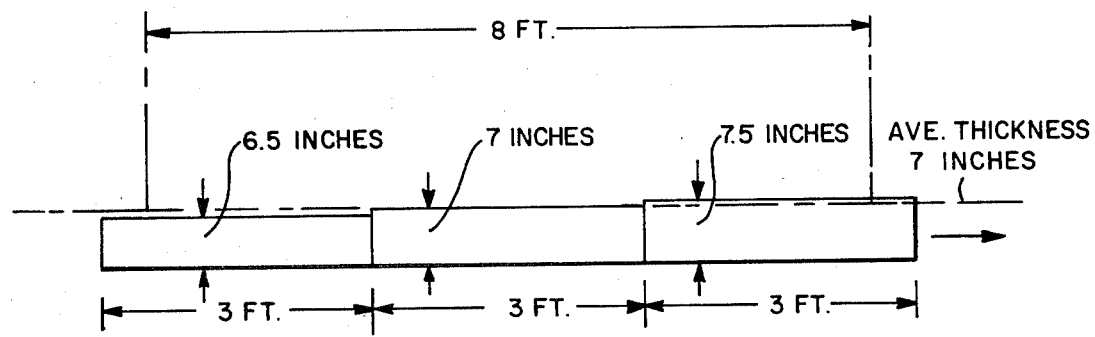
FIG. 26 illustrates the determination of the average slab thickness within the theoretical control area of the charge zone or the heat zone.

The slab heat control system can include hot metal detector for determining the movement of each slab and tracking it out of the furnace. The slab tracking operation can work in conjunction with a succession of these hot metal detectors as shown in FIG. 25 to track the slab movement out of the furnace and into the associated rolling mill. Several slabs can be actually tracked by keeping a map in the computer memory which is representative of the physical locations that each slab would have between the furnace and the rolling mill, such that a pictorial image is kept in the computer memory of the location of each slab identified by slab ID numbers and other information to tell which furnace the particular slab came out of.

After the first stand pass in the rolling mill, the temperature of the slab is measured because at that point a fairly clean slab surface is available, and this measured temperature is correlated with that slab temperature supposedly delivered from the furnace. If the slab did not roll as it should have rolled, this gives an indication whether or not the furnace is running cold or hot. If the furnace is running cold, the heat control program can raise the furnace temperature, and if the furnace is running hot, the heat control program can lower the furnace temperature. In this way, a feedback control is provided on top of all the heat control considerations previously discussed, such that in effect a control multiplier is provided that will be 1.000 initially. By adjusting this multiplier such as to one of 0.999 to 1.001, or even providing a greater adjustment than this as may be desired, this multiplier is going to raise or lower the furnace control temperature setpoints accordingly.

FIG. 6 is provided to illustrate the control slab in the theoretical control area in the furnace heating zone in relation to the predetermined physical locations in the furnace. This theoretical control slab is 8 feet wide, and this 8 feet is selected as one of the control parameters for tuning the operation of the here described control system and method. Initially, it was chosen that the theoretical control slab is 8 feet wide and the center of that slab is locationed 29½ feet inside the charge zone. The corresponding theoretical control slab in the heat zone is 8 feet wide and location 11.3 feet inside the heat zone. These figures were chosen to give a good representation of an average grouping of slabs, because this theoretical control slab is actually composed of several slabs since no one actual slab can be 8 feet wide; this control unit slab is probably composed of parts of 2 or 3 actual slabs. The theoretical control slab has a known cross-sectional surface area and a determined average thickness, which average thickness is used in relation to the illustrated curves, for example the 7 inch thickness in the case of FIG. 2. Therefore, FIG. 6 shows the placement of the theoretical control slab in each of the charge zone and the heat zone of the furnace. The specific distances shown in FIG. 6 are not critical, and it should be understood these distances can be changed to in effect fine tune the desired control system operation. The control area dimensions and the location chosen for the theoretical slab are merely for the purpose of example, and can be varied as readily apparent to persons skilled in this art for improving the operation of the present control system and method.

It should be understood, that in the event slab surface temperature measuring devices are subsequently improved to become more reliable and adequate in operation, then the present control system and method is readily operative with such an actual temperature measurement for use in conjunction with the here calculated slab surface temperature. For example, in the calculation of the heat transfer coefficient KT as shown in FIG. 9, if the slab surface temperature TS can be actually measured instead of calculated by the Schmidt Method in accordance with the showing of FIG. 8, this could enable a more immediate check on the accuracy of the calculated heat content of the slab as determined by the Schmidt method. Without the benefit of such an actual slab surface temperature measurement device and operation, it becomes necessary to wait for this check until a given slab leaves the furnace and passes through the first pass rolling operation such that the actual temperature of the slab can be measured by the radiation pyrometer at that location. If the surface temperature TS could be accurately measured while the slab is still within the furnace, then the difference value (TF-TS) shown in relation to FIG. 9 could be better established and this in turn would permit a better calculation of the slab heat content in relation to the Schmidt Method as shown in FIG. 8. This would in effect improve the slab heating model operation as herein described.

The surface temperature of a slab, even though it could be measured accurately inside a heating zone of the furnace, is only a partial indication of the suitability of a heated slab for hot rolling. The distribution of heat within a slab and the related temperature profile between the surface and the center of a slab are different for each thickness of slab. Therefore, the total heat content corresponding to a given surface temperature at a given time is a more accurate and comprehensive measure of the actual heated status of slabs of various thicknesses and their suitability for rolling.

The heat content of a slab at any instant in time is defined as the summation of the heat energy corresponding to the temperature profile from the outside surface of the slabs to the inside center of the slab, as shown in FIG. 8, and assuming the slab is heated from both sides such as happens in the charge zone and the heat zone of the slab heating furnace illustrated in FIG. 1. The slab heating model predicts the complete temperature profile and resultant heat content as the slab is heated and is based on the actual elapsed time and the actual effective furnace temperature by which the slab is heated.

The following Table II is provided to show generally the relationship between the various curve plots of FIGS. 2 through 4 and 10 through 24 in relation to the representative or average thickness slab in the control area of the respective charge zone and heat zone of a furnace.

TABLE II

Figure 10:
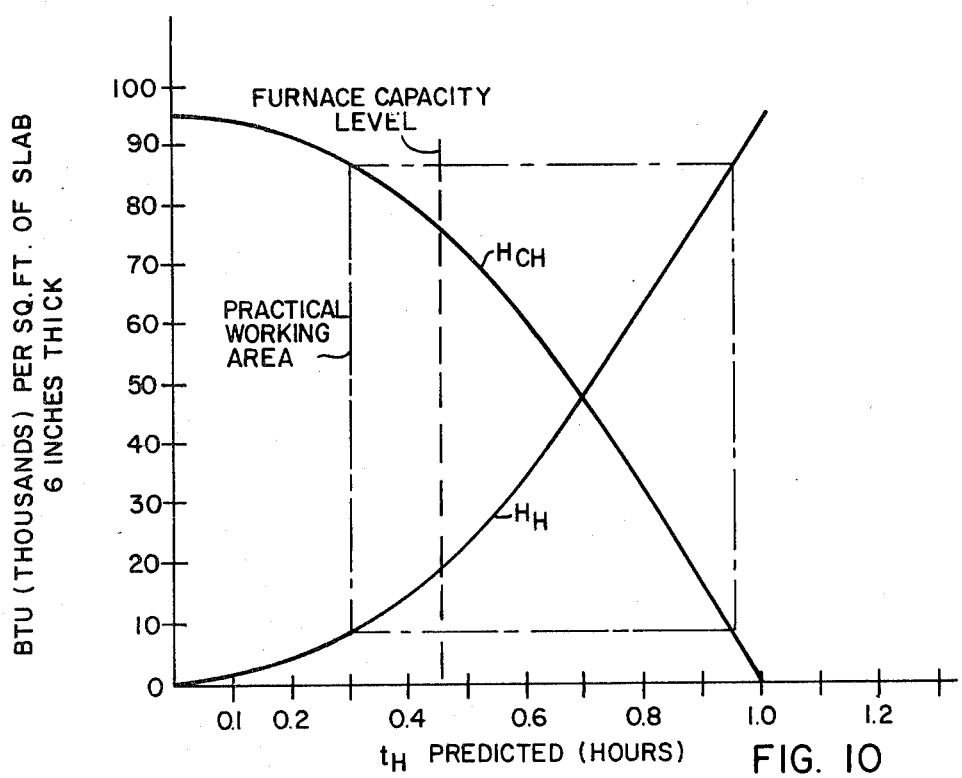
FIG. 10 is a curve plot similar to that shown in FIG. 2, however, for an average six inches thick slab.
Figure 11:
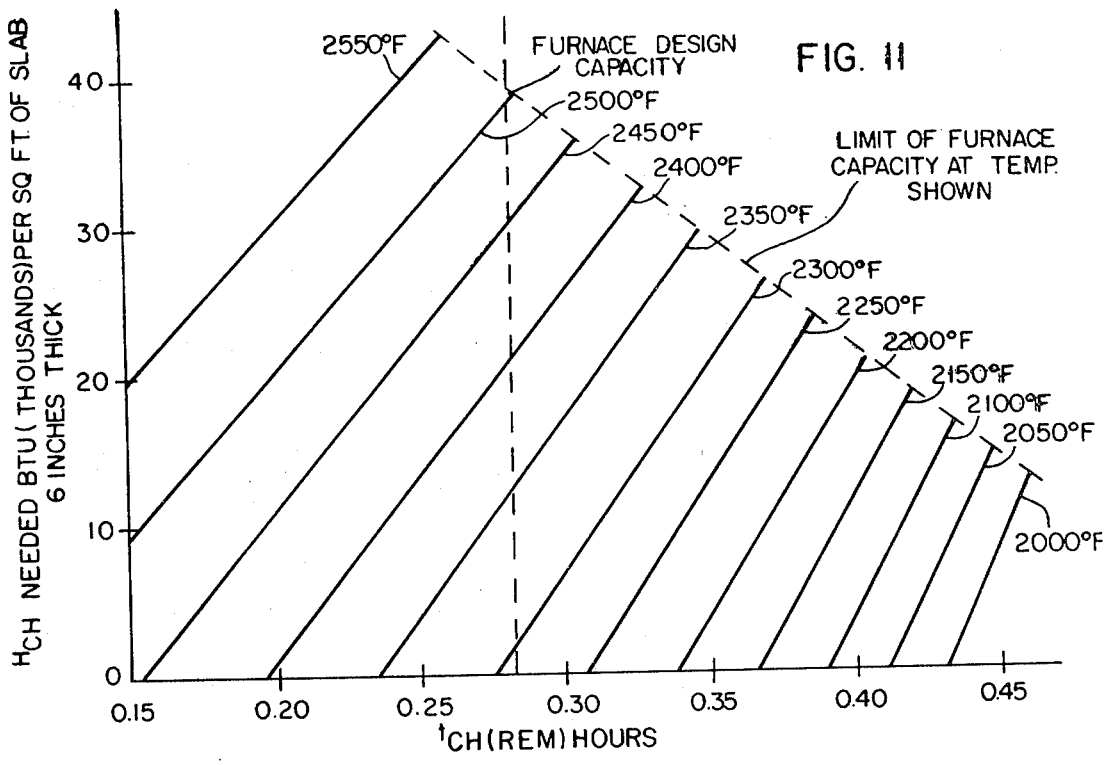
FIG. 11 is a curve plot similar to that shown in FIG. 3, however, for an average six inches thick slab.
Figure 12:
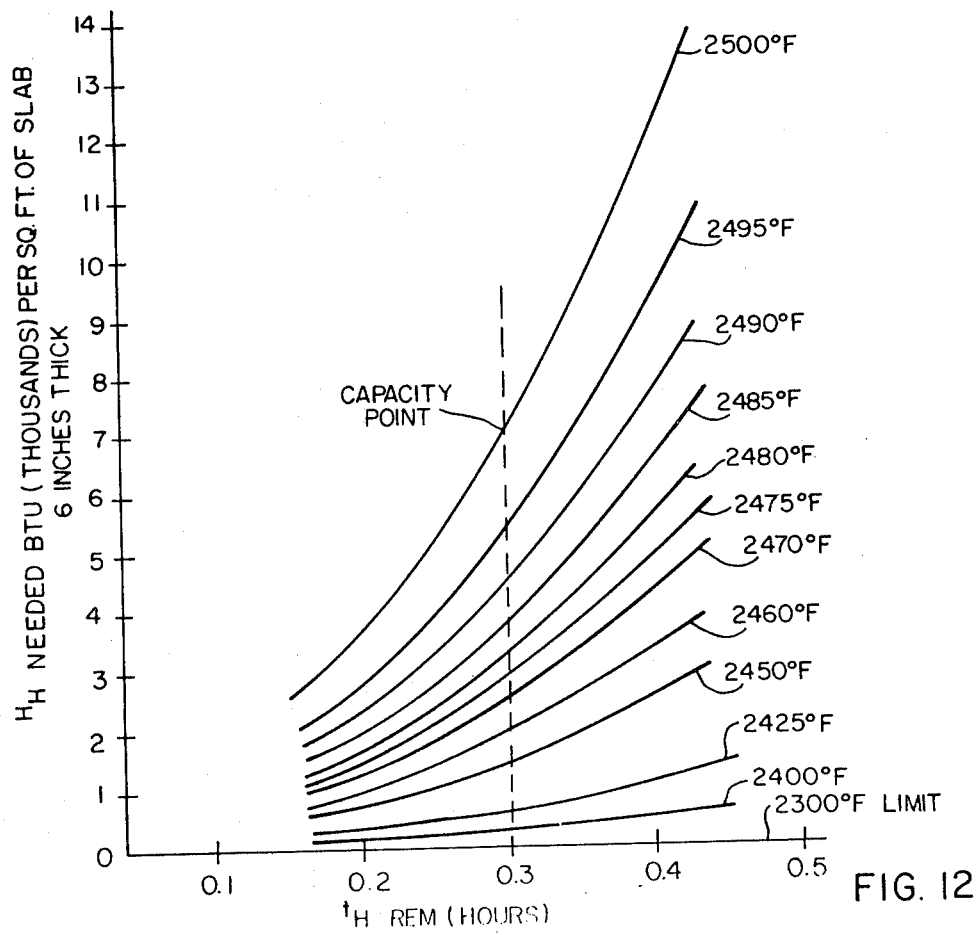
FIG. 12 is a curve plot similar to that shown in FIG. 4, however, for an average six inches thick slab.
Figure 13:
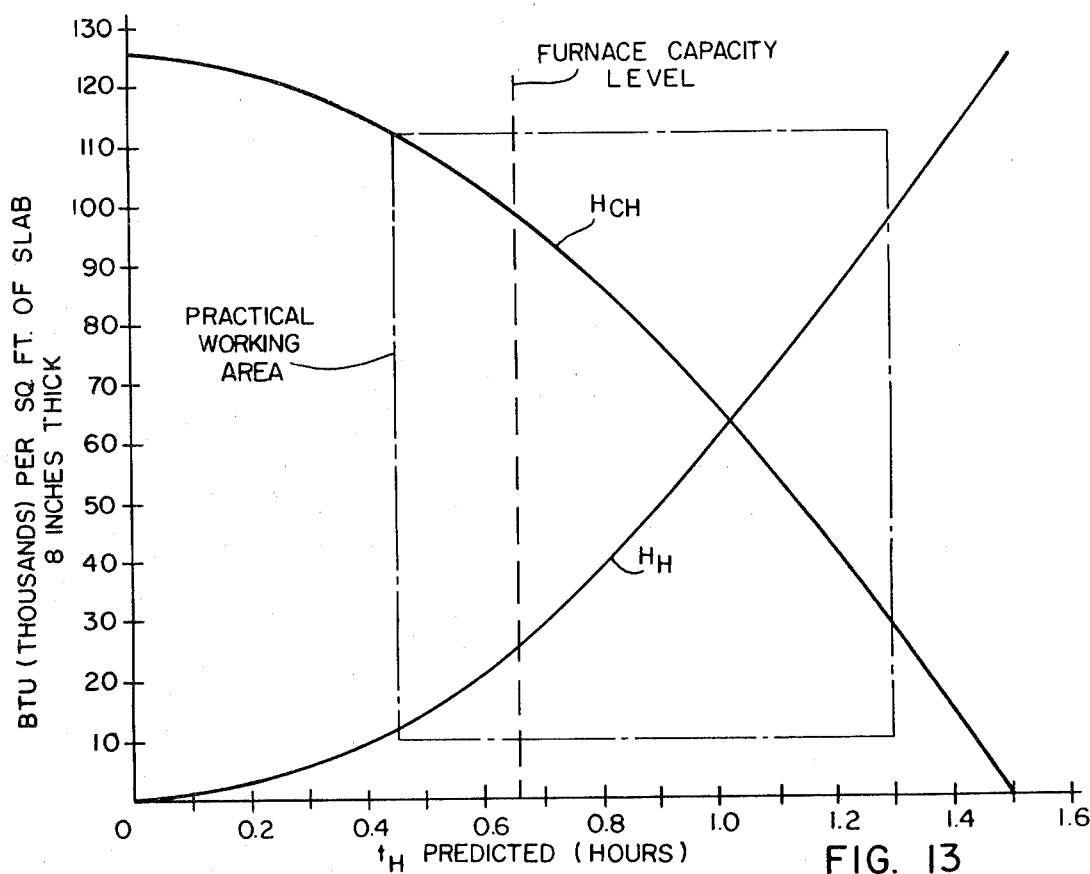
FIG. 13 is a curve plot similar to that shown in FIG. 2, however, for an average 8 inches thick slab.
Figure 14:
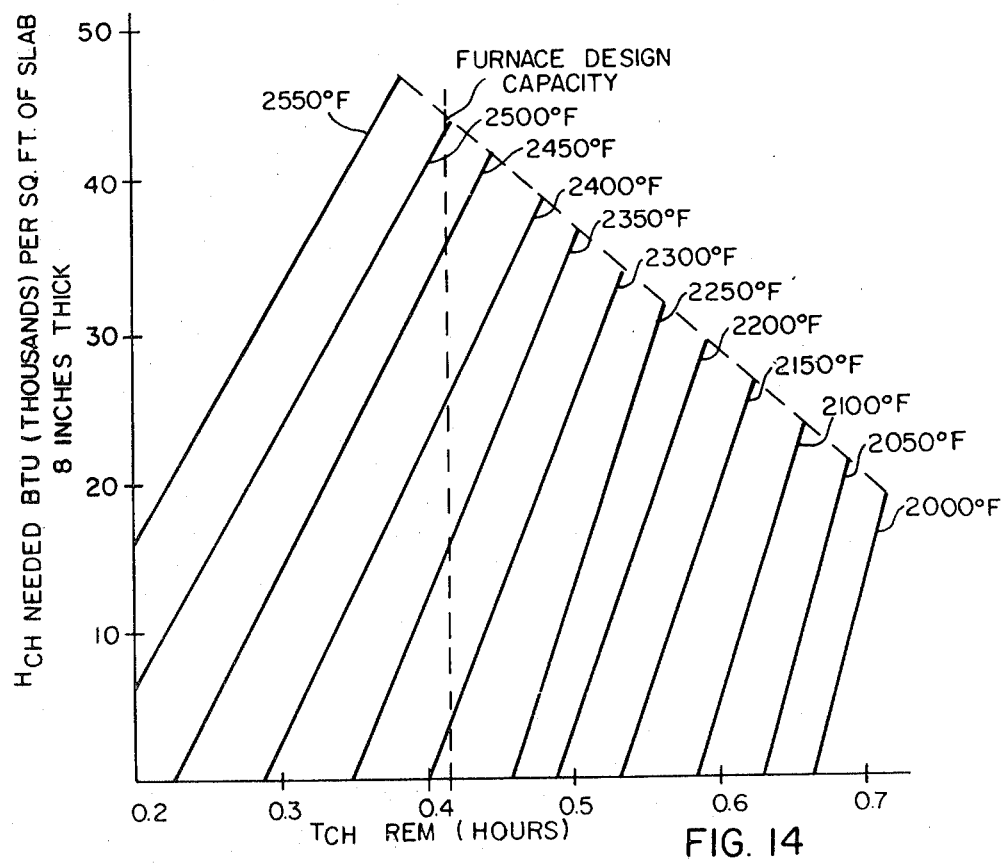
FIG. 14 is a curve plot similar to that shown in FIG. 3, however, for an average 8 inches thick slab.
Figure 15:
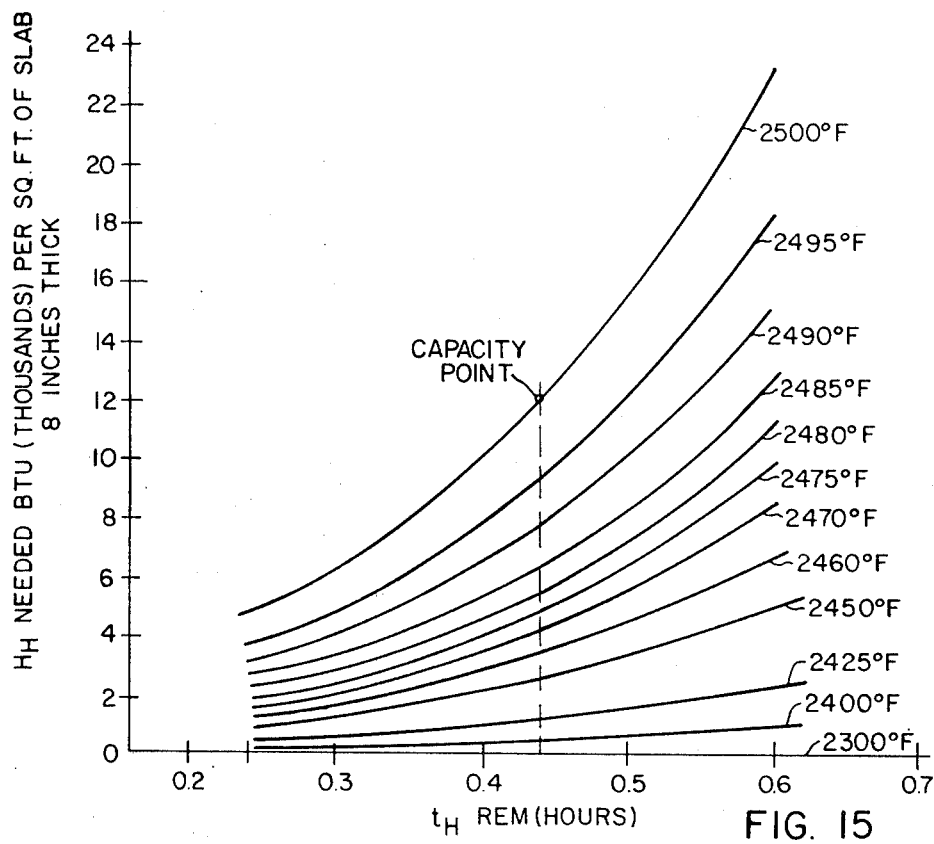
FIG. 15 is a curve plot similar to that shown in FIG. 4, however, for an average 8 inches thick slab.
Figure 16:
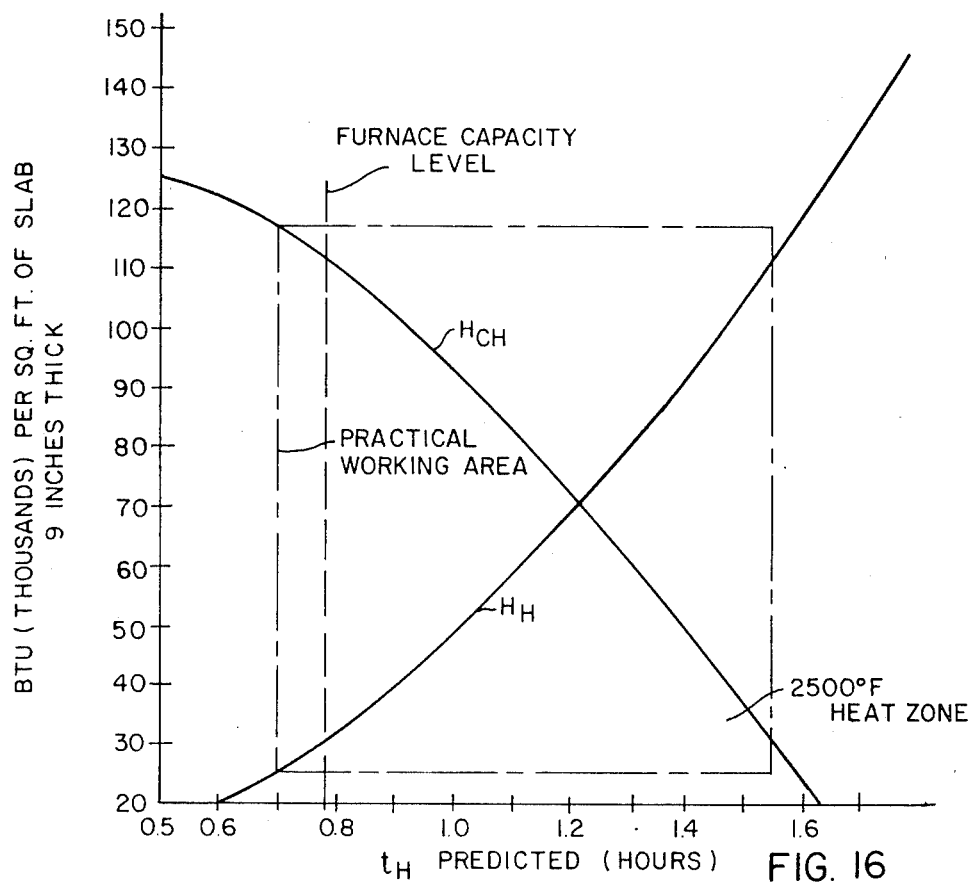
FIG. 16 is a curve plot similar to that shown in FIG. 2, however, for an average 9 inches thick slab.
Figure 17:
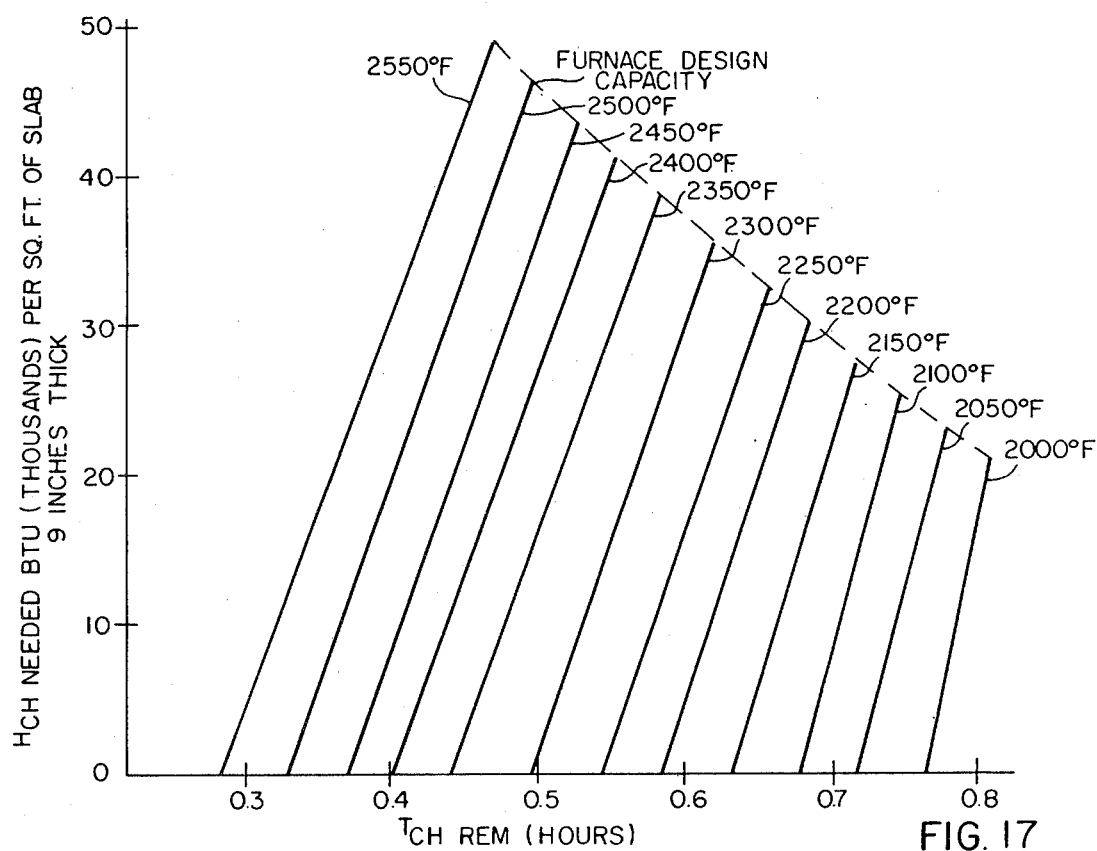
FIG. 17 is a curve plot similar to that shown in FIG. 3, however, for an average 9 inches thick slab.
Figure 18:
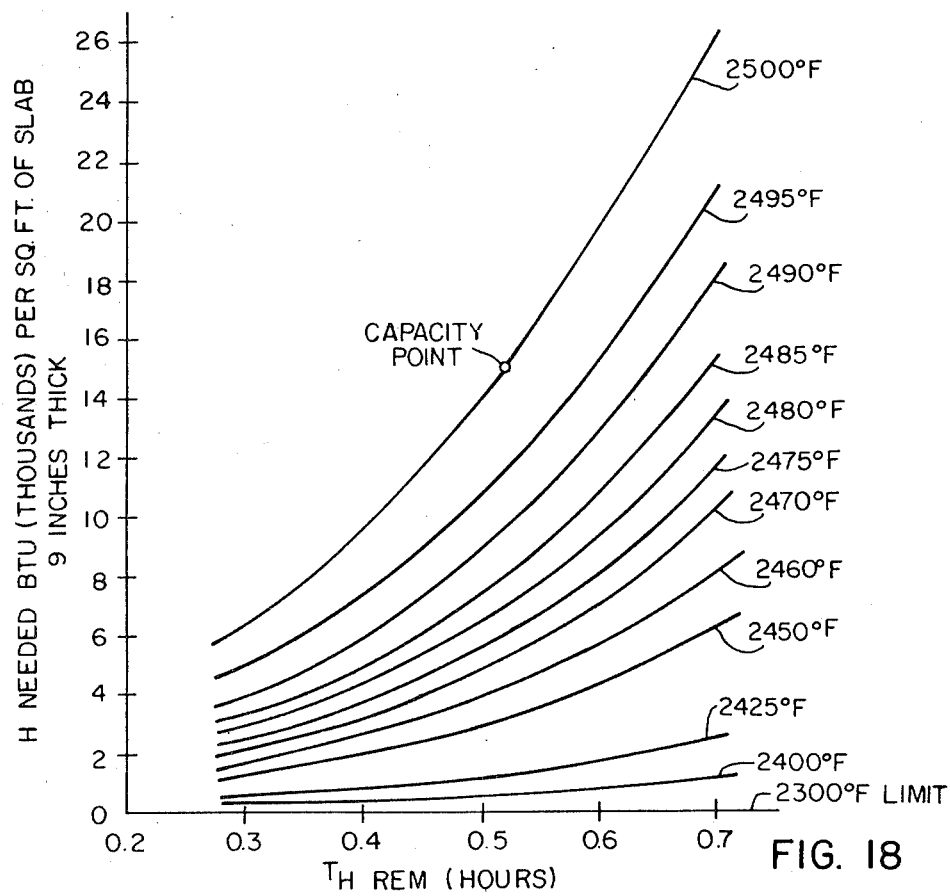
FIG. 18 is a curve plot similar to that shown in FIG. 4, however, for an average 9 inches thick slab.
Figure 19:
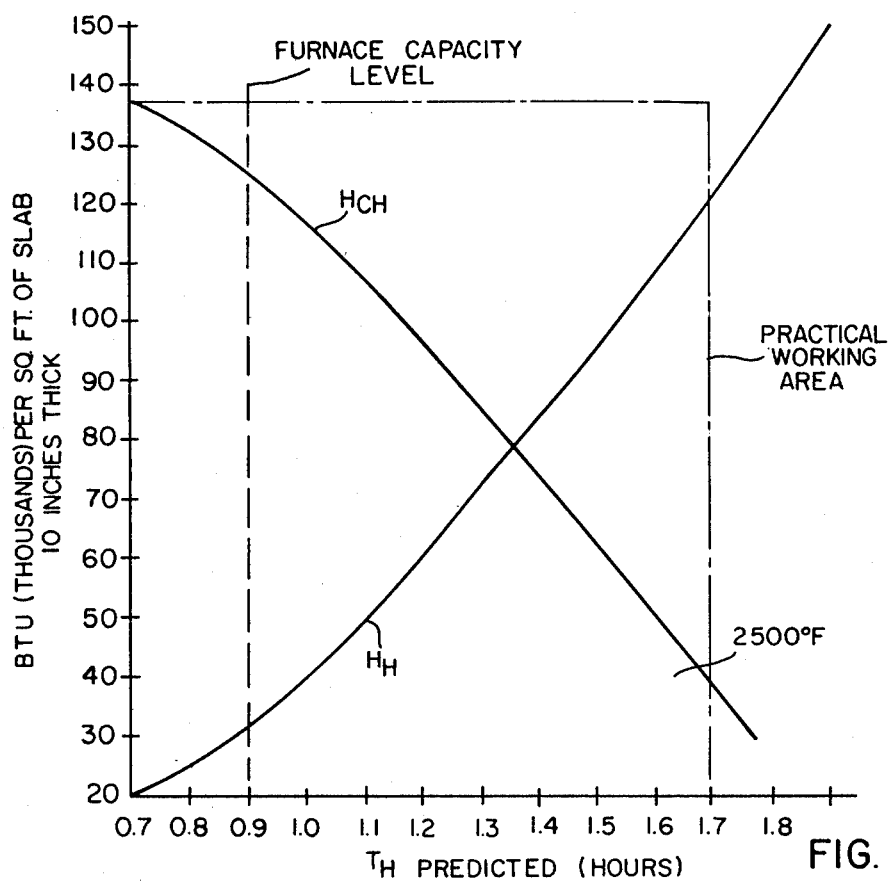
FIG. 19 is a curve plot similar to that shown in FIG. 2, however, for an average 10 inches thick slab.
Figure 20:
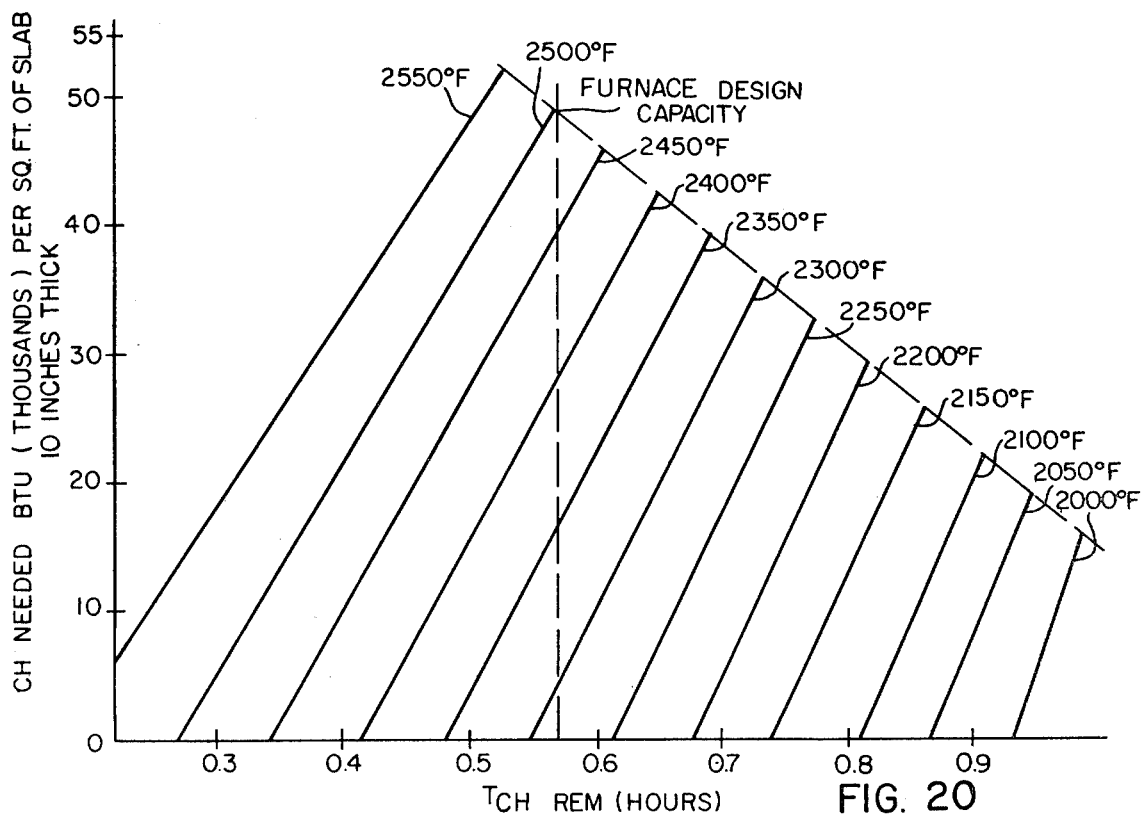
FIG. 20 is a curve plot similar to that shown in FIG. 3, however, for an average 10 inches thick slab.
Figure 21:
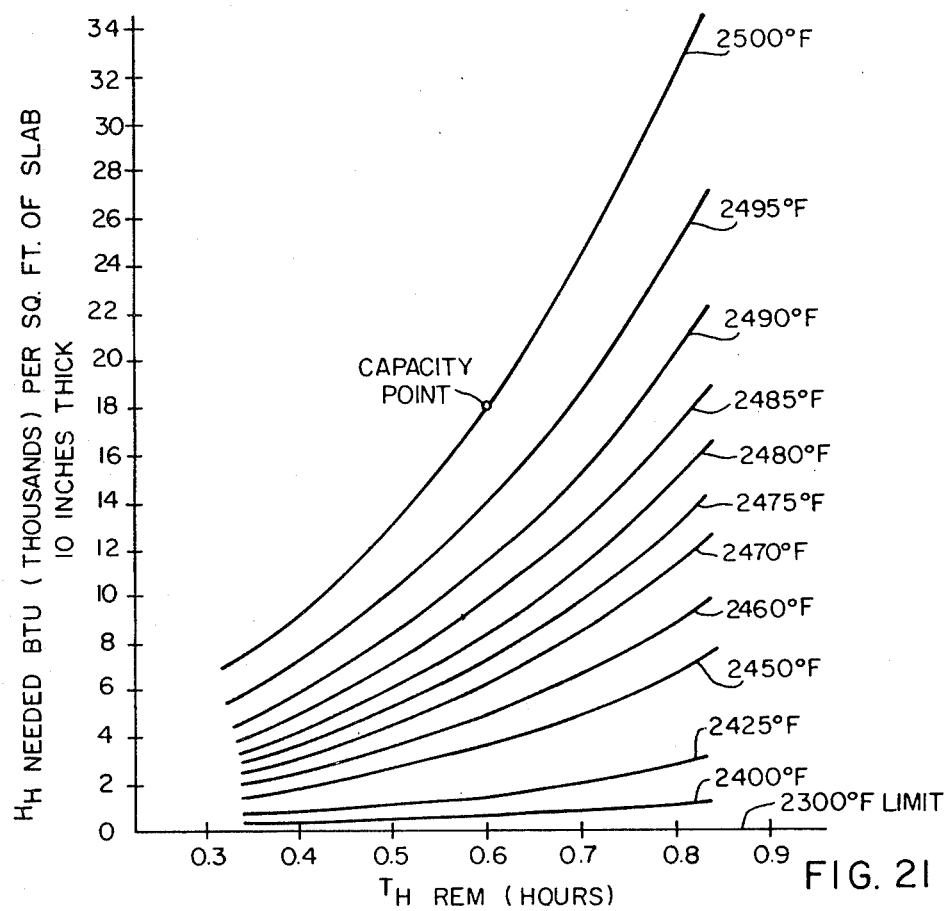
FIG. 21 is a curve plot similar to that shown in FIG. 4, however, for an average 10 inches thick slab.
Figure 22:
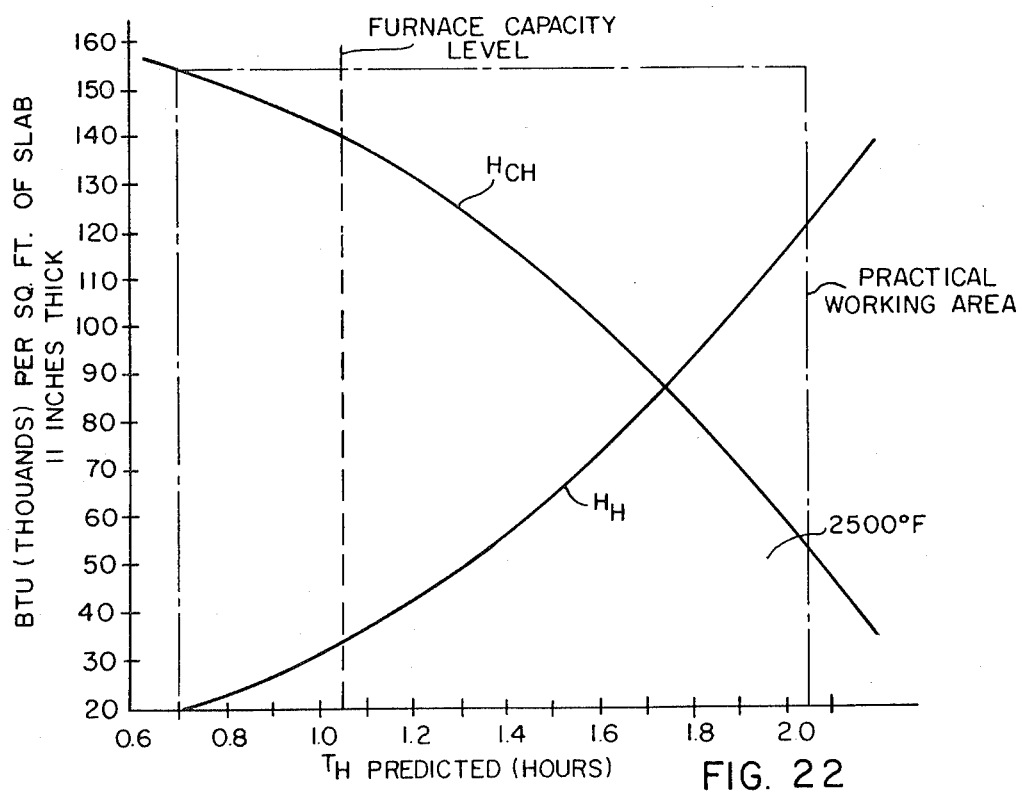
FIG. 22 is a curve plot similar to that shown in FIG. 2, however, for an average 11 inches thick slab.
Figure 23:
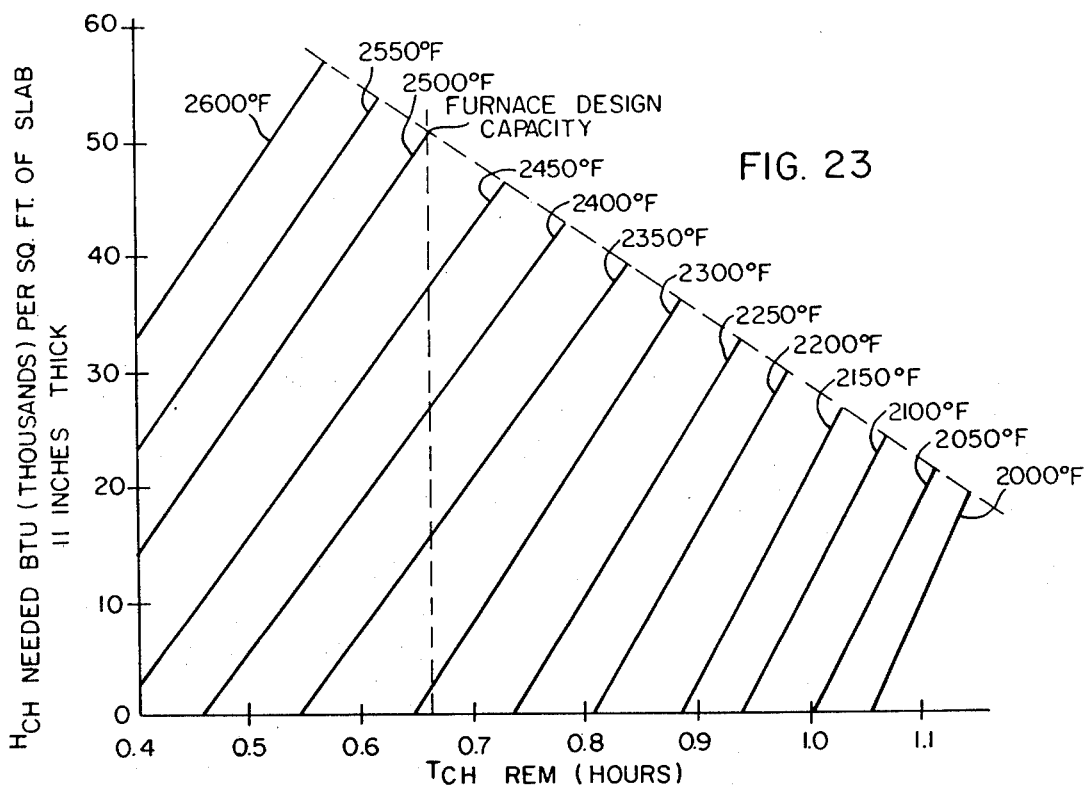
FIG. 23 is a curve plot similar to that shown in FIG. 3, however, for an average 11 inches thick slab.
Figure 24:
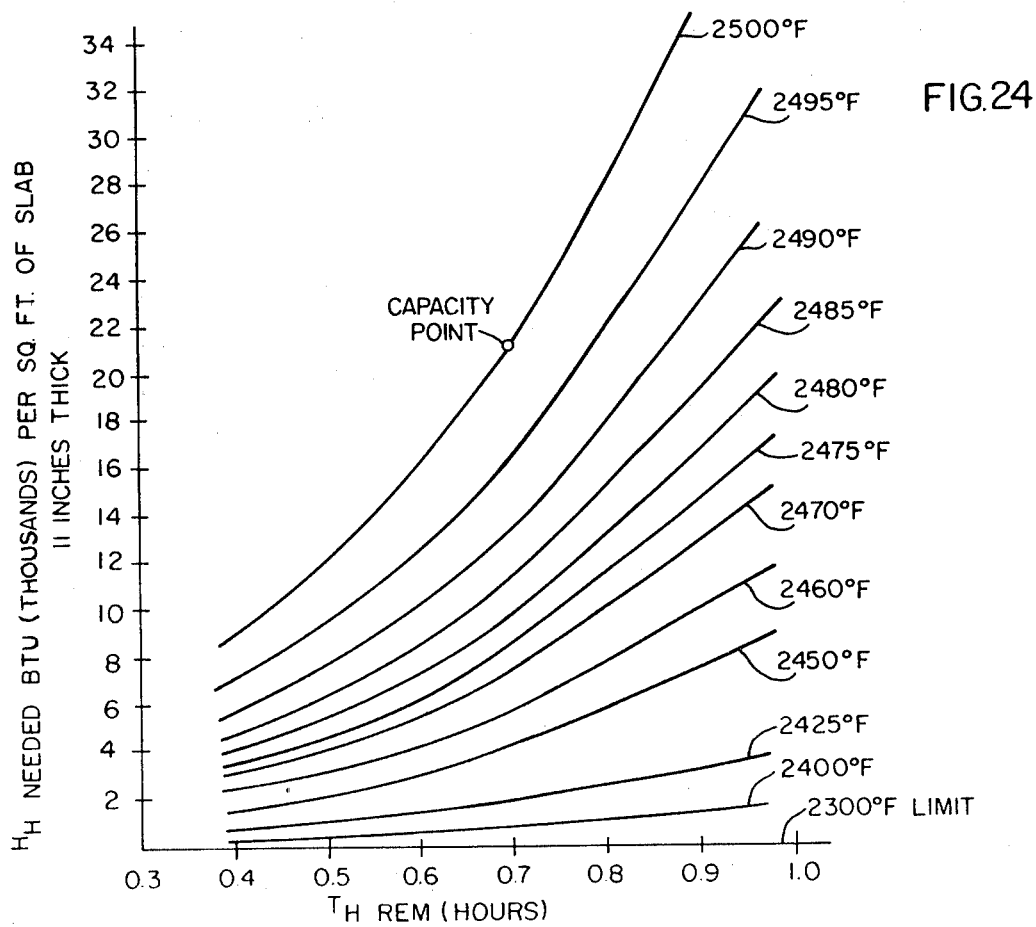
FIG. 24 is a curve plot similar to that shown in FIG. 4, however, for an average 11 inches thick slab.

| Slab thickness | 7" | 6" | 8" | 9" | 10" | 11" |
|---|---|---|---|---|---|---|
| distribution of heating between heat zone and charge zone | Fig. 2 | Fig. 10 | Fig. 13 | Fig. 16 | Fig. 18 | Fig. 22 |
| temperature setpoiunt determination for charge zone | Fig. 3 | Fig. 11 | Fig. 14 | Fig. 17 | Fig. 20 | Fig. 23 |
| temperature setpoint determination for heat zone | Fig. 4 | Fig. 12 | Fig. 15 | Fig. 18 | Fig. 21 | Fig. 24 |

GENERAL DESCRIPTION OF INSTRUCTION PROGRAM LISTING AND RELATED DATA TABLES

In Appendix A there is included an instruction program listing that has been prepared to control the operation of three slab heating furnaces in accordance with the here disclosed control system and method. The instruction program listing is written in the machine language of the PRODAC P 500 digital computer system, which was first sold by Westinghouse Electric Corproation in about 1963 for real time process control computer applications. Many of these digital computer systems have already been supplied to customers, including customer instruction books and descriptive documentation to explain to persons skilled in this art the operation of the hardware logic and the executive software of this digital computer system. This instruction program listing is included to provide an illustration of one suitable embodiment of the present control system and method that has actually been prepared. This instruction program listing at the present time is a more or less development program and has not been extensively debugged through the course of practical operation for the real time control of a combination of several slab heating furnaces. It is well known by persons skilled in this art that most real time process control application programs contain some bugs or minor errors, and it usually takes varying periods of actual operation time to identify and correct and more critical of these bugs.

In relation to the instruction program listing set forth for illustrative purposes in Appendix A, the following general comments may assist in the understanding of same.

Pages 1 through 4 contain macro definitions used within the program. Pages 5 through 17 contain constants and data locations used within the program. Page 18 contains a small subroutine called NEWFRM used within the program. Pages 19 through 22 contain additional constants and temporary locations used within the program. Pages 23 to 28 contain the update for the furnace slab map. Page 29 begins the check for a furnace in service and the expected delay program which ends on page 30. Pages 30 and 31 are the expected delay temperature setpoint output calculations. Pages 31 through 36 contain some bookkeeping type of programming associated with locating information on drum tracks. Pages 37 to 44 contain some index initialization data for internal bookkeeping and to get the setup to perform the Schmidt calculation on the heat content data. Pages 45 and 46 contain a subroutine which is used in the calculations themselves to determine the mill time calculation. Pages 47 to 49 contain the subroutine to calculate the ideal zone or the theoretical control in the heat zone. Pages 51 through 54 contain the determination of the position of the slabs for the calculations used in the charge zone and heat zones. Pages 55 through 64 contain the heat calculation on each slab for all the slabs in the furnace, going through the furnace and updating each slab then going back to do the setpoint calculation for the charge zone and for the heat zone. Page 67 contains interface functions for data logging. Page 68 starts the charge zone setpoint calculation. Page 78 starts the heat zone setpoint calculation. Page 86 starts the setpoint check program against some of the actual feedbacks to determine whether or not the temperatures were met within the proper tolerance level; this is checking the actual setpoint controller feedback to make sure that the controller met the information sent to it last time, as a feedback on the controller itself and not on the furnace. Page 86 also contains an overriding safety part of the program which checks the actual thermocouple to make sure they are not too high or too low.

On page 86 through page 94 is a limit checking program which checks all the actual furnace temperatures against present alarm conditions and if for some reason the controller has run away when the temperature gets too hot this program will provide a check based on the thermocouple feedback and will alarm that to the operator, as a safety program. On page 95 through page 101 will be where the last setpoint temperature is met within the tolerance level. The output required setpoint changes for all zones would be on page 102 and page 103. Pages 105 through 107 are the expected delay program. Page 108 is the delay override program. Pages 109 through 117 are the push to extract interrupt program.

A person skilled in the art of writing computer instruction program listings, particularly for an invention such as the present control system and method for a slab heating furnace, must generally go through the following determinative steps:

Step One—Study the slab heating furnace and its operation to be controlled, and then establish the desired control system and method concepts.

Step Two—Develop the control system logic analysis, regarding both hardware and software.

Step Three—Prepare the system flowcharts and the more detailed programmer's flowcharts.

Step Four—Prepare the actual computer instruction program listings from the programmer's flowcharts.

This instruction program listing included in Appendix A was prepared in relation to the programmer's flowcharts shown in FIGS. 32 to 39.

The following Table III is provided to more clearly set forth the relationship between the instruction program listing, included in Appendix A, and the system logic flowchart programs shown in FIGS. 27, 28 and 29.

TABLE III

| Pages of INstruction Program listing | Figure of System Flowchart Program | Block Number |
|---|---|---|
| 108 | 27 | Delay Override |
| 109 to 117 | 27 | Push to Extract |
| 105 to 107 | 28 | Expected Delay |
| 23 to 28 | 29 | 248 |
| 29 to 30 | | |
| 30 to 31 and 34 | 29 | 252 |
| 55 to 64 | 29 | 254 |
| 68 to 77 | 29 (also Fig. 30) | 256 |
| 78 to 84 | 29 (also Fig. 31) | 256 |
| 99 and 100 | 29 | 260 |
| 95 to 101 | 29 | 262 |
| 102 and 103 | 29 | 264 |

In Appendix B there are included data tables provided for use by the instruction program listing for all desired table lookup calculations. The curves shown in the various figures have been plotted into a data table form to be suitable for storage in the computer memory and operative with the computer for the necessary calculations required by the present control system and method.

The following general comments may assist in the understanding of these data tables. Pages 2 and 3 contain the values of the total heat content $H_T$ needed by the various slabs to be heated, with one-half values being provided since the computer has an eighteen bit word length and the half values were more suitable for this reason. Page 3 contains operation modifiers K0, K1 and K2, as explained by the programmer's comments included in the instruction program listing. Pages 3 and 4 contain the start of the lookup table for the required soak zone times. Pages 56 to 58 contain the heat transfer coefficient kT data in accordance with FIG. 9. Pages 59 to 63 provide spare data space. Pages 64 and 65 contain interpolation data for use to later interpolate in finding data from the data tables for respective FIGS. 2, 3 and 4. Pages 66 and 67 provide spare data space. Pages 68 to 75 contain the data table corresponding to FIG. 2 and similar figures for other slab thicknesses. Pages 76 to 99 contain the data table corresponding to FIG. 3 and similar figures for other slab thicknesses. Pages 100 to 123 contain the data table corresponding to FIG. 4 and similar figures for other slab thicknesses.

ARMCO FURNACE CONTROL - HEAT CALCULATION

```
 1                                         ARMCO FURNACE SLAB HEAT CALCULATION PROGRAM
 2                                         P-550 DEFINITION DECK
 3      DLW         VFD 6,3,1,8
 4      DM1         VFD 6,1,11
 5      DM2         VFD 1,2,15
 6      EXC         VFD 6,3,9
 7      LGC         VFD 6,3,5,4
10      LGQ         VFD 3,15
11      LGX         VFD 4,14
12          IFO     VFD 7,5,5,1
13                  MACROS
14      ACW         MAC REG                ACCUMULATOR TO CCO WORD
15                  IRJ CCEXEC
16                  DEC REG
17                  TER
20      ANI         MAC ADS,DAT,N,FAST     ANALOG INPUT
21                  DEC -FAST*128+N+2943,ADS,DAT
22                  TER
23      BID         MAC V,CORE             BID FOR PROGRAM
24                  DEC V+1536,CORE
25                  TER
26      CAW         MAC REG                CCI WORD TO ACCUMLATOR
27                  IRJ CCEXEC+1
30                  DEC REG
31                  TER
32      CBT         MAC BIT,ADDR           COMPLEMENT BIT
33                  IRJ CCEXEC+6
34                  DEC ADDR*16+BIT
35                  TER
36      CRD         MAC BUFFER             CARD READER
37                  EXC 0,7,0
40                  DEC BUFFER
41                  TER
42      IBC         MAC                    INPUT BINARY CHARACTER
43                  DEC 1038
44                  TER
45      IBW         MAC                    INPUT BINARY WORD
..                  DEC 1037
..                  TER
..                  MAC                    INPUT BCD CHARACTER
51                  DEC 1039
52                  TER
53      INR         MAC CORE,N             INPUT RECORD IN BCD OR BINARY
54                  DEC 1052,CORE,N
55                  TER
56      JBO         MAC BIT,ADDR,ABLE      JUMP ON BIT ONE
57                  IRJ CCEXEC+3
60                  DEC ADDR*16+BIT
61                  DJP ABLE
62                  TER
63      JBZ         MAC BIT,ADDR,ABLE      JUMP ON BIT ZERO
64                  IRJ CCEXEC+2
65                  DEC ADDR*16+BIT
66                  DJP ABLE
67                  TER
70      MIN         MAC N                  TIME DELAY N MINUTES
```

| Line | Label | Instruction | Comment |
|---|---|---|---|
| 71 | | DLW,6,1,10*N | |
| 72 | | TER | |
| 73 | OBC | MAC | OUTPUT BINARY CHARACTER |
| 74 | | DEC 1034 | |
| 75 | | TER | |
| 76 | OTC | MAC | OUTPUT BCD CHARACTER |
| 77 | | DEC 1032 | |
| 100 | | TER | |
| 101 | OTR | MAC CORE,CHAR | OUTPUT BCD RECORD |
| 102 | | DEC ID51,CORE,CHAR | |
| 103 | | TER | |
| 104 | OTW | MRQ | OUTPUT BCD WORD |
| 105 | | DEC 1033 | |
| 106 | | TER | |
| 107 | RDT | MAC CORE,DRUM,N | RECD FROM DRUM AND TRANSFER |
| 110 | | DM1,00,0,DRUM | |
| 111 | | DM2 1,N-1,CORE | |
| 112 | | TER | |
| 113 | RFD | MRC CORE,DRUM,N | READ FROM DRUM |
| 114 | | DM1 63,0,DRUM | |
| 115 | | DM2 0,N-1,CORE | |
| 116 | | TER | |
| 117 | SBO | MAC BIT,ADDR | SET BIT TO ONE |
| | | IRJ CCEXEC+4 | |
| 121 | | DEC ADDR*16+BIT | |
| 122 | | TER | |
| 123 | SBZ | MRC BIT,ADDR | SET BIT TO ZERO |
| 124 | | IRJ CCEXEC+3 | |
| 125 | | DEC ADDR*16+BIT | |
| 126 | | TER | |
| 127 | SCN | MRQ | SCAN CCO IMAGES AND OUTPUT |
| 130 | | IRJ CCEXEC+7 | |
| 131 | | TER | |
| 132 | SEC | MAC N | TIME DELAY N SECONDS |
| 133 | | DLW,6,10*N | |
| 134 | | TER | |
| 135 | TOP | MAC | TURN OFF PROGRAM |
| 136 | | EXC,1 | |
| 137 | | TER | |
| 140 | TYP | MAC T,BUFFER,N,R | LOGGING TYPEWRITER |
| 141 | | LGC 0,4,T,N-1 | |
| 142 | | LGQ T,BUFFER | |
| 143 | | TER | |
| 144 | WOD | MAC CORE,DRUM,N | WRITE ON DRUM |
| 145 | | DM1 63,1,DRUM | |
| 146 | | DM2 0,N-1,CORE | |
| 147 | | TER | |
| 150 | WTR | MAC DEVNO,FORMAT,PCHTBL | MESSAGE WRITER |
| 151 | | EXC 0,4,256+DEVNO | |
| 152 | | RPT PCHTBL/PCHTBL+0 | |
| 153 | | OCT PCHTBL | |
| 154 | | OCT FORMAT | |
| 155 | | TER | |
| 156 | | LIST OF ADDRESSES FOLLOW THE MACRO | |
| 157 | | DECIMAL DATA   LGX BPOINT,DECADR | |
| 160 | | PHRASE         OCT PHRADR | |
| 161 | INC | MAC A,B | INCREMENT |
| 162 | | ENL A | |
| 163 | | ALC B | |
| 164 | | STL A | |
| 165 | | TER | |
| 166 | STC | MAC A,B | STORE CONSTANT |
| 167 | | ELC B | |
| 170 | | STL A | |

```
171                TER
172        XJP     MAC A,B              INDEX SKIP AND JUMP
173                XSK A
174                DJP B
175                TER
176        RPZ     MAC                  REPEAT ZERO
177                RPT 19712-L
200                DEC 0
201                TER
202        ENA     MAC LOC,B            ENTER ACCUMULATOR
203                ENL LOC,B
204                ENU LOC+1,B
205                TER
206        STO     MAC LOC,B            STORE ACCUMULATOR
207                STL LOC,B
210                STU LOC+1,B
211                TER
212        SFO     MAC SYMB
213                IRJ LFLAGO
214                DEC SYMB
215                TER
216        SFZ     MAC SYMB
217                IRJ LFLAGZ
220                DEC SYMB
221                TER
222        JBT     MAC SYMBOL
223                IRJ CHKBIT
224                DEC SYMBOL
225                TER
226        FSO     MAC A,B,C
227                IRJ NXOBIT
230                DEC A
231                DEC B
232                DEC C
233                TER
234        PIO     MAC SYMB,NOBITS,IO
235                IRJ LPIO
236                IFO SYMB/16-CCOBUF,NOBITS,SYMB-CCOLOC-SYMB/16*CCOBUF,IO
237                TER
240                EJE
241                                     ***** EQUATE CARDS FOR BAY 3 PROGRAMS *****
242
243  005266   NSLBTW8EQU 5266
244  005267.  DLGHTW8EQU 5267
245
246  020146   TX    8EQU 20146
247
250  030600   TBLELC8EQU 30600
251
252  034424   KNXOBT8EQU 34424
253  034425   KNXZBT6EQU 34425
254  034426   KFLAGO8EQU 34426
255  034427   KFLAGZ8EQU 34427
256  034430   LPIO  8EQU 34430
257  034431   FLFXCV8EQU 34431
260  034432   FXFLCV8EQU 34432
261  034443   BCDFIX6EQU 34443
262  034446   ACTION8EQU 34446
263
264  035255   SIDNB 8EQU 35255
265  035256   FCNB  8EQU 35256
266  035257   MPCTM 8EQU 35257
267  035264   HTDLFG8EQU 35264
270  035271   ALLDFG8EQU 35271
271  035272   1GOHLD8EQU 35272
272  035273   2GOHLD8EQU 35273
273  035274   3GOHLD8EQU 35274
274  035277   3PO1B98EQU 35277
275
276  035302   DELINT8EQU 35302
277  035303   DLINT18EQU 35303
300  035304   DLINT28EQU 35304
```

```
301     035305    DLINT38EQU 35305
302     035306    DLCTRA8EQU 35306
303     035307    DLCTR18EQU 35307
304     035310    DLCTR28EQU 35310
305     035311    DLCTR38EQU 35311
306     035314    MPTDS88EQU 35314
307     035315    DLOOBF8EQU 35315
310     035334    BASENO8EQU 35334
311     035340    TEN10 8EQU 35340
312     035341    SAVBBX8EQU 35341
313
314     035400    F1SSDB8EQU 35400
315     035431    F1NSDB8EQU 35431
316     035462    F2SSDB8EQU 35462
317     035513    F2NSDB8EQU 35513
320     035544    F3SSDB8EQU 35544
321     035574    F3NSDB8EQU 35574
322
323     147031    A076008EQU 147031
324     147032    A077008EQU 147032
325     147033    F078008EQU 147033
326     236005    PX00008EQU 236005
327     236006    PX00018EQU 236006
330     236007    PX00028EQU 236007
331
332
333
334
335
336                                         SET-POINT FEEDBACK DEFINITIONS
337     045434    F1FBTC8EQU 45434
340     045435    F1FBBC8EQU 45435
341     045436    F1FBTH8EQU 45436
342     045437    F1FBBH8EQU 45437
343     045440    F1FBNS8EQU 45440
344     045441    F1FBSS8EQU 45441
345     045442    F2FBTC8EQU 45442
346     045443    F2FBBC8EQU 45443
347     045444    F2FBTH8EQU 45444
350     045445    F2FBBH8EQU 45445
351     045446    F2FBNS8EQU 45446
352     045447    F2FBSS8EQU 45447
353     045450    F3FBTC8EQU 45450
354     045451    F3FBBC8EQU 45451
355     045452    F3FBTH8EQU 45452
356     045453    F3FBBH8EQU 45453
357     045454    F3FBNS8EQU 45454
360     045455    F3FBSS8EQU 45455
361                                         THERMO-COUPLE INPUT DEFINITIONS
362     045456    F1TCT18EQU 45456
363     045457    F1TCT28EQU 45457
364     045460    F1TCT38EQU 45460
365     045461    F1TCBC8EQU 45461
366     045462    F1TCTH8EQU 45462
367     045463    F1TCBH8EQU 45463
370     045464    F1TCNS8EQU 45464
371     045465    F1TCSS8EQU 45465
372     045466    F2TCT18EQU 45466
373     045467    F2TCT28EQU 45467
374     045470    F2TCT38EQU 45470
375     045471    F2TCBC8EQU 45471
376     045472    F2TCTH8EQU 45472
377     045473    F2TCBH8EQU 45473
400     045474    F2TCNS8EQU 45474
401     045475    F2TCSS8EQU 45475
402     045476    F3TCT18EQU 45476
403     045477    F3TCT28EQU 45477
404     045500    F3TCT38EQU 45500
405     045501    F3TCBC8EQU 45501
406     045502    F3TCTH8EQU 45502
407     045503    F3TCBH8EQU 45503
```

| | | | |
|---|---|---|---|
| 410 | 045504 | FJTCNS8EQU 45504 | |
| 411 | 045505 | FJTCSS8EQU 45505 | |
| 412 | | | MISCELLANEOUS DEFINITIONS |
| 413 | 001223 | CLOCK 8EQU 1223 | |
| 414 | 023517 | GAPLOC8EQU 23517 | |
| 415 | 034620 | EFCDIN8EQU 34620 | |
| 416 | 017704 | DELLOC8EQU 17704 | |
| 417 | | | I/O SYMBOL DEFINITIONS |
| 420 | 147060 | A09500B8EQU 147060 | |
| 421 | 151261 | A04801B8EQU 151261 | |
| 422 | 151263 | A05001B8EQU 151263 | |
| 423 | 151265 | A05201B8EQU 151265 | |
| 424 | 151271 | A05601B8EQU 151271 | |
| 425 | 151273 | A05801B8EQU 151273 | |
| 426 | 151275 | A06001B8EQU 151275 | |
| 427 | 151303 | A06401B8EQU 151303 | |
| 430 | 151305 | A06601B8EQU 151305 | |
| 431 | 151307 | A06801B8EQU 151307 | |
| 432 | | | NON-I/O SYMBOL DEFINITIONS |
| 433 | 234173 | MC1CBS8EQU 234173 | |
| 434 | 234174 | MC1CAS8EQU 234174 | |
| 435 | 234175 | MC1HBS8EQU 234175 | |
| 436 | 234200 | MC1HAS8EQU 234200 | |
| 437 | 234201 | MC1SBS8EQU 234201 | |
| 440 | 234202 | MC1SAS8EQU 234202 | |
| 441 | 234203 | MC2CBS8EQU 234203 | |
| 442 | 234204 | MC2CAS8EQU 234204 | |
| 443 | 234205 | MC2HBS8EQU 234205 | |
| 444 | 234206 | MC2HAS8EQU 234206 | |
| 445 | 234207 | MC2SBS8EQU 234207 | |
| 446 | 234210 | MC2SAS8EQU 234210 | |
| 447 | 234211 | MC3CBS8EQU 234211 | |
| 450 | 234212 | MC3CAS8EQU 234212 | |
| 451 | 234213 | MC3HBS8EQU 234213 | |
| 452 | 234214 | MC3HAS8EQU 234214 | |
| 453 | 234215 | MC3SBS8EQU 234215 | |
| 454 | 234220 | MC3SAS8EQU 234220 | |
| 455 | 237306 | TC1TCR8EQU 237306 | |
| 456 | | | TRACK NUMBER DEFINITIONS |
| 457 | 000421 | CTLDRM8EQU 421 | |
| 460 | 000446 | GTRK 8EQU 446 | |
| 461 | 000447 | KTRK 8EQU 447 | |
| 462 | 000450 | HTRK 8EQU 450 | |
| 463 | 001020 | BASTRK8EQU 1020 | |
| 464 | | | SCRATCH BLOCKS |
| 465 | 045600 | WRKARA8EQU 45600 | |
| 466 | 046400 | FNDARA8EQU 46400 | |
| 467 | 046400 | TABLOC8EQU 46400 | |
| 470 | 046474 | CZTIM18EQU 46474 | |
| 471 | 046506 | CZTIM28EQU 46506 | |
| 472 | 046520 | HZTIMER8EQU 46520 | |
| 473 | 046532 | CZHEAT8EQU 46532 | |
| 474 | 046544 | HZHEAT8EQU 46544 | |
| 475 | 046600 | COPLOC8EQU 46600 | |
| 476 | 046400 | HTREQ18EQU 46400 | |
| 477 | 046401 | HTREQ28EQU 46401 | |
| 500 | 046400 | HEAT1 8EQU 46400 | |
| 501 | 046401 | HEAT2 8EQU 46401 | |
| 502 | | | FCE MAP DEFINITIONS |
| 503 | 046600 | MPIDNO8EQU 46600 | |
| 504 | 046607 | MPGRDF8EQU 46607 | |
| 505 | 046612 | MPWDTH8EQU 46612 | |
| 506 | 046613 | MPLGTH8EQU 46613 | |
| 507 | 046614 | MPTHCK8EQU 46614 | |
| 510 | 046624 | MPPSTN8EQU 46624 | |
| 511 | 046630 | MPENTR8EQU 46630 | |
| 512 | | | CTL MAP DEFINITIONS |
| 513 | 046600 | DSLBID8EQU 46600 | |
| 514 | 046601 | DGRADE8EQU 46601 | |
| 515 | 046602 | DWIDTH8EQU 46602 | |
| 516 | 046603 | DLEGTH8EQU 46603 | |

```
517            046604      DTHICK8EQU 46604
520            046605      DENTER8EQU 46605
521            046606      DLFXPT8EQU 46606
522            046607      DCTRPT8EQU 46607
523            046610      D1STPT8EQU 46610
524            046611      D2NDPT8EQU 46611
525            046612      D3RDPT8EQU 46612
526            046613      DHFXPT8EQU 46613
527            046614      DTSOLC8EQU 46614
530            046615      DTOLC 8EQU 46615
531            046616      DTIMLC8EQU 46616
532            046617      DSKEYM8EQU 46617
533                        EJF
534                                    THE LAYOUT OF THE CONTROL MAP IS AS FOLLOWS
535
536                        RPL-LOC                 CONT-NTS OF LOCATION
537
540                          000            SLAB ID NUMBER
541
542                          001            SLAB GRADE
543
544                          002            WIDTH
545
546                          003            LENGTH
547
550                          004            THICKNESS
551
552                          005            TIME OF ENTRY
553
554                          006            LOW TEMP POINT
555
556                          007            CTR TEMP POINT
557
560                          010            1ST TEMP POINT
561
562                          011            2ND TEMP POINT
563
564                          012            3RD TEMP POINT
565
566                          013            TOP TEMP POINT
567
570                          014            TSO (LAST CALC)
571
572                          015            TO (LAST CALC)
573
574                          016            TIME INCREMENT (LAST CALC)
575
576                          017            SOAK ZONE ENTRY TIME
577                                    EJE
600            000314           BDRM 314
601            047000           BLOC 47000
602
603
604
605   47000    000000      ZEROR  DEC 0            STORED DECIMAL CONSTANTS AT 80
606   47001    000001      KDEC01 DEC 1
607   47002    000002      KDEC02 DEC 2
610   47003    000003      KDEC03 DEC 3
611   47004    000004      KDEC04 DEC 4
612   47005    000005      KDEC05 DEC 5
613   47006    000006      KDEC06 DEC 6
614   47007    000007      KDEC07 DEC 7
615   47010    000010      KDEC08 DEC 8
616   47011    000011      KDEC09 DEC 9
617   47012    000012      KDEC10 DEC 10
620   47013    000013      ELEVEN DEC 11
621   47014    000014      FOOT   DEC 12
622   47015    000016      FORTEN DEC 14
623   47016    000021      KDEC17 DEC 17
624   47017    000074      DEC060 DEC 60
625   47020    000140      DEC096 DEC 96
```

```
626   47021   000144   DEC100  DEC 100
627   47022   000161   DRMLIM  DEC 113
630   47023   000310   DEC200  DEC 200
631   47024   000550   HTINC   DEC 360
632   47025   001320   PHTINC  DEC 720
633   47026   001320   THINC   DEC 720
634   47027   002506   TMP1    DEC 1350
635   47030   000764   HHPINC  DEC 500       ORIGINALLY WAS 1500
636   47031   003410   18HNRD  DEC 1800      SHOULD BE 1500
637   47032   003720   2THOUS  DEC 2000
640   47033   004540   24HNRD  DEC 2400
641   47034   004704   HHINC   DEC 2500
642   47035   005050   SPTFDG  DEC 2600
643   47036   007020   36HNRD  DEC 3600
644   47037   011610   HPHINC  DEC 5000
645   47040   014544   HAS     DEC 6500
646   47041   014544   1STHAS  DEC 6500
647   47042   060650   HASLMT  DEC 25000
650   47043   060650   BSTCHK  DEC 25000
651   47044   250600   MAXTIM  DEC 86400
652   47045   000000           OCT 0
653   47046   000000           OCT 0
654   47047   000000           OCT 0
655                                          STORED DECIMAL CONSTANTS AT B3
656   47050   000020   TWOB3   DEC 2.0B3
657   47051   000000           OCT 0
660   47052   000000           OCT 0
661                                          STORED DECIMAL CONSTANTS AT B5
662   47053   000140   THREB5  DEC 3.0B5
663   47054   000200   FOURB5  DEC 4.0B5
664   47055   000300   BASTHK  DEC 6.0B5
665   47056   001200   TWTYB5  DEC 20.0B5
666   47057   001700   BASWID  DEC 30.0B5
667   47060   005000   MILCON  DEC 80.0B5
670   47061   006000   D1      DEC 96.0B5
671   47062   006000   D2      DEC 96.0B5
672   47063   015400   HTTOSK  DEC 216.0B5
673   47064   017000   CGTOHT  DEC 240.0B5
674   47065   032200   FRNWID  DEC 420.0B5
675   47066   036000   HTZEND  DEC 480.0B5
676   47067   047600   CGTOSK  DEC 636.0B5
677   47070   053400   X2      DEC 696.0B5
700   47071   066600   SECTN   DEC 876.0B5
701   47072   071600   TOTL    DEC 924.0B5
702   47073   076200   DSTC3   DEC 996.0B5
703   47074   105600   X1      DEC 1116.0B5
704   47075   107200   DSTC2   DEC 1140.0B5
705   47076   120200   DSTC1   DEC 1284.0B5
706   47077   124300   FRNLNG  DEC 1350.0B5
707   47100   000000           OCT 0
710   47101   000000           OCT 0
711   47102   000000           OCT 0
712   47103   000000           OCT 0
713   47104   000000           OCT 0
714   47105   000000           OCT 0
715   47106   000000           OCT 0
716   47107   000000           OCT 0
717                                          STORED DECIMAL CONSTANTS AT
720   47110   160400   9HRDB6  DEC 900.0B6       B6,B9,B11,B12,B17
721   47111   242400   13+DB6  DEC 1300.0B6
722   47112   000005   P01B9   DEC 0.01B9
723   47113   000024   PT010   DEC 0.01B11
724   47114   000366   PT12    DEC 0.12B11
725   47115   001561   PT43    DEC 0.43B11
726   47116   074000   15PT0   DEC 15.0B11
727   47117   204000   THTHR   DEC 33.0B11
730   47120   000014   PT003   DEC 0.003B12
731   47121   000061   PT012   DEC 0.012B12
732   47122   001065   KQ      DEC 0.138B12
733   47123   031463   PT10    DEC 0.10B17
734   47124   050754   PT16    DEC 0.16B17
735   47125   000000           OCT 0
```

```
736   47126   000000            OCT 0
737   47127   000000            OCT 0
740                                          ***** SET-POINT TABLES *****
741
742   47130   004540   TCGST1   DEC 2400
743   47131   004540   TCGST2   DEC 2400
744   47132   004540   TCGST3   DEC 2400
745   47133   000000            OCT 0
746   47134   000000            OCT 0
747
750   47135   004571   BCGST1   DEC 2425
751   47136   004571   BCGST2   DEC 2425
752   47137   004571   BCGST3   DEC 2425
753   47140   000000            OCT 0
754   47141   000000            OCT 0
755
756   47142   004704   THTST1   DEC 2500
757   47143   004704   THTST2   DEC 2500
760   47144   004704   THTST3   DEC 2500
761   47145   000000            OCT 0
762   47146   000000            OCT 0
763
764   47147   004735   BHTST1   DEC 2525
765   47150   004735   BHTST2   DEC 2525
766   47151   004735   BHTST3   DEC 2525
767   47152   000000            OCT 0
770   47153   000000            OCT 0
771
772   47154   004374   NSKST1   DEC 2300
773   47155   004374   NSKST2   DEC 2300
774   47156   004374   NSKST3   DEC 2300
775   47157   000000            OCT 0
776   47160   000000            OCT 0
777
1000  47161   004425   SSKST1   DEC 2325
1001  47162   004425   SSKST2   DEC 2325
1002  47163   004425   SSKST3   DEC 2325
1003  47164   000000            OCT 0
1004  47165   000000            OCT 0
1005
1006  47166   001000   C01000   OCT 1000
1007  47167   004000   C04000   OCT 4000
1010
1011                                      SYSTEM ROUTINE XFER VECTORS
1012  47170   013262   FLCFIX   OCT 13262
1013  47171   003427   CHKBIT   OCT 3427
1014  47172   012227   HIBCD    OCT 12227
1015  47173   003453   LFLAGO   OCT 3453
1016  47174   012616   NXOBIT   OCT 12616
1017  47175   020201   DTALOG   OCT 20201
1020
1021  47176   416600   CLRMAP   OCT 416600    STZ CORLOC,B
1022  47177   456600   DATXFR   OCT 456600    STL CORLOC,B
1023                            EJE
1024
1025  47200   003410   LTCHRG   DEC 1800                        TOP CHARGE ZONE
1026  47201   003326   LBCHRG   DEC 1750                        BOTTOM CHARGE ZONE
1027  47202   003410   LTHEAT   DEC 1800   LOW SET-POINT LIMIT  TOP HEAT ZONE
1030  47203   003326   LBHEAT   DEC 1750                        BOTTOM HEAT ZONE
1031  47204   004374   LSOAKN   DEC 2300                        SOAK ZONE (NORTH)
1032  47205   004312   LSOAKS   DEC 2250                        SAOK ZONE (SOUTH)
1033  47206   004704   HTCHRG   DEC 2500                        TOP CHARGE ZONE
1034  47207   004622   HBCHRG   DEC 2450                        BOTTOM CHARGE ZONE
1035  47210   004704   HTHEAT   DEC 2500   HIGH SET-POINT LIMIT TOP HEAT ZONE
1036  47211   004622   HBHEAT   DEC 2450                        BOTTOM HEAT ZONE
1037  47212   004622   HSOAKN   DEC 2450                        SOAK ZONE (NORTH)
1040  47213   004540   HSOAKS   DEC 2400                        SOAK ZONE (SOUTH)
1041
1042  47214   000001   CGMOD    OCT 1 MODIFIER FOR FCE CHARGE ZONE BOTTOM SET-POINT
1043  47215   000001   HTMOD    OCT 1 MODIFIER FOR FCE HEAT ZONE BOTTOM SET-POINT
1044  47216   000001   SKMOD    OCT 1 MODIFIER FOR FCE SOAK ZONE SOUTH SET-POINT
1045  47217   000000            OCT 0
```

```
1046
1047   47220   000000   PSTDAT OCT 0       FCE 1 CHARGE INDEX LAST TIME THROUGH
1050   47221   000000          OCT 0           2
1051   47222   000000          OCT 0           3
1052   47223   000000          OCT 0       FCE 1 EXTRCT INDEX LAST TIME THOURGH
1053   47224   000000          OCT 0           2
1054   47225   000000          OCT 0           3
1055   47226   000000          OCT 0
1056   47227   000000          OCT 0
1057   47230   000000          OCT 0
1060   47231   000000          OCT 0
1061
1062   47232   000000   PREVT0 OCT 0              LAST CALC VALUES
1063   47233   000000   PREVT1 OCT 0
1064   47234   000000   PREVT2 OCT 0
1065   47235   000000   PREVT3 OCT 0
1066   47236   000000   PREVT4 OCT 0
1067   47237   000000   PREVT5 OCT 0
1070
1071   47240   366000   CTLMPI OCT 366000   FCE 1 CONTROL MAP CHARGE INDEX
1072   47241   371200          OCT 371200       2
1073   47242   374400          OCT 374400       3
1074   47243   366000   CTLMPO OCT 366000   FCE 1 CONTROL MAP EXTRCT INDEX
1075   47244   371200          OCT 371200       2
1076   47245   374400          OCT 374400       3
1077   47246   000000          OCT 0
1100   47247   000000          OCT 0
1101   47250   000000          OCT 0
1102   47251   000000          OCT 0
1103
1104   47252   000000   NEWTP0 OCT 0              THIS CALC VALUES
1105   47253   000000   NEWTP1 OCT 0
1106   47254   000000   NEWTP2 OCT 0
1107   47255   000000   NEWTP3 OCT 0
1110   47256   000000   NEWTP4 OCT 0
1111   47257   000000   NEWTP5 OCT 0
1112
1113   47260   001730   BLODRM OCT 1730     FCE 1 CONTROL MAP LOW LIMIT
1114   47261   001745          OCT 1745         2
1115   47262   001762          OCT 1762         3
1116   47263   001745   BHIDRM OCT 1745     FCE 1 CONTROL MAP HIGH LIMIT
1117   47264   001762          OCT 1762         2
1120   47265   001777          OCT 1777         3
1121   47266   000000          OCT 0
1122   47267   000000          OCT 0
1123   47270   000000          OCT 0
1124   47271   000000          OCT 0
1125
1126   47272   000000   CURIDN OCT                SLAB ID NUMBER
1127   47273   000000   CURGRD OCT                SLAB WIDTH
1130   47274   000000   CURWID OCT                SLAB LENGTH
1131   47275   000000   CURLNG OCT                SLAB THICKNESS
1132   47276   000000   CURTHK OCT                SLAB FCE NO
1133   47277   000000   CURETM OCT                SLAB DISCHARGE TIME
1134
1135   47300   000661   LIMITL OCT 661      FCE 1 FURNACE MAP LOW LIMIT
1136   47301   000711          OCT 711          2
1137   47302   000741          OCT 741          3
1140   47303   000711   LIMITH OCT 711      FCE 1 FURNACE MAP HIGH LIMIT
1141   47304   000741          OCT 741          2
1142   47305   000771          OCT 771          3
1143   47306   000000          OCT 0
1144   47307   000000          OCT 0
1145   47310   000000          OCT 0
1146   47311   000000          OCT 0
1147
1150   47312   000000   HEATCK OCT 0        FCE 1 HEAT CURRENT AT END OF HEAT ZONE
1151   47313   000000          OCT 0            2
1152   47314   000000          OCT 0            3
1153
```

```
1154   47315   151172   FINSVC OCT 151172   FCE 1 SEL IN SERVICE -------- A01001
1155   47316   151173          OCT 151173       2                        A01101
1156   47317   151174          OCT 151174       3                        A01201
1157
1160   47320   000000   HLDLOC OCT 0       FCE 1 GOING OR NOW ON HOLD INDICATOR
1161   47321   000000          OCT 0           2
1162   47322   000000          OCT 0           3
1163
1164   47323   000000   HLDTIM OCT 0       FCE 1 START TEMP RISE CLOCK IMAGE
1165   47324   000000          OCT 0           2
1166   47325   000000          OCT 0           3
1167
1170   47326   000000   DLYIND OCT 0       FCE 1 HOLD IN PROGRESS INDICATOR
1171   47327   000000          OCT 0           2
1172   47330   000000          OCT 0           3
1173
1174   47331   000000   DLYCNT OCT 0       FCE 1 SET-POINT STEP-DOWN COUNT
1175   47332   000000          OCT 0           2
1176   47333   000000          OCT 0           3
1177
1200   47334   004540   SETPNT DEC 2400    FCE 1 DELAY SET-POINT LAST TIME THROUGH
1201   47335   004540          DEC 2400        2
1202   47336   004540          DEC 2400        3
1203   47337   000000          OCT 0
1204
1205   47340   000000   DECODE ...
1206   47341   10 7000         ENU ZEROB
1207   47342   5047 13         LSA 11
1210   47343   5046 07         LSL 7
1211   47344   55 7340         IJP DECODE
1212   47345   000000          OCT 0
1213   47346   000000          OCT 0
1214   47347   000000          OCT 0
1215
1216   47350   000000   NEWFRM ...
1217   47351   46 7456         STU TMPTRK
1220   47352   44 7457         STL TMPLOC
1221   47353   14 7455         ADD INCMNT
1222   47354   02 7022         CPL DRMLIM
1223   47355   67 7365         JOL TRAKOK
1224   47356   12 7456         ENL TMPTRK
1225   47357   71 0001         ALC 1
1226   47360   02 7454         CPL HITRAK
1227   47361   67 7363         JOL L+2
1230   47362   12 7453         ENL LOTRAK
1231   47363   44 7456         STL TMPTRK
1232   47364   70 0000         ELC 0
1233   47365   44 7457   TRAKOK STL TMPLOC
1234   47366   12 7456         ENL TMPTRK
1235   47367   5047 07         LSA 7
1236   47370   14 7457         ADD TMPLOC
1237   47371   55 7350         IJP NEWFRM
1240   47372   000000          OCT 0
1241
1242
1243   47373   017500   LSTHND DEC 8000
1244   47374   017500          DEC 8000
1245   47375   017500          DEC 8000
1246   47376   000000          OCT 0
1247   47377   000000          OCT 0
1250                           EJE
1251           047400          8ORG 47400
1252
1253
1254   47400   000000   FRNNO  OCT       FCE FOR WHICH HEAT CALCS ARE NOW RUNNING
1255   47401   000000   INDCTR OCT 0     CALCULATIONS - RELATIVE LOC OF SLAB DATA
1256   47402   000000   DRMTRK OCT 0     CALCULATIONS - DRUM TRACK OF SLAB DATA
1257   47403   000000   BCHGRL OCT 0     MAP UPDATE - FCE MAP REL LOC
1260   47404   000000   BCHGDM OCT 0     MAP UPDATE - FCE AMP DRUM TRACK
1261   47405   000000   BCTLRL OCT 0     MAP UPDATE - CTL MAP REL LOC
1262   47406   000000   BCTLDM OCT 0     MAP UPDATE - CTL MAP DRUM TRACK
1263   47407   000000   SHTSLB OCT       SHORT SLAB ACKNOWLEDGED INDICATOR
```

```
1264
1265    47410    000000    HTTIME  OCT     MILLING TIME CALC - SECOND LIMIT RESULT
1266    47411    000000    PHTIME  OCT     MILLING TIME CALC - FIRST LIMIT RESULT
1267    47412    000000    CHTIME  OCT  0  MILLING TIME CALC - THIRD LIMIT RESULT
1270    47413    000000    TPHTIM  OCT     MILLING TIME ACCUMULATOR A (TO FIRST LIMIT)
1271    47414    000000    TMLTIM  OCT     MILLING TIME ACCUMULATOR B (TO SECOND LIMIT)
1272    47415    000000    TOTWID  OCT     TOTAL SLAB WIDTHS ACCUMULATOR
1273    47416    000000    GAPTIM  OCT     F1 GAP-TIME FOR MILLING TIME CALC
1274    47417    000000            OCT  0
1275
1276    47420    000000    HTSLBF  OCT     FIRST SLAB IN HEAT ZONE ACKNOWLEDGED
1277    47421    000000    PHTSBF  OCT     FIRST SLAB IN CHARGE ZONE ACKNOWLEDGED
1300    47422    000000    GRDSV1  OCT     GRADE OF FIRST SLAB IN IDEAL CHARGE ZONE
1301    47423    000000    GRDSV2  OCT     GRADE OF FIRST SLAB IN IDEAL HEAT ZONE
1302    47424    000000    AVTHK1  OCT     AVERAGE THICKNESS IN IDEAL CHARGE ZONE
1303    47425    000000    AVTHK2  OCT     AVERAGE THICKNESS IN IDEAL HEAT ZONE
1304    47426    000000    PHTOT   OCT     TOTAL HEAT OF IDEAL CHARGE ZONE
1305    47427    000000    HTOT    OCT     TOTAL HEAT OF IDEAL HEAT ZONE
1306
1307    47430    000000    HTREQC  OCT  0  HEAT REQUIRED IN CHARGE ZONE
1310    47431    000000    HTREQH  OCT  0  HEAT REQUIRED IN HEAT ZONE
1311    47432    000000    TF      OCT     FURNACE TEMPERATURE AT LOCATION OF SLAB
1312    47433    000000    TFRE    OCT     EQUALS (TF+460) RAISED TO 4TH POWER
1313    47434    000000    KMOD0   OCT     K1 FOR SET-POINT CALC
1314    47435    000000    KMOD1   OCT     K2 FOR SET-POINT CALC
1315    47436    000000    IMPT1   OCT
1316    47437    000000    IMPT2   OCT
1317
1320    47440    000000    TS0     OCT  0  LAST CALC VALUE
1321    47441    000000    TU      OCT  0  HEAT CURRENT
1322    47442    000000    TIMEC   OCT  0       CALCULATED TIME INCREMENT
1323    47443    000000    DS      OCT  0
1324    47444    000000    HASLST  OCT  0
1325    47445    000000    CYCNT   OCT  0
1326    47446    000000    BSTHPH  OCT  0
1327    47447    000000    BSTHAS  OCT  0
1330
1331    47450    000000    INDICE  OCT  0  FCE X WORKING INDEX
1332    47451    000000    OVERXX  OCT  0  FCE X SHUT-OFF INDEX
1333    47452    000000    SCNTEM  OCT     AMOUNT SLAB CENTER TEMP IS OVER 2000 DEGREES
1334    47453    000000    LOTRAK  OCT  0  NEWFRM SUBR - LOW TRACK LIMIT
1335    47454    000000    HITRAK  OCT  0  NEWFRM SUBR - HIGH TRACK LIMIT
1336    47455    000000    INCMNT  OCT  0  NEWFRM SUBR - INCREMENT VALUE
1337    47456    000000    TMPTRK  OCT  0  NEWFRM SUBR - TEMP TRACK STORAGE
1340    47457    000000    TMPLOC  OCT  0  NEWFRM SUBR - TEMP REL LOC STORAGE
1341
1342    47460    000000    CALCRN  OCT  0  SET TO NEG FROM P.C. TO INHIBIT THE HEAT CALCS
1343    47461    000000    CLCK    OCT  0  HOLD CALCULATION - CLOCK TIME
1344    47462    000000    TEMDEC  OCT  0  HOLD CALCULATION - TEMPERATURE DECREASE
1345    47463    000000    DWNTMP  OCT  0  HOLD CALCULATION - LOW TEMPERATURE
1346    47464    000000    DWNTIM  OCT  0  HOLD CALCULATION - DELAY TIME
1347    47465    000000    SETVAL  OCT  0  HOLD CALCULATION - NEW SETPOINT
1350    47466    000000    BSVIND  OCT  0  TEMPORARY B-BOX STORAGE
1351    47467    000000    OPTEM   OCT  0  OPTIMUM TEMPERATURE TO CALCULATE TF
1352
1353    47470    000000    DSTNCE  OCT  0  OPTIMUM DISTANCE FOR CALCULATING TF
1354    47471    000000    TEMP0   OCT  0  STORAGE FOR TC FEEDBACKS (TC1-200)
1355    47472    000000    TEMP1   OCT  0  STORAGE FOR TC FEEDBACKS (TC1)
1356    47473    000000    TEMP2   OCT  0  STORAGE FOR TC FEEDBACKS (TC2)
1357    47474    000000    TEMP3   OCT  0  STORAGE FOR TC FEEDBACKS (TC3)
1360    47475    000000    TEMP4   OCT  0  STORAGE FOR TC FEEDBACKS (THT)
1361    47476    000000    A1      OCT  0  DISTANCE # 1 - IDEAL SUBR (CHARGE ZONE)
1362    47477    000000    A       OCT  0  DISTANCE # 2 - IDEAL SUBR (HEAT ZONE)
1363
1364    47500    000000    K1      OCT  0  GO FLOW SUBR
1365    47501    000000    K2      OCT  0  GO FLOW SUBR
1366    47502    000000    C       OCT  0  GO FLOW SUBR
1367    47503    000000    CM      OCT  0  GO FLOW SUBR
1370    47504    000000    DT      OCT  0           GO FLOW SUBR
1371    47505    000000    KT      OCT  0           GO FLOW SUBR
1372    47506    000000    M       OCT  0           GO FLOW SUBR
1373    47507    000000    G       OCT  0           GO FLOW SUBR
```

```
1374
1375    47510    000000    DS2     OCT  0    GO FLOW SUBR
1376    47511    000000    MDS     OCT  0    GO FLOW SUBR
1377    47512    000000    TMC     OCT  0    GO FLOW SUBR
1400    47513    000000    TSN     OCT  0    GO FLOW SUBR
1401    47514    000000    TMGM    OCT  0    GO FLOW SUBR
1402    47515    000000    KTEM    OCT  0    GO FLOW SUBR
1403    47516    000000    KPOS    OCT  0    GO FLOW SUBR
1404    47517    000000    TSFN    OCT  0    GO FLOW SUBR
1405
1406    47520    000000    RMNDR   OCT  0    GO FLOW SUBR
1407    47521    000000    PRSNT   OCT  0    GO FLOW SUBR
1410    47522    000000    FURTM   OCT  0    GO FLOW SUBR
1411    47523    000000    BFINE   OCT  0    GO FLOW SUBR
1412    47524    000000    NEWTQ   OCT  0    GO FLOW SUBR
1413    47525    000000    NEWTMC  OCT  0    GO FLOW SUBR
1414    47526    000000    TS1     OCT  0    GO FLOW SUBR
1415    47527    000000    1STONE  OCT  0    FIRST SLAB IN HEAT ZONE ACKNOWLEDGED
1416
1417    47530    000000    GRADEB  OCT  0    SET-POINT CALC
1420    47531    000000    LOWRIS  OCT  0    SET-POINT CALC
1421    47532    000000    TOLRCE  OCT  0    SET-POINT CALC
1422    47533    000000    SECB    OCT  0    SET-POINT CALC
1423    47534    000000    PRIB    OCT  0    SET-POINT CALC
1424    47535    000000    MTTRAK  OCT  0    SET-POINT CALC
1425    47536    000000    TABLB   OCT  0    SET-POINT CALC
1426    47537    000000    FINLB   OCT  0    SET-POINT CALC
1427
1430    47540    000000    SETING  OCT  0    SET-POINT CALC
1431    47541    000000    HPHTEM  OCT  0    SET-POINT CALC
1432    47542    000000    HTCHK   OCT  0    SET-POINT CALC
1433    47543    000000    WHOLE   OCT  0    SET-POINT CALC
1434    47544    000000    FRCTN   OCT  0    SET-POINT CALC
1435    47545    000000    HTDF    OCT  0    SET-POINT CALC
1436    47546    000000    HHDF    OCT  0    SET-POINT CALC
1437    47547    000000    HPH     OCT  0    SET-POINT CALC
1440
1441    47550    000000    HPHND   OCT  0    SET-POINT CALC
1442    47551    000000    HPWDF   OCT  0    SET-POINT CALC
1443    47552    000000    PHTDIF  OCT  0    SET-POINT CALC
1444    47553    000000    HHND    OCT  0    SET-POINT CALC
1445    47554    000000    SAVTK1  OCT
1446    47555    000000    SAVTK2  OCT
1447    47556    000000    SAVTQC  OCT
1450    47557    000000    SAVTQH  OCT
1451
1452    47560    000000    CNT     OCT  0    MILLING TIME CALC
1453    47561    000000    YTEM    OCT  0    MILLING TIME CALC
1454    47562    000000    Y11     OCT  0    MILLING TIME CALC
1455    47563    000000    CFTEM   OCT  0    MILLING TIME CALC
1456    47564    000000    CFPRIM  OCT  0    MILLING TIME CALC
1457    47565    000000    CFCT    OCT  0    MILLING TIME CALC
1460    47566    000000    TEMPTM  OCT  0    MILLING TIME CALC
1461    47567    000000    LSTHRQ  OCT
1462
1463    47570    000000    FUDGE   OCT  0    SET-POINT MOTOR CONTROL
1464    47571    000000    UPDOWN  OCT  0    SET-POINT MOTOR CONTROL
1465    47572    000000    HOWFAR  OCT  0    SET-POINT MOTOR CONTROL
1466    47573    000000    OUTWRD  OCT  0    SET-POINT MOTOR CONTROL
1467    47574    000000    OUTBIT  OCT  0    SET-POINT MOTOR CONTROL
1470    47575    000000    BSAVE1  OCT  0    SET-POINT MOTOR CONTROL
1471    47576    000000    BSAVE2  OCT  0    SET-POINT MOTOR CONTROL
1472    47577    000000    THISIT  OCT  0    SET-POINT MOTOR CONTROL
1473
1474                                 EJE
1475             000421             DRM CTLDRM
1476             045600             LOC WRKARA
1477    45600    000421             DEC CTLDRM
1500
1501
```

```
1502                                        THIS PROGRAM WILL RUN ONCE A MINUTE FROM
1503                                        AN ASI BID. THIS FIRST PORTION WILL DETERMINE
1504                                        IF A SLAB HAS BEEN CHARGED TO THE FURNACE MAP
1505                                        THAT DOES NOT APPEAR ON THE CONTROL MAP - AND
1506                                        WILL UPDATE THE CONTROL MAP IF NECESSARY.
1507
1510
1511    45601   36  0000    INDAT   EBC 0           PICK UP THE FURNACE INDICIES
1512    45602   72  0013            ESR 11
1513    45603   13  4620            ENL EFCDIN,B
1514    45604   72  0000            ESR 0
1515    45605   45  6305            STL BDATIN,B
1516    45606   56  7005            BSK KDEC05
1517    45607   34  5602            DJP INDAT+1
1520
1521    45610   36  0000    CHECKN  EBC 0           CHECK FOR CHANGE IN CHARAGE INDICES
1522    45611   13  7220            ENL PSTDAT,B
1523    45612   03  6305            CPL BDATIN,B
1524    45613   63  5627            JNE NEWIN
1525    45614   56  7002            BSK KDEC02
1526    45615   34  5611            DJP CHECKN+1
1527
1530    45616   36  0000    CHECKO  EBC 0           CHECK FOR CHANGE IN EXTRACT INDICIES
1531    45617   13  7223            ENL PSTDAT+3,B
1532    45620   03  6310            CPL BDATIN+3,B
1533    45621   63  6013            JNE DISCHG
1534    45622   56  7002            BSK KDEC02
1535    45623   34  5617            DJP CHECKO+1
1536
1537    45624   12  7460            ENL CALCRN      ARE CALCS TO BE RUN
1540    45625   65  6046            JLP CALCHT      YES - GO ON TO HEAT CALCS
1541            045626    TRNOFF    TOP             NO -- TURN OFF
        45626   001000              EXC ,1,
1542                                EJE
1543
1544    45627   13  7220    NEWIN   ENL PSTDAT,B    IS FCE X PAST DATA LOC NON-ZERO
1545    45630   63  5634            JLT L+4         NO -- MAKE NEXT CHECK
1546    45631   13  6305            ENL BDATIN,B    YES - FCE X PAST DATA IN = FCE
1547    45632   45  7220            STL PSTDAT,B          • CHARGE INDEX
1550    45633   34  5614            DJP CHECKN+4
1551
1552
1553    45634   42  7466            STB BSVIND      PICK UP THE INDEX FOR FCE X AND
1554    45635   13  7220            ENL PSTDAT,B    PREPARE TO TRANSFER DATA TO THE MAP
1555    45636   76  7340            DRJ DECODE
1556    45637   46  7404            STU BCHGDM
1557    45640   44  7403            STL BCHGRL
1560    45641   12  7404            ENL BCHGDM
1561    45642   74  5643            STA L+1
1562            045643              RFD CORLOC,XX,1  READ IN FCE MAP TRACK AND
        45643   770000              DM1 63,0,XX      PICK UP DATA
        45644   046600              DM2 0,1-1,CORLOC
1563    45645   32  7403            ENB BCHGRL
        45646   13  6600            ENL MPIDNO,B    SLAB ID NO
1565    45647   44  6315            STL BSVDAT
        45650   13  6607            ENL MPGRDE,B    SLAB GRADE
1567    45651   44  6316            STL BSVDAT+1
1570    45652   13  6612            ENL MPWDTH,B    SLAB WIDTH
1571    45653   44  6317            STL BSVDAT+2
1572    45654   13  6613            ENL MPLGTH,B    SLAB LENGTH
1573    45655   44  6320            STL BSVDAT+3
1574    45656   13  6614            ENL MPTHCK,B    SLAB THICKNESS
1575    45657   44  6321            STL BSVDAT+4
1576    45660   13  6630            ENL MPENTR,B    TIME OF ENTRY
1577    45661   44  6322            STL BSVDAT+5
1600    45662   13  6624            ENL MPPSTN,B    POSITION IN FCE
1601    45663   44  6323            STL BSVDAT+6
1602                                                CONVERT SLAB DIMENSIONS
1603                                                TO FIX POINT (B05)
1604    45664   10  6317            ENU BSVDAT+2       WIDTH OF SLAB
1605    45665   60  5671            JUZ L+4
1606    45666   70  0005            ELC 5
1607    45667   30  7170            IRJ FLOFIX
```

```
1610   45670   46   6317              STU BSVDAT+2
1611
1612   45671   10   6320              ENU BSVDAT+3   LENGTH OF SLAB
1613   45672   60   5676              JUZ L+4
1614   45673   70   0005              ELC 5
1615   45674   30   7170              IRJ FLOFIX
1616   45675   46   6320              STU BSVDAT+3
1617
1620   45676   10   6321              ENU BSVDAT+4   THICKNESS OF SLAB
1621   45677   60   5703              JUZ L+4
1622   45700   70   0005              ELC 5
1623   45701   30   7170              IRJ FLOFIX
1624   45702   46   6321              STU BSVDAT+4
1625
1626   45703   10   7000              ENU ZEROB      DETERMINE IF THIS IS A SOUTH SHORT
1627   45704   12   6323              ENL BSVDAT+6
1630   45705   5046 03                LSL 3
1631   45706   5047 24                LSA 20
1632   45707   02   7003              CPL KDEC03
1633   45710   63   5732              JNE MOVDAT     NO -- DATA MAY BE XFERED TO CTL MAP
1634
1635   45711   32   7466              ENB BSVIND     YES - DETERMINE IF NORTH SHORT IS IN
1636   45712   13   7300              ENL LIMITL,B
1637   45713   11   7303              ENU LIMITH,B
1640   45714   44   7453              STL LOTRAK
1641   45715   46   7454              STU HITRAK
1642           045716                 STC INCMNT,32
       45716   70   0040              ELC 32
       45717   44   7455              STL INCMNT
1643   45720   10   7404              ENU BCHGDM
1644   45721   12   7403              ENL BCHGRL
1645   45722   76   7350              DRJ NEWFRM
1646   45723   03   6305              CPL BDATIN,B
1647   45724   63   5726              JNE L+2
1650   45725   34   5614              DJP CHECKN+4   NO -- DO NOT XFER DATA TO THE MAP
1651
1652   45726   12   7167              ENL C04000     YES - DATA IS TO BE XFERED - SET
1653   45727   5046 06                LSL 6                          BIT 17 OF SOUTH SHORT ID NO.
1654   45730   51   6315              IOR BSVDAT
1655   45731   44   6315              STL BSVDAT
1656
1657   45732   32   7466    MOVDAT    ENB BSVIND     YES - THIS DATA MAY BE XFERRED
1660   45733   13   7240              ENL CTLMPI,B                   TO CTL MAP
1661   45734   76   7340              DRJ DFCODE
1662   45735   46   7406              STU BCTLDM
1663   45736   44   7405              STL BCTLRL
1664   45737   12   7406              ENL BCTLDM
1665   45740   74   5741              STA L+1
1666           045741                 RFD CORLOC,XX,1
       45741   770000                 DM1 63,0,XX
       45742   046600                 DM2 0,1-1,CORLOC
1667
1670   45743   12   7176              ENL CLRMAP     CLEAR THE SECTION TO BE USED
1671   45744   51   7405              IOR BCTLRL
1672   45745   44   5747              STL L+2
1673   45746   36   0017              EBC 15
1674   45747   41   6600              STZ CORLOC,B
1675   45750   73   5747              BJP L-1
1676                                                 TRANSFER DATA TO CTL MAP
1677   45751   12   7177              ENL DATXFR
1700   45752   51   7405              IOR BCTLRL
1701   45753   44   5756              STL L+3
1702   45754   36   0005              EBC 5
1703   45755   13   6315              ENL BSVDAT,B
1704   45756   45   6600              STL CORLOC,B
1705   45757   73   5755              BJP L-2
1706
1707   45760   12   7406              ENL BCTLDM     PUT UPDATED CTL MAP TRACK BACK
1710   45761   14   7167              ADD C04000                 ON DRUM
1711   45762   74   5763              STA L+1
1712           045763                 WOD CORLOC,XX,1
       45763   774000                 DM1 63,1,XX
       45764   046600                 DM2 0,1-1,CORLOC
```

```
1713
1714    45765   32  7466            ENB BSVIND     SET-UP NEWFRM SUBR AND GENERATE NEW
1715    45766   13  7260            ENL BLODRM,B    INDEX FOR CTLMPI,B
1716    45767   11  7263            ENU BHIDRM,B
1717    45770   44  7453            STL LOTRAK
1720    45771   46  7454            STU HITRAK
1721              045772            STC INCMNT,16
        45772   70  0020            ELC 16
        45773   44  7455            STL INCMNT
1722    45774   12  7405            ENL BCTLRL
1723    45775   10  7406            ENU BCTLDM
1724    45776   76  7350            DRJ NEWFRM
1725    45777   45  7240            STL CTLMPI,B
1726
1727    46000   13  7300            ENL LIMITL,B   SET-UP NEWFRM SUBR AND GENERATE NEW
1730    46001   11  7303            ENU LIMITH,B    INDEX FOR PSTDAT,B
1731    46002   44  7453            STL LOTRAK
1732    46003   46  7454            STU HITRAK
1733              045004            STC INCMNT,32
        46004   70  0040            ELC 32
        46005   44  7455            STL INCMNT
1734    46006   10  7404            ENU BCHGDM
1735    46007   12  7403            ENL BCHGRL
1736    46010   76  7350            DRJ NEWFRM
1737    46011   45  7220            STL PSTDAT,B
1740    46012   34  5611            DJP CHECKN+1
1741                                EJE
1742
1743    46013   13  7223    DISCHG  ENL PSTDAT+3,B IS FCE X PAST DATA LOC ZERO
1744    46014   63  6020            JLT L+4        NO -- CONTINUE
1745    46015   13  6310            ENL BDATIN+3,B YES -- FCE X PAST DATA OUT =
1746    46016   45  7223            STL PSTDAT+3,B        FCE X EXTRCT INDEX
1747    46017   34  5622            DJP CHECKO+4
1750
1751    46020   42  7466            STB BSVIND     GENERATE NEW PAST DATA OUT INDEX
1752    46021   13  7300            ENL LIMITL,B   FOR FCE X FROM THE PRESENT PAST
1753    46022   11  7303            ENU LIMITH,B   DATA OUT INDEX
1754    46023   44  7453            STL LOTRAK
1755    46024   46  7454            STU HITRAK
1756              046025            STC INCMNT,32
        46025   70  0040            ELC 32
        46026   44  7455            STL INCMNT
1757    46027   13  7223            ENL PSTDAT+3,B
1760    46030   76  7340            DRJ DECODE
1761    46031   76  7350            DRJ NEWFRM
1762    46032   45  7223            STL PSTDAT+3,B
1763
1764    46033   13  7260            ENL BLODRM,B
1765    46034   11  7263            ENU BHIDRM,B
1766    46035   44  7453            STL LOTRAK
1767    46036   46  7454            STU HITRAK
1770              046057            STC INCMNT,16
        46037   70  0020            ELC 16
        46040   44  7455            STL INCMNT
1771    46041   13  7243            ENL CTLMPO,B
1772    46042   76  7340            DRJ DECODE
1773    46043   76  7350            DRJ NEWFRM
1774    46044   45  7243            STL CTLMPO,B
1775    46045   34  5617            DJP CHECKO+1
1776                                EJE
1777
2000    46046   12  7400    CALCHT  ENL FRNNO      INCREMENT FCE NO FOR NEW RUN THOURH
2001    46047   71  0001            ALC 1          HEAT CALCS AND CHECK FOR VALIDITY
2002    46050   02  7003            CPL KDEC03
2003    46051   67  6053            JOL L+2
2004    46052   70  0000            ELC 0
2005    46053   44  7400            STL FRNNO
2006    46054   32  7400            ENB FRNNO      SET B-BOX FOR FCE X
2007    46055   13  7315            ENL FINSVC,B   SET-UP IN SERVICE CHECK
2010    46056   44  6060            STL L+2
2011    46057   30  7171            IRJ CHKBIT     IS FCE X IN SERVICE
2012    46050     000000            DEC 0
```

```
2013  46061  34  6205         DJP SETNEG  NO -- SET ALL ENTRY TIMES NEGATIVE FOR
2014                                                  ALL SLABS IN THIS FURNACE
2015
2016  46062  13  7320         ENL HLDLOC,B            IS FCE X HOLD LOC NEG
2017  46063  67  6075         JLN DELAY               YES - THIS FCE ON DELAY
2020
2021  46064  72  0012         ESR 10
2022  46065  12  3517         ENL GAPLOC
2023  46066  72  0000         ESR 0
2024  46067  36  0000         EBC 0
2025  46070  70  0000         ELC 0
2026  46071  70  0310         ELC 200    // WILL LATER BE CHANGED TO IRJ BIBCD //
2027  46072  44  7416         STL GAPTIM
2030         046073           RDT DTINDX,CTLDRM+3,3
      46073   770424          DM1 63,0,CTLDRM+3
      46074   645601          DM2 1,3-1,DTINDX
2031
2032                          EJE
2033  46075  13  7326  DELAY  ENL DLYIND,B  HAS THIS FCE BEEN ON DELAY
2034  46076  65  6107         JLP HLDACT    NO -- TAKE HOLD ACTION
2035  46077  13  7331         ENL DLYCNT,B  YES - IS DELAY COUNT NOW ZERO
2036  46100  61  6157         JLZ CNTZER    YES - CHECK FURTHER
2037  46101  71  7776         ALC -1        NO -- DECREMENT DELAY COUNT
2040  46102  45  7331         STL DLYCNT,B
2041  46103  13  7334         ENL SETPNT,B  DECREASE FCE X SET-POINT 10 DEGREES
2042  46104  71  7765         ALC -10
2043  46105  45  7334         STL SETPNT,B
2044  46106  34  6267         DJP SPTSET
2045
2046  46107  70  7776  HLDACT ELC -1   SET FCE X DELAY ACTION TAKEN INDICATOR
2047  46110  45  7326         STL DLYIND,B
2050  46111  13  7323         ENL HLDTIM,B
2051  46112  24  7021         MPL DEC100
2052  46113  26  7017         DIV DEC060
2053  46114  44  7462         STL TEMDEC    CALCULATED TEMPERATURE DECREASE
2054  46115  12  7033         ENL 24HRRD
2055  46116  16  7462         SUB TEMDEC
2056  46117  44  7463         STL DWNTMP    CALCULATED DELAY SET-POINT
2057  46120  12  7031         ENL 18HNRD    IS CALC DELAY SET-POINT BELOW LIMIT
2060  46121  02  7463         CPL DWNTMP
2061  46122  67  6126         JOL L+4       NO -- CONTINUE
2062  46123  70  0074         ELC 60        YES - SET DLYCNT FOR LOW LIMIT
2063  46124  45  7331         STL DLYCNT,B        DECREASE
2064  46125  34  6132         DJP L+5
2065  46126  10  7000         ENU ZEROB
2066  46127  12  7462         ENL TEMDEC
2067  46130  26  7012         DIV KDEC10
2070  46131  45  7331         STL DLYCNT,B  CALCULATED NUMBER OF STEP-DOWNS
2071  46132  13  7323         ENL HLDTIM,B
2072  46133  17  7331         SUB DLYCNT,B
2073  46134  24  7017         MPL DEC060
2074  46135  44  7464         STL DWNTIM    CALCULATED TIME TILL RISE BEGINS
2075  46136  72  0010         ESR 8              (SECS)
2076  46137  12  1223         ENL CLOCK
2077  46140  72  0000         ESR 0
2100  46141  44  7461         STL CLCK
2101  46142  12  7044         ENL MAXTIM
2102  46143  16  7461         SUB CLCK
2103  46144  02  7464         CPL DWNTIM
2104  46145  67  6152         JOL L+5
2105  46146  12  7461         ENL CLCK
2106  46147  14  7464         ADD DWNTIM
2107  46150  45  7323         STL HLDTIM,B CLOCK IMAGE AT END OF HOLD FOR FCE X
2110  46151  34  6205         DJP SETNEG
2111  46152  44  7461         STL CLCK
2112  46153  12  7464         ENL DWNTIM
2113  46154  16  7461         SUB CLCK
2114  46155  45  7323         STL HLDTIM,B CLOCK IMAGE AT END OF HOLD FOR FCE X
2115  46156  34  6205         DJP SETNEG
2116
2117  46157  72  0010  CNTZER ESR 8          IS CLOCK-HLDTIM = +/- 100
```

```
2120    46160   12    1223            ENL  CLOCK
2121    46161   72    0000            ESR  0
2122    46162   44    7461            STL  CLCK
2123    46163   17    7323            SUB  HLDTIM,B
2124    46164   65    6166            JLP  L+2
2125    46165   5061  00              CML
 126    46166   02    7021            CPL  DEC100
 127    46167   67    6173            JOL  TEMPUP    NOW IS TIME TO START RAISING FCE X
 130    46170   13    7323            ENL  HLDTIM,B  TEMP
 131    46171   61    6173            JLZ  TEMPUP    FCE X TEMP RISE HAS BEGUN
 132    46172   34    6303            DJP  FBKCHK
2133    46173   13    7334    TEMPUP  ENL  SETPNT,B  HAS FCE X REACHED TEMP
2134    46174   02    7033            CPL  24HNRD
2135    46175   67    6201            JOL  L+4
2136    46176   41    7326            STZ  DLYIND,B  YES - DELAY IS NOW COMPLETED
2137    46177   41    7320            STZ  HLDLOC,B
2140    46200   34    6303            DJP  FBKCHK
2141    46201   71    0012            ALC  10        INCREASE FCE X SET-POIN 10 DEGREES
2142    46202   45    7334            STL  SETPNT,B
2143    46203   41    7323            STZ  HLDTIM,B  TEMP RISE HAS BEGUN - CLEAR CLOCK
2144    46204   34    6267            DJP  SPTSET    IMAGE
2145
2146
2147
2150
2151    46205   13    7243    SETNEG  ENL  CTLMPO,B  PICK-UP INDEX FOR NEXT SLAB OUT
2152    46206   11    7240            ENU  CTLMPI,B  AS START POINT AND NEXT SLAB CHARGED
2153    46207   44    7450            STL  INDICE    AS END POINT   (START POINT)
2154    46210   46    7451            STU  OVERXX                  (END POINT)
2155    46211   42    7466            STB  BSVIND
2156    46212   02    7451            CPL  OVERXX    DETERMINE IF WE HAVE A MAP GENERATED
2157    46213   61    6303            JEQ  FBKCHK    NO -- NOTHING TO BE DONE AT THIS TIME
2160
2161    46214   76    7340    NOWGO1  DRJ  DECODE    DECODE THE STARTING POINT
2162    46215   46    7406            STU  BCTLDM
2163    46216   44    7405            STL  BCTLRL
2164
2165    46217   12    7406            ENL  BCTLDM
2166    46220   74    6221            STA  L+1
2167            046221                 RFD  CORLOC,XX,1
        46221   770000                 DM1  63,0,XX
        46222   045600                 DM2  0,1-1,CORLOC
2170
2171    46223   32    7405    NOWGO2  ENB  BCTLRL
2172    46224   70    7776            ELC  -1        SET ENTRY TIME LOCATION NEGATIVE
2173    46225   45    6605            STL  DENTER,B
2174    46226   13    6601            ENL  DGRADE,B  SET BIT 9 OF GRADE
2175    46227   51    7166            IOR  C01000
2176    46230   45    6601            STL  DGRADE,B
2177
2200    46231   32    7466            ENB  BSVIND    SET-UP THE NEW FORM SUBR TO GENERATE
2201    46232   13    7260            ENL  BLODRM,B  A NEW WORKING INDEX
2202    46233   11    7263            ENU  BHIDRM,B
2203    46234   44    7453            STL  LOTRAK
2204    46235   46    7454            STU  HITRAK
2205    46236   70    0020            ELC  16
2206    46237   44    7455            STL  INCMNT
2207    46240   12    7405            ENL  BCTLRL
2210    46241   10    7406            ENU  BCTLDM
2211    46242   76    7350            DRJ  NEWFRM
2212
2213    46243   02    7451            CPL  OVERXX    HAVE WE UPDATED THE WHOLE MAP
2214    46244   61    6261            JEQ  XXOVER    YES - PUT THIS LAST TRACK BACK ON DRUM
2215    46245   44    7450            STL  INDICE    NO -- SAVE THE NEW WORKING INDEX
2216    46246   76    7340            DRJ  DECODE    DECODE THE NEW WORKING INDEX
2217    46247   61    6252            JLZ  L+3       MUST WE CHANGE TRACKS
2220    46250   44    7405            STL  BCTLRL        NO -- SAVE THE REL LOC AND GO ON
2221    46251   34    6223            DJP  NOWGO2
2222
2223    46252   12    7406            ENL  BCTLDM    YES - TRACKS MUST CHANGE, WRITE MAP
2224    46253   14    7167            ADD  C04000        DATA BACK ON DRUM
```

```
2225    46254   74  6255            STA  L+1
2226            046255               WOD  CORLOC,XX,1
        46255       774000           DM1  63,1,XX
        46256       046600           DM2  0,1-1,CORLOC
2227    46257   12  7450             ENL  INDICE        PICK UP NEW INDEX AND GO TO
2230    46260   34  6214             DJP  NOWGO1          BRING IN DATA
2231
2232
2233    46261   12  7406    XXOVER   ENL  BCTLDM        MAP IS ALL UPDATED, PUT LAST
2234    46262   14  7167             ADD  C04000          TRACK BACK ON DRUM
2235    46263   74  6264             STA  L+1
2236            046264               WOD  CORLOC,XX,1
        46264       774000           DM1  63,1,XX
        46265       046600           DM2  0,1-1,CORLOC
2237    46266   34  6303             DJP  FBKCHK
2240                                 EJE
2241
2242
2243    46267   44  7465    SPTSET   STL  SETVAL        SAVE NEW SET-POINT VALUE
2244    46270   45  7130             STL  TCGST1,B      FCE X TOP CHARGE
2245    46271   45  7142             STL  TMTST1,B      FCE X TOP HEAT
2246    46272   45  7154             STL  NSKST1,B      FCE X NORTH SOAK
2247    46273   24  7214             MPL  CGMOD
2250    46274   45  7135             STL  BCGST1,B      FCE X BOTTOM CHARGE
2251    46275   12  7465             ENL  SETVAL
2252    46276   24  7215             MPL  HTMOD
2253    46277   45  7147             STL  BHTST1,B      FCE X BOTTOM HEAT
2254    46300   12  7465             ENL  SETVAL
2255    46301   24  7216             MPL  SKMOD
2256    46302   45  7161             STL  SSKST1,B      FCE X SOUTH SOAK
2257
2260            046303      FBKCHK   RDT  FCECK1,CTLDRM+15,3
        46303       770440           DM1  63,0,CTLDRM+15
        46304       645601           DM2  1,3-1,FCECK1
2261
2262    46305       000000  BDATIN   OCT  0,0,0,0,0,0,0,0
        46306       000000
        46307       000000
        46310       000000
        46311       000000
        46312       000000
        46313       000000
        46314       000000
2263
2264    46315       000000  BSVDAT   OCT  0,0,0,0,0,0,0,0
        46316       000000
        46317       000000
        46320       000000
        46321       000000
        46322       000000
        46323       000000
        46324       000000
2265
2266            046325               RPZ
                000053               RPT  19712-L
        46325       000000           DEC  0
        46326       000000
        46327       000000
        46330       000000
        46331       000000
        46332       000000
        46333       000000
        46334       000000
        46335       000000
        46336       000000
        46337       000000
        46340       000000
        46341       000000
        46342       000000
        46343       000000
        46344       000000
        46345       000000
```

```
          46346    000000
          46347    000000
          46350    000000
          46351    000000
          46352    000000
          46353    000000
          46354    000000
          46355    000000
          46356    000000
          46357    000000
          46360    000000
          46361    000000
          46362    000000
          46363    000000
          46364    000000
          46365    000000
          46366    000000
          46367    000000
          46370    000000
          46371    000000
          46372    000000
          46373    000000
          46374    000000
          46375    000000
          46376    000000
          46377    000000
2267                                EJE
2270               000424           DRM  CTLDRM+3
2271               045600           LOC  WRKARA
2272      45600    000424           DEC  CTLDRM+3
2273                                       THIS PORTION TAKES THE CURRENT INPUT INDEX
2274                                AND FROM IT LOCATES THE TRACK NO, AND RELATIVE
2275                                LOCATION OF THE SLAB DATA ON WHICH TO BEGIN THE
2276                                HEAT FLOW CALCULATIONS
2277
2300                                                         INITIALIZE
2301
2302      45601  40  7407    DTINDX STZ  SHTSLB
2303      45602  40  7413           STZ  TPHTIM
2304      45603  40  7414           STZ  TMLTIM
2305      45604  40  7415           STZ  TOTWID
2306      45605  40  7430           STZ  HTREQC
2307      45606  40  7431           STZ  HTREQH
2310      45607  40  7554           STZ  SAVTK1
2311      45610  40  7555           STZ  SAVTK2
2312      45611  40  7556           STZ  SAVTQC
2313      45612  40  7557           STZ  SAVTQH
2314      45613  40  7567           STZ  LSTHRQ
2315
2316                                EJE
2317      45614  32  7400           ENB  FRNNO
2320      45615  13  7243           ENL  CTLMPO,B   PICK-UP NEXT SLAB OUT INDEX FCE X
2321      45616  11  7240           ENU  CTLMPI,B   PICK-UP NEXT SLAB IN INDEX FCE X
2322      45617  44  7450           STL  INDICE     (START POINT)
2323      45620  46  7451           STU  OVERXX     (STOP POINT)
2324
2325      45621  12  7450    PASSCK ENL  INDICE  DETERMINE IF WE ARE DONE WITH THIS FCE
2326      45622  02  7451           CPL  OVERXX
2327      45623  61  6054           JEQ  FEEDBK     YES - GO TO SET-POINT CONTROL
2330
2331               045624           RFD  TABLOC,GTRK,1  PICK UP MODIFIERS (CREEPING)
          45624    770446           DM1  63,0,GTRK             FOR MILLTM
          45625    046400           DM2  0,1-1,TABLCC
2332      45626  32  7400           ENB  FRNNO
2333      45627  13  6436           ENL  TABLOC+30,E
2334      45630  11  6441           ENU  TABLOC+33,E
2335      45631  44  7434           STL  KMOD0
2336      45632  46  7435           STU  KMOD1
2337
2340      45633  12  7450    DATIN  ENL  INDICE
2341      45634  76  7340           DRJ  DECODE
2342      45635  46  7402           STU  DRMTRK
2343      45636  44  7401           STL  INDCTR
```

```
2344
2345   45637   12   7402           ENL DRMTRK       READ IN THE DATA TRACK FROM THE
2346   45640   74   5641           STA L+1              CTL MAP
2347           045641              RFD CORLOC,XX,1
       45641        770000         DM1 63,0,XX
       45642        046600         DM2 0,1-1,CORLOC
2350
2351   45643   12   7407 HAVDAT    ENL SHTSLB       IS THIS A SECOND SHORT
2352   45644   65   5647           JLP L+3
2353   45645   40   7407           STZ SHTSLB       YES - CLEAR 1ST SHORT INDICATOR
2354   45646   34   5730           DJP STTMP            AND GO TO STORE 1ST SHORT
2355                                                    RESULTS FOR 2ND
2356   45647   32   7401           ENB INDCTR
2357   45650   13   6600           ENL DSLBID,B
2360   45651   11   6601           ENU DGRADE,B
2361   45652   44   7272           STL CURIDN       SLAB ID NO
2362   45653   46   7273           STU CURGRD       SLAB GRADE
2363
2364   45654   10   7273           ENU CURGRD       ADJUST STORED GRADE TO GET FIVE GRADE
2365   45655   70   0000           ELC 0               CODES FOR TABLE LOOK-UP
2366   45656   5047 06             LSA 6
2367   45657   44   7273           STL CURGRD
2370
2371   45660   13   6602           ENL DWIDTH,B
2372   45661   61   5667           JLZ L+6          NO DATA - SKIP PICK-UP OF SLAB
2373   45662   44   7274           STL CURWID          DIMENSIONS SLAB WIDTH
2374   45663   13   6603           ENL DLEGTH,B
2375   45664   11   6604           ENU DTHICK,B
2376   45665   44   7275           STL CURLNG       SLAB LENGTH
2377   45666   46   7276           STU CURTHK       SLAB THICKNESS
2400
2401   45667   12   7415           ENL TOTWID       INCREMENT TOTAL WIDTH ACCUMULATOR
2402   45670   14   7274           ADD CURWID
2403   45671   44   7415           STL TOTWID
2404
2405   45672   16   7077           SUB FRNLNG       HAVE WE REACHED CHARGE DOORS
2406   45673   65   6056           JLP GOAHED       YES - GO AHEAD TO CALC THE SET-POINTS
2407
2410   45674   12   7272           ENL CURIDN       IS THIS A 1ST SHORT SLAB
2411   45675   65   5700           JLP L+3
2412   45676   70   7776           ELC -1           SET THE 1ST SHORT INDICATOR
2413   45677   44   7407           STL SHTSLB
2414
2415   45700   76   6122 PMLTIM    DRJ MILLTM       DO MILLING TIME CALC
2416
2417   45701   12   7276           ENL CURTHK       IF THICKNESS IS LESS THAN 6 INCHES, USE
2420   45702   02   7055           CPL BASTHK        6 INCHES FOR ALL CALCULATIONS
2421   45703   65   5706           JGE L+3
2422   45704   12   7055           ENL BASTHK
2423   45705   44   7276           STL CURTHK
2424
2425   45706   13   6605           ENL DENTER,B
2426   45707   67   5767           JLN PSTNCK       ENTRY TIME LOC NEG (SLAB WAS IN DELAY)
2427   45710   44   7277           STL CURETM       SLAB CHARGE TIME
2430
2431   45711   12   7415           ENL TOTWID       HAVE WE REACHED THE HEAT ZONE
2432   45712   16   7066           SUB HTZEND
2433   45713   67   5767           JLN PSTNCK                NO -- SKIP ALL OTHER CALCS
2434           045714              RDT DTMNPS,CTLDRM+6,3     YES - CALL HEAT FLOW AND
       45714        770427         DM1 63,0,CTLDRM+6                 IDEAL SUBR
       45715        645601         DM2 1,3-1,DTMNPS
2435   45716   76   6175           DRJ IDEAL
2436
2437   45717   12   7527 FLOVER    ENL 1STONE       IS THIS 1ST SLAB IN HEAT ZONE TO BE
2440   45720   67   5730           JLN STTMP          FOUND
2441   45721   12   7441           ENL TO           YES - STORE TO FOR BAY 3 PGMS
2442   45722   32   7400           ENB FRNNO
2443   45723   45   7312           STL HEATCK,B
2444   45724   70   7776           ELC -1
2445   45725   44   7527           STL 1STONE
2446   45726   12   7276           ENL CURTHK       SAVE CURTHK FOR LAST PIECE IN HEAT
2447   45727   44   7567           STL LSTHRQ          ZONE FOR CALC OF LAST HEAT REQUIRED
```

```
2450
2451   45730  12  7177 STTMP  ENL DATXFR   SET-UP THE INSTRUCTION TO STORE THE
2452   45731  51  7401        IOR INDCTR    CALCULATED TEMPERATURES ON THE MAP
2453   45732  71  0006        ALC 6
2454   45733  44  5736        STL L+3
2455   45734  36  0005        EBC 5
2456   45735  13  7232        ENL PREVT0,B  STORE THE LAST VALID TEMPERATURE
2457   45736  45  0000        STL XX,B
2460   45737  73  5735        BJP L-2
2461
2462   45740  32  7401        ENB INDCTR
2463   45741  12  7440        ENL TS0      STORE THE LAST VALID TEMP AT SURFACE
2464   45742  10  7441        ENU T0       STORE THE LAST VALID HEAT CONTENT
2465   45743  45  6614        STL DTSOLC,B
2466   45744  47  6615        STU DTOLC,B
2467   45745  72  0010        ESR 8
2470   45746  12  1223        ENL CLOCK    PICK UP PRESENT TIME
2471   45747  72  0000        ESR 0
2472   45750  10  7442        ENU TIMEC
2473   45751  45  6617        STL DSKETM,B STORE CLOCK IN SOAK ZONE ENTRY TIME LO
2474   45752  47  6616        STU DTIMLC,B STORE LAST VALID TIME INCREMENT CALCD
2475
2476   45753  12  7233        ENL PREVT1
2477   45754  16  7032        SUB 2THOUS
2500   45755  65  5757        JLP L+2
2501   45756  70  0000        ELC 0
2502   45757  44  7452        STL SCNTEM
2503   45760  13  6601        ENL DGRADE,B
2504   45761  10  7000        ENU ZEROB
2505   45762  5047 11         LSA 9
2506   45763  70  0000        ELC 0
2507   45764  5043 11         RSA 9
2510   45765  14  7452        ADD SCNTEM
2511   45766  45  6601        STL DGRADE,B
2512
2513   45767  12  7415 PSTNCK ENL TOTWID   DO WE HAVE ENOUGH MILLING TIME FOR THE
2514   45770  16  7064        SUB CGTOHT    IDEAL CHARGE TO HEAT ZONE
2515   45771  65  5774        JLP L+3
2516   45772  12  7414        ENL TMLTIM   YES - STORE PHTIME
2517   45773  44  7411        STL PHTIME
2520
2521   45774  12  7415        ENL TOTWID   DO WE HAVE ENOUGH MILLING TIME FOR THE
2522   45775  16  7063        SUB HTTOSK    IDEAL HEAT TO SOAK ZONE
2523   45776  65  6001        JLP L+3
2524   45777  12  7414        ENL TMLTIM   YES - STORE HTTIME
2525   46000  44  7410        STL HTTIME
2526
2527   46001  12  7415        ENL TOTWID   DO WE HAVE ENOUGH MILLING TIME FOR THE
2530   46002  16  7067        SUB L-OSK     END OF CHARGE TO SOAK ZONE
2531   46003  65  6007        JLP L+4
2532   46004  12  7414        ENL TMLTIM   YES - STORE CHTIME
2533   46005  16  7411        SUB PHTIME
2534   46006  44  7412        STL CHTIME
2535
2536   46007  32  7400 MORDAT ENB FRNAO    SET-UP THE NEW FORM SUBR TO GENERATE
2537   46010  13  7260        ENL BLODRM,B  A NEW WORKING INDEX
2540   46011  11  7263        ENU BHIDRM,B
2541   46012  44  7453        STL LOTRAK
2542   46013  46  7454        STU HITRAK
2543   46014  70  0020        ELC 16
2544   46015  44  7455        STL INCMNT
2545   46016  12  7401        ENL INDCTR
2546   46017  10  7402        ENU DRMTRK
2547   46020  76  7350        DRJ NEWFRM
2550
2551   46021  44  7450        STL INDICE
2552   46022  02  7451        CPL OVERXX   HAVE WE REACHED MAP END BEFORE FCE END
2553   46023  61  6037        JEQ XOVERX   YES - STOP CALCS - CLEAN UP
2554
2555   46024  76  7340        DRJ DECODE   DECODE THE NEW WORKING INDEX
2556   46025  61  6030        JLZ L+3
```

```
2557  46026  44  7401         STL INDCTR      SAME TRACK - GO ON TO NEXT SLAB
2560  46027  34  5643         DJP HAVDAT
2561
2562  46030  12  7402         ENL DRMTRK      CHANGE TRACKS - WRITE THIS DATA
2563  46031  14  7167         ADD C04000       BACK ON THE CONTROL MAP
2564  46032  74  6033         STA L+1
2565         046033           WOD CORLOC,XX,1
      46033  774000           DM1 63,1,XX
      46034  046600           DM2 0,1-1,CORLOC
2566  46035  12  7450         ENL INDICE      GO BACK TO BRING IN NEXT TRACK OF
2567  46036  34  5633         DJP DATIN        DATA
2570
2571                          EJE
2572  46037  12  7402  XOVERX ENL DRMTRK      WRITE THIS LAST DATA ON DRUM
2573  46040  14  7167         ADD C04000
2574  46041  74  6042         STA L+1
2575         046042           WOD CORLOC,XX,1
      46042  774000           DM1 63,1,XX
      46043  046600           DM2 0,1-1,CORLOC
2576  46044  40  7527         STZ 1STONE
2577  46045  40  7407         STZ SHTSLB
2600  46046  40  7415         STZ TOTWID
2601  46047  40  7414         STZ TMLTIM
2602  46050  40  7424         STZ AVTHK1
2603  46051  40  7425         STZ AVTHK2
2604  46052  40  7426         STZ PHTOT
2605  46053  40  7427         STZ HTOT
2606         046054  FEEDBK   RDT FCECK1,CTLDRM+15,3
      46054  770440           DM1 63,0,CTLDRM-15
      46055  645601           DM2 1,3-1,FCECK1
2607
2610                                          HEAT FLOW CALCS ARE NOW COMPLETED
2611
2612  46056  12  7402  GOAHED ENL DRMTRK      WRITE THIS LAST DATA ON DRUM
2613  46057  14  7167         ADD C04000
2614  46060  74  6061         STA L+1
2615         046061           WOD CORLOC,XX,1
      46061  774000           DM1 63,1,XX
      46062  046600           DM2 0,1-1,CORLOC
2616  46063  40  7527         STZ 1STONE
2617  46064  40  7407         STZ SHTSLB
2620  46065  40  7415         STZ TOTWID
2621  46066  40  7414         STZ TMLTIM
2622  46067  40  7560         STZ CNT
2623
2624
2625  46070  36  0002         EBC 2           DECIDE NO OF FCES IN SERVICE AND
2626  46071  13  7315         ENL FINSVC,B    INCREMENT COUNT FOR EACH ONE
2627  46072  44  6074         STL L+2
2630  46073  30  7171         IRJ CHKBIT
2631  46074  000000           DEC 0
2632  46075  34  6101         DJP L+4
2633  46076  12  7560         ENL CNT
2634  46077  71  0001         ALC 1
2635  46100  44  7560         STL CNT
2636  46101  73  6071         BJP L-8
2637
2640
2641  46102  12  7411         ENL PHTIME
2642  46103  24  7560         MPL CNT
2643  46104  26  7003         DIV KDEC03
2644  46105  44  7411         STL PHTIME
2645
2646  46106  12  7412         ENL CHTIME
2647  46107  24  7560         MPL CNT
2650  46110  26  7003         DIV KDEC03
2651  46111  44  7412         STL CHTIME
2652
2653  46112  12  7410         ENL HTTIME
2654  46113  24  7560         MPL CNT
2655  46114  26  7003         DIV KDEC03
```

```
2656   46115  44  7410           STL HTTIME
2657
2660          045116             RFD TABLOC,GTRK,1
       46116  770446             DM1 63,0,GTRK
       46117  046400             DM2 0,1-1,TABLOC
2661          046120             RDT RTHTM,CTLDRM+9,3
       46120  770432             DM1 63,0,CTLDRM+9
       46121  645601             DM2 1,3-1,RTHTM
2662                             EJE
2663
2664   46122  000000      MILLTM ...
2665   46123  34  6161           DJP L+30       /// WILL LATER BE CHANGED TO   ENL
2666   46124  16  7057           SUB BASWID          CURWID ///        (30.0B5)
2667   46125  24  7004           MPL KDEC04
2670   46126  26  7012           DIV KDEC10
2671   46127  14  7056           ADD TWTYB5         (20.0B5)
2672   46130  44  7561           STL YTEM  B5 * YTEM = 20.0B5+ (4(WIDTH-30.0B5))/10
2673
2674   46131  12  7276           ENL CURTHK
2675   46132  16  7054           SUB FOURB5         (4.0B5)
2676   46133  24  7561           MPL YTEM
2677   46134  5043 05            RSA 5
2700   46135  14  7274           ADD CURWID
2701   46136  14  7050           ADD MILCON
2702   46137  44  7562           STL Y11    B5 * Y11 = MILCON + WIDTH
2703                                            + YTEM(THICK-YTEM)
2704   46140  12  7276           ENL CURTHK
2705   46141  16  7053           SUB THREB5         (3.0B5)
2706   46142  24  7120           MPL PT003          (0.003B12)
2707   46143  5043 05            RSA 5
2710   46144  14  7121           ADD PT012          (0.012B12)
2711   46145  44  7563           STL CFTEM  B12 * CFTEM = .012B12
2712                                            + .003B12(THICK-3.0B5)
2713   46146  12  7065           ENL FRNWID         (336.0B5)
2714   46147  16  7275           SUB CURLNG
2715   46150  26  7014           DIV FOOT
2716   46151  24  7563           MPL CFTEM
2717   46152  5043 05            RSA 5
2720   46153  44  7564           STL CFPRIM B12*CFPRIM = CFTEM((336.0B5-LENGTH)/12)
2721
2722   46154  70  0001           ELC 1
2723   46155  5046 14            LSL 12
2724   46156  16  7564           SUB CFPRIM
2725   46157  44  7565           STL CFCT         B12 * CFCT = 1.0B12-CFPRIM
2726
2727   46160  24  7562           MPL Y11
2730   46161  70  0000           ELC 0      /// WILL LATER BE CHANGED TO RSA 17 ///
2731   46162  14  7416           ADD GAPTIM
2732   46163  44  7566           STL TEMPTM  B0 * TEMPTM = GAPTIM + (Y11 * CFCT)
2733
2734   46164  12  7407           ENL SHTSLB         IS THIS A SHORT SLAB
2735   46165  65  6171           JLP L+4
2736   46166  12  7566           ENL TEMPTM  YES - DOUBLE CALCULATED TIME TO
2737   46167  5046 01            LSL 1              CONSIDER  SECOND SHORT
2740   46170  44  7566           STL TEMPTM
2741
2742   46171  12  7566           ENL TEMPTM   ADD CALCULATED TIME TO TOTAL TIME
2743   46172  14  7414           ADD TMLTIM
2744   46173  44  7414           STL TMLTIM
2745   46174  55  6122           RTN
2746                             EJE
2747
2750   46175  000000      IDEAL  ...
2751   46176  12  7070           ENL X2          IS SLAB BEYOND IDEAL HEAT ZONE
2752   46177  14  7062           ADD D2
2753   46200  14  7274           ADD CURWID
2754   46201  16  7415           SUB TOTWID
2755   46202  67  6252           JLN CHGCHK      YES - GO TO CHARGE ZONE CHECK
2756
2757   46203  12  7070           ENL X2          IS SLAB IN IDEAL HEAT ZONE
2760   46204  16  7415           SUB TOTWID
2761   46205  65  6325           JLP NEXT        NO -- RETURN TO MAIN PORGRAM
```

```
2762
2763  46206  12  7420           ENL HTSLBF  HAS FLAG BEEN SET BY PREVIOUS SLAB IN ZONE
2764  46207  67  6220           JLN CHKMOR     YES - WE ARE IN IDEAL HEAT ZONE
2765
2766  46210  12  7415           ENL TOTWID   NO -- FIRST SLAB IN ZONE
2767  46211  16  7070           SUB X2
2770  46212  44  7477           STL A2
2771  46213  12  7273           ENL CURGRD
2772  46214  44  7423           STL GRDSV2
2773  46215  70  7776           ELC -1
2774  46216  44  7420           STL HTSLBF
2775  46217  34  6237           DJP HIDEAL
2776
2777  46220  12  7070  CHKMOR   ENL X2      IS THIS LAST SLAB IN IDEAL HEAT ZONE
3000  46221  14  7062           ADD D2
3001  46222  16  7415           SUB TOTWID
3002  46223  67  6227           JLN L+4     YES - TAKE ACTION
3003
3004  46224  12  7274           ENL CURWID  NO -- ENTIRE SLAB IS IN IDEAL HEAT ZONE
3005  46225  44  7477           STL A2
3006  46226  34  6237           DJP HIDEAL
3007
3010  46227  12  7415           ENL TOTWID
3011  46230  16  7070           SUB X2
3012  46231  16  7062           SUB D2
3013  46232  44  7477           STL A2
3014  46233  12  7274           ENL CURWID
3015  46234  16  7477           SUB A2
3016  46235  44  7477           STL A2
3017  46236  40  7420           STZ HTSLBF
3020  46237  12  7441  HIDEAL   ENL T0
3021  46240  24  7477           MPL A2
3022  46241  26  7062           DIV D2
3023  46242  14  7427           ADD HTOT     ACCUMULATE TOTAL HEAT OF IDEAL HEAT
3024  46243  44  7427           STL HTOT      ZONE AND SAVE FOR SET-POINT CALC
3025  46244  12  7276           ENL CURTHK
3026  46245  24  7477           MPL A2
3027  46246  26  7062           DIV D2
3030  46247  14  7425           ADD AVTHK2   ACCUMULATE AVERAGE THICKNESS IN IDEAL
3031  46250  44  7425           STL AVTHK2    HEAT ZONE AND SAVE FOR SET-POINT CALC
3032  46251  34  6325           DJP NEXT
3033
3034
3035  46252  12  7074  CHGCHK   ENL X1      IS SLAB BEYOND IDEAL CHARGE ZONE
3036  46253  14  7061           ADD D1
3037  46254  14  7274           ADD CURWID
3040  46255  16  7415           SUB TOTWID
3041  46256  67  6325           JLN NEXT    YES - RETURN TO MAIN PROGRAM
3042
3043  46257  12  7074           ENL X1      IS SLAB IN IDEAL CHARGE ZONE
3044  46260  16  7415           SUB TOTWID
3045  46261  65  6325           JLP NEXT    NO -- RETURN TO MAIN PROGRAM
3046
3047  46262  12  7421           ENL PHTSBF  HAS FLAG BEEN SET BY PREVIOUS SLAB IN ZONE
3050  46263  67  6274           JLN MORCHK  YES - WE ARE IN IDEAL CHARGE ZONE
3051
3052  46264  12  7415           ENL TOTWID  NO -- FIRST SLAB IN ZONE
3053  46265  16  7074           SUB X1
3054  46266  44  7476           STL A1
3055  46267  12  7273           ENL CURGRD
3056  46270  44  7422           STL GRDSV1
3057  46271  70  7776           ELC -1
3060  46272  44  7421           STL PHTSBF
3061  46273  34  6313           DJP CIDEAL
3062                                         IS THIS LAST SLAB IN IDEAL CHARGE ZONE
3063  46274  12  7074  MORCHK   ENL X1
3064  46275  14  7061           ADD D1
3065  46276  16  7415           SUB TOTWID
3066  46277  67  6303           JLN L+4          YES - TAKE ACTION
3067
3070  46300  12  7274           ENL CURWID       NO -- ENTIRE SLAB IS IN IDEAL
                                                      CHARGE ZONE
```

```
3071   46301   44   7476              STL A1
3072   46302   34   6313              DJP CIDEAL
3073
3074   46303   12   7415              ENL TOTWID
3075   46304   16   7074              SUB X1
3076   46305   16   7061              SUB D1
3077   46306   44   7476              STL A1
3100   46307   12   7274              ENL CURWID
3101   46310   16   7476              SUB A1
3102   46311   44   7476              STL A1
3103   46312   40   7421              STZ PHTSBF
3104   46313   12   7441   CIDEAL     ENL TQ
3105   46314   24   7476              MPL A1
3106   46315   26   7061              DIV D1
3107   46316   14   7426              ADD PHTOT     ACCUMULATE TOTAL HEAT OF IDEAL CHARGE
3110   46317   44   7426              STL PHTOT     ZONE AND  SAVE FOR SET-POINT CALC.
3111   46320   12   7276              ENL CURTHK
3112   46321   24   7476              MPL A1
3113   46322   26   7061              DIV D1
3114   46323   14   7424              ADD AVTHK1    ACCUMULATE AVERAGE THICKNESS IN IDEAL
3115   46324   44   7424              STL AVTHK1    CHARGE  ZONE AND SAVE FOR SET-POINT
3116                                                CALC
3117   46325   10   7000   NEXT       ENU ZEROB
3120   46326   55   6175              IJP IDEAL
3121           046327                  RPZ
               000051                  RPT 19712-L
        46327  000000                  DEC 0
        46330  000000
        46331  000000
        46332  000000
        46333  000000
        46334  000000
        46335  000000
        46336  000000
        46337  000000
        46340  000000
        46341  000000
        46342  000000
        46343  000000
        46344  000000
        46345  000000
        46346  000000
        46347  000000
        46350  000000
        46351  000000
        46352  000000
        46353  000000
        46354  000000
        46355  000000
        46356  000000
        46357  000000
        46360  000000
        46361  000000
        46362  000000
        46363  000000
        46364  000000
        46365  000000
        46366  000000
        46367  000000
        46370  000000
        46371  000000
        46372  000000
        46373  000000
        46374  000000
        46375  000000
        46376  000000
        46377  000000
 122                                   EJE
 123           000427                  DRM CTLDRM+6
 124           045600                  LOC WRKARA
 125    45600  000427                  DEC CTLDRM+6
```

```
3126
3127
3130                                   AT THIS POINT THE POSITION IN THE FCE IS
3131                            DETERMINED TO SELECT THE PROPER FCE TEMPS FOR
3132                            USE IN THE CALCS
3133
3134   45601  40  7442   DTMNPS STZ TIMEC
3135   45602  40  7441          STZ TO
3136   45603  12  7400          ENL FRNNO
3137   45604  24  7010          MPL KDEC08
3140   45605  44  7534          STL PRIB
3141   45606  32  7534          ENB PRIB      B-BOX IS NOW SET TO DETERMINE TEMPS
3142
3143   45607  13  5456          ENL F1TCT1,B
3144   45610  11  5456          ENU F1TCT1,B  /// WILL LATER BE CHANGED TO
3145   45611  44  7472          STL TEMP1          ENU F1TCT2,B ///
3146   45612  46  7473          STU TEMP2
3147   45613  13  5456          ENL F1TCT1,B  /// WILL LATER BE CHANGED TO
3150   45614  11  5462          ENU F1TCTH,B       ENL F1TCT3,B ///
3151   45615  44  7474          STL TEMP3
3152   45616  46  7475          STU TEMP4
3153
3154   45617  12  7472          ENL TEMP1
3155   45620  71  7467          ALC -200
3156   45621  44  7471          STL TEMPO
3157
3160   45622  12  7071          ENL SECTN      IS SLAB IN CHARGE ZONE
3161   45623  16  7415          SUB TOTWID
3162   45624  65  5703          JLP HEAT       NO -- GO TO HEAT ZONE
3163
3164   45625  12  7076          ENL DSTC1      IS SLAB BETWEEN ENTRY AND TC-#1
3165   45626  16  7415          SUB TOTWID
3166   45627  65  5640          JLP CHKTC2     NO -- CHECK NEXT AREA
3167   45630  70  0310          ELC 200
3170   45631  44  7467          STL OPTEM
3171   45632  12  7415          ENL TOTWID  B5
3172   45633  24  7467          MPL OPTEM   B5
3173   45634  26  7076          DIV DSTC1   80
3174   45635  14  7471          ADD TEMPO   80
3175   45636  44  7432          STL TF
3176   45637  34  5705          DJP TMPBGN                TF IS AT 80
3177
3200   45640  12  7075   CHKTC2 ENL DSTC2     IS SLAB BETWEEN TC-#1 AND TC-#2
3201   45641  16  7415          SUB TOTWID
3202   45642  65  5660          JLP CHKTC3    NO -- CHECK NEXT AREA
3203   45643  12  7473          ENL TEMP2
3204   45644  16  7472          SUB TEMP1
3205   45645  44  7467          STL OPTEM   80
3206   45646  12  7075          ENL DSTC2
3207   45647  16  7076          SUB DSTC1
3210   45650  44  7470          STL DSTNCE  85
3211   45651  12  7415          ENL TOTWID  85
3212   45652  16  7076          SUB DSTC1   85
3213   45653  24  7467          MPL OPTEM   85
3214   45654  26  7470          DIV DSTNCE  80
3215   45655  14  7472          ADD TEMP1   80
3216   45656  44  7432          STL TF                   TF IS AT 80
3217   45657  34  5705          DJP TMPBGN
3220
3221   45660  12  7073   CHKTC3 ENL DSTC3     IS SLAB BETWEEN TC-#2 AND TC-#3
3222   45661  16  7415          SUB TOTWID
3223   45662  65  5700          JLP BEYOND    NO -- SLAB IS BEYOND TC-#3
3224   45663  12  7474          ENL TEMP3
3225   45664  16  7473          SUB TEMP2
3226   45665  44  7467          STL OPTEM   30
3227   45666  12  7073          ENL DSTC3
3230   45667  16  7075          SUB DSTC2
3231   45670  44  7470          STL DSTNCE  35
3232   45671  12  7415          ENL TOTWID  35
3233   45672  16  7075          SUB DSTC2   35
3234   45673  24  7467          MPL OPTEM   35
3235   45674  26  7470          DIV DSTNCE  30
```

```
3236   45675  14  7473         ADD  TEMP2      30
3237   45676  44  7432         STL  TF                  TF IS AT B0
3240   45677  34  5705         DJP  TMPBGN
3241
3242   45700  12  7474  BEYOND ENL  TEMP3               USE TEMP3 FOR THIS AREA
3243   45701  44  7432         STL  TF                  TF IS AT B0
3244   45702  34  5705         DJP  TMPBGN
3245
3246   45703  12  7475  HEAT   ENL  TEMP4               USE TEMP4 FOR THIS AREA
3247   45704  44  7432         STL  TF                  TF IS AT B0
3250                                                    PICK UP THE HEAT VALUES FOR THIS
3251                                                    SLAB FROM LAST CALC OR INITIALIZE
3252                                                    FOR FIRST RUN
3253   45705  32  7401  TMPBGN ENB  INDCTR
3254   45706  13  6615         ENL  DTOLC,B
3255   45707  61  5734         JLZ  FRSTRN
3256
3257   45710  13  6606         ENL  DLEXPT,B
3260   45711  11  6607         ENU  DCTRPT,B
3261   45712  44  7232         STL  PREVT0
3262   45713  46  7233         STU  PREVT1
3263   45714  13  6610         ENL  D1STPT,B
3264   45715  11  6611         ENU  D2NDPT,B
3265   45716  44  7234         STL  PREVT2
3266   45717  46  7235         STU  PREVT3
3267   45720  13  6612         ENL  D3RDPT,B
3270   45721  11  6613         ENU  DHEXPT,B
3271   45722  44  7236         STL  PREVT4
3272   45723  46  7237         STU  PREVT5
3273   45724  13  6614         ENL  DTSOLC,B
3274   45725  11  6615         ENU  DTOLC,B
3275   45726  44  7440         STL  TS0
3276   45727  46  7441         STU  T0
3277   45730  13  6616         ENL  DTIMLC,B
3300   45731  10  7000         ENU  ZEROB
3301   45732  44  7442         STL  TIMEC
3302   45733  34  5741         DJP  TMPRUN
3303
3304   45734  36  0005  FRSTRN EBC  5
3305   45735  70  0062         ELC  50
3306   45736  45  7232         STL  PREVT0,B
3307   45737  73  5736         BJP  L-1
3310   45740  44  7440         STL  TS0
3311
3312   45741  10  7000  TMPRUN ENU  ZEROB
3313   45742  12  7432         ENL  TF          B0
3314   45743  71  0714         ALC  460         B0
3315   45744  5047 10          LSA  8           B8
3316   45745  26  7023         DIV  DEC200      B8
3317   45746  44  7433         STL  TFRE        B8
3320   45747  24  7433         MPL  TFRE        B16
3321   45750  5043 11          RSA  9           B7   TFRE **2
3322   45751  24  7433         MPL  TFRE        B15
3323   45752  5043 14          RSA  12          B3   TFRE **3
3324   45753  24  7433         MPL  TFRE        B11
3325   45754  5043 13          RSA  11          B0   TFRE **4
3326   45755  44  7433         STL  TFRE             TFRE IS AT B0
3327
3330   45756  10  7000         ENU  ZEROB
3331   45757  12  7276         ENL  CURTHK      B5
3332   45760  5047 10          LSA  8           B13
3333   45761  26  7020         DIV  DEC096      B13
3334   45762  44  7443         STL  DS               DS IS AT B13
3335          045763           RFD  TABLOC,KTRK,1
       45763  770447           DM1  63,0,KTRK
       45764  046400           DM2  0,1,-1,TABLOC
3336                           EJE
3337
3340                                 THIS PORTION OF THE PROGRAM CALCULATES THE
3341                           RATE OF FLOW OF HEAT INTO THE SLAB AND THE CUR-
3342                           RENT TEMPERATURE AT DESIGNATED POINTS THROUGH
3343                           THE THICKNESS OF THE SLAB
```

```
3344   45765   10   7000    GOFLOW ENU ZEROB
3345   45756   12   7233           ENL PREVT1
3346   45757   44   7252           STL NEWTPO
3347   45770   36   0005           EBC 5
3350   45771   13   7232           ENL PREVT0,B
3351   45772   37   7776           ABC -1
3352   45773   73   5775           BJP L+2
3353   45774   34   6002           DJP HTFLOW
3354   45775   15   7232           ADD PREVT0,B
3355   45776   5043 01            RSA 1
3356   45777   45   7253           STL NEWTP1,B
3357   46000   37   0002           ABC 2
3360   46001   73   5771           BJP GOFLOW+4
3361
3362                               EJE
3363   46002   12   7432    HTFLOW ENL TF
3364   46003   16   7440           SUB TS0
3365   46004   44   7517           STL TSFN       80 * TSFN = TF - TS0
3366   46005   70   3472           ELC 1850
3367   46006   02   7517           CPL TSFN                IS TSFN GREATER THAN 1850
3370   46007   65   6011           JGE L+2
3371   46010   44   7517           STL TSFN       80 *  YES - TSFN = 1850
3372
3373   46011   10   7000           ENU ZEROB
3374   46012   12   7517           ENL TSFN
3375   46013   71   0144           ALC 100
3376   46014   26   7023           DIV DEC200
3377   46015   44   7523           STL BFINE      80 * BFINE = (TSFN*100) /200
3400                               EJE
3401
3402   46016   10   7000           ENU ZEROB
3403   46017   12   7432           ENL TF
3404   46020   26   7021           DIV DEC100
3405   46021   46   7520           STU RMNDR
3406   46022   44   7516           STL KPOS       80 * KPOS = TF/100
3407
3410   46023   70   0062           ELC 50
3411   46024   02   7520           CPL RMNDR              IS REMAINDER GREATER THAN 50
3412   46025   65   6031           JGE L+4
3413   46026   12   7516           ENL KPOS       YES- INCREMENT KPOS
3414   46027   71   0001           ALC 1
3415   46030   44   7516           STL KPOS       80 * KPOS = KPOS+1
3416
3417   46031   70   0031           ELC 25                  IS KPOS GREATER THAN 25
3420   46032   02   7516           CPL KPOS
3421   46033   65   6036           JGE L+3
3422   46034   44   7516           STL KPOS       80 * YES - KPOS = 25
3423   46035   34   6042           DJP L+5
3424
3425   46036   70   0022           ELC 18                  IS KPOS LESS THAN 18
3426   46037   02   7516           CPL KPOS
3427   46040   67   6042           JOL L+2
3430   46041   44   7516           STL KPOS       80 * YES - KPOS = 18
3431
3432   46042   12   7516           ENL KPOS
3433   46043   71   7755           ALC -18
3434   46044   24   7013           MPL ELEVEN
3435   46045   14   7523           ADD BFINE
3436   46046   44   7516           STL KPOS       80 * KPOS = BFINE + 11(KPOS-18)
3437                               EJE
3440
3441   46047   32   7516           ENB KPOS
3442   46050   13   6413           ENL TABLOC+11,B
3443   46051   11   6414           ENU TABLOC+12,B
3444   46052   44   7500           STL K1
3445   46053   46   7501           STU K2
3446
3447   46054   32   7523           ENB BFINE
3450   46055   12   7517           ENL TSFN
3451   46056   17   6400           SUB TABLOC,B
3452   46057   44   7515           STL KTEM       80 * KTEM = YSFN - (X)
```

```
3453
3454
3455   46060   12  7500        ENL K1
3456   46061   16  7501        SUB K2
3457   46062   24  7515        MPL KTEM
3460   46063   5047 11         LSA 9
3461   46064   26  7023        DIV DEC200
3462   46065   44  7515        STL KTEM          B9 • KTEM = (KTEM(K1-K2))/200
3463
3464   46066   12  7500        ENL K1
3465   46067   5047 11         LSA 9
3466   46070   16  7515        SUB KTEM
3467   46071   44  7505        STL KT            B9 • KT = K1 - KTEM
3470                           EJE
3471
3472   46072   12  7440        ENL TSO
3473   46073   24  7113        MPL PT010         (0.01B11)
3474   46074   44  7512        STL TMC
3475   46075   12  7117        ENL THTHR         (33.0B11)
3476   46076   16  7512        SUB TMC
3477   46077   44  7502        STL C
3500   46100   12  7116        ENL 15PT0         (15.0B11)
3501   46101   02  7502        CPL C
3502   46102   67  6104        JOL L+2
3503   46103   44  7502        STL C             B11 • C = 15.0B11 ( OR GREATER)
3504
3505
3506
3507   46104   12  7440        ENL TSO
3510   46105   16  7027        SUB TMP1          (1350)
3511   46106   65  6115        JLP L+7
3512   46107   12  7440        ENL TSO
3513   46110   24  7124        MPL PT16          (0.16B17)
3514   46111   26  7111        DIV 13HDB6        (1300.0B6)
3515   46112   14  7114        ADD PT12          (0.12B11)
3516   46113   44  7503        STL CM            B11 • CM = ((TSO ( 0.16B17)
3517   46114   34  6124        DJP L+8                       /1300.0B6) + 0.12B11
3520
3521   46115   12  7440        ENL TSO
3522   46116   24  7123        MPL PT10          (0.10B17)
3523   46117   26  7110        DIV 9HRDB6        (900.0B6)
3524   46120   44  7512        STL TMC
3525   46121   12  7115        ENL PT43          (0.43B11)
3526   46122   16  7512        SUB TMC
3527   46123   44  7503        STL CM            B11 • CM = 0.43B11 - ((TSO
3530                           EJE                          • 0.10B17)/900.0B6)
3531
3532   46124   10  7000        ENU ZEROB
3533   46125   12  7502        ENL C
3534   46126   5047 10         LSA 8
3535   46127   26  7505        DIV KT
3536   46130   44  7506        STL M             B10 • M = C/KT
3537
3540   46131   10  7000        ENU ZEROB
3541   46132   12  7443        ENL DS
3542   46133   26  7050        DIV TWOB3
3543   46134   44  7510        STL DS2           B10 • DS2 = DS/TWOB3
3544
3545   46135   14  7506        ADD M
3546   46136   44  7511        STL MDS           B10 • MDS = M+DS.
3547
3550   46137   10  7000        ENU ZEROB
3551   46140   12  7432        ENL TF
3552   46141   16  7256        SUB NEWTP4
3553   46142   5047 15         LSA 13
3554   46143   26  7511        DIV MDS
3555   46144   44  7507        STL G             B3 • G = (TF - NEWTP4)/MDS
3556
3557   46145   24  7506        MPL M
3560   46146   5043 15         RSA 13
3561   46147   44  7514        STL TMGM          B0 • TMGM = M•G
3562   46150   12  7432        ENL TF
```

```
3563   46151  16  7514        SUB  TMGM
3564   46152  44  7526        STL  TS1           B0 * TS1 = TF-TMGM
3565
3566   46153  12  7506        ENL  M
3567   46154  16  7510        SUB  DS2
3570   46155  24  7507        MPL  G
3571   46156  5043 15         RSA  13
3572   46157  44  7514        STL  TMGM          B0 * TMGM = G(M-DS2)
3573   46160  12  7432        ENL  TF
3574   46161  16  7514        SUB  TMGM
3575   46162  44  7257        STL  NEWTP5        B0 * NEWTP5 = TF-TMGM
3576                          EJE
3577
3600   46163  10  7000        ENU  ZEROB
3601   46164  70  0752        ELC  490
3602   46165  24  7503        MPL  CM
3603   46166  26  7050        DIV  TWOB3
3604   46167  5042 01         RSL  1
3605   46170  44  7504        STL  DT            B7 * DT = (CM * 490)/2.0B3
3606   46171  12  7443        ENL  DS
3607   46172  24  7504        MPL  DT
3610   46173  26  7502        DIV  C
3611   46174  5042 02         RSL  2
3612   46175  44  7504        STL  DT            B7 * DT = (DS * DT) /C
3613   46176  12  7443        ENL  DS
3614   46177  5042 03         RSL  3
3615   46200  24  7504        MPL  DT
3616   46201  5043 03         RSA  3
3617   46202  44  7504        STL  DT            B14 *DT = DS*DT
3620                          EJE
3621
3622   46203  10  7000        ENU  ZEROB
3623   46204  12  7526        ENL  TS1           B0
3624   46205  71  0714        ALC  460
3625   46206  5047 10         LSA  8             B3
3626   46207  26  7023        DIV  DEC200        B8
3627   46210  44  7513        STL  TSN           B8   TSN = (TS1 +460)/200
3630   46211  24  7513        MPL  TSN           B16
3631   46212  5043 11         RSA  9             T7   TSN **2
3632   46213  24  7513        MPL  TSN           B15
3633   46214  5043 14         RSA  12            B3   TSN **3
3634   46215  24  7513        MPL  TSN           B11
3635   46216  5043 13         RSA  11            B0   TSN **4
3636   46217  44  7513        STL  TSN           B0 * TSN = TSN **4
3637
3640
3641
3642   46220  12  7433        ENL  TFRE
3643   46221  16  7513        SUB  TSN
3644   46222  24  7122        MPL  KQ            (DEC 0.138B12)
3645   46223  5043 11         RSA  9
3646   46224  24  7504        MPL  DT
3647   46225  5043 21         RSA  17
3650   46226  24  7015        MPL  FORTEN
3651   46227  14  7441        ADD  TO
3652   46230  44  7524        STL  NEWTQ
3653                          EJE
3654
3655   46231  10  7000        ENU  ZEROB
3656   46232  12  7504        ENL  DT
3657   46233  24  7036        MPL  36HNRD
3660   46234  5043 16         RSA  14
3661   46235  44  7504        STL  DT            B0 * DT = DT*3600
3662   46236  14  7442        ADD  TIMEC
3663   46237  44  7525        STL  NEWTMC
3664                          EJE
3665
3666                          AT THIS POINT THE COMPUTED TIME IS
3667                          COMPARED TO THE ACTUAL ELAPSED TIME TO
3670                          DETERMINE IF THE CALCULATION IS UP TO DATE
3671                          FOR THIS SLAB
```

```
3672
3673    46240   72  0010        ESR 8
3674    46241   12  1223        ENL CLOCK
3675    46242   72  0000        ESR 0
3676    46243   44  7521        STL PRSNT
3677    46244   16  7277        SUB CURETM
3700    46245   65  6247        JLP L+2
3701    46246   14  7044        ADD MAXTIM
3702    46247   44  7522        STL FURTM           80 = LENGTH OF TIME IN FCE
3703
3704    46250   12  7525        ENL NEWTMC
3705    46251   16  7522        SUB FURTM
3706    46252   65  6272        JLP AL4NOW
3707    46253   12  7524        ENL NEWTQ
3710    46254   10  7525        ENU NEWTMC
3711    46255   32  7526        ENB TS1
3712    46256   44  7441        STL TQ
3713    46257   46  7442        STU TIMEC
3714    46260   42  7440        STB TS0
3715    46261   40  7524        STZ NEWTQ
3716    46262   40  7525        STZ NEWTMC
3717    46263   40  7526        STZ TS1
3720    46264   36  0005        EBC 5
3721    46265   13  7252        ENL NEWTP0,B
3722    46266   45  7232        STL PREVT0,B
3723    46267   41  7252        STZ NEWTP0,B
3724    46270   73  6265        BJP L-3
3725    46271   34  5765        DJP GOFLOW  GO THROUGH HEAT FLOW CALCULATION AGAIN
3726
3727            046272      AL4NOW  RDT FLOVER-1,CTLDRM+3,3
        46272   770424              DM1 63,0,CTLDRM+3
        46273   645716              DM2 1,3-1,FLOVER-1
3730            046274              RPZ
                000184              RPT 19712-L
        46274   000000              DEC 0
        46275   000000
        46276   000000
        46277   000000
        46300   000000
        46301   000000
        46302   000000
        46303   000000
        46304   000000
        46305   000000
        46306   000000
        46307   000000
        46310   000000
        46311   000000
        46312   000000
        46313   000000
        46314   000000
        46315   000000
        46316   000000
        46317   000000
        46320   000000
        46321   000000
        46322   000000
        46323   000000
        46324   000000
        46325   000000
        46326   000000
        46327   000000
        46330   000000
        46331   000000
        46332   000000
        46333   000000
        46334   000000
        46335   000000
        46336   000000
        46337   000000
        46340   000000
```

```
        46341   000000
        46342   000000
        46343   000000
        46344   000000
        46345   000000
        46346   000000
        46347   000000
        46350   000000
        46351   000000
        46352   000000
        46353   000000
        46354   000000
        46355   000000
        46356   000000
        46357   000000
        46360   000000
        46361   000000
        46362   000000
        46363   000000
        46364   000000
        46365   000000
        46366   000000
        46367   000000
        46370   000000
        46371   000000
        46372   000000
        46373   000000
        46374   000000
        46375   000000
        46376   000000
        46377   000000
3731                                  EJE
3732             000432               DRM  CTLDRM+9
3733             045600               LOC  WRKARA
3734    45600   000432                DEC  CTLDRM+9
3735
3736                                       ***** INTERFACE FUNCTIONS FOR DATA-LOGGING
3737
3740    45601   12  7424    RTMTM     ENL  AVTHK1    SAVE AVERAGE THICKNESS FOR CHARGE
3741    45602   10  7425              ENU  AVTHK2     AND HEAT ZONES FOR DATA LOGGING
3742    45603   44  7554              STL  SAVTK1
3743    45604   46  7555              STU  SAVTK2
3744
3745    45605   12  7426              ENL  PHTOT     SAVE AVERAGE TQ FOR CHARGE AND HEAT
3746    45606   10  7427              ENU  HTOT       ZONES FOR DATA LOGGING
3747    45607   44  7556              STL  SAVTQC
3750    45610   46  7557              STU  SAVTQH
3751
3752    45611   12  7567              ENL  LSTHRQ    SAVE THICKNESS OF LAST SLAB IN HEAT
3753    45612   44  7276              STL  CURTHK     ZONE FOR DATA LOGGING
3754
3755    45613   16  7055              SUB  BASTHK    CALCULATE THE HEAT REQUIRED FOR THE
3756    45614   10  7000              ENU  ZEROB      LAST SLAB IN THE HEAT ZONE
3757    45615   5047 15               LSA  13
3760    45616   5046 05               LSL  5
3761    45617   46  7543              STU  WHOLE
3762    45620   44  7544              STL  FRCTN
3763
3764    45621   32  7543              ENB  WHOLE
3765    45622   13  6401              ENL  HTREQ2,B
3766    45623   17  6400              SUB  HTREQ1,B
3767    45624   24  7544              MPL  FRCTN
3770    45625   5043 05               RSA  5
3771    45626   15  6400              ADD  HTREQ1,B
3772    45627   44  7567              STL  LSTHRQ
3773                                  EJE
3774
3775                                       ***** CHARGE ZONE SET-POINT CALCULATION *****
3776
3777    45630   12  7422    RTMTM1    ENL  GRDSV1
4000    45631   61  5636              JLZ  L+5
4001    45632   71  7776              ALC  -1
```

```
4002   45633  24   7006         MPL KDEC06
4003   45634  65   5656         JLP L+2
4004   45635  70   0000         ELC 0
4005   45636  44   7530         STL GRADEB       NOW HAVE GRADE LOOK-UP VALUE
4006
4007   45637  12   7424         ENL AVTHK1
4010   45640  16   7055         SUB BASTHK
4011   45641  10   7000         ENU ZEROB
4012   45642  5047 15           LSA 13
4013   45643  5046 05           LSL 5
4014   45644  46   7543         STU WHOLE        NOW HAVE THE AVERAGE THICKNESS BROKEN
4015   45645  44   7544         STL FRCTN        DOWN FOR THE IDEAL CHARGE ZONE
4016                                              CALCULATION OF SET-POINT
4017   45646  12   7543         ENL WHOLE
4020   45647  65   5653         JLP L+4
4021   45650  40   7543         STZ WHOLE
4022   45651  40   7544         STZ FRCTN
4023   45652  34   5660         DJP L+6
4024   45653  02   7005         CPL KDEC05
4025   45654  67   5661         JOL L+5
4026   45655  70   0005         ELC 5
4027   45656  44   7543         STL WHOLE        LIMIT CHECK WHOLE AND FRCTN AND AFTER
4030   45657  40   7544         STZ FRCTN        LIMIT CHECKING - NOW HAVE LOCATION IN
4031                                              TABLE
4032   45660  12   7543         ENL WHOLE
4033   45661  14   7530         ADD GRADEB
4034   45662  44   7530         STL GRADEB
4035
4036   45663  32   7530         ENB GRADEB       B-BOX IS NOW SET-UP FOR HEAT
4037   45664  13   6401         ENL HTRFQ2,B         REQUIRED LOOK-UP
4040   45665  17   6400         SUB HTREQ1,B
4041   45666  24   7544         MPL FRCTN
4042   45667  5043 05           RSA 5
4043   45670  15   6400         ADD HTREQ1,B
4044   45671  44   7430         STL HTREQC           NOW HAVE REQUIRED HEAT
4045
4046   45672  12   7430         ENL HTREQC
4047   45673  34   5674         DJP L+1   /// WILL LATER BE CHANGED TO MPL KMODO ///
4050   45674  34   5675         DJP L+1   /// WILL LATER BE CHANGED TO RSA 9      ///
4051   45675  44   7430         STL HTREQC       NOW HAVE MODIFIED REQUIRED HEAT
4052
4053          045676            RFD TABLOC,HTRK,1
       45676  770450            DM1 63,0,HTRK
       45677  046400            DM2 0,1-1,TABLOC
4054                             EJE
4055
4056   45700  12   6474  LOOKA  ENL CZTIM1  LIMIT CHECK THE CALCULATED MILLING TIME
4057   45701  02   7412         CPL CHTIME
4060   45702  67   5705         JOL L+3
4061   45703  44   7412         STL CHTIME
4062   45704  34   5711         DJP L+5
4063
4064   45705  12   6505         ENL CZTIM1+9
4065   45706  02   7412         CPL CHTIME
4066   45707  65   5711         JGE L+2
4067   45710  44   7412         STL CHTIME
4070
4071
4072   45711  36   0011         EBC 9        LOOK-UP FOR TIME SLOT IN FIG. 2 TABLES
4073   45712  12   7412         ENL CHTIME
4074   45713  17   6474         SUB CZTIM1,B
4075   45714  65   5717         JLP L+3
4076   45715  73   5712         BJP L-3
4077   45716  70   0000         ELC 0
4100   45717  44   7545         STL HTDF
4101   45720  42   7534         STB PRIB
4102
4103   45721  12   7543         ENL WHOLE
4104   45722  24   7012         MPL KDEC10
4105   45723  14   7534         ADD PRIB
4106   45724  44   7537         STL FINLB        NOW HAVE REL LOC FOR TABLE LOOK-UP
```

```
4107                                         EJE
4110
4111    45725   32   7537       ENB FINLB            INTERPOLATE IN TABLES FOR HPH
4112    45726   13   6401       ENL HEAT2,B
4113    45727   17   6400       SUB HEAT1,B
4114    45730   24   7545       MPL HTDF
4115    45731   26   7024       DIV HTINC
4116    45732   15   6400       ADD HEAT1,B
4117    45733   44   7436       STL IMPT1
4120
4121
4122    45734   37   0012       ABC 10
4123    45735   13   6401       ENL HEAT2,B
4124    45736   17   6400       SUB HEAT1,B
4125    45737   24   7545       MPL HTDF
4126    45740   26   7024       DIV HTINC
4127    45741   15   6400       ADD HEAT1,B
4130    45742   44   7437       STL IMPT2
4131                            EJE
4132
4133    45743   10   7000       ENU ZEROB
4134    45744   12   7437       ENL IMPT2
4135    45745   16   7436       SUB IMPT1
4136    45746   24   7544       MPL FRCTN
4137    45747   5043 05         RSA 5
4140    45750   14   7436       ADD IMPT1
4141    45751   24   7005       MPL KDEC05
4142    45752   44   7547       STL HPH    NOW HAVE HPH FOR THIS CALCULATION
4143
4144    45753   16   7426       SUB PHTOT
4145    45754   44   7550       STL HPHND
4146    45755   34   5756       DJP L+1   // DEBUGGING JUMP TO PHASE-1 PRINTOUT //
4147    45756   34   5757       DJP PART2
4150                            EJE
4151
4152            045757  PART2   RFD TABLOC,HTRK,1
        45757   770450          DM1 63,0,HTRK
        45760   046400          DM2 0,1-1,TABLOC
4153
4154    45761   12   7550       ENL HPHND
4155    45762   65   5765       JLP L+3
4156    45763   12   6532       ENL CZHEAT
4157    45764   44   7550       STL HPHND
4160
4161    45765   12   6506       ENL CZTIM2
4162    45766   02   7411       CPL PHTIME
4163    45767   67   5772       JOL L+3
4164    45770   44   7411       STL PHTIME
4165    45771   34   5776       DJP L+5
4166    45772   12   6517       ENL CZTIM2+9
4167    45773   02   7411       CPL PHTIME
4170    45774   65   5776       JGE L+2
4171    45775   44   7411       STL PHTIME
4172                            EJE
4173
4174    45776   70   0021       ELC 17
4175    45777   02   7544       CPL FRCTN
4176    46000   65   6004       JGE L+4
4177    46001   12   7543       ENL WHOLE
4200    46002   71   0001       ALC 1
4201    46003   44   7543       STL WHOLE
4202
4203    46004   12   7543       ENL WHOLE
4204    46005   71   1020       ALC BASTRK
4205    46006   71   6751       ALC -534
4206    46007   67   6011       JLN L+2
4207
4210    46010   70   7776       ELC -1
4211    46011   71   1026       ALC 534
4212    46012   71   0006       ALC 6
4213    46013   74   6014       STA L+1
4214            046014          RFD TABLOC,XX,1
        46014   770000          DM1 63,0,XX
        46015   046400          DM2 0,1-1,TABLOC
```

```
4215                         EJE
4216
4217   46016  36  0000  LOOK3    EBC  0           LOOK-UP FOR FIG 1 (CHARGE TEMP VALUE)
4220   46017  13  6552           ENL  CZHEAT,B
4221   46020  16  7550           SUB  HPHND
4222   46021  65  6025           JLP  PKVAL3
4223   46022  56  7011           BSK  KDEC09
4224   46023  34  6017           DJP  LOOK3+1
4225   46024  34  6040           DJP  ERRORB
4226   46025  44  7551  PKVAL3   STL  HPHDF
4227   46026  42  7533           STB  SECB
4230   46027  12  7533           ENL  SECB
4231   46030  24  7013           MPL  ELEVEN
4232   46031  44  7533           STL  SECB
4233
4234
4235
4236   46032  36  0011  LOOK4    EBC  9
4237   46033  12  7411           ENL  PHTIME
4240   46034  17  6506           SUB  CZTIM2,B
4241   46035  65  6052           JLP  L-3
4242   46036  65  6042           JLP  PKVAL4
4243   46037  73  6034           BJP  L-3
4244   46040  12  7033  ERRORB   ENL  2=HNRD     END OF TABLE WITH NO VALID COMPARISON
4245   46041  34  6103           DJP  CGSPST     -- USA A CONSTANT SET-POINT --
4246   46042  44  7552  PKVAL4   STL  PHTDIF
4247   46043  42  7534           STB  PRIB
4250   46044  12  7533           ENL  SECB
4251   46045  14  7534           ADD  PRIB
4252   46046  44  7537           STL  FINLB
4253                             EJE
4254
4255   46047  32  7537           ENB  FINLB      INTERPOLATE IN TABLE TO GET CHARGE
4256   46050  13  6401           ENL  HEAT2,B
4257   46051  17  6400           SUB  HEAT1,B
4260   46052  24  7552           MPL  PHTDIF
4261   46053  26  7025           DIV  PHTINC
4262   46054  15  6400           ADD  HEAT1,B
4263   46055  44  7436           STL  IMPT1
4264
4265   46056  12  7537           ENL  FINLB
4266   46057  71  7764           ALC  -11
4267   46060  44  7537           STL  FINLB
4270   46061  65  6065           JLP  L+4
4271   46062  12  7436           ENL  IMPT1
4272   46063  71  7467           ALC  -200
4273   46064  34  6073           DJP  L+7
4274
4275   46065  32  7537           ENB  FINLB
4276   46066  13  6401           ENL  HEAT2,B
4277   46067  17  6400           SUB  HEAT1,B
4300   46070  24  7552           MPL  PHTDIF
4301   46071  26  7025           DIV  PHTINC
4302   46072  15  6400           ADD  HEAT1,B
4303   46073  44  7437           STL  IMPT2
4304                             EJE
4305
4306   46074  12  7436           ENL  IMPT1
4307   46075  16  7437           SUB  IMPT2
4310   46076  24  7551           MPL  HPHDF
4311   46077  26  7037           DIV  HPHINC
4312   46100  44  7541           STL  HPHTEM
4313
4314   46101  12  7436           ENL  IMPT1
4315   46102  16  7541           SUB  HPHTEM
4316
4317   46103  44  7540  CGSPST   STL  SETING
4320   46104  32  7400           ENB  FRNNO
4321   46105  45  7130           STL  TCGST1,B   STORE SET-POINT FOR TOP CHARGE
4322   46106  24  7214           MPL  CGMOD
4323   46107  45  7135           STL  BCGST1,B   STORE SET-POINT FOR BOTTOM CHARGE
```

```
4324
4325    46110   34  6111           DJP L+1 // DEBUGGING JUMP TO PHASE-2 PRINTOUT //
4326    46111   40  7424           STZ AVTHK1
4327    46112   40  7426           STZ PHTOT
4330            046113             RFD TABLOC,GTRK,1
        46113   770446             DM1 63,0,GTRK
        46114   046400             DM2 0,1-1,TABLOC
4331                               EJE
4332
4333                               ***** HEAT ZONE SET-POINT CALCULATION *****
4334
4335    46115   12  7423   RTHTM2  ENL GRDSV2
4336    46116   61  6123           JLZ L+5
4337    46117   71  7776           ALC -1
4340    46120   24  7006           MPL KDEC06
4341    46121   65  6123           JLP L+2
4342    46122   70  0000           ELC 0
4343    46123   44  7530           STL GRADER          NOW HAVE GRADE LOOK-UP VALUE
4344
4345    46124   12  7425           ENL AVTHK2
4346    46125   16  7055           SUB BASTHK
4347    46126   10  7000           ENU ZEROB
4350    46127   5047 15            LSA 13
4351    46130   5046 05            LSL 5
4352    46131   46  7543           STU WHOLE  NOW HAVE THE AVERAGE THICKNESS BROKEN
4353    46132   44  7544           STL FRCTN  DOWN FOR THE IDEAL HEAT ZONE
4354                                          CALCULATION OF SET-POINT
4355    46133   12  7543           ENL WHOLE
4356    46134   65  6140           JLP L+4
4357    46135   40  7543           STZ WHOLE
4360    46136   40  7544           STZ FRCTN
4361    46137   34  6145           DJP L+6
4362    46140   02  7005           CPL KDEC05
4363    46141   67  6145           JOL L+5
4364    46142   70  0005           ELC 5
4365    46143   44  7543           STL WHOLE  LIMIT CHECK WHOLE AND FRCTN AND AFTER
4366    46144   40  7544           STZ FRCTN  LIMIT CHECKING - NOW HAVE LOCATION
4367                                          IN TABLE
4370    46145   12  7543           ENL WHOLE
4371    46146   14  7530           ADD GRADER
4372    46147   44  7530           STL GRADER
4373
4374    46150   32  7530           ENB GRADER          B-BOX IS NOW SET-UP FOR HEAT
4375    46151   13  6401           ENL HTREQ2,B        REQUIRED LOOK-UP
4376    46152   17  6400           SUB HTREQ1,B
4377    46153   24  7544           MPL FRCTN
4400    46154   5043 05            RSA 5
4401    46155   15  6400           ADD HTREQ1,B
4402    46156   44  7431           STL HTREQH          NOW HAVE REQUIRE
4403
4404    46157   12  7431           ENL HTREQH
4405    46160   34  6161           DJP L+1 /// WILL LATER BE CHANGED TO MPL KMOD1 ///
4406    46161   34  6162           DJP L+1 /// WILL LATER BE CHANGED TO RSA 9     ///
4407    46162   44  7431           STL HTREQH   NOW HAVE MODIFIED REQUIRED HEAT
4410
4411            046163             RFD TABLOC,HTRK,1
        46163   770450             DM1 63,0,HTRK
        46164   046400             DM2 0,1-1,TABLOC
4412
4413    46165   12  7431           ENL HTREQH
4414    46166   16  7427           SUB HTOT
4415    46167   44  7553           STL HHND
4416                               EJE
4417
4420    46170   12  7553   LOOKC   ENL HHND
4421    46171   65  6174           JLP L+3
4422    46172   12  6544           ENL HZHEAT
4423    46173   44  7553           STL HHND
4424    46174   12  7410           ENL HTTIME
4425    46175   65  6200           JLP L+3
4426    46176   12  6524           ENL HZTIME+4
4427    46177   44  7410           STL HTTIME
```

```
4430                                       EJE
4431
4432   46200   36   0000    LOOK5    EBC 0        LOOK-UP FOR FIG 3 (HEAT TEMP VALUE)
4433   46201   13   6544             ENL HZHEAT,B
4434   46202   16   7553             SUB HHND
4435   46203   65   6207             JLP PKVAL5
4436   46204   56   7011             BSK KDEC09
4437   46205   34   6201             DJP LOOK5+1
4440   46206   34   6221             DJP ERRORC
4441   46207   44   7546    PKVAL5   STL HHDF
4442   46210   42   7533             STB SECB
4443   46211   12   7533             ENL SECB
4444   46212   24   7013             MPL ELEVEN
4445   46213   44   7533             STL SECB
4446
4447
4450
4451   46214   36   0011    LOOK6    EBC 9        LOOK-UP FOR FIG 3 (HEAT TIME VALUE)
4452   46215   12   7410             ENL HTTIME
4453   46216   17   6520             SUB HZTIME,B
4454   46217   65   6223             JLP PKVAL6
4455   46220   73   6215             BJP L-3
4456   46221   00   6221    ERRORC   EL 24HNRD END OF TABLE WITH NO VALID COMPARISON
4457   46222   34   6304             DJP HTSPST     -- USA A CONSTANT SET-POINT --
4460   46223   44   7545    PKVAL6   STL HTDF
4461   46224   42   7534             STB PRIB
4462   46225   12   7533             ENL SECB
4463   46226   14   7534             ADD PRIB
4464   46227   44   7537             STL FINLB
4465                                 EJE
4466
4467
4470
4471   46230   70   0021             ELC 17
4472   46231   02   7544             CPL FRCTN
4473   46232   65   6236             JGE L+4
4474   46233   12   7543             ENL WHOLE
4475   46234   71   0001             ALC 1
4476   46235   44   7543             STL WHOLE
4477   46236   12   7543             ENL WHOLE
4500   46237   71   1020             ALC BASTRK
4501   46240   71   6751             ALC -534
4502   46241   67   6243             JLN L+2
4503   46242   70   7776             ELC -1
4504   46243   71   1026             ALC 534
4505   46244   71   0014             ALC 12
4506   46245   74   6246             STA L+1
4507           046246                 RFD TABLOC,XX,1
       46246   770000                 DM1 63,0,XX
       46247   046400                 DM2 0,1-1,TABLOC
4510                                 EJE
4511
4512   46250   32   7537             ENB FINLB
4513   46251   13   6400             ENL HEAT1,B
4514   46252   17   6401             SUB HEAT2,B
4515   46253   24   7545             MPL HTDF
4516   46254   26   7026             DIV THINC
4517   46255   15   6401             ADD HEAT2,B
4520   46256   44   7436             STL IMPT1
4521
4522   46257   12   7537             ENL FINLB
4523   46260   71   7764             ALC -11
4524   46261   44   7537             STL FINLB
4525   46262   65   6266             JLP L+4
4526   46263   12   7436             ENL IMPT1
4527   46264   71   7633             ALC -100
4530   46265   34   6274             DJP L+7
4531
4532   46266   32   7537             ENB FINLB
4533   46267   13   6400             ENL HEAT1,B
4534   46270   17   6401             SUB HEAT2,B
4535   46271   24   7545             MPL HTDF
```

```
4536   46272   26   7026            DIV THINC
4537   46273   15   6401            ADD HEAT2,B
4540   46274   44   7437            STL IMPT2
4541                                 EJE
4542
4543   46275   10   7000            ENU ZEROB
4544   46276   16   7436            SUB IMPT1
4545   46277   24   7546            MPL HHDF
4546   46300   26   7030            DIV HHPINC
4547   46301   44   7541            STL HPHTEM
4550   46302   12   7437            ENL IMPT2
4551   46303   16   7541            SUB HPHTEM
4552   46304   44   7540   HTSPST   STL SETING
4553   46305   32   7400            ENB FRNNO
4554   46306   45   7142            STL THTST1,B   STORE SET-POINT FOR TOP HEAT
4555   46307   24   7215            MPL HTMOD
4556   46310   45   7147            STL BHTST1,B   STORE SET-POINT FOR BOTTOM HEAT
4557
4560   46311   34   6312            DJP L+1. // DEBUGGING JUMP TO PHASE-3 PRINTOUT //
4561   46312   40   7425            STZ AVTHK2
4562   46313   40   7427            STZ HTOT
4563           046314               RDT FCECK1,CTLDRM+15,3
       46314   770440               DM1 63,0,CTLDRM-15
       46315   645601               DM2 1,3-1,FCECK1
4564           046316               RPZ
               000062               RPT 19712-L
       46316   000000               DEC 0
       46317   300000
       46320   000000
       46321   000000
       46322   000000
       46323   000000
       46324   000000
       46325   000000
       46326   000000
       46327   000000
       46330   000000
       46331   000000
       46332   000000
       46333   000000
       46334   000000
       46335   000000
       46336   000000
       46337   000000
       46340   000000
       46341   000000
       46342   000000
       46343   000000
       46344   000000
       46345   000000
       46346   000000
       46347   000000
       46350   000000
       46351   000000
       46352   000000
       46353   000000
       46354   000000
       46355   000000
       46356   000000
       46357   000000
       46360   000000
       46361   000000
       46362   000000
       46363   000000
       46364   000000
       46365   000000
       46366   000000
       46367   000000
       46370   000000
       46371   000000
       46372   000000
```

```
            46373    000000
            46374    000000
            46375    000000
            46376    000000
            46377    000000
1565                          EJE
1566             000440       DRM  CTLDRM+15
1567             045600       LOC  WRKARA
1570    45600    000440       DEC  CTLDRM+15
1571
1572                                    THIS PORTION OF THE PROGRAM WILL LIMIT
1573                                    CHECK THE THERMO-COUPLE FEEDBACK FOR ALL IN
1574                                    SERVICE FURNACES, PROVIDING THE ZONE IS ON
1575                                    AUTO, AND WILL ALARM ANY OUT OF LIMITS
1576                                    CONDITION
1577
1600    45601  30   7171   FCECK1  IRJ  CHKBIT    IS FCE 1 IN SERVICE (A01001)
1601    45602       151172          OCT  151172
1602    45603  34   5675           DJP  FCECK2    NO -- GO ON TO CHECK FCE 2
1603
1604    45604  30   7171   FBKCZ1  IRJ  CHKBIT    IS FCE 1 CHARGE ZONE ON AUTO
1605    45605       151261         DEC  A04801
1606    45606  34   5627           DJP  FBKHZ1    NO -- GO ON TO CHECK EHAT ZONE
1607
1610    45607  12   5457           ENL  F1TCT2    PICK UP TOP CHARGE TC FEEDBACK
1611    45610  02   7200           CPL  LTCHRG    IS FEEDBACK TOO LOW
1612    45611  67   5622           JOL  LCZ1      YES - ALARM
1613    45612  02   7206           CPL  HTCHRG    IS FEEDBACK TOO HIGH
1614    45613  55   5625           JGE  HCZ1      YES - ALARM
1615
1616    45614  12   5461           ENL  F1TCBC    PICK UP BOTTOM CHARGE TC FEEDBACK
1617    45615  02   7201           CPL  LPCHRG    IS FEEDBACK TOO LOW
1620    45616  67   5622           JOL  LCZ1      YES - ALARM
1621    45617  02   7207           CPL  HBCHRG    IS FEEDBACK TOO HIGH
1622    45620  65   5625           JGE  HCZ1      YES - ALARM
1623    45621  34   5627           DJP  FBKHZ1    NO -- GO ON TO CHECK HEAT ZONE
1624
1625    45622  30   7173   LCZ1    IRJ  LFLAGO    CHARGE ZONE TCT2 OR TCBC BELOW LIMITS
1626    45623       234173          DEC  MC1CBS   ALARM CONDITION
1627    45624  34   5627           DJP  FBKHZ1
1630
1631    45625  30   7173   HCZ1    IRJ  LFLAGO    CHARGE ZONE TCT2 OR TCBC ABOVE LIMITS
1632    45626       234174         DEC  MC1CAS    ALARM CONDITION
1633
1634
1635
1636    45627  30   7171   FBKHZ1  IRJ  CHKBIT    IS FCE 1 HEAT ZONE ON AUTO
1637    45630       151263         DEC  A05001
1640    45631  34   5652           DJP  FBKSZ1    NO -- GO ON TO CHECK SOAK ZONE
1641
1642    45632  12   5462           ENL  F1TCTH    PICK UP TOP HEAT TC FEEDBACK
1643    45633  02   7202           CPL  LTHEAT    IS FEEDBACK TOO LOW
1644    45634  67   5645           JOL  LHZ1      YES - ALARM
1645    45635  02   7210           CPL  HTHEAT    IS FEEDBACK TOO HIGH
1646    45636  65   5650           JGE  HHZ1      YES - ALARM
1647
1650    45637  12   5463           ENL  F1TCBH    PICK UP BOTTOM HEAT TC FEEDBACK
1651    45640  02   7203           CPL  LBHEAT    IS FEEDBACK TOO LOW
1652    45641  67   5645           JOL  LHZ1      YES - ALARM
1653    45642  02   7211           CPL  HBHEAT    IS FEEDBACK TOO HIGH
1654    45643  65   5650           JGE  HHZ1      YES - ALARM
1655    45644  34   5652           DJP  FBKSZ1    NO -- GO ON TO CHECK SOAK ZONE
1656
1657    45645  30   7173   LHZ1    IRJ  LFLAGO    HEAT ZONE TCTH OR TCBH BELOW LIMITS
1660    45646       234175         DEC  MC1HBS    ALARM CONDITION
1661    45647  34   5652           DJP  FBKSZ1
1662
1663    45650  30   7173   HHZ1    IRJ  LFLAGO    HEAT ZONE TCTH OR TCBH ABOVE LIMITS
1664    45651       234200         DEC  MC1HAS    ALARM CONDITION
1665
1666
```

```
4667
4670    45652   30  7171    F6KSZ1  IRJ CHKBIT      IS FCE 1 SOAK ZONE ON AUTO
4671    45653       151265           DEC A05201
4672    45654   34  5675            DJP FCECK2      NO -- GO TO TO CHECK FCE 2
4673
4674    45655   12  5464            ENL F1TCNS      PICK UP NORTH SOAK TC FEEDBACK
4675    45656   02  7204            CPL LSOAKN      IS FEEDBACK TOO LOW
4676    45657   67  5670            JOL LSZ1        YES - ALARM
4677    45660   02  7212            CPL HSOAKN      IS FEEDBACK TOO HIGH
4700    45661   65  5673            JGE HSZ1        YES - ALARM
4701
4702    45662   12  5465            ENL F1TCSS      PICK UP SOUTH SOAK TC FEEDBACK
4703    45663   02  7205            CPL LSOAKS      IS FEEDBACK TOO LOW
4704    45664   67  5670            JOL LSZ1        YES - ALARM
4705    45665   02  7213            CPL HSOAKS      IS FEEDBACK TOO HIGH
4706    45666   65  5673            JGE HSZ1        YES - ALARM
4707    45667   34  5675            DJP FCECK2      NO -- GO ON TO CHECK FCE 2
4710
4711    45670   30  7173    LSZ1    IRJ LFLAGO      SOAK ZONE TCNS OR TCSS BELOW LIMITS
4712    45671       234201          DEC MC1SBS       ALARM CONDITION
4713    45672   34  5675            DJP FCECK2
4714
4715    45673   30  7173    HSZ1    IRJ LFLAGO      SOAK ZONE TCNS OR TCSS ABOVE LIMITS
4716    45674       234202          DEC MC1SAS       ALARM CONDITION
4717                                EJE
4720
4721    45675   30  7171    FCECK2  IRJ CHKBIT      IS FCE 2 IN SERVICE (A01101)
4722    45676       151173          OCT 151173
4723    45677   34  5771            DJP FCECK3      NO -- GO ON TO CHECK FCE 3
4724
4725    45700   30  7171    F6KCZ2  IRJ CHKBIT      IF FCE 2 CHARGE ZONE ON AUTO
4726    45701       151271          DEC A05601
4727    45702   34  5723            DJP F6KHZ2      NO -- GO ON TO CHECK HEAT ZONE
4730
4731    45703   12  5467            ENL F2TCT2      PICK UP TOP CHARGE TC FEEDBACK
4732    45704   02  7200            CPL LTCHRG      IS FEEDBACK TOO LOW
4733    45705   67  5716            JOL LCZ2        YES - ALARM
4734    45706   02  7206            CPL HTCHRG      IS FEEDBACK TOO HIGH
4735    45707   65  5721            JGE HCZ2        YES - ALARM
4736
4737    45710   12  5471            ENL F2TCBC      PICK UP BOTTOM CHARGE TC FEEDBACK
4740    45711   02  7201            CPL LBCHRG      IS FEEDBACK TOO LOW
4741    45712   67  5716            JOL LCZ2        YES - ALARM
4742    45713   02  7207            CPL HBCHRG      IS FEEDBACK TOO HIGH
4743    45714   65  5721            JGE HCZ2        YES - ALARM
4744    45715   34  5723            DJP F6KHZ2      NO,-- GO ON TO CHECK HEAT ZONE
4745
4746    45716   30  7173    LCZ2    IRJ LFLAGO      CHARGE ZONE TCT2 OR TCBC BELOW
4747    45717       234203          DEC MC2CBS       LIMITS ALARM CONDITION
4750    45720   34  5723            DJP F6KHZ2
4751
4752    45721   30  7173    HCZ2    IRJ LFLAGO      CHARGE ZONE TCT2 OR TCBC ABOVE
4753    45722       234204          DEC MC2CAS       LIMITS ALARM CONDITION
4754
4755
4756
4757
4760    45723   30  7171    F6KHZ2  IRJ CHKBIT      IS FCE 2 HEAT ZONE ON AUTO
4761    45724       151273          DEC A05801
4762    45725   34  5746            DJP F6KSZ2      NO -- GO ON TO CHECK SOAK ZONE
4763
4764    45726   12  5472            ENL F2TCTH      PICK UP TOP HEAT TC FEEDBACK
4765    45727   02  7202            CPL LTHEAT      IS FEEDBACK TOO LOW
4766    45730   67  5741            JOL LHZ2        YES - ALARM
4767    45731   02  7210            CPL HTHEAT      IS FEEDBACK TOO HIGH
4770    45732   65  5744            JGE HHZ2        YES - ALARM
4771
4772    45733   12  5473            ENL F2TCBH      PICK UP BOTTOM HEAT TC FEEDBACK
4773    45734   02  7203            CPL LBHEAT      IS FEEDBACK TOO LOW
4774    45735   67  5741            JOL LHZ2        YES - ALARM
4775    45736   02  7211            CPL HBHEAT      IS FEEDBACK TOO HIGH
```

```
4776   45737  65  5744            JGE  HHZ2    YES - ALARM
4777   45740  34  5746            DJP  FBKSZ2  NO -- GO ON TO CHECK SOAK ZONE
5000
5001   45741  30  7173    LHZ2    IRJ  LFLAGO  HEAT ZONE TCTH OR TCBH BELOW LIMITS
5002   45742    234205            DEC  MC2HBS  ALARM CONDITION
5003   45743  34  5746            DJP  FBKSZ2
5004
5005   45744  30  7173    HHZ2    IRJ  LFLAGO  HEAT ZONE TCTH OR TCBH ABOVE LIMITS
5006   45745    234206            DEC  MC2HAS  ALARM CONDITION
5007
5010
5011
5012
5013   45746  30  7171    FBKSZ2  IRJ  CHKBIT  IS FCE 2 SOAK ZONE ON AUTO
5014   45747    151275            DEC  A0600I
5015   45750  34  5771            DJP  FCECK3  NO -- GO ON TO CHECK FCE 3
5016
5017   45751  12  5474            ENL  F2TCNS  PICK UP NORTH SOAK TC FEEDBACK
5020   45752  02  7204            CPL  LSOAKN  IS FEEDBACK TOO LOW
5021   45753  67  5670            JOL  LSZ1    YES - ALARM
5022   45754  02  7212            CPL  HSOAKN  IS FEEDBACK TOO HIGH
5023   45755  65  5673            JGE  HSZ1    YES - ALARM
5024
5025   45756  12  5475            ENL  F2TCSS  PICK UP SOUTH SOAK TC FEEDBACK
5026   45757  02  7205            CPL  LSOAKS  IS FEEDBACK TOO LOW
5027   45760  67  5764            JOL  LSZ2    YES - ALARM
5030   45761  02  7213            CPL  HSOAKS  IS FEEDBACK TOO HIGH
5031   45762  65  5744            JGE  HHZ2    YES - ALARM
5032   45763  34  5771            DJP  FCECK3  NO -- GO ON TO CHECK FCE 3
5033
5034   45764  30  7173    LSZ2    IRJ  LFLAGO  SOAK ZONE TCNS OR TCSS BELOW LIMITS
5035   45765    234207            DEC  MC2SBS  ALARM CONDITION
5036   45766  34  5771            DJP  FCECK3
5037
5040   45767  30  7173    HSZ2    IRJ  LFLAGO  SOAK ZONE TCNS OR TCSS ABOVE LIMITS
5041   45770    234210            DEC  MC2SAS  ALARM CONDITION
5042                              EJE
5043
5044   45771  30  7171    FCECK3  IRJ  CHKBIT  IS FCE 3 IN SERVICE (A01201)
5045   45772    151174            OCT  151174
5046   45773  34  6067            DJP  OUTTCG  NO- GO ON TO SET-POINT OUT-PUT CHECK
5047
5050   45774  30  7171    FBKCZ3  IRJ  CHKBIT  IS FCE 3 CHARGE ZONE ON AUTO
5051   45775    151303            DEC  A0640I
5052   45776  34  6021            DJP  FBKHZ3  NO -- GO ON TO CHECK HEAT ZONE
5053
5054   45777  12  5477            ENL  F3TCT2  PICK UP TOP CHARGE TC FEEDBACK
5055   46000  02  7200            CPL  LTCHRG  IS FEEDBACK TOO LOW
5056   46001  67  6014            JOL  LCZ3    YES - ALARM
5057   46002  02  7206            CPL  HTCHRG  IS FEEDBACK TOO HIGH
5060   46003  65  6017            JGE  HCZ3    YES - ALARM
5061
5062   46004  12  5501            ENL  F3TCBC  PICK UP BOTTOM CHARGE TC FEEDBACK
5063   46005  02  7201            CPL  LBCHRG  IS FEEDBACK TOO LOW
5064   46006  67  6014            JOL  LCZ3    YES - ALARM
5065   46007  02  7207            CPL  HBCHRG  IS FEEDBACK TOO HIGH
5066   46010  67  6014            JOL  LCZ3    YES - ALARM
5067   46011  02  7207            CPL  HBCHRG  IS FEEDBACK TOO HIGH
5070   46012  65  6017            JGE  HCZ3    YES - ALARM
5071   46013  34  6021            DJP  FBKHZ3  NO -- GO ON TO CHECK HEAT ZONE
5072
5073   46014  30  7173    LCZ3    IRJ  LFLAGO  CHARGE ZONE TCT2 OR TCBC BELOW LIMITS
5074   46015    234211            DEC  MC3CBS  ALARM CONDITION
5075   46016  34  6021            DJP  FBKHZ3
5076
5077   46017  30  7173    HCZ3    IRJ  LFLAGO  CHARGE ZONE TCT2 TO TCBC ABOVE LIMITS
5100   46020    234212            DEC  MC3CAS  ALARM CONDITIONS
5101
5102
5103
5104
```

```
5105   45021   30   7171    FBKHZ3  IRJ CHKBIT      IS FCE 3 HEAT ZONE ON AUTO
5106   45022        151305          DEC A06601
5107   45023   34   6044            DJP FBKSZ3      NO -- GO ON TO CHECK SAOK ZONE
5110
5111   45024   12   5502            ENL F3TCTH      PICK UP TOP HEAT TC FEEDBACK
5112   45025   02   7202            CPL LTHEAT      IS FEEDBACK TOO LOW
5113   45026   67   6037            JOL LHZ3        YES - ALARM
5114   45027   02   7210            CPL HTHEAT      IS FEEDBACK TOO HIGH
5115   45030   65   6042            JGE HHZ3        YES - ALARM
5116
5117   45031   12   5503            ENL F3TCBH      PICK UP BOTTOM HEAT TC FEEDBACK
5120   45032   02   7203            CPL LBHEAT      IS FEEDBACK TOO LOW
5121   45033   67   6037            JOL LHZ3        YES - ALARM
5122   45034   02   7211            CPL HBHEAT      IS FEEDBACK TOO HIGH
5123   45035   65   6042            JGE HHZ3        YES - ALARM
5124   45036   34   6044            DJP FBKSZ3      NO -- GO ON TO CHECK SOAK ZONE
5125
5126   45037   30   7173    LHZ3    IRJ LFLAGO      HEAT ZONE TCTH OR TCBH BELOW LIMITS
5127   45040        234213          DEC MC3HBS      ALARM CONDITION
5130   45041   34   6044            DJP FBKSZ3
5131
5132   45042   30   7173    HHZ3    IRJ LFLAGO      HEAT ZONE TCTH OR TCBH ABOVE LIMITS
5133   45043        234214          DEC MC3HAS      ALARM CONDITION
5134
5135
5136
5137   45044   30   7171    FBKSZ3  IRJ CHKBIT      IS FCE 3 SOAK ZONE ON AUTO
5140   45045        151307          DEC A06801
5141   45046   34   6067            DJP OUTTCG      NO- GO ON TO SET-POINT OUT-PUT CHECK
5142
5143   45047   12   5504            ENL F3TCNS      PICK UP NORTH SOAK TC FEEDBACK
5144   45050   02   7204            CPL LSOAKN      IS FEEDBACK TOO LOW
5145   45051   67   6062            JOL LSZ3        YES - ALARM
5146   45052   02   7212            CPL HSOAKN      IS FEEDBACK TOO HIGH
5147   45053   65   6065            JGE HSZ3        YES - ALARM
5150
5151   45054   12   5505            ENL F3TCSS      PICK UP SOUTH SOAK TC FEEDBACK
5152   45055   02   7205            CPL LSOAKS      IS FEEDBACK TOO LOW
5153   45056   67   6062            JOL LSZ3        YES - ALARM
5154   45057   02   7213            CPL HSOAKS      IS FEEDBACK TOO HIGH
5155   45060   65   6065            JGE HSZ3        YES - ALARM
5156   45061   34   6067            DJP OUTTCG      NO- GO ON TO SET-POINT OUT-PUT CHECK
5157
5160   45062   30   7173    LSZ3    IRJ LFLAGO      SOAK ZONE TCNS OR TCSS BELOW LIMITS
5161   45063        234215          DEC MC3SBS      ALARM CONDITION
5162   45064   34   6067            DJP OUTTCG      NO- GO ON TO SET-POINT OUT-PUT CHECK
5163
5164   45065   30   7173    HSZ3    IRJ LFLAGO      SOAK ZONE TCNS OR TCSS ABOVE LIMITS
5165   45066        234220          DEC MC3SAS      ALARM CONDITION
5166
5167
5170
5171                                    THIS PORTION OF THE PROGRAM WILL COMPARE
5172                                THE SET-POINT SLIDE-WIRE FEEDBACK TO THE DESIRED
5173                                SET-POINT STORED AND OUTPUT ANY DIFFERENCE OVER
5174                                10 DEGREES (BUT NOT GREATER THAN 50 DEGREES AT
5175                                ONE TIME), AFTER ENSURING THAT THE SET-POINT
5176                                CALCULATED IS WITHIN THE LIMITS DESIGNATED.
5177
5200
5201   45067   36   0000    OUTTCG  EBC 0       FCE X TOP CHARGE ZONE SET-POINT CONTROL
5202   45070   12   7200            ENL LTCHRG
5203   45071   03   7130            CPL TCGST1,B    IS SET-POINT BELOW LOW LIMIT
5204   45072   65   6077            JGE TCGOUT+1 YES - USE LOW LIMIT FOR OUTPUT
5205   45073   12   7206            ENL HTCHRG
5206   45074   03   7130            CPL TCGST1,B    IS SET-POINT ABOVE HIGH LIMIT
5207   45075   67   6077            JOL TCGOUT+1 YES - USE HIGH LIMIT FOR OUTPUT
5210
5211   45076   13   7130    TCGOUT  ENL TCGST1,B    SET-POINT IS VALID - USE FOR OUTPUT
5212   45077   44   7577            STL THISIT      SAVE DETERMINED SET-POINT FOR OUTSET
5213   45100   42   7575            STR BSAVE1         SUBR
```

```
5214   46101  12  7575         ENL BSAVE1    ADJUST B-BOX FOR OUTSET SUBR
5215   46102  24  7006         MPL KDEC06    INTERFACE
5216   46103  44  7576         STL BSAVE2
5217   46104  32  7576         ENB BSAVE2
5220   46105  76  6256         DRJ OUTSET
5221   46106  32  7575         ENB BSAVE1    RESET B-BOX TO LAST FCE DONE AND
5222   46107  56  7002         BSK KDEC02    DETERMINE IF WE ARE DONE WITH
5223   46110  34  6070         DJP OUTTCG+1  THIS ZONE
5224                           EJE
5225   46111  36  0000  OUTBCG EBC 0  FCE X BOTTOM CHARGE ZONE SET-POINT CONTROL
5226   46112  12  7201         ENL LBCHRG
5227   46113  03  7135         CPL BCGST1,B  IS SET-POINT BELOW LOW LIMIT
5230   46114  65  6121         JGE BCGOUT+1  YES - USE LOW LIMIT FOR OUTPUT
5231   46115  12  7207         ENL HBCHRG
5232   46116  03  7135         CPL BCGST1,B  IS SET-POINT ABOVE HIGH LIMIT
5233   46117  67  6121         JOL BCGOUT+1  YES - USE HIGH LIMIT FOR OUTPUT
5234
5235   46120  13  7135  BCGOUT ENL BCGST1,B  SET-POINT IS VALID - USE FOR OUTPUT
5236   46121  44  7577         STL THISIT    SAVE DETERMINED SET-POINT FOR OUTSET
5237   46122  42  7575         STR BSAVE1    SUBR
5240   46123  12  7575         ENL BSAVE1    ADJUST B-BOX FOR OUTSET SUBR
5241   46124  24  7006         MPL KDEC06    INTERFACE IF WE ARE DONE WITH
5242   46125  71  0001         ALC 1         THIS ZONE
5243   46126  44  7576         STL BSAVE2
5244   46127  32  7576         ENB BSAVE2
5245   46130  76  6256         DRJ OUTSET
5246   46131  32  7575         ENB BSAVE1    RESET B-BOX TO LAST FCE DONE AND
5247   46132  56  7002         BSK KDEC02    DETERMINE
5250   46133  34  6112         DJP OUTBCG+1
5251                           EJE
5252   46134  36  0000  OUTTHT EBC 0    FCE X TOP HEAT ZONE SET-POINT CONTROL
5253   46135  12  7202         ENL LTHEAT
5254   46136  03  7142         CPL THTST1,B  IS SET-POINT BELOW LOW LIMIT
5255   46137  65  6144         JGE THTOUT+1  YES - USE LOW LIMIT FOR OUTPUT
5256   46140  12  7210         ENL HTHEAT
5257   46141  03  7142         CPL THTST1,B  IS SET-POINT ABOVE HIGH LIMIT
5260   46142  67  6144         JOL THTOUT+1  YES - USE HIGH LIMIT FOR OUTPUT
5261
5262   46143  13  7142  THTOUT ENL THTST1,B  SET-POINT IS VALID - USE FOR OUTPUT
5263   46144  44  7577         STL THISIT    SAVE DETERMINED SET-POINT FOR OUTSET
5264   46145  42  7575         STR BSAVE1    SUBR
5265   46146  12  7575         ENL BSAVE1    ADJUST B-BOX FOR OUTSET SUBR
5266   46147  24  7006         MPL KDEC06    INTERFACE
5267   46150  71  0002         ALC 2
5270   46151  44  7576         STL BSAVE2
5271   46152  32  7576         ENB BSAVE2
5272   46153  76  6256         DRJ OUTSET
5273   46154  32  7575         ENB BSAVE1    RESET B-BOX TO LAST FCE DONE AND
5274   46155  56  7002         BSK KDEC02    DETERMINE IF WE ARE DONE WITH
5275   46156  34  6135         DJP OUTTHT+1  THIS ZONE
5276                           EJE
5277   46157  36  0000  OUTBHT EBC 0    FCE X BOTTOM HEAT ZONE SET-POINT CONTROL
5300   46160  12  7203         ENL LBHEAT
5301   46161  03  7147         CPL BHTST1,B  IS SET-POINT BELOW LOW LIMIT
5302   46162  65  6167         JGE BHTOUT+1  YES - USE LOW LIMIT FOR OUTPUT
5303   46163  12  7211         ENL HBHEAT
5304   46164  03  7147         CPL BHTST1,B  IS SET-POINT ABOVE HIGH LIMIT
5305   46165  67  6167         JOL BHTOUT+1  YES - USE HIGH LIMIT FOR OUTPUT
5306
5307   46166  13  7147  BHTOUT ENL BHTST1,B  SET-POINT IS VALID - USE FOR OUTPUT
5310   46167  44  7577         STL THISIT    SAVE DETERMINED SET-POINT FOR OUTSET
5311   46170  42  7575         STR BSAVE1    SUBR
5312   46171  12  7575         ENL BSAVE1    ADJUST B-BOX FOR OUTSET SUBR
5313   46172  24  7006         MPL KDEC06    INTERFACE
5314   46173  71  0003         ALC 3
5315   46174  44  7576         STL BSAVE2
5316   46175  32  7576         ENB BSAVE2
5317   46176  76  6256         DRJ OUTSET
5320   46177  32  7575         ENB BSAVE1    RESET B-BOX TO LAST FCE DONE AND
5321   46200  56  7002         BSK KDEC02    DETERMINE IF WE ARE DONE WITH
5322   46201  34  6160         DJP OUTBHT+1  THIS ZONE
```

```
5323            EJE
5324  46202  36  0000   OUTNSK  EBC 0       FCE X NORTH SOAK ZONE SET-POINT CONTROL
5325  46203  12  7204           ENL LSOAKN
5326  46204  03  7154           CPL NSKST1,B   IS SET-POINT BELOW LOW LIMIT
5327  46205  65  6212           JGE NSKOUT+1   YES - USE LOW LIMIT FOR OUTPUT
5330  46206  12  7212           ENL HSOAKN
5331  46207  03  7154           CPL NSKST1,B   IS SET-POINT ABOVE HIGH LIMIT
5332  46210  67  6212           JOL NSKOUT+1   YES - USE HIGH LIMIT FOR OUTPUT
5333
5334  46211  13  7154   NSKOUT  ENL NSKST1,B   SET-POINT IS VALID - USE FOR OUTPUT
5335  46212  44  7577           STL THISIT     SAVE DETERMINED SET-POINT FOR OUTSET
5336  46213  42  7575           STB BSAVE1     SUBR
5337  46214  12  7575           ENL BSAVE1     ADJUST B-BOX FOR OUTSET SUBR
5340  46215  24  7006           MPL KDEC06       INTERFACE
5341  46216  71  0004           ALC 4
5342  46217  44  7576           STL BSAVE2
5343  46220  32  7576           ENB BSAVE2
5344  46221  76  6256           DRJ OUTSET
5345  46222  32  7575           ENB BSAVE1     RESET B-BOX TO LAST FCE DONE AND
5346  46223  56  7002           BSK KDEC02       DETERMINE IF WE ARE DONE WITH
5347  46224  34  6203           DJP OUTNSK+1     THIS ZONE
5350            EJE
5351  46225  36  0000   OUTSSK  EBC 0       FCE X SOUTH SOAK ZONE SET-POINT CONTROL
5352  46226  12  7205           ENL LSOAKS
5353  46227  03  7161           CPL SSKST1,B   IS SET-POINT BELOW LOW LIMIT
5354  46230  65  6235           JGE SSKOUT+1   YES - USE LOW LIMIT FOR OUTPUT
5355  46231  12  7213           ENL HSOAKS
5356  46232  03  7161           CPL SSKST1,B   IS SET-POINT ABOVE HIGH LIMIT
5357  46233  67  6235           JOL SSKOUT+1   YES - USE HIGH LIMIT FOR OUTPUT
5360
5361  46234  13  7161   SSKOUT  ENL SSKST1,B   SET-POINT IS VALID - USE FOR OUTPUT
5362  46235  44  7577           STL THISIT     SAVE DETERMINED SET-POINT FOR OUTSET
5363  46236  42  7575           STB BSAVE1     SUBR
5364  46237  12  7575           ENL BSAVE1     ADJUST B-BOX FOR OUTSET SUBR
5365  46240  24  7006           MPL KDEC06       INTERFACE
5366  46241  71  0005           ALC 5
5367  46242  44  7576           STL BSAVE2
5370  46243  32  7576           ENB BSAVE2
5371  46244  76  6256           DRJ OUTSET
5372  46245  32  7575           ENB BSAVE1     RESET B-BOX TO LAST FCE DONE AND
5373  46246  56  7002           BSK KDEC02       DETERMINE IF WE ARE DONE WITH
5374  46247  34  6226           DJP OUTSSK+1     THIS ZONE
5375            EJE
5376
5377  46250  70  1234           ELC 668     CALL DATA LOGGING TO OUTPUT DATA STORED
5400  46251  5047 22            LSA 18
5401  46252  70  0444           ELC 292
5402  46253  30  7175           IRJ DTALOG
5403
5404         046254    FINISH   RDT TRNOFF,CTLDRM,3
      46254  770421            DM1 63,0,CTLDRM
      46255  645626            DM2 1,3-1,TRNOFF
5405
5406            EJE
5407  46256     000000  OUTSET ...
5410  46257  13  5434           ENL F1FBTC,B   DETERMINE DIFFERENCE BETWEEN SET-
5411  46260  16  7577           SUB THISIT       POINT SLIDEWIRE FEEDBACK AND
5412  46261  67  6266           JLN L+5          STORED DESIRED SET-POINT FOR
5413                                             FCE X ZONE X
5414  46262  44  7570           STL FUDGE        SLIDEWIRE FEEDBACK IS GREATER
5415  46263  70  7776           ELC -1           - LOWER SET-POINT
5416  46264  44  7571           STL UPDOWN       SET DIRECTION FLAG TO DOWN
5417  46265  34  6271           DJP L+4
5420
5421  46266  5061 00            CML              SLIDEWIRE FEEDBACK IS LESS
5422  46267  44  7570           STL FUDGE        - RAISE SET-POINT
5423  46270  40  7571           STZ UPDOWN   SET DIRECTION FLAG TO UP
5424
5425  46271  12  7570           ENL FUDGE    IS SET-POINT CHANGE GREATER THAN 10
5426  46272  71  7765           ALC -10
5427  46273  67  6335           JLN GOBACK   NO -- DO NOT OUTPUT A CHANGE
```

```
5430
5431  46274  12  7570        ENL FUDGE    YES - IS SET-POINT CHANGE GREATER
5432  46275  71  7715        ALC -50              THAN 50
5433  46276  67  6301        JLN L+3      NO -- OUTPUT CHANGE DETERMINED
5434  46277  70  0062        ELC 50       YES - OUTPUT 50 AS SET-POINT CHANGE
5435  46300  44  7570        STL FUDGE
5436
5437  46301  42  7572        STB HOWFAR   SET-UP B-BOX FOR OUTPUT OF SET-POINT
5440  46302  12  7572        ENL HOWFAR    CHANGE
5441  46303  5046 01         LSL 1
5442  46304  44  7572        STL HOWFAR
5443  46305  32  7572        ENB HOWFAR
5444
5445  46306  12  7571        ENL UPDOWN   IS SET-POINT TO BE LOWERED
5446  46307  65  6311        JLP L+2
5447  46310  37  0001        ABC 1        YES - INCREMENT B-BOX TO LOWER
5450                                              SET-POINT
5451  46311  10  7000        ENU ZEROB
5452  46312  12  7570        ENL FUDGE
5453  46313  5043 01         RSA 1
5454  46314  72  0011        ESR 9        STORE TIME DELAY IN PROPER SLOT
5455  46315  45  7704        STL DELLOC,B  TO MAKE CHANGE
5456  46316  72  0000        ESR 0
5457
5460  46317  42  7572        STB HOWFAR
5461
5462  46320  10  7000        ENU ZEROB    DETERMINE WORD AND BIT INDEX FOR
5463  46321  12  7572        ENL HOWFAR    THIS FCE AND ZONE
5464  46322  26  7015        DIV FORTEN
5465  46323  44  7573        STL OUTWRD
5466  46324  46  7574        STU OUTBIT
5467
5470  46325  30  7174        IRJ NXOBIT   START SET-POINT MOTOR
5471  46326     047573       DEC OUTWRD
5472  46327     047574       DEC OUTBIT
5473  46330     147060       DEC A09500
5474
5475  46331  30  7174        IRJ NXOBIT   TRIGGER TIME DELAY TO STOP SET-POINT
5476  46332     047573       DEC OUTWRD    MOTOR
5477  46333     047574       DEC OUTBIT
5500  46334     237306       DEC TC1TCR
5501
5502  46335  40  7571   GOBACK STZ UPDOWN
5503  46336  55  6256        RTN
5504              046337     RPZ
                  000041     RPT 19712-L
          46337   000000     DEC 0
          46340   000000
          46341   000000
          46342   000000
          46343   000000
          46344   000000
          46345   000000
          46346   000000
          46347   000000
          46350   000000
          46351   000000
          46352   000000
          46353   000000
          46354   000000
          46355   000000
          46356   000000
          46357   000000
          46360   000000
          46361   000000
          46362   000000
          46363   000000
          46364   000000
          46365   000000
          46366   000000
          46367   000000
```

```
       46370    000000
       46371    000000
       46372    000000
       46373    000000
       46374    000000
       46375    000000
       46376    000000
       46377    000000
5505                              EJF
5506            000443            DRM  CTLDRM+16
5507            030000            BLOC 30000
5510   30000    000443            DEC  CTLDRM+16
5511                              ***** EXPECTED DELAY PROGRAM *****
5512
5513   30001  72  0010   EFDLIN   ESR  8        PICK UP THE THUMBWHEEL DATA -----
5514   30002  12  5266            ENL  NSLBTW        NO OF SLABS TILL DELAY BEGINS
5515   30003  10  5267            ENU  DLGHTW        LENGTH OF THE DELAY
5516   30004  72  0000            ESR  0
5517   30005  44  0550            STL  NS2DL
5520   30006  46  0551            STU  DELGTH
5521
5522   30007  10  0550            ENU  NS2DL    CONVERT NS2DL BCD TO BINARY (B0)
5523   30010  36  0000            EBC  0
5524   30011  70  0000            ELC  0
5525   30012  30  4443            IRJ  BCDFIX
5526   30013  44  0550            STL  NS2DL
5527
5530   30014  12  0550            ENL  NS2DL    IS THIS A SPECIAL CASE (NS2DL
5531   30015  71  7645            ALC  -90           GREATER THAN 89)
5532   30016  67  0036            JLN  ISDLAY
5533
5534   30017  71  0036            ALC  30       YES - SAVE REL. MOD. NO.
5535   30020  44  0552            STL  RELMOD            30+(NS2DL-90)
5536
5537   30021  10  0551            ENU  DELGTH   CONVERT DELGTH TO FIX POINT (B9)
5540   30022  70  0011            ELC  9
5541   30023  36  0000            EBC  0
5542   30024  30  4443            IRJ  BCDFIX
5543   30025  44  0551            STL  DELGTH   THIS IS NEW MODIFIER
5544
5545            030026            RFD  TBLELC,GTRK,1
       30026    770446            DM1  63,0,GTRK
       30027    030600            DM2  0,1-1,TBLELC
5546
5547   30030  32  0552            ENB  RELMOD
5550   30031  12  0551            ENL  DELGTH
5551   30032  45  0600            STL  TBLELC,B  STORE THE NEW MODIFIER
5552
5553            030033            LOD  TBLELC,GTRK,1
       30033    774446            DM1  63,1,GTRK
       30034    030600            DM2  0,1-1,TBLELC
5554
5555   30035  55  4446            IJP  ACTION
5556
5557
5560   30036  10  0551   ISDLAY   ENU  DELGTH   CONVERT DELGTH TO FIX POINT (B5)
5561   30037  70  0005            ELC  5
5562   30040  36  0000            EBC  0
5563   30041  30  4443            IRJ  BCDFIX   NOW HAVE DELAY IN HOURS (XX.X)
5564   30042  24  0546            MPL  KCON60
5565   30043  5043 05             RSA  5
5566   30044  44  0551            STL  DELGTH
5567
5570   30045  30  4430            IRJ  LPIO     PICK UP DELAY SELECT VALUE (A07001)
5571   30046    640263            OCT  640263
5572   30047  61  0057            JLZ  ALLDLY
5573   30050  5042 01             RSL  1
5574   30051  61  0056            JLZ  ONEDLY
5575   30052  5042 01             RSL  1
5576   30053  61  0070            JLZ  TWODLY
5577   30054  5042 01             RSL  1
5600   30055  61  0072            JLZ  THRDLY
```

```
5601    30056  55  4446           IJP ACTION
5602
5603    30057  70  7776    ALLDLY ELC -1
5604    30060  44  5271           STL ALLDFG
5605    30061  44  5272           STL 1GOHLD
5606    30062  44  5273           STL 2GOHLD
5607    30063  44  5274           STL 3GOHLD
5610    30064  36  0000           EBC 0
5611    30065  34  0077           DJP NOTDON+3
5612
5613    30066  30  0001    ONEDLY EBC 1
5614    30067  34  0074           DJP NOTDON
5615
5616    30070  36  0002    TWODLY EBC 2
5617    30071  34  0074           DJP NOTDON
5620
5621    30072  36  0003    THRDLY EBC 3
5622    30073  34  0074           DJP NOTDON
5623
5624    30074  70  7776    NOTDON ELC -1
5625    30075  45  5271           STL ALLDFG,B    SET PROPER GOHOLD FOR FCE X
5626    30076  12  0551           ENL DFLGTH
5627    30077  45  5302           STL DFLINT,B    STORE LENGTH OF DELAY IN PROPER
5630    30100  12  0550           ENL NS2DL         SLOT
5631    30101  45  5306           STL DLCTRA,B    STORE NO OF SLABS TILL DELAY IN
5632    30102  55  4446           IJP ACTION        PROPER SLOT
5633                              EJE
5634
5635                                              ***** DELAY OVER-RIDE PROGRAMS *****
5636
5637    30103  70  0000    DOVRD1 ELC 0            SET-UP FOR FCE 1 RUN
5640    30104  44  5256           STL FCNB
5641    30105  34  0113           DJP L+6
5642    30106  70  0001    DOVRD2 ELC 1            SET-UP FOR FCE 2 RUN
5643    30107  44  5256           STL FCNB
5644    30110  34  0113           DJP L+3
5645    30111  70  0002    DOVRD3 ELC 2            SET-UP FOR FCE 3 RUN
5646    30112  44  5256           STL FCNB
5647
5650    30113  30  4424           IRJ KNXOBT      TURN ON FCE X DELAY OVER-RIDE IL
5651    30114      030545         DEC ZEROWD
5652    30115      035256         DEC FCNB
5653    30116      147031         DEC A07600
5654    30117  30  4425           IRJ KNXZBT      TURN OFF FCE X HEAT DELAY FLAG
5655    30120      030545         DEC ZEROWD
5656    30121      035256         DEC FCNB
5657    30122      236005         DEC PX0000
5660
5661
5662    30123  12  5255           ENL SIDNB       STORE ID NO IN DELAY OVER-RIDE
5663    30124  44  5315           STL DLOOBF        OUTPUT BUFFER
5664    30125  30  4426           IRJ KFLAGO      INITIATE DELAY OVER-RIDE ALARM
5665    30126      234065         OCT 234065        (MCDOVR)
5666    30127  30  4427           IRJ KFLAGZ      TURN OFF HEAT DELAY IL  (A00530)
5667    30130      247053         OCT 247053
5670    30131  12  5257           ENL MPCTM       STORE MILL PACE TIME IN DELAY
5671    30132  44  5314           STL MPTDSR        OVER-RIDE OUTPUT BUFFER
5672    30133  12  5264           ENL HTDLFG      WAS THIS A HEAT DELAY
5673    30134  65  0443           JLP CHKHET      NO -- GO TO CHECK HEAT
5674    30135  40  5264           STZ HTDLFG      YES - CLEAR HEAT DELAY FLAG AND
5675    30136  34  0510           DJP OTEXPD        GO ON TO STORE TIME
5676                              EJE
5677                                              ***** EXTRACT INITIATE PROGRAMS *****
5700
5701    30137  70  0002    EXIT1  ELC 2           SET-UP TO RUN FCE 3
5702    30140  44  5256           STL FCNB
5703    30141  34  0147           DJP EXITX
5704
5705    30142  70  0000    EXIT2  ELC 0           SET-UP TO RUN FCE 1
5706    30143  44  5256           STL FCNB
5707    30144  34  0147           DJP EXITX
```

```
5710
5711  30145  70  0001   EXIT3   ELC 1              SET-UP TO RUN FCE 2
5712  30146  44  5256           STL FCNB
5713
5714  30147  72  0012   EXITX   ESR 10             PICK UP MILL PACE TIME AND
5715  30150  10  0146           ENU TX             CONVERT TO FIX POINT (BO)
5716  30151  72  0000           ESR 0
5717  30152  70  0000           ELC 0
5720  30153  36  0000           EBC 0
5721  30154  30  4431           IRJ FLFXCV
5722  30155  46  5257           STU MPCTM
5723
5724  30156  32  5256   EXITCK  ENR FCNB           IS FCE X GOING ON HOLD
5725  30157  13  5272           ENL 1GOHLD,B       (XGOHLD IS NEG)
5726  30160  67  0173           JLN EXSKP
5727  30161  72  0014           ESR 12             NO -- IS FCE X ON HOLD NOW
5730  30162  13  7320           ENL HLDLOC,B
5731  30163  72  0000           ESR 0
5732  30164  65  0237           JLP CNPM
5733  30165  12  5256           ENL FCNB           YES - GO ON TO CHECK NEXT
5734  30166  71  7776           ALC -1                 SEQUENTIAL FURNACE
5735  30167  65  0171           JLP L+2
5736  30170  70  0002           ELC 2
5737  30171  44  5256           STL FCNB
5740  30172  34  0156           DJP EXITCK
5741
5742
5743  30173  12  5271   EXSKP   ENL ALLDFG         FCE X GOING ON HOLD - IS IT
5744  30174  67  0202           JLN DCRALL         AN ALL FCE HOLD
5745  30175  13  5307           ENL DLCTR1,B       NO -- DECREMENT FCE X NO OF
5746  30176  61  0207           JLZ STDLYF            SLABS TO GO COUNTER
5747  30177  71  7776           ALC -1
5750  30200  45  5307           STL DLCTR1,B
5751  30201  34  0237           DJP CNPM
5752
5753  30202  12  5306   DCRALL  ENL DLCTRA
5754  30203  61  0217           JLZ STDLYA
5755  30204  71  7776           ALC -1
5756  30205  44  5306           STL DLCTRA
5757  30206  34  0237           DJP CNPM
5760
5761  30207  41  5272   STDLYF  STZ 1GOHLD,B       FCE X NO OF SLAB TO GO IS NOW
5762  30210  70  7777           ELC -0             ZERO, INITIATE THE DELAY
5763  30211  11  5303           ENU DLINT1,B
5764  30212  72  0014           ESR 12
5765  30213  45  7320           STL HLDLOC,B
5766  30214  47  7323           STU HLDTIM,B
5767  30215  72  0000           ESR 0
5770  30216  34  0237           DJP CNPM
5771
5772  30217  70  7777   STDLYA  ELC -0             NO OF SLABS TO GO IS NOW ZERO,
5773  30220  10  5302           ENU DELINT         INITIATE A DELAY FOR ALL THREE
5774  30221  72  0014           ESR 12             FURNACES
5775  30222  44  7320           STL HLDLOC
5776  30223  44  7321           STL HLDLOC+1
5777  30224  44  7322           STL HLDLOC+2
6000  30225  46  7323           STU HLDTIM+0
6001  30226  46  7324           STU HLDTIM+1
6002  30227  46  7325           STU HLDTIM+2
6003  30230  72  0000           ESR 0
6004  30231  40  5302           STZ DELINT
6005  30232  40  5271           STZ ALLDFG
6006  30233  40  5272           STZ 1GOHLD
6007  30234  40  5273           STZ 2GOHLD
6010  30235  40  5274           STZ 3GOHLD
6011  30236  34  0237           DJP CNPM
6012
6013  30237  72  0014   CNPM    ESR 12             PICK UP FCE X CONTROL MAP EXTRACT
6014  30240  11  7243           ENU CTLMPO,B       INDEX AND DFCODE
6015  30241  72  0000           ESR 0
6016  30242  70  0000           ELC 0
```

```
6017   30243   5047  13            LSA  11
6020   30244   44    0555           STL  EXTTRK
6021   30245   70    0000           ELC  0
6022   30246   5047  07             LSA  7
6023   30247   44    0556           STL  EXTLOC
6024   30250   12    0556           ENL  EXTLOC          BACK UP TWO SLABS AND BEGIN
6025   30251   71    7737           ALC  -32               ID NO CHECK
6026   30252   67    0255           JLV  L+3
6027   30253   44    0556           STL  EXTLOC
6030   30254   34    0270           DJP  EXTIDC
6031   30255   71    0160           ALC  112             MUST CHANGE TRACKS TO BACK UP,
6032   30256   44    0556           STL  EXTLOC             SET-UP REL LOC
6033   30257   12    0555           ENL  EXTTRK          DECREMENT TRACK NO AND LIMIT CHECK
6034   30260   71    7776           ALC  -1
6035   30261   72    0014           ESR  12
6036   30262   03    7260           CPL  BLODRM,B
6037   30263   55    0266           JGE  L+3
6040   30264   13    7263           ENL  BHIDRM,B
6041   30265   71    7776           ALC  -1
6042   30266   72    0000           ESR  0
6043   30267   44    0555           STL  EXTTRK
6044
6045
6046   30270   70    0005   EXTIDC  ELC  5
6047   30271   44    0557           STL  IDPASS
6050   30272   12    5256           ENL  FCNB
6051   30273   71    7776           ALC  -1
6052   30274   24    0542           MPL  KCON50
6053   30275   44    0554           STL  FCEDBA
6054
6055   30276   32    0554   FCDBCK  ENB  FCEDBA          IS DATA IN FCE X SOUTH SLAB
6056   30277   13    5400           ENL  F1SSDB,B          DATA BLOCK
6057   30300   63    0306           JLT  CTLCHK
6060   30301   37    0031           ABC  25
6061   30302   42    0554           STB  FCEDBA
6062   30303   13    5400           ENL  F1SSDB,B        NO -- IS DATA IN NORTH SLAB
6063   30304   63    0306           JLT  CTLCHK            DATA BLOCK
6064   30305   55    4446           IJP  ACTION
6065
6066   30306   44    0573   CTLCHK  STL  3IDNBR          SAVE FCE X (NORTH-SOUTH) SLAB
6067   30307   12    0555           ENL  EXTTRK            DATA BLOCK ID
6070   30310   74    0311           STA  L+1
6071           030311                RFD  TRLELC,XX,1    READ IN CONTROL MAP TRACK
       30311   770000                DM1  63,0,XX
       30312   030600                DM2  0,1-1,TRLELC
6072
6073   30313   32    0556           ENB  EXTLOC
6074   30314   13    0600           ENL  TRLELC,B       PICK UP CONTROL MAP ID NUMBER
6075   30315   16    0573           SUB  3IDNBR
6076   30316   61    0346           JLZ  FNDTRK
6077
6100   30317   12    0556           ENL  EXTLOC
6101   30320   71    0020           ALC  16
6102   30321   44    0556           STL  EXTLOC
6103   30322   02    0541           CPL  RELMNT         IS THERE MORE DATA ON THIS TRACK
6104   30323   67    0336           JOL  ETRKOK
6105   30324   70    0000           ELC  0              NO -- PREPARE TO CHANGE TRACKS
6106   30325   44    0556           STL  EXTLOC
6107   30326   12    0555           ENL  EXTTRK
6110   30327   71    0001           ALC  1
6111   30330   72    0014           ESR  12
6112   30331   03    7263           CPL  BHIDRM,B
6113   30332   67    0334           JOL  L+2
6114   30333   13    7260           ENL  BLODRM,B
6115   30334   72    0000           ESR  0
6116   30335   44    0555           STL  EXTTRK
6117   30336   12    0557   ETRKOK  ENL  IDPASS         HAVE FIVE SLABS BEEN CHECKED
6120   30337   71    0001           ALC  1
6121   30340   63    0342           JLT  L+2
6122   30341   55    4446           IJP  ACTION
6123   30342   44    0557           STL  IDPASS         NO -- CHECK NEXT SLAB
```

```
6124    30343   12  0556            ENL EXTLOC
6125    30344   61  0307            JLZ CTLCHK+1    READ IN NEXT TRACK
6126    30345   34  0313            DJP CTLCHK+5    DATA IN - MAKE NEXT CHECK
6127
6130
6131    30346   12  0555    FNDTRK  ENL EXTTRK      TRACK AND REL LOC HAS BEEN FOUND -
6132    30347   5046 07             LSL 7            STORE A CORRECTED EXTRACT INDEX IN
6133    30350   14  0556            ADD EXTLOC       THE CONTROL MAP
6134    30351   32  5256            ENR FCNR
6135    30352   72  0014            ESR 12
6136    30353   45  7243            STL CTLMPO,B
6137    30354   72  0000            ESR 0
6140
6141    30355   32  0556            ENR EXTLOC      PICK UP ALL DATA NEEDED FROM
6142    30356   13  0601            ENL TBLELC+1,B   THE CTL MAP
6143    30357   44  0574            STL 3GRADE
6144    30360   13  0604            ENL TBLELC+4,B  GRADE
6145    30361   44  0575            STL 3THICK      THICKNESS
6146    30362   13  0617            ENL TBLELC+15,B
6147    30363   44  0576            STL 3SOAKT      SOAK ZONE ENTRY TIME
6150
6151    30364   12  0574            ENL 3GRADE      TRANSFER THIS GRADE TO THE DATA
6152    30365   32  0554            ENR FCEDBA       BLOCK
6153    30366   45  5407            STL F1SSDB+7,B
6154    30367   52  0544            AND DLYMSK      WAS THIS SLAB EVER IN A DELAY
6155    30370   63  0517            JLT ALLGO       YES - SKIP CHECKS ON THIS SLAB
6156
6157            030371              RFD TBLELC,GTRK,1
        30371   770446              DM1 63,0,GTRK
        30372   030600              DM2 0,1-1,TBLELC
6160    30373   32  5256            ENB FCNR
6161    30374   13  0644            ENL TBLELC+36,B
6162    30375   44  0557            STL 3KMOD2
6163
6164    30376   10  0574            ENU 3GRADE      ADJUST GRADE FOR TABLE LOOK-UP
6165    30377   70  0000            ELC 0
6166    30400   5047 06             LSA 6
6167    30401   61  0412            JLZ L+9
6170    30402   71  7776            ALC -1
6171    30403   61  0412            JLZ L+7
6172    30404   02  0543            CPL KCON05                  LIMIT GRADE TO 1-5
6173    30405   67  0407            JOL L+2
6174    30406   70  0004            ELC 4
6175    30407   44  0556            STL GRDEAB
6176    30410   70  0006            ELC 6
6177    30411   24  0556            MPL GRDEAB
6200    30412   44  0556            STL GRDEAB
6201
6202    30413   12  0575            ENL 3THICK
6203    30414   16  5334            SUB BASENO
6204    30415   5043 05             RSA 5
6205    30416   14  0556            ADD GRDEAB
6206    30417   45  5341            STL SAVBBX,B    THIS IS REL LOC FOR TABLE LOOK-UP
6207                                                FOR THIS SLAB
6210    30420   33  5341            ENR SAVBBX,B
6211    30421   13  0655            ENL TBLELC+45,B
6212    30422   44  0555            STL REQSOK
6213
6214    30423   72  0010            ESR 8
6215    30424   12  1223            ENL CLOCK
6216    30425   72  0000            ESR 0
6217    30426   44  0554            STL PRSNTT      THIS IS THE TIME NOW
6220    30427   16  0576            SUB 3SOAKT
6221    30430   65  0432            JLP L+2
6222    30431   14  0540            ADD DAYSEC
6223    30432   14  5257            ADD MPCTM
6224    30433   16  0555            SUB REQSOK      WAS THIS SLAB IN SOAK LONG ENOUGH
6225    30434   65  0445            JLP CHKHET+2    YES - GO ON TO CHECK HEAT
6226
6227    30435   5061 00             CML             NO -- DETERMINE LENGTH OF TIME TO WAIT
6230    30436   14  5257            ADD MPCTM
```

```
6231   30437  44  5314        STL MPTDSR     STORE TIME IN DELAY OVER-RIDE
6232   30440  30  4426        IRJ KFLAGO      OUTPUT BUFFER TIME DELAY FOR SOAK
6233   30441      234063      OCT 234063      ZONE ALARM (MCSKZD)
6234   30442  34  0504        DJP DNTEXP
6235
6236
6237
6240
6241          030443   CHKHET RFD TBLELC,GTRK,1
       30443  770446          DM1 63,0,GTRK
       30444  030600          DM2 0,1-1,TBLELC
6242
6243   30445  32  5256        ENB FCNB       PICK UP LAST CALCULATED HEAT
6244   30446  72  0014        ESR 12           IN HEAT ZONE
6245   30447  13  7312        ENL HEATCK,B
6246   30450  72  0000        ESR 0
6247   30451  44  0551        STL CALHET
6250
6251   30452  13  0636        ENL TBLELC+30,B  PICK UP KO FOR FCE X
6252   30453  44  0553        STL NDEDHT
6253
6254   30454  33  5341        ENB SAVRBX,B   PICK UP THE NEEDED HEAT FOR
6255   30455  13  0600        ENL TBLFLC,B    THIS SLAB
6256
6257   30456  24  0553        MPL NDEDHT
6260   30457  5043 11         RSA 9
6261   30460  44  0553        STL NDEDHT     NDEDHT =      KO * REQHT
6262
6263   30461  24  5277        MPL 3P0189
6264   30462  5043 11         RSA 9
6265   30463  44  0550        STL HTOLRC     HTOLRC =     .01 * NDEDHT
6266
6267
6270   30464  12  0553        ENL NDEDHT     IS THE SLAB HOT ENOUGH
6271   30465  16  0551        SUB CALHET
6272   30466  67  0517        JLN ALLGO      YES - NO DELAY NEEDED
6273   30467  44  0552        STL HOFSET     DIFFERENCE BETWEEN CALC AND REQD HEAT
6274
6275   30470  16  0550        SUB HTOLRC     IS DIFFERENCE WITHIN LIMITS
6276   30471  67  0517        JLN ALLGO      YES - NO DELAY NEEDED
6277
6300   30472  70  7776        ELC -1         SET THE HEAT DELAY FLAG
6301   30473  44  5264        STL HTDLFG
6302   30474  70  0000        ELC 0          DETERMINE LENGTH OF TIME TO WAIT
6303   30475  5047 22         LSA 18
6304   30476  12  0552        ENL HOFSET
6305   30477  26  5340        DIV TEN10
6306   30500  14  5257        ADD MPCTM
6307   30501  44  5314        STL MPTDSR     STORE TIME IN DELAY OVER-RIDE OUTPUT
6310   30502  30  4426        IRJ KFLAGO      BUFFER TIME DELAY FOR HEAT ZONE
6311   30503      234064      OCT 234064      ALARM (MCHDLC)
6312
6313   30504  30  4424  DNTEXP IRJ KNXOBT    TURN ON FCE X HEAT DELAY FLAG
6314   30505      030545      DEC ZEROWD
6315   30506      035256      DEC FCNB
6316   30507      236005      DEC PX0000
6317
6320   30510  10  5314  OTEXPD ENU MPTDSB    RESTORE TIME TO MILL PACE
6321   30511  70  0000        ELC 0
6322   30512  30  4432        IRJ FXFLCV
6323   30513  72  0012        ESR 10
6324   30514  46  0146        STU TX
6325   30515  72  0000        ESR 0
6326   30516  55  4446        IJP ACTION
6327
6330
6331
6332
6333   30517  30  4425  ALLGO  IRJ KNXZBT
6334   30520      030545      DEC ZEROWD
6335   30521      035256      DEC FCNB
```

```
6336    30522    147031           DEC A07600
6337    30523    55 4446          IJP ACTION
6340             000014           BRPT 30540-L
6341    30524    000000           OCT 0
        30525    000000
        30526    000000
        30527    000000
        30530    000000
        30531    000000
        30532    000000
        30533    000000
        30534    000000
        30535    000000
        30536    000000
        30537    000000
6342    30540    250600   DAYSEC  DEC 86400
6343    30541    000161   RELMNT  OCT 161
6344    30542    000062   KCON50  OCT 62
6345    30543    000005   KCON05  OCT 5
6346    30544    001000   DLYMSK  OCT 1000
6347    30545    000000   ZEROWD  OCT 0
6350    30546    000074   KCON60  OCT 74
6351    30547    000000           OCT 0
6352             030550   NS?DL   EQU L
6353    30550    000000   HTOLRC  OCT
6354             030551   DELGTH  EQU L
6355    30551    000000   CALHET  OCT
6356             030552   RELMOD  EQU L
6357    30552    000000   HOFSET  OCT
6360             030553   DLYSEL  EQU L
6361    30553    000000   NDFDHT  OCT
6362             030554   FCEDBA  EQU L
6363    30554    000000   PRSNTT  OCT
6364             030555   EXTTRK  EQU L
6365    30555    000000   REQSOK  OCT
6366             030556   EXTLOC  EQU L
6367    30556    000000   GRDEAR  OCT
6370             030557   IDPASS  EQU L
6371    30557    000000   3KMOD2  OCT
6372    30560    000000           OCT 0,0,0,0,0,0,0,0
        30561    000000
        30562    000000
        30563    000000
        30564    000000
        30565    000000
        30566    000000
        30567    000000
6373    30570    000000           OCT 0,0,0
        30571    000000
        30572    000000
6374    30573    000000   3IDNBR  OCT 0
6375    30574    000000   3GRADE  OCT 0
6376    30575    000000   3THICK  OCT 0
6377    30576    000000   3SOAKT  OCT 0
6400    30577    000000           OCT 0
6401             000000           END
COMBUSTION CONTROL DATA TRACKS (REVISED)

6                                EJE
 7              030446            DRM CTLDRM+21
10              046400            LOC TABLOC
11
12                                ***** REQUIRED HALF-HEATS FOR GRADE 1 *****
13      46400   134450            DEC 47400          6 INCH SLAB
14      46401   153330            DEC 55000          7 INCH SLAB
15      46402   173422            DEC 63250          8 INCH SLAB
16      46403   212530            DEC 71000          9 INCH SLAB
17      46404   212530            DEC 71000          9 INCH SLAB
20      46405   232230            DEC 79000         10 INCH SLAB
21      46406   251730            DEC 87000         11 INCH SLAB
22
```

```
                              ***** REQUIRED HALF-HEATS FOR GRADE 2 *****
23
24    46407    134450         DEC 47400         6 INCH SLAB
25    46410    153330         DEC 55000         7 INCH SLAB
26    46411    173422         DEC 63250         8 INCH SLAB
27    46412    212530         DEC 71000         9 INCH SLAB
30    46413    232230         DEC 79000        10 INCH SLAB
31    46414    251730         DEC 87000        11 INCH SLAB
32
33                            ***** REQUIRED HALF-HEATS FOR GRADE 3 *****
34    46415    134450         DEC 47400         6 INCH SLAB
35    46416    153330         DEC 55000         7 INCH SLAB
36    46417    173422         DEC 63250         8 INCH SLAB
37    46420    212530         DEC 71000         9 INCH SLAB
40    46421    232230         DEC 79000        10 INCH SLAB
41    46422    251730         DEC 87000        11 INCH SLAB
42
43                            ***** REQUIRED HALF-HEATS FOR GRADE 4 *****
44    46423    134450         DEC 47400         6 INCH SLAB
45    46424    153330         DEC 55000         7 INCH SLAB
46    46425    173422         DEC 63250         8 INCH SLAB
47    46426    212530         DEC 71000         9 INCH SLAB
50    46427    232230         DEC 79000        10 INCH SLAB
51    46430    251730         DEC 87000        11 INCH SLAB
52
53                            ***** REQUIRED HALF-HEATS FOR GRADE 5 *****
54    46431    134450         DEC 47400         6 INCH SLAB
55    46432    153330         DEC 55000         7 INCH SLAB
56    46433    173422         DEC 63250         8 INCH SLAB
57    46434    212530         DEC 71000         9 INCH SLAB
60    46435    232230         DEC 79000        10 INCH SLAB
61    46436    251730         DEC 87000        11 INCH SLAB
62
63
64                            ***** MODIFIER K0 *****
65    46437    001000         DEC 1.089         FCE 1
66    46440    001000         DEC 1.089         FCE 2
67    46441    001000         DEC 1.089         FCE 3
70
71                            ***** MODIFIER K1 *****
72    46442    001000         DEC 1.089         FCE 1
73    46443    001000         DEC 1.089         FCE 2
74    46444    001000         DEC 1.089         FCE 3
75
76                            ***** MODIFIER K2 *****
77    46445    001000         DEC 1.089         FCE 1
100   46446    001000         DEC 1.089         FCE 2
101   46447    001000         DEC 1.089         FCE 3
102
103
104
105   46450    000000         DEC 0
106   46451    000000         DEC 0
107   46452    000000         DEC 0
110   46453    000000         DEC 0
111   46454    000000         DEC 0
112   46455    000000         DEC 0
113
114
115                           ***** REQUIRED SOAK TIME (SECONDS) FOR GRADE 1 *****
116   46456    003142         DEC 1634          6 INCH SLAB (0.454 HOURS)
117   46457    003703         DEC 1987          7 INCH SLAB (0.552 HOURS)
120   46460    004475         DEC 2365          8 INCH SLAB (0.657 HOURS)
121   46461    005346         DEC 2790          9 INCH SLAB (0.775 HOURS)
122   46462    006272         DEC 3258         10 INCH SLAB (0.905 HOURS)
123   46463    007414         DEC 3852         11 INCH SLAB (1.070 HOURS)
124
125                           ***** REQUIRED SOAK TIME (SECONDS) FOR GRADE 2 *****
126   46464    003142         DEC 1634          6 INCH SLAB (0.454 HOURS)
127   46465    003703         DEC 1987          7 INCH SLAB (0.552 HOURS)
130   46466    004475         DEC 2365          8 INCH SLAB (0.657 HOURS)
131   46467    005346         DEC 2790          9 INCH SLAB (0.775 HOURS)
132   46470    006272         DEC 3258         10 INCH SLAB (0.905 HOURS)
133   46471    007414         DEC 3852         11 INCH SLAB (1.070 HOURS)
```

```
134
135                       ooooo REQUIRED SOAK TIME (SECONDS) FOR GRADE 3 ooooo
136   46472  003142       DEC 1634                6 INCH SLAB (0.454 HOURS)
137   46473  003703       DEC 1987                7 INCH SLAB (0.552 HOURS)
140   46474  004475       DEC 2365                8 INCH SLAB (0.657 HOURS)
141   46475  005346       DEC 2790                9 INCH SLAB (0.775 HOURS)
142   46476  006272       DEC 3258               10 INCH SLAB (0.905 HOURS)
143   46477  007414       DEC 3852               11 INCH SLAB (1.070 HOURS)
144
145                       ooooo REQUIRED SOAK TIME (SECONDS) FOR GRADE 4 ooooo
146   46500  003142       DEC 1634                6 INCH SLAB (0.454 HOURS)
147   46501  003703       DEC 1987                7 INCH SLAB (0.552 HOURS)
150   46502  004475       DEC 2365                8 INCH SLAB (0.657 HOURS)
151   46503  005346       DEC 2790                9 INCH SLAB (0.775 HOURS)
152   46504  006272       DEC 3258               10 INCH SLAB (0.905 HOURS)
153   46505  007414       DEC 3852               11 INCH SLAB (1.070 HOURS)
154
155                       ooooo REQUIRED SOAK TIME (SECONDS) FOR GRADE 5 ooooo
156   46506  003142       DEC 1634                6 INCH SLAB (0.454 HOURS)
157   46507  003703       DEC 1987                7 INCH SLAB (0.552 HOURS)
160   46510  004475       DEC 2365                8 INCH SLAB (0.657 HOURS)
161   46511  005346       DEC 2790                9 INCH SLAB (0.775 HOURS)
162   46512  006272       DEC 3258               10 INCH SLAB (0.905 HOURS)
163   46513  007414       DEC 3852               11 INCH SLAB (1.070 HOURS)
164
165
166
167          000064       ORPT 46600-L
171          000447       DRM CYLDRM+22
172          046400       LOC TABLUC
173
174                       ooooo CONSTANTS FOR TF-TS CHECK ooooo
175   46400  000000       DEC 0
176   46401  000144       DEC 100
177   46402  000454       DEC 300
200   46403  000764       DEC 500
201   46404  001274       DEC 700
202   46405  001604       DEC 900
203   46406  002114       DEC 1100
204   46407  002424       DEC 1300
205   46410  002734       DEC 1500
206   46411  003244       DEC 1700
207   46412  003554       DEC 1900
210
211                       ooooo TF = 1800 ooooo
212   46413  000111       DEC 73
213   46414  000104       DEC 68
214   46415  000074       DEC 60
215   46416  000063       DEC 51
216   46417  000055       DEC 45
217   46420  000046       DEC 38
220   46421  000041       DEC 33
221   46422  000034       DEC 28
222   46423  000026       DEC 22
223   46424  000022       DEC 18
224   46425  000021       DEC 17
225
226                       ooooo TF = 1900 ooooo
227   46426  000121       DEC 81
230   46427  000111       DEC 73
231   46430  000101       DEC 65
232   46431  000070       DEC 56
233   46432  000062       DEC 50
234   46433  000054       DEC 44
235   46434  000045       DEC 37
236   46435  000040       DEC 32
237   46436  000033       DEC 27
240   46437  000027       DEC 23
241   46440  000026       DEC 22
242
243                       ooooo TF = 2000 ooooo
```

```
244   46441   000137     DEC 95
245   46442   000122     DEC 82
246   46443   000111     DEC 73
247   46444   000100     DEC 64
250   46445   000071     DEC 57
251   46446   000063     DEC 51
252   46447   000056     DEC 46
253   46450   000050     DEC 40
254   46451   000044     DEC 36
255   46452   000041     DEC 33
256   46453   000040     DEC 32
257
260                                 ***** TF = 2100 *****
261   46454   000153     DEC 107
262   46455   000141     DEC 97
263   46456   000126     DEC 86
264   46457   000114     DEC 76
265   46460   000101     DEC 65
266   46461   000074     DEC 60
267   46462   000066     DEC 54
270   46463   000060     DEC 48
271   46464   000053     DEC 43
272   46465   000046     DEC 38
273   46466   000045     DEC 37
274
275                                 ***** TF = 2200 *****
276   46467   000166     DEC 118
277   46470   000156     DEC 110
300   46471   000141     DEC 97
301   46472   000126     DEC 86
302   46473   000114     DEC 76
303   46474   000104     DEC 68
304   46475   000076     DEC 62
305   46476   000067     DEC 55
306   46477   000062     DEC 50
307   46500   000056     DEC 46
310   46501   000054     DEC 44
311
312                                 ***** TF = 2300 *****
313   46502   000202     DEC 130
314   46503   000173     DEC 123
315   46504   000142     DEC 98
316   46505   000127     DEC 87
317   46506   000117     DEC 79
320   46507   000110     DEC 72
321   46510   000100     DEC 64
322   46511   000071     DEC 57
323   46512   000065     DEC 53
324   46513   000062     DEC 50
325
326                                 ***** TF = 2400 *****
327   46514   000225     DEC 149
330   46515   000212     DEC 138
331   46516   000175     DEC 125
332   46517   000160     DEC 112
333   46520   000144     DEC 100
334   46521   000131     DEC 89
335   46522   000121     DEC 81
336   46523   000111     DEC 73
337   46524   000101     DEC 65
340   46525   000075     DEC 61
341   46526   000071     DEC 57
342
343                                 ***** TF = 2500 *****
344   46527   000237     DEC 159
345   46530   000231     DEC 153
346   46531   000213     DEC 139
347   46532   000176     DEC 126
350   46533   000163     DEC 115
351   46534   000147     DEC 103
352   46535   000136     DEC 94
353   46536   000127     DEC 87
```

```
354    46537    000117          DEC 79
355    46540    000112          DEC 74
356    46541    000106          DEC 70
357
360
361             064246          RPT 46600-L
362    46542    000000          DEC 0
       46543    000000
       46544    000000
       46545    000000
       46546    000000
       46547    000000
       46550    000000
       46551    000000
       46552    000000
       46553    000000
       46554    000000
       46555    000000
       46556    000000
       46557    000000
       46560    000000
       46561    000000
       46562    000000
       46563    000000
       46564    000000
       46565    000000
       46566    000000
       46567    000000
       46570    000000
       46571    000000
       46572    000000
       46573    000000
       46574    000000
       46575    000000
       46576    000000
       46577    000000
       46600    000000
       46601    000000
       46602    000000
       46603    000000
       46604    000000
       46605    000000
       46606    000000
       46607    000000
       46610    000000
       46611    000000
       46612    000000
       46613    000000
       46614    000000
       46615    000000
       46616    000000
       46617    000000
       46620    000000
       46621    000000
       46622    000000
       46623    000000
       46624    000000
       46625    000000
       46626    000000
       46627    000000
       46630    000000
       46631    000000
       46632    000000
       46633    000000
       46634    000000
       46635    000000
       46636    000000
       46637    000000
       46640    000000
       46641    000000
       46642    000000
       46643    000000
```

```
            46754     000000
            46755     000000
            46756     000000
            46757     000000
            46760     000000
            46761     000000
            46762     000000
            46763     000000
            46764     000000
            46765     000000
            46766     000000
            46767     000000
            46770     000000
            46771     000000
            46772     000000
            46773     000000
            46774     000000
            46775     000000
            46776     000000
            46777     000000
            47000     000000
            47001     000000
            47002     000000
            47003     000000
            47004     000000
            47005     000000
            47006     000000
            47007     000000
363                                EJE
364         000450                 DRM CTLDRM+23
365         046400                 LOC TABLOC
366
367                                ********** TIME TABLE FOR PHASE-1 LOOK-UP **********
370
371         46400     000550   CZTIM1 DEC 0360        TIME = 0.1 HOURS
372         46401     001320          DEC 0720        TIME = 0.2 HOURS
373         46402     002070          DEC 1080        TIME = 0.3 HOURS
374         46403     002640          DEC 1440        TIME = 0.4 HOURS
375         46404     003410          DEC 1800        TIME = 0.5 HOURS
376         46405     004160          DEC 2160        TIME = 0.6 HOURS
377         46406     004730          DEC 2520        TIME = 0.7 HOURS
400         46407     005500          DEC 2880        TIME = 0.8 HOURS
401         46410     006250          DEC 3240        TIME = 0.9 HOURS
402         46411     007020          DEC 3600        TIME = 1.0 HOURS
403         46412     007570          DEC 3960        TIME = 1.1 HOURS
404         46413     010340          DEC 4320        TIME = 1.2 HOURS
405         46414     011110          DEC 4680        TIME = 1.3 HOURS
406         46415     011660          DEC 5040        TIME = 1.4 HOURS
407         46416     012430          DEC 5400        TIME = 1.5 HOURS
410         46417     013200          DEC 5760        TIME = 1.6 HOURS
411         46420     013750          DEC 6120        TIME = 1.7 HOURS
412         46421     014520          DEC 6480        TIME = 1.8 HOURS
413         46422     015270          DEC 6840        TIME = 1.9 HOURS
414         46423     016040          DEC 7200        TIME = 2.0 HOURS
415         46424     016610          DEC 7560        TIME = 2.1 HOURS
416         46425     017360          DEC 7920        TIME = 2.2 HOURS
417         46426     020130          DEC 8280        TIME = 2.3 HOURS
420
421                                ********** TIME TABLE FOR PHASE-2 LOOK-UP **********
422
423         46427     000264   CZTIM2 DEC 0180        TIME = 0.05 HOURS
424         46430     000550          DEC 0360        TIME = 0.10 HOURS
425         46431     001034          DEC 0540        TIME = 0.15 HOURS
426         46432     001320          DEC 0720        TIME = 0.20 HOURS
427         46433     001604          DEC 0900        TIME = 0.25 HOURS
430         46434     002070          DEC 1080        TIME = 0.30 HOURS
431         46435     002354          DEC 1260        TIME = 0.35 HOURS
432         46436     002640          DEC 1440        TIME = 0.40 HOURS
433         46437     003124          DEC 1620        TIME = 0.45 HOURS
434         46440     003410          DEC 1800        TIME = 0.50 HOURS
435
436                                ********** TIME TABLE FOR PHASE-3 LOOK-UP **********
```

| | |
|---|---|
| 46644 | 000000 |
| 46645 | 000000 |
| 46646 | 000000 |
| 46647 | 000000 |
| 46650 | 000000 |
| 46651 | 000000 |
| 46652 | 000000 |
| 46653 | 000000 |
| 46654 | 000000 |
| 46655 | 000000 |
| 46656 | 000000 |
| 46657 | 000000 |
| 46660 | 000000 |
| 46661 | 000000 |
| 46662 | 000000 |
| 46663 | 000000 |
| 46664 | 000000 |
| 46665 | 000000 |
| 46666 | 000000 |
| 46667 | 000000 |
| 46670 | 000000 |
| 46671 | 000000 |
| 46672 | 000000 |
| 46673 | 000000 |
| 46674 | 000000 |
| 46675 | 000000 |
| 46676 | 000000 |
| 46677 | 000000 |
| 46700 | 000000 |
| 46701 | 000000 |
| 46702 | 000000 |
| 46703 | 000000 |
| 46704 | 000000 |
| 46705 | 000000 |
| 46706 | 000000 |
| 46707 | 000000 |
| 46710 | 000000 |
| 46711 | 000000 |
| 46712 | 000000 |
| 46713 | 000000 |
| 46714 | 000000 |
| 46715 | 000000 |
| 46716 | 000000 |
| 46717 | 000000 |
| 46720 | 000000 |
| 46721 | 000000 |
| 46722 | 000000 |
| 46723 | 000000 |
| 46724 | 000000 |
| 46725 | 000000 |
| 46726 | 000000 |
| 46727 | 000000 |
| 46730 | 000000 |
| 46731 | 000000 |
| 46732 | 000000 |
| 46733 | 000000 |
| 46734 | 000000 |
| 46735 | 000000 |
| 46736 | 000000 |
| 46737 | 000000 |
| 46740 | 000000 |
| 46741 | 000000 |
| 46742 | 000000 |
| 46743 | 000000 |
| 46744 | 000000 |
| 46745 | 000000 |
| 46746 | 000000 |
| 46747 | 000000 |
| 46750 | 000000 |
| 46751 | 000000 |
| 46752 | 000000 |
| 46753 | 000000 |

```
437
440    46441    001320    HZTIME DEC 0720           TIME = 0.2 HOURS
441    46442    002640           DEC 1440           TIME = 0.4 HOURS
442    46443    004160           DEC 2160           TIME = 0.6 HOURS
443    46444    005500           DEC 2880           TIME = 0.8 HOURS
444    46445    007020           DEC 3600           TIME = 1.0 HOURS
445    46446    010340           DEC 4320           TIME = 1.2 HOURS
446    46447    011660           DEC 5040           TIME = 1.4 HOURS
447    46450    013200           DEC 5760           TIME = 1.6 HOURS
450    46451    014520           DEC 6480           TIME = 1.8 HOURS
451    46452    016040           DEC 7200           TIME = 2.0 HOURS
452
453                              ********** HEAT TABLE FOR PHASE-2 LOOK-UP ******
454
455    46453    011610    CZHEAT DEC 050000/10
456    46454    023420           DEC 100000/10
457    46455    752061           DEC 150000/10
460    46456    763671           DEC 200000/10
461    46457    775501           DEC 250000/10
462    46460    007311           DEC 300000/10
463    46461    021121           DEC 350000/10
464    46462    747563           DEC 400000/10
465    46463    761373           DEC 450000/10
466    46464    773203           DEC 500000/10 .
467
470                              ********** HEAT TABLE FOR PHASE-3 LOOK-UP ******
471
472    46465    002734    HZHEAT DEC 015000/10
473    46466    003720           DEC 020000/10
474    46467    004704           DEC 025000/10
475    46470    005670           DEC 030000/10
476    46471    006654           DEC 035000/10
477    46472    007640           DEC 040000/10
500    46473    010624           DEC 045000/10
501    46474    011610           DEC 050000/10
502    46475    012574           DEC 055000/10
503    46476    013560           DEC 060000/10
504
505
506             000101    BRPT 46600-L
507    46477    000000           DEC 0
       46500    000000
       46501    000000
       46502    000000
       46503    000000
       46504    000000
       46505    000000
       46506    000000
       46507    000000
       46510    000000
       46511    000000
       46512    000000
       46513    000000
       46514    000000
       46515    000000
       46516    000000
       46517    000000
       46520    000000
       46521    000000
       46522    000000
       46523    000000
       46524    000000
       46525    000000
       46526    000000
       46527    000000
       46530    000000
       46531    000000
       46532    000000
       46533    000000
       46534    000000
       46535    000000
       46536    000000
```

|       |       |        |       |           |        |             |
|-------|-------|--------|-------|-----------|--------|-------------|
|       | 46537 | 000000 |       |           |        |             |
|       | 46540 | 000000 |       |           |        |             |
|       | 46541 | 000000 |       |           |        |             |
|       | 46542 | 000000 |       |           |        |             |
|       | 46543 | 000000 |       |           |        |             |
|       | 46544 | 000000 |       |           |        |             |
|       | 46545 | 000000 |       |           |        |             |
|       | 46546 | 000000 |       |           |        |             |
|       | 46547 | 000000 |       |           |        |             |
|       | 46550 | 000000 |       |           |        |             |
|       | 46551 | 000000 |       |           |        |             |
|       | 46552 | 000000 |       |           |        |             |
|       | 46553 | 000000 |       |           |        |             |
|       | 46554 | 000000 |       |           |        |             |
|       | 46555 | 000000 |       |           |        |             |
|       | 46556 | 000000 |       |           |        |             |
|       | 46557 | 000000 |       |           |        |             |
|       | 46560 | 000000 |       |           |        |             |
|       | 46561 | 000000 |       |           |        |             |
|       | 46562 | 000000 |       |           |        |             |
|       | 46563 | 000000 |       |           |        |             |
|       | 46564 | 000000 |       |           |        |             |
|       | 46565 | 000000 |       |           |        |             |
|       | 46566 | 000000 |       |           |        |             |
|       | 46567 | 000000 |       |           |        |             |
|       | 46570 | 000000 |       |           |        |             |
|       | 46571 | 000000 |       |           |        |             |
|       | 46572 | 000000 |       |           |        |             |
|       | 46573 | 000000 |       |           |        |             |
|       | 46574 | 000000 |       |           |        |             |
|       | 46575 | 000000 |       |           |        |             |
|       | 46576 | 000000 |       |           |        |             |
|       | 46577 | 000000 |       |           |        |             |
| 510   |       |        | EJE   |           |        |             |
| 511   |       | 001020 | DRM CTLDRM+255 |  |        |             |
| 512   |       | 046400 | LOC TABLOC |     |        |             |
| 513   |       |        |       |           |        |             |
| 514   |       |        | ********** FIGURE 2 DATA FOR 06 INCH SLAB ********** |
| 515   | 46400 | 022270 | DEC 94000/10  | TIME = 0360 | (0.1 HOURS) |
| 516   | 46401 | 021614 | DEC 91000/10  | TIME = 0720 | (0.2 HOURS) |
| 517   | 46402 | 020774 | DEC 87000/10  | TIME = 1080 | (0.3 HOURS) |
| 520   | 46403 | 017500 | DEC 80000/10  | TIME = 1440 | (0.4 HOURS) |
| 521   | 46404 | 016204 | DEC 73000/10  | TIME = 1800 | (0.5 HOURS) |
| 522   | 46405 | 013560 | DEC 60000/10  | TIME = 2160 | (0.6 HOURS) |
| 523   | 46406 | 011134 | DEC 47000/10  | TIME = 2520 | (0.7 HOURS) |
| 524   | 46407 | 035670 | DEC 30000/10  | TIME = 2880 | (0.8 HOURS) |
| 525   | 46410 | 002734 | DEC 15000/10  | TIME = 3240 | (0.9 HOURS) |
| 526   | 46411 | 002734 | DEC 15000/10  | TIME = 3600 | (1.0 HOURS) |
| 527   | 46412 | 002734 | DEC 15000/10  | TIME = 3960 | (1.1 HOURS) |
| 530   | 46413 | 002734 | DEC 15000/10  | TIME = 4320 | (1.2 HOURS) |
| 531   | 46414 | 002734 | DEC 15000/10  | TIME = 4680 | (1.3 HOURS) |
| 532   | 46415 | 002734 | DEC 15000/10  | TIME = 5040 | (1.4 HOURS) |
| 533   | 46416 | 002734 | DEC 15000/10  | TIME = 5400 | (1.5 HOURS) |
| 534   | 46417 | 002734 | DEC 15000/10  | TIME = 5760 | (1.6 HOURS) |
| 535   | 46420 | 002734 | DEC 15000/10  | TIME = 6120 | (1.7 HOURS) |
| 536   | 46421 | 002734 | DEC 15000/10  | TIME = 6480 | (1.8 HOURS) |
| 537   | 46422 | 002734 | DEC 15000/10  | TIME = 6840 | (1.9 HOURS) |
| 540   | 46423 | 002734 | DEC 15000/10  | TIME = 7200 | (2.0 HOURS) |
| 541   | 46424 | 002734 | DEC 15000/10  | TIME = 7560 | (2.1 HOURS) |
| 542   | 46425 | 002734 | DEC 15000/10  | TIME = 7920 | (2.2 HOURS) |
| 543   | 46426 | 002734 | DEC 15000/10  | TIME = 8280 | (2.3 HOURS) |
| 544   | 46427 | 002734 | DEC 15000/10  | TIME = 8640 | (2.4 HOURS) |
| 545   |       |        |       |           |        |             |
| 546   |       |        | ********** FIGURE 2 DATA FOR 07 INCH SLAB ********** |
| 547   | 46430 | 025060 | DEC 108000/10 | TIME = 0360 | (0.1 HOURS) |
| 550   | 46431 | 024714 | DEC 107000/10 | TIME = 0720 | (0.2 HOURS) |
| 551   | 46432 | 024240 | DEC 104000/10 | TIME = 1080 | (0.3 HOURS) |
| 552   | 46433 | 023420 | DEC 100000/10 | TIME = 1440 | (0.4 HOURS) |
| 553   | 46434 | 022434 | DEC 095000/10 | TIME = 1800 | (0.5 HOURS) |
| 554   | 46435 | 020464 | DEC 085000/10 | TIME = 2160 | (0.6 HOURS) |
| 555   | 46436 | 016204 | DEC 073000/10 | TIME = 2520 | (0.7 HOURS) |
| 556   | 46437 | 013724 | DEC 061000/10 | TIME = 2580 | (0.8 HOURS) |
| 557   | 46440 | 011134 | DEC 047000/10 | TIME = 3240 | (0.9 HOURS) |

```
560  46441  036510           DEC 034000/10           TIME = 3600   (1.0 HOURS)
561  46442  033720           DEC 020000/10           TIME = 3960   (1.1 HOURS)
562  46443  031130           DEC 006000/10           TIME = 4320   (1.2 HOURS)
563  46444  031130           DEC 006000/10           TIME = 4680   (1.3 HOURS)
564  46445  031130           DEC 006000/10           TIME = 5040   (1.4 HOURS)
565  46446  031130           DEC 006000/10           TIME = 5400   (1.5 HOURS)
566  46447  031130           DEC 006000/10           TIME = 5760   (1.6 HOURS)
567  46450  031130           DEC 006000/10           TIME = 6120   (1.7 HOURS)
570  46451  031130           DEC 006000/10           TIME = 6480   (1.8 HOURS)
571  46452  031130           DEC 006000/10           TIME = 6840   (1.9 HOURS)
572  46453  031130           DEC 006000/10           TIME = 7200   (2.0 HOURS)
573  46454  031130           DEC 006000/10           TIME = 7560   (2.1 HOURS)
574  46455  031130           DEC 006000/10           TIME = 7920   (2.2 HOURS)
575  46456  031130           DEC 006000/10           TIME = 8280   (2.3 HOURS)
576  46457  031130           DEC 006000/10           TIME = 8640   (2.4 HOURS)
577
600                          ********** FIGURE 2 DATA FOR 08 INCH SLAB **********
601  46460  030324           DEC 125000/10           TIME = 0360   (0.1 HOURS)
602  46461  027650           DEC 122000/10           TIME = 0720   (0.2 HOURS)
603  46462  027174           DEC 119000/10           TIME = 1080   (0.3 HOURS)
604  46463  026354           DEC 115000/10           TIME = 1440   (0.4 HOURS)
605  46464  025370           DEC 110000/10           TIME = 1800   (0.5 HOURS)
606  46465  024074           DEC 103000/10           TIME = 2160   (0.6 HOURS)
607  46466  022600           DEC 096000/10           TIME = 2520   (0.7 HOURS)
610  46467  020774           DEC 087000/10           TIME = 2880   (0.8 HOURS)
611  46470  017170           DEC 078000/10           TIME = 3240   (0.9 HOURS)
612  46471  015054           DEC 067000/10           TIME = 3600   (1.0 HOURS)
613  46472  012430           DEC 054000/10           TIME = 3960   (1.1 HOURS)
614  46473  010004           DEC 041000/10           TIME = 4320   (1.2 HOURS)
615  46474  007164           DEC 037000/10           TIME = 4680   (1.3 HOURS)
616  46475  002734           DEC 015000/10           TIME = 5040   (1.4 HOURS)
617  46476  002734           DEC 015000/10           TIME = 5400   (1.5 HOURS)
620  46477  002734           DEC 015000/10           TIME = 5760   (1.6 HOURS)
621  46500  002734           DEC 015000/10           TIME = 6120   (1.7 HOURS)
622  46501  002734           DEC 015000/10           TIME = 6480   (1.8 HOURS)
623  46502  002734           DEC 015000/10           TIME = 6840   (1.9 HOURS)
624  46503  002734           DEC 015000/10           TIME = 7200   (2.0 HOURS)
625  46504  002734           DEC 015000/10           TIME = 7560   (2.1 HOURS)
626  46505  002734           DEC 015000/10           TIME = 7920   (2.2 HOURS)
627  46506  002734           DEC 015000/10           TIME = 8280   (2.3 HOURS)
630  46507  002734           DEC 015000/10           TIME = 8640   (2.4 HOURS)
631
632
633         736067           BRPT 4600-L
634  46510  000000           DEC 0
     46511  000000
     46512  000000
     46513  000000
     46514  000000
     46515  000000
     46516  000000
     46517  000000
     46520  000000
     46521  000000
     46522  000000
     46523  000000
     46524  000000
     46525  000000
     46526  000000
     46527  000000
     46530  000000
     46531  000000
     46532  000000
     46533  000000
     46534  000000
     46535  000000
     46536  000000
     46537  000000
     46540  000000
     46541  000000
     46542  000000
```

```
            46543    030000
            46544    030000
            46545    030000
            46546    030000
            46547    030000
            46550    030000
            46551    030000
            46552    030000
            46553    030000
            46554    030000
            46555    030000
            46556    030000
            46557    030000
            46560    030000
            46561    030000
            46562    030000
            46563    030000
            46564    030000
            46565    030000
            46566    030000
            46567    030000
            46570    030000
            46571    030000
            46572    030000
            46573    030000
            46574    030000
            46575    030000
            46576    030000
635
636         031021            EJE
637         046400            DRM  CTLDRM+256
640                           LOC  TABLOC
641
642  46400  030000   ********** FIGURE 2 DATA FOR 09 INCH SLAB **********
643  46401  030000            DEC  142000\10       TIME = 0360  (0.1 HOURS)
644  46402  030000            DEC  140000\10       TIME = 0720  (0.2 HOURS)
645  46403  030000            DEC  137000\10       TIME = 1080  (0.3 HOURS)
646  46404  030000            DEC  130000\10       TIME = 1440  (0.4 HOURS)
647  46405  030000            DEC  125000\10       TIME = 1800  (0.5 HOURS)
650  46406  030000            DEC  121000\10       TIME = 2160  (0.6 HOURS)
651  46407  030000            DEC  116000\10       TIME = 2520  (0.7 HOURS)
652  46410  030000            DEC  111000\10       TIME = 2880  (0.8 HOURS)
653  46411  030000            DEC  102000\10       TIME = 3240  (0.9 HOURS)
654  46412  030000            DEC  093000\10       TIME = 3600  (1.0 HOURS)
655  46413  030000            DEC  083000\10       TIME = 3960  (1.1 HOURS)
656  46414  030000            DEC  073000\10       TIME = 4320  (1.2 HOURS)
657  46415  030000            DEC  061000\10       TIME = 4680  (1.3 HOURS)
660  46416  030000            DEC  050000\10       TIME = 5040  (1.4 HOURS)
661  46417  030000            DEC  037000\10       TIME = 5400  (1.5 HOURS)
662  46420  030000            DEC  023000\10       TIME = 5760  (1.6 HOURS)
663  46421  030000            DEC  023000\10       TIME = 6120  (1.7 HOURS)
664  46422  030000            DEC  023000\10       TIME = 6480  (1.8 HOURS)
665  46423  030000            DEC  023000\10       TIME = 6840  (1.9 HOURS)
666  46424  030000            DEC  023000\10       TIME = 7200  (2.0 HOURS)
667  46425  030000            DEC  023000\10       TIME = 7560  (2.1 HOURS)
670  46426  030000            DEC  023000\10       TIME = 7920  (2.2 HOURS)
671  46427  030000            DEC  023000\10       TIME = 8280  (2.3 HOURS)
672                           DEC  023000\10       TIME = 8640  (2.4 HOURS)
673
674  46430  030000   ********** FIGURE 2 DATA FOR 10 INCH SLAB **********
675  46431  030000            DEC  156000\10       TIME = 0360  (0.1 HOURS)
676  46432  030000            DEC  154000\10       TIME = 0720  (0.2 HOURS)
677  46433  030000            DEC  152000\10       TIME = 1080  (0.3 HOURS)
700  46434  030000            DEC  148000\10       TIME = 1440  (0.4 HOURS)
701  46435  030000            DEC  144000\10       TIME = 1800  (0.5 HOURS)
702  46436  030000            DEC  142000\10       TIME = 2160  (0.6 HOURS)
703  46437  030000            DEC  138000\10       TIME = 2520  (0.7 HOURS)
704  46440  030000            DEC  133000\10       TIME = 2880  (0.8 HOURS)
705  46441  030000            DEC  126000\10       TIME = 3240  (0.9 HOURS)
706  46442  030000            DEC  118000\10       TIME = 3600  (1.0 HOURS)
707  46443  030000            DEC  106000\10       TIME = 3960  (1.1 HOURS)
                              DEC  097000\10       TIME = 4320  (1.2 HOURS)
```

```
710  46444  030000     DEC 085000\10        TIME = 4680   (1.3 HOURS)
711  46445  030000     DEC 073000\10        TIME = 5040   (1.4 HOURS)
712  46446  030000     DEC 062000\10        TIME = 5400   (1.5 HOURS)
713  46447  030000     DEC 051000\10        TIME = 5760   (1.6 HOURS)
714  46450  030000     DEC 040000\10        TIME = 6120   (1.7 HOURS)
715  46451  030000     DEC 040000\10        TIME = 6480   (1.8 HOURS)
716  46452  030000     DEC 040000\10        TIME = 6840   (1.9 HOURS)
717  46453  030000     DEC 040000\10        TIME = 7200   (2.0 HOURS)
720  46454  030000     DEC 040000\10        TIME = 7560   (2.1 HOURS)
721  46455  030000     DEC 040000\10        TIME = 7920   (2.2 HOURS)
722  46456  030000     DEC 040000\10        TIME = 8280   (2.3 HOURS)
723  46457  030000     DEC 040000\10        TIME = 8640   (2.4 HOURS)
724
725                    ********** FIGURE 2 DATA FOR 11 INCH SLAB **********
726  46460  030000     DEC 174000\10        TIME = 0360   (0.1 HOURS)
727  46461  030000     DEC 172000\10        TIME = 0720   (0.2 HOURS)
730  46462  030000     DEC 169000\10        TIME = 1080   (0.3 HOURS)
731  46463  030000     DEC 166000\10        TIME = 1440   (0.4 HOURS)
732  46464  030000     DEC 163000\10        TIME = 1800   (0.5 HOURS)
733  46465  030000     DEC 159000\10        TIME = 2160   (0.6 HOURS)
734  46466  030000     DEC 154000\10        TIME = 2520   (0.7 HOURS)
735  46467  030000     DEC 150000\10        TIME = 2880   (0.8 HOURS)
736  46470  030000     DEC 146000\10        TIME = 3240   (0.9 HOURS)
737  46471  030000     DEC 143000\10        TIME = 3600   (1.0 HOURS)
740  46472  030000     DEC 137000\10        TIME = 3960   (1.1 HOURS)
741  46473  030000     DEC 132000\10        TIME = 4320   (1.2 HOURS)
742  46474  030000     DEC 125000\10        TIME = 4680   (1.3 HOURS)
743  46475  030000     DEC 118000\10        TIME = 5040   (1.4 HOURS)
744  46476  030000     DEC 110000\10        TIME = 5400   (1.5 HOURS)
745  46477  030000     DEC 101000\10        TIME = 5760   (1.6 HOURS)
746  46500  030000     DEC 092000\10        TIME = 6120   (1.7 HOURS)
747  46501  030000     DEC 080000\10        TIME = 6480   (1.8 HOURS)
750  46502  030000     DEC 069000\10        TIME = 6840   (1.9 HOURS)
751  46503  030000     DEC 058000\10        TIME = 7200   (2.0 HOURS)
752  46504  030000     DEC 046000\10        TIME = 7560   (2.1 HOURS)
753  46505  030000     DEC 046000\10        TIME = 7920   (2.2 HOURS)
754  46506  030000     DEC 046000\10        TIME = 8280   (2.3 HOURS)
755  46507  030000     DEC 046000\10        TIME = 8640   (2.4 HOURS)
756
757
760         030070     BRPT 46600-L
761  46510  030000     DEC 0
     46511  030000
     46512  030000
     46513  030000
     46514  030000
     46515  030000
     46516  030000
     46517  030000
     46520  030000
     46521  030000
     46522  030000
     46523  030000
     46524  030000
     46525  030000
     46526  030000
     46527  030000
     46530  030000
     46531  030000
     46532  030000
     46533  030000
     46534  030000
     46535  030000
     46536  030000
     46537  030000
     46540  030000
     46541  030000
     46542  030000
     46543  030000
     46544  030000
     46545  030000
     46546  030000
```

```
        46547    030000
        46550    030000
        46551    030000
        46552    030000
        46553    030000
        46554    030000
        46555    030000
        46556    030000
        46557    030000
        46560    030000
        46561    030000
        46562    030000
        46563    030000
        46564    030000
        46565    030000
        46566    030000
        46567    030000
        46570    030000
        46571    030000
        46572    030000
        46573    030000
        46574    030000
        46575    030000
        46576    030000
        46577    030000
762                             EJE
763      031026                 DRM  CYLDRM+261
764      046400                 LOC  TABLOC
765
766
767                     ********** FIGURE 3 DATA FOR 06 INCH SLAB **********
770
771
772      46400   004766         DEC 2550              HCH = 5000
773      46401   004730         DEC 2520                 TIME = 0180   (0.05 HOURS)
774      46402   004653         DEC 2475                 TIME = 0360   (0.10 HOURS)
775      46403   004571         DEC 2425                 TIME = 0540   (0.15 HOURS)
776      46404   004463         DEC 2355                 TIME = 0720   (0.20 HOURS)
777      46405   004355         DEC 2285                 TIME = 0900   (0.25 HOURS)
1000     46406   004235         DEC 2205                 TIME = 1080   (0.30 HOURS)
1001     46407   004071         DEC 2105                 TIME = 1260   (0.35 HOURS)
1002     46410   003674         DEC 1980                 TIME = 1440   (0.40 HOURS)
1003     46411   003636         DEC 1950                 TIME = 1620   (0.45 HOURS)
1004     46412   003600         DEC 1920                 TIME = 1800   (0.50 HOURS)
1005                                                     TIME = 1980   (0.55 HOURS)
1006
1007     46413   004766         DEC 2550              HCH = 10000
1010     46414   004766         DEC 2550                 TIME = 0180   (0.05 HOURS)
1011     46415   004716         DEC 2510                 TIME = 0360   (0.10 HOURS)
1012     46416   004615         DEC 2445                 TIME = 0540   (0.15 HOURS)
1013     46417   004514         DEC 2380                 TIME = 0720   (0.20 HOURS)
1014     46420   004420         DEC 2320                 TIME = 0900   (0.25 HOURS)
1015     46421   004273         DEC 2235                 TIME = 1080   (0.30 HOURS)
1016     46422   004141         DEC 2145                 TIME = 1260   (0.35 HOURS)
1017     46423   003737         DEC 2015                 TIME = 1440   (0.40 HOURS)
1020     46424   003701         DEC 1985                 TIME = 1620   (0.45 HOURS)
1021     46425   003643         DEC 1955                 TIME = 1800   (0.50 HOURS)
1022                                                     TIME = 1980   (0.55 HOURS)
1023
1024     46426   004766         DEC 2550              HCH = 15000
1025     46427   004766         DEC 2550                 TIME = 0180   (0.05 HOURS)
1026     46430   004742         DEC 2530                 TIME = 0360   (0.10 HOURS)
1027     46431   004660         DEC 2480                 TIME = 0540   (0.15 HOURS)
1030     46432   004564         DEC 2420                 TIME = 0720   (0.20 HOURS)
1031     46433   004451         DEC 2345                 TIME = 0900   (0.25 HOURS)
1032     46434   004336         DEC 2270                 TIME = 1080   (0.30 HOURS)
1033     46435   004204         DEC 2180                 TIME = 1260   (0.35 HOURS)
1034     46436   004242         DEC 2210                 TIME = 1440   (0.40 HOURS)
1035     46437   004300         DEC 2240                 TIME = 1620   (0.45 HOURS)
1036     46440   004336         DEC 2270                 TIME = 1800   (0.50 HOURS)
1037                                                     TIME = 1980   (0.55 HOURS)
```

```
1040
1041    46441    004766    DEC 2550
1042    46442    004766    DEC 2550
1043    46443    004766    DEC 2550
1044    46444    004704    DEC 2500
1045    46445    004610    DEC 2440
1046    46446    004475    DEC 2365
1047    46447    004367    DEC 2295
1050    46450    004235    DEC 2205
1051    46451    004273    DEC 2235
1052    46452    004331    DEC 2265
1053    46453    004367    DEC 2295
1054
1055
1056    46454    004766    DEC 2550
1057    46455    004766    DEC 2550
1060    46456    004766    DEC 2550
1061    46457    005024    DEC 2580
1062    46460    004641    DEC 2465
1063    46461    004545    DEC 2405
1064    46462    004432    DEC 2330
1065    46463    004470    DEC 2360
1066    46464    004526    DEC 2390
1067    46465    004564    DEC 2420
1070    46466    004622    DEC 2450
1071
1072
1073    46467    004766    DEC 2550
1074    46470    004766    DEC 2550
1075    46471    004766    DEC 2550
1076    46472    004766    DEC 2550
1077    46473    004610    DEC 2440
1100    46474    004571    DEC 2425
1101    46475    004456    DEC 2350
1102    46476    004514    DEC 2380
1103    46477    004552    DEC 2410
1104    46500    004610    DEC 2440
1105    46501    004646    DEC 2470
1106
1107
1110    46502    004766    DEC 2550
1111    46503    004766    DEC 2550
1112    46504    004766    DEC 2550
1113    46505    004766    DEC 2550
1114    46506    004747    DEC 2535
1115    46507    004634    DEC 2460
1116    46510    004672    DEC 2490
1117    46511    004730    DEC 2520
1120    46512    004766    DEC 2550
1121    46513    004766    DEC 2550
1122    46514    004766    DEC 2550
1123
1124
1125    46515    004766    DEC 2550
1126    46516    004766    DEC 2550
1127    46517    004766    DEC 2550
1130    46520    004766    DEC 2550
1131    46521    004761    DEC 2545
1132    46522    004766    DEC 2550
1133    46523    004766    DEC 2550
1134    46524    004766    DEC 2550
1135    46525    004766    DEC 2550
1136    46526    004766    DEC 2550
1137    46527    004766    DEC 2550
1140
1141
1142    46530    004766    DEC 2550
1143    46531    004766    DEC 2550
1144    46532    004766    DEC 2550
1145    46533    004766    DEC 2550
1146    46534    004766    DEC 2550
1147    46535    004766    DEC 2550
```

$HCH = 20000$
TIME = 0180 (0.05 HOURS)
TIME = 0360 (0.10 HOURS)
TIME = 0540 (0.15 HOURS)
TIME = 0720 (0.20 HOURS)
TIME = 0900 (0.25 HOURS)
TIME = 1080 (0.30 HOURS)
TIME = 1260 (0.35 HOURS)
TIME = 1440 (0.40 HOURS)
TIME = 1620 (0.45 HOURS)
TIME = 1800 (0.50 HOURS)
TIME = 1980 (0.55 HOURS)

$HCH = 25000$
TIME = 0180 (0.05 HOURS)
TIME = 0360 (0.10 HOURS)
TIME = 0540 (0.15 HOURS)
TIME = 0720 (0.20 HOURS)
TIME = 0900 (0.25 HOURS)
TIME = 1080 (0.30 HOURS)
TIME = 1260 (0.35 HOURS)
TIME = 1440 (0.40 HOURS)
TIME = 1620 (0.45 HOURS)
TIME = 1800 (0.50 HOURS)
TIME = 1980 (0.55 HOURS)

$HCH = 30000$
TIME = 0180 (0.05 HOURS)
TIME = 0360 (0.10 HOURS)
TIME = 0540 (0.15 HOURS)
TIME = 0720 (0.20 HOURS)
TIME = 0900 (0.25 HOURS)
TIME = 1080 (0.30 HOURS)
TIME = 1260 (0.35 HOURS)
TIME = 1440 (0.40 HOURS)
TIME = 1620 (0.45 HOURS)
TIME = 1800 (0.50 HOURS)
TIME = 1980 (0.55 HOURS)

$HCH = 35000$
TIME = 0180 (0.05 HOURS)
TIME = 0360 (0.10 HOURS)
TIME = 0540 (0.15 HOURS)
TIME = 0720 (0.20 HOURS)
TIME = 0900 (0.25 HOURS)
TIME = 1080 (0.30 HOURS)
TIME = 1260 (0.35 HOURS)
TIME = 1440 (0.40 HOURS)
TIME = 1620 (0.45 HOURS)
TIME = 1800 (0.50 HOURS)
TIME = 1980 (0.55 HOURS)

$HCH = 40000$
TIME = 0180 (0.05 HOURS)
TIME = 0360 (0.10 HOURS)
TIME = 0540 (0.15 HOURS)
TIME = 0720 (0.20 HOURS)
TIME = 0900 (0.25 HOURS)
TIME = 1080 (0.30 HOURS)
TIME = 1260 (0.35 HOURS)
TIME = 1440 (0.40 HOURS)
TIME = 1620 (0.45 HOURS)
TIME = 1800 (0.50 HOURS)
TIME = 1980 (0.55 HOURS)

$HCH = 45000$
TIME = 0180 (0.05 HOURS)
TIME = 0360 (0.10 HOURS)
TIME = 0540 (0.15 HOURS)
TIME = 0720 (0.20 HOURS)
TIME = 0900 (0.25 HOURS)
TIME = 1080 (0.30 HOURS)

```
1150    46536   034766          DEC 2550                    TIME = 1260     (0.35 HOURS)
1151    46537   034766          DEC 2550                    TIME = 1440     (0.40 HOURS)
1152    46540   034766          DEC 2550                    TIME = 1620     (0.45 HOURS)
1153    46541   034766          DEC 2550                    TIME = 1800     (0.50 HOURS)
1154    46542   034766          DEC 2550                    TIME = 1980     (0.55 HOURS)
1155
1156                                            HCH = 50000
1157    46543   034766          DEC 2550                    TIME = 0180     (0.05 HOURS)
1160    46544   034766          DEC 2550                    TIME = 0360     (0.10 HOURS)
1161    46545   034766          DEC 2550                    TIME = 0540     (0.15 HOURS)
1162    46546   034766          DEC 2550                    TIME = 0720     (0.20 HOURS)
1163    46547   034766          DEC 2550                    TIME = 0900     (0.25 HOURS)
1164    46550   034766          DEC 2550                    TIME = 1080     (0.30 HOURS)
1165    46551   034766          DEC 2550                    TIME = 1260     (0.35 HOURS)
1166    46552   034766          DEC 2550                    TIME = 1440     (0.40 HOURS)
1167    46553   034766          DEC 2550                    TIME = 1620     (0.45 HOURS)
1170    46554   034766          DEC 2550                    TIME = 1800     (0.50 HOURS)
1171    46555   034766          DEC 2550                    TIME = 1980     (0.55 HOURS)
1172
1173
1174            000022          BRPT 46600-L
1175    46556   000000          DEC 0
        46557   000000
        46560   000000
        46561   000000
        46562   000000
        46563   000000
        46564   000000
        46565   000000
        46566   000000
        46567   000000
        46570   000000
        46571   000000
        46572   000000
        46573   000000
        46574   000000
        46575   000000
        46576   000000
        46577   000000
1176                            EJE
1177            001027          DRM CYLDRM+262
1200            046400          LOC TABLOC
1201
1202                            ********** FIGURE 3 DATA FOR 07 INCH SLAB **********
1203
1204
1205                                            HCH = 5000
1206    46400   034766          DEC 2550                    TIME = 0180     (0.05 HOURS)
1207    46401   034766          DEC 2550                    TIME = 0360     (0.10 HOURS)
1210    46402   034766          DEC 2550                    TIME = 0540     (0.15 HOURS)
1211    46403   034665          DEC 2485                    TIME = 0720     (0.20 HOURS)
1212    46404   034576          DEC 2430                    TIME = 0900     (0.25 HOURS)
1213    46405   034521          DEC 2385                    TIME = 1080     (0.30 HOURS)
1214    46406   034432          DEC 2330                    TIME = 1260     (0.35 HOURS)
1215    46407   034336          DEC 2270                    TIME = 1440     (0.40 HOURS)
1216    46410   034216          DEC 2190                    TIME = 1620     (0.45 HOURS)
1217    46411   034103          DEC 2115                    TIME = 1800     (0.50 HOURS)
1220    46412   033674          DEC 1980                    TIME = 1980     (0.55 HOURS)
1221
1222                                            HCH = 10000
1223    46413   034766          DEC 2550                    TIME = 0180     (0.05 HOURS)
1224    46414   034766          DEC 2550                    TIME = 0360     (0.10 HOURS)
1225    46415   034766          DEC 2550                    TIME = 0540     (0.15 HOURS)
1226    46416   034711          DEC 2505                    TIME = 0720     (0.20 HOURS)
1227    46417   034622          DEC 2450                    TIME = 0900     (0.25 HOURS)
1230    46420   034545          DEC 2405                    TIME = 1080     (0.30 HOURS)
1231    46421   034456          DEC 2350                    TIME = 1260     (0.35 HOURS)
1232    46422   034350          DEC 2280                    TIME = 1440     (0.40 HOURS)
1233    46423   034242          DEC 2210                    TIME = 1620     (0.45 HOURS)
1234    46424   034115          DEC 2125                    TIME = 1800     (0.50 HOURS)
1235    46425   034235          DEC 2205                    TIME = 1980     (0.55 HOURS)
```

```
1236
1237
1240   46426   030000              DEC              HCH = 15000
1241   46427   034766              DEC 2550             TIME = 0180   (0.05 HOURS)
1242   46430   034766              DEC 2550             TIME = 0360   (0.10 HOURS)
1243   46431   034766              DEC 2550             TIME = 0540   (0.15 HOURS)
1244   46432   034653              DEC 2475             TIME = 0720   (0.20 HOURS)
1245   46433   034571              DEC 2425             TIME = 0900   (0.25 HOURS)
                                                        TIME = 1080   (0.30 HOURS)
1246   46434   034502              DEC 2370             TIME = 1260   (0.35 HOURS)
1247   46435   034374              DEC 2300             TIME = 1440   (0.40 HOURS)
1250   46436   034254              DEC 2220             TIME = 1620   (0.45 HOURS)
1251   46437   034122              DEC 2130             TIME = 1800   (0.50 HOURS)
1252   46440   034254              DEC 2220             TIME = 1980   (0.55 HOURS)
1253
1254                                                 HCH = 20000
1255   46441   034766              DEC 2550             TIME = 0180   (0.05 HOURS)
1256   46442   030000              DEC                  TIME = 0360   (0.10 HOURS)
1257   46443   034766              DEC 2550             TIME = 0540   (0.15 HOURS)
1260   46444   034766              DEC 2550             TIME = 0720   (0.20 HOURS)
1261   46445   034704              DEC 2500             TIME = 0900   (0.25 HOURS)
1262   46446   034615              DEC 2445             TIME = 1080   (0.30 HOURS)
1263   46447   034514              DEC 2380             TIME = 1260   (0.35 HOURS)
1264   46450   034420              DEC 2320             TIME = 1440   (0.40 HOURS)
1265   46451   034300              DEC 2240             TIME = 1620   (0.45 HOURS)
1266   46452   034141              DEC 2145             TIME = 1800   (0.50 HOURS)
1267   46453   034177              DEC 2175             TIME = 1980   (0.55 HOURS)
1270
1271                                                 HCH = 25000
1272   46454   034766              DEC 2550             TIME = 0180   (0.05 HOURS)
1273   46455   034766              DEC 2550             TIME = 0360   (0.10 HOURS)
1274   46456   034766              DEC 2550             TIME = 0540   (0.15 HOURS)
1275   46457   034766              DEC 2550             TIME = 0720   (0.20 HOURS)
1276   46460   034754              DEC 2540             TIME = 0900   (0.25 HOURS)
1277   46461   034634              DEC 2460             TIME = 1080   (0.30 HOURS)
1300   46462   034540              DEC 2400             TIME = 1260   (0.35 HOURS)
1301   46463   034444              DEC 2340             TIME = 1440   (0.40 HOURS)
1302   46464   034312              DEC 2250             TIME = 1620   (0.45 HOURS)
1303   46465   034350              DEC 2280             TIME = 1800   (0.50 HOURS)
1304   46466   034406              DEC 2310             TIME = 1980   (0.55 HOURS)
1305
1306                                                 HCH = 30000
1307   46467   034766              DEC 2550             TIME = 0180   (0.05 HOURS)
1310   46470   034766              DEC 2550             TIME = 0360   (0.10 HOURS)
1311   46471   034766              DEC 2550             TIME = 0540   (0.15 HOURS)
1312   46472   034766              DEC 2550             TIME = 0720   (0.20 HOURS)
1313   46473   034766              DEC 2550             TIME = 0900   (0.25 HOURS)
1314   46474   034672              DEC 2490             TIME = 1080   (0.30 HOURS)
1315   46475   034571              DEC 2425             TIME = 1260   (0.35 HOURS)
1316   46476   034470              DEC 2360             TIME = 1440   (0.40 HOURS)
1317   46477   034526              DEC 2390             TIME = 1620   (0.45 HOURS)
1320   46500   034564              DEC 2420             TIME = 1800   (0.50 HOURS)
1321   46501   034622              DEC 2450             TIME = 1980   (0.55 HOURS)
1322
1323                                                 HCH = 35000
1324   46502   034766              DEC 2550             TIME = 0180   (0.05 HOURS)
1325   46503   034766              DEC 2550             TIME = 0360   (0.10 HOURS)
1326   46504   034766              DEC 2550             TIME = 0540   (0.15 HOURS)
1327   46505   034766              DEC 2550             TIME = 0720   (0.20 HOURS)
1330   46506   034766              DEC 2550             TIME = 0900   (0.25 HOURS)
1331   46507   034742              DEC 2530             TIME = 1080   (0.30 HOURS)
1332   46510   034615              DEC 2445             TIME = 1260   (0.35 HOURS)
1333   46511   034507              DEC 2375             TIME = 1440   (0.40 HOURS)
1334   46512   034545              DEC 2405             TIME = 1620   (0.45 HOURS)
1335   46513   034603              DEC 2435             TIME = 1800   (0.50 HOURS)
1336   46514   034641              DEC 2465             TIME = 1980   (0.55 HOURS)
1337
1340                                                 HCH = 40000
1341   46515   034766              DEC 2550             TIME = 0180   (0.05 HOURS)
1342   46516   034766              DEC 2550             TIME = 0360   (0.10 HOURS)
1343   46517   034766              DEC 2550             TIME = 0540   (0.15 HOURS)
1344   46520   034766              DEC 2550             TIME = 0720   (0.20 HOURS)
```

```
1345   46521   034766         DEC 2550              TIME = 0900   (0.25 HOURS)
1346   46522   034766         DEC 2550              TIME = 1080   (0.30 HOURS)
1347   46523   034646         DEC 2470              TIME = 1260   (0.35 HOURS)
1350   46524   034704         DEC 2500              TIME = 1440   (0.40 HOURS)
1351   46525   034742         DEC 2530              TIME = 1620   (0.45 HOURS)
1352   46526   034766         DEC 2550              TIME = 1800   (0.50 HOURS)
1353   46527   034766         DEC 2550              TIME = 1980   (0.55 HOURS)
1354
1355                                       HCH = 45000
1356   46530   034766         DEC 2550              TIME = 0180   (0.05 HOURS)
1357   46531   034766         DEC 2550              TIME = 0360   (0.10 HOURS)
1360   46532   034766         DEC 2550              TIME = 0540   (0.15 HOURS)
1361   46533   034766         DEC 2550              TIME = 0720   (0.20 HOURS)
1362   46534   034766         DEC 2550              TIME = 0900   (0.25 HOURS)
1363   46535   034766         DEC 2550              TIME = 1080   (0.30 HOURS)
1364   46536   034766         DEC 2550              TIME = 1260   (0.35 HOURS)
1365   46537   034766         DEC 2550              TIME = 1440   (0.40 HOURS)
1366   46540   034766         DEC 2550              TIME = 1620   (0.45 HOURS)
1367   46541   034766         DEC 2550              TIME = 1800   (0.50 HOURS)
1370   46542   034766         DEC 2550              TIME = 1980   (0.55 HOURS)
1371
1372                                       HCH = 50000
1373   46543   034766         DEC 2550              TIME = 0180   (0.05 HOURS)
1374   46544   034766         DEC 2550              TIME = 0360   (0.10 HOURS)
1375   46545   034766         DEC 2550              TIME = 0540   (0.15 HOURS)
1376   46546   034766         DEC 2550              TIME = 0720   (0.20 HOURS)
1377   46547   034766         DEC 2550              TIME = 0900   (0.25 HOURS)
1400   46550   034766         DEC 2550              TIME = 1080   (0.30 HOURS)
1401   46551   034766         DEC 2550              TIME = 1260   (0.35 HOURS)
1402   46552   034766         DEC 2550              TIME = 1440   (0.40 HOURS)
1403   46553   034766         DEC 2550              TIME = 1620   (0.45 HOURS)
1404   46554   034766         DEC 2550              TIME = 1800   (0.50 HOURS)
1405   46555   034766         DEC 2550              TIME = 1980   (0.55 HOURS)
1406
1407
1410           000022         BRPT 46600-L
1411   46556   000000         DEC 0
       46557   000000
       46560   000000
       46561   000000
       46562   000000
       46563   000000
       46564   000000
       46565   000000
       46566   000000
       46567   000000
       46570   000000
       46571   000000
       46572   000000
       46573   000000
       46574   000000
       46575   000000
       46576   000000
       46577   000000
1412                          EJE
1413           001030         DRM CYLDRM+263
1414           046400         LOC TABLOC
1415
1416                ********** FIGURE 3 DATA FOR 08 INCH SLAB **********
1417
1420
1421                                       HCH = 5000
1422   46400   034766         DEC 2550              TIME = 0180   (0.05 HOURS)
1423   46401   034766         DEC 2550              TIME = 0360   (0.10 HOURS)
1424   46402   034766         DEC 2550              TIME = 0540   (0.15 HOURS)
1425   46403   034677         DEC 2495              TIME = 0720   (0.20 HOURS)
1426   46404   034622         DEC 2450              TIME = 0900   (0.25 HOURS)
1427   46405   034564         DEC 2420              TIME = 1080   (0.30 HOURS)
1430   46406   034463         DEC 2355              TIME = 1260   (0.35 HOURS)
1431   46407   034374         DEC 2300              TIME = 1440   (0.40 HOURS)
1432   46410   034324         DEC 2260              TIME = 1620   (0.45 HOURS)
```

| | | | | | |
|---|---|---|---|---|---|
| 1433 | 46411 | 034235 | DEC 2205 | TIME = 1800 | (0.50 HOURS) |
| 1434 | 46412 | 034141 | DEC 2145 | TIME = 1980 | (0.55 HOURS) |
| 1435 | | | | | |
| 1436 | | | | HCH = 10000 | |
| 1437 | 46413 | 034766 | DEC 2550 | TIME = 0180 | (0.05 HOURS) |
| 1440 | 46414 | 034766 | DEC 2550 | TIME = 0360 | (0.10 HOURS) |
| 1441 | 46415 | 034766 | DEC 2550 | TIME = 0540 | (0.15 HOURS) |
| 1442 | 46416 | 034730 | DEC 2520 | TIME = 0720 | (0.20 HOURS) |
| 1443 | 46417 | 034653 | DEC 2475 | TIME = 0900 | (0.25 HOURS) |
| 1444 | 46420 | 034603 | DEC 2435 | TIME = 1080 | (0.30 HOURS) |
| 1445 | 46421 | 034514 | DEC 2380 | TIME = 1260 | (0.35 HOURS) |
| 1446 | 46422 | 034420 | DEC 2320 | TIME = 1440 | (0.40 HOURS) |
| 1447 | 46423 | 034350 | DEC 2280 | TIME = 1620 | (0.45 HOURS) |
| 1450 | 46424 | 034300 | DEC 2240 | TIME = 1800 | (0.50 HOURS) |
| 1451 | 46425 | 034172 | DEC 2170 | TIME = 1980 | (0.55 HOURS) |
| 1452 | | | | | |
| 1453 | | | | HCH = 15000 | |
| 1454 | 46426 | 034766 | DEC 2550 | TIME = 0180 | (0.05 HOURS) |
| 1455 | 46427 | 034766 | DEC 2550 | TIME = 0360 | (0.10 HOURS) |
| 1456 | 46430 | 034766 | DEC 2550 | TIME = 0540 | (0.15 HOURS) |
| 1457 | 46431 | 034766 | DEC 2550 | TIME = 0720 | (0.20 HOURS) |
| 1460 | 46432 | 034704 | DEC 2500 | TIME = 0900 | (0.25 HOURS) |
| 1461 | 46433 | 034627 | DEC 2455 | TIME = 1080 | (0.30 HOURS) |
| 1462 | 46434 | 034545 | DEC 2405 | TIME = 1260 | (0.35 HOURS) |
| 1463 | 46435 | 034451 | DEC 2345 | TIME = 1440 | (0.40 HOURS) |
| 1464 | 46436 | 034401 | DEC 2305 | TIME = 1620 | (0.45 HOURS) |
| 1465 | 46437 | 034324 | DEC 2260 | TIME = 1800 | (0.50 HOURS) |
| 1466 | 46440 | 034223 | DEC 2195 | TIME = 1980 | (0.55 HOURS) |
| 1467 | | | | | |
| 1470 | | | | HCH = 20000 | |
| 1471 | 46441 | 034766 | DEC 2550 | TIME = 0180 | (0.05 HOURS) |
| 1472 | 46442 | 034766 | DEC 2550 | TIME = 0360 | (0.10 HOURS) |
| 1473 | 46443 | 034766 | DEC 2550 | TIME = 0540 | (0.15 HOURS) |
| 1474 | 46444 | 034766 | DEC 2550 | TIME = 0720 | (0.20 HOURS) |
| 1475 | 46445 | 034735 | DEC 2525 | TIME = 0900 | (0.25 HOURS) |
| 1476 | 46446 | 034660 | DEC 2480 | TIME = 1080 | (0.30 HOURS) |
| 1477 | 46447 | 034571 | DEC 2425 | TIME = 1260 | (0.35 HOURS) |
| 1500 | 46450 | 034470 | DEC 2360 | TIME = 1440 | (0.40 HOURS) |
| 1501 | 46451 | 034425 | DEC 2325 | TIME = 1620 | (0.45 HOURS) |
| 1502 | 46452 | 034350 | DEC 2280 | TIME = 1800 | (0.50 HOURS) |
| 1503 | 46453 | 034247 | DEC 2215 | TIME = 1980 | (0.55 HOURS) |
| 1504 | | | | | |
| 1505 | | | | HCH = 25000 | |
| 1506 | 46454 | 034766 | DEC 2550 | TIME = 0180 | (0.05 HOURS) |
| 1507 | 46455 | 034766 | DEC 2550 | TIME = 0360 | (0.10 HOURS) |
| 1510 | 46456 | 034766 | DEC 2550 | TIME = 0540 | (0.15 HOURS) |
| 1511 | 46457 | 034766 | DEC 2550 | TIME = 0720 | (0.20 HOURS) |
| 1512 | 46460 | 034766 | DEC 2550 | TIME = 0900 | (0.25 HOURS) |
| 1513 | 46461 | 034716 | DEC 2510 | TIME = 1080 | (0.30 HOURS) |
| 1514 | 46462 | 034622 | DEC 2450 | TIME = 1260 | (0.35 HOURS) |
| 1515 | 46463 | 034526 | DEC 2390 | TIME = 1440 | (0.40 HOURS) |
| 1516 | 46464 | 034451 | DEC 2345 | TIME = 1620 | (0.45 HOURS) |
| 1517 | 46465 | 034374 | DEC 2300 | TIME = 1800 | (0.50 HOURS) |
| 1520 | 46466 | 034300 | DEC 2240 | TIME = 1980 | (0.55 HOURS) |
| 1521 | | | | | |
| 1522 | | | | HCH = 30000 | |
| 1523 | 46467 | 034766 | DEC 2550 | TIME = 0180 | (0.05 HOURS) |
| 1524 | 46470 | 034766 | DEC 2550 | TIME = 0360 | (0.10 HOURS) |
| 1525 | 46471 | 034766 | DEC 2550 | TIME = 0540 | (0.15 HOURS) |
| 1526 | 46472 | 034766 | DEC 2550 | TIME = 0720 | (0.20 HOURS) |
| 1527 | 46473 | 034766 | DEC 2550 | TIME = 0900 | (0.25 HOURS) |
| 1530 | 46474 | 034742 | DEC 2530 | TIME = 1080 | (0.30 HOURS) |
| 1531 | 46475 | 034653 | DEC 2475 | TIME = 1260 | (0.35 HOURS) |
| 1532 | 46476 | 034564 | DEC 2420 | TIME = 1440 | (0.40 HOURS) |
| 1533 | 46477 | 034507 | DEC 2375 | TIME = 1620 | (0.45 HOURS) |
| 1534 | 46500 | 034425 | DEC 2325 | TIME = 1800 | (0.50 HOURS) |
| 1535 | 46501 | 034324 | DEC 2260 | TIME = 1980 | (0.55 HOURS) |
| 1536 | | | | | |
| 1537 | | | | HCH = 35000 | |
| 1540 | 46502 | 034766 | DEC 2550 | TIME = 0180 | (0.05 HOURS) |
| 1541 | 46503 | 034766 | DEC 2550 | TIME = 0360 | (0.10 HOURS) |

| | | | | | |
|---|---|---|---|---|---|
| 1542 | 46504 | 034766 | DEC 2550 | TIME = 0540 | (0.15 HOURS) |
| 1543 | 46505 | 034766 | DEC 2550 | TIME = 0720 | (0.20 HOURS) |
| 1544 | 46506 | 034766 | DEC 2550 | TIME = 0900 | (0.25 HOURS) |
| 1545 | 46507 | 034766 | DEC 2550 | TIME = 1080 | (0.30 HOURS) |
| 1546 | 46510 | 034723 | DEC 2515 | TIME = 1260 | (0.35 HOURS) |
| 1547 | 46511 | 034610 | DEC 2440 | TIME = 1440 | (0.40 HOURS) |
| 1550 | 46512 | 034552 | DEC 2410 | TIME = 1620 | (0.45 HOURS) |
| 1551 | 46513 | 034436 | DEC 2350 | TIME = 1800 | (0.50 HOURS) |
| 1552 | 46514 | 034414 | DEC 2380 | TIME = 1980 | (0.55 HOURS) |
| 1553 | | | | | |
| 1554 | | | HCH = 4000 | | |
| 1555 | 46515 | 034766 | DEC 2550 | TIME = 0180 | (0.05 HOURS) |
| 1556 | 46516 | 034766 | DEC 2550 | TIME = 0360 | (0.10 HOURS) |
| 1557 | 46517 | 004766 | DEC 2550 | TIME = 0540 | (0.15 HOURS) |
| 1560 | 46520 | 034766 | DEC 2550 | TIME = 0720 | (0.20 HOURS) |
| 1561 | 46521 | 034766 | DEC 2550 | TIME = 0900 | (0.25 HOURS) |
| 1562 | 46522 | 034766 | DEC 2550 | TIME = 1080 | (0.30 HOURS) |
| 1563 | 46523 | 034747 | DEC 2535 | TIME = 1260 | (0.35 HOURS) |
| 1564 | 46524 | 034646 | DEC 2470 | TIME = 1440 | (0.40 HOURS) |
| 1565 | 46525 | 034704 | DEC 2500 | TIME = 1620 | (0.45 HOURS) |
| 1566 | 46526 | 034742 | DEC 2530 | TIME = 1800 | (0.50 HOURS) |
| 1567 | 46527 | 034766 | DEC 2550 | TIME = 1980 | (0.55 HOURS) |
| 1570 | | | | | |
| 1571 | | | HCH = 45000 | | |
| 1572 | 46530 | 034766 | DEC 2550 | TIME = 0180 | (0.05 HOURS) |
| 1573 | 46531 | 034766 | DEC 2550 | TIME = 0360 | (0.10 HOURS) |
| 1574 | 46532 | 034766 | DEC 2550 | TIME = 0540 | (0.15 HOURS) |
| 1575 | 46533 | 034766 | DEC 2550 | TIME = 0720 | (0.20 HOURS) |
| 1576 | 46534 | 034766 | DEC 2550 | TIME = 0900 | (0.25 HOURS) |
| 1577 | 46535 | 034766 | DEC 2550 | TIME = 1080 | (0.30 HOURS) |
| 1600 | 46536 | 034766 | DEC 2550 | TIME = 1260 | (0.35 HOURS) |
| 1601 | 46537 | 034766 | DEC 2550 | TIME = 1440 | (0.40 HOURS) |
| 1602 | 46540 | 034766 | DEC 2550 | TIME = 1620 | (0.45 HOURS) |
| 1603 | 46541 | 034766 | DEC 2550 | TIME = 1800 | (0.50 HOURS) |
| 1604 | 46542 | 034766 | DEC 2550 | TIME = 1980 | (0.55 HOURS) |
| 1605 | | | | | |
| 1606 | | | HCH = 50000 | | |
| 1607 | 46543 | 034766 | DEC 2550 | TIME = 0180 | (0.05 HOURS) |
| 1610 | 46544 | 034766 | DEC 2550 | TIME = 0360 | (0.10 HOURS) |
| 1611 | 46545 | 004766 | DEC 2550 | TIME = 0540 | (0.15 HOURS) |
| 1612 | 46546 | 034766 | DEC 2550 | TIME = 0720 | (0.20 HOURS) |
| 1613 | 46547 | 034766 | DEC 2550 | TIME = 0900 | (0.25 HOURS) |
| 1614 | 46550 | 034766 | DEC 2550 | TIME = 1080 | (0.30 HOURS) |
| 1615 | 46551 | 034766 | DEC 2550 | TIME = 1260 | (0.35 HOURS) |
| 1616 | 46552 | 034766 | DEC 2550 | TIME = 1440 | (0.40 HOURS) |
| 1617 | 46553 | 034766 | DEC 2550 | TIME = 1620 | (0.45 HOURS) |
| 1620 | 46554 | 034766 | DEC 2550 | TIME = 1800 | (0.50 HOURS) |
| 1621 | 46555 | 034766 | DEC 2550 | TIME = 1980 | (0.55 HOURS) |
| 1622 | | | | | |
| 1623 | | | | | |
| 1624 | | 030022 | BRPT 46600-L | | |
| 1625 | 46556 | 030000 | DEC 0 | | |
| | 46557 | 030000 | | | |
| | 46560 | 030000 | | | |
| | 46561 | 030000 | | | |
| | 46562 | 030000 | | | |
| | 46563 | 030000 | | | |
| | 46564 | 030000 | | | |
| | 46565 | 030000 | | | |
| | 46566 | 030000 | | | |
| | 46567 | 030000 | | | |
| | 46570 | 030000 | | | |
| | 46571 | 030000 | | | |
| | 46572 | 030000 | | | |
| | 46573 | 030000 | | | |
| | 46574 | 030000 | | | |
| | 46575 | 030000 | | | |
| | 46576 | 030000 | | | |
| | 46577 | 030000 | | | |
| 1626 | | | EJE | | |
| 1627 | | 031031 | DRM CTLDRM+264 | | |
| 1630 | | 046400 | LOC TABLOC | | |

******** FIGURE 3 DATA FOR 89 INCH SLAB ********

```
1631
1632
1633
1634
1635                                                  HCH = 5000
1636   46400   034766      DEC 2550                   TIME = 0180   (0.05 HOURS)
1637   46401   034766      DEC 2550                   TIME = 0360   (0.10 HOURS)
1640   46402   034766      DEC 2550                   TIME = 0540   (0.15 HOURS)
1641   46403   034766      DEC 2550                   TIME = 0720   (0.20 HOURS)
1642   46404   034766      DEC 2550                   TIME = 0900   (0.25 HOURS)
1643   46405   034766      DEC 2550                   TIME = 1080   (0.30 HOURS)
1644   46406   034704      DEC 2500                   TIME = 1260   (0.35 HOURS)
1645   46407   034603      DEC 2435                   TIME = 1440   (0.40 HOURS)
1646   46410   034470      DEC 2360                   TIME = 1620   (0.45 HOURS)
1647   46411   034413      DEC 2315                   TIME = 1800   (0.50 HOURS)
1650   46412   034324      DEC 2260                   TIME = 1980   (0.55 HOURS)
1651
1652                                                  HCH = 10000
1653   46413   034704      DEC 2500                   TIME = 0180   (0.05 HOURS)
1654   46414   034704      DEC 2500                   TIME = 0360   (0.10 HOURS)
1655   46415   034704      DEC 2500                   TIME = 0540   (0.15 HOURS)
1656   46416   034704      DEC 2500                   TIME = 0720   (0.20 HOURS)
1657   46417   034704      DEC 2500                   TIME = 0900   (0.25 HOURS)
1660   46420   034704      DEC 2500                   TIME = 1080   (0.30 HOURS)
1661   46421   034730      DEC 2520                   TIME = 1260   (0.35 HOURS)
1662   46422   034627      DEC 2455                   TIME = 1440   (0.40 HOURS)
1663   46423   034514      DEC 2380                   TIME = 1620   (0.45 HOURS)
1664   46424   034444      DEC 2340                   TIME = 1800   (0.50 HOURS)
1665   46425   034350      DEC 2280                   TIME = 1980   (0.55 HOURS)
1666
1667                                                  HCH = 15000
1670   46426   034766      DEC 2550                   TIME = 0180   (0.05 HOURS)
1671   46427   034766      DEC 2550                   TIME = 0360   (0.10 HOURS)
1672   46430   034766      DEC 2550                   TIME = 0540   (0.15 HOURS)
1673   46431   034766      DEC 2550                   TIME = 0720   (0.20 HOURS)
1674   46432   034766      DEC 2550                   TIME = 0900   (0.25 HOURS)
1675   46433   034766      DEC 2550                   TIME = 1080   (0.30 HOURS)
1676   46434   034761      DEC 2545                   TIME = 1260   (0.35 HOURS)
1677   46435   034660      DEC 2480                   TIME = 1440   (0.40 HOURS)
1700   46436   034571      DEC 2425                   TIME = 1620   (0.45 HOURS)
1701   46437   034456      DEC 2350                   TIME = 1800   (0.50 HOURS)
1702   46440   034374      DEC 2300                   TIME = 1980   (0.55 HOURS)
1703
1704                                                  HCH = 20000
1705   46441   034766      DEC 2550                   TIME = 0180   (0.05 HOURS)
1706   46442   034766      DEC 2550                   TIME = 0360   (0.10 HOURS)
1707   46443   034766      DEC 2550                   TIME = 0540   (0.15 HOURS)
1710   46444   034766      DEC 2550                   TIME = 0720   (0.20 HOURS)
1711   46445   034766      DEC 2550                   TIME = 0900   (0.25 HOURS)
1712   46446   034766      DEC 2550                   TIME = 1080   (0.30 HOURS)
1713   46447   034766      DEC 2550                   TIME = 1260   (0.35 HOURS)
1714   46450   034704      DEC 2500                   TIME = 1440   (0.40 HOURS)
1715   46451   034615      DEC 2445                   TIME = 1620   (0.45 HOURS)
1716   46452   034502      DEC 2370                   TIME = 1800   (0.50 HOURS)
1717   46453   034420      DEC 2320                   TIME = 1980   (0.55 HOURS)
1720
1721                                                  HCH = 25000
1722   46454   034766      DEC 2550                   TIME = 0180   (0.05 HOURS)
1723   46455   034766      DEC 2550                   TIME = 0360   (0.10 HOURS)
1724   46456   034766      DEC 2550                   TIME = 0540   (0.15 HOURS)
1725   46457   034766      DEC 2550                   TIME = 0720   (0.20 HOURS)
1726   46460   034766      DEC 2550                   TIME = 0900   (0.25 HOURS)
1727   46461   034766      DEC 2550                   TIME = 1080   (0.30 HOURS)
1730   46462   034766      DEC 2550                   TIME = 1260   (0.35 HOURS)
1731   46463   034742      DEC 2530                   TIME = 1440   (0.40 HOURS)
1732   46464   034646      DEC 2470                   TIME = 1620   (0.45 HOURS)
1733   46465   034540      DEC 2400                   TIME = 1800   (0.50 HOURS)
1734   46466   034437      DEC 2335                   TIME = 1980   (0.55 HOURS)
1735
1736                                                  HCH = 30000
1737   46467   034766      DEC 2550                   TIME = 0180   (0.05 HOURS)
1740   46470   034766      DEC 2550                   TIME = 0360   (0.10 HOURS)
```

| | | | | | |
|---|---|---|---|---|---|
| 1741 | 46471 | 004766 | DEC 2550 | TIME = 0540 | (0.15 HOURS) |
| 1742 | 46472 | 004766 | DEC 2550 | TIME = 0720 | (0.20 HOURS) |
| 1743 | 46473 | 004766 | DEC 2550 | TIME = 0900 | (0.25 HOURS) |
| 1744 | 46474 | 004766 | DEC 2550 | TIME = 1080 | (0.30 HOURS) |
| 1745 | 46475 | 004766 | DEC 2550 | TIME = 1260 | (0.35 HOURS) |
| 1746 | 46476 | 004766 | DEC 2550 | TIME = 1440 | (0.40 HOURS) |
| 1747 | 46477 | 004660 | DEC 2480 | TIME = 1620 | (0.45 HOURS) |
| 1750 | 46500 | 004571 | DEC 2425 | TIME = 1800 | (0.50 HOURS) |
| 1751 | 46501 | 004456 | DEC 2350 | TIME = 1980 | (0.55 HOURS) |
| 1752 | | | | | |
| 1753 | | | | HCH = 35000 | |
| 1754 | 46502 | 004766 | DEC 2550 | TIME = 0180 | (0.05 HOURS) |
| 1755 | 46503 | 004766 | DEC 2550 | TIME = 0360 | (0.10 HOURS) |
| 1756 | 46504 | 004766 | DEC 2550 | TIME = 0540 | (0.15 HOURS) |
| 1757 | 46505 | 004766 | DEC 2550 | TIME = 0720 | (0.20 HOURS) |
| 1760 | 46506 | 004766 | DEC 2550 | TIME = 0900 | (0.25 HOURS) |
| 1761 | 46507 | 004766 | DEC 2550 | TIME = 1080 | (0.30 HOURS) |
| 1762 | 46510 | 004766 | DEC 2550 | TIME = 1260 | (0.35 HOURS) |
| 1763 | 46511 | 004766 | DEC 2550 | TIME = 1440 | (0.40 HOURS) |
| 1764 | 46512 | 004723 | DEC 2515 | TIME = 1620 | (0.45 HOURS) |
| 1765 | 46513 | 004622 | DEC 2450 | TIME = 1800 | (0.50 HOURS) |
| 1766 | 46514 | 004514 | DEC 2380 | TIME = 1980 | (0.55 HOURS) |
| 1767 | | | | | |
| 1770 | | | | HCH = 40000 | |
| 1771 | 46515 | 004766 | DEC 2550 | TIME = 0180 | (0.05 HOURS) |
| 1772 | 46516 | 004766 | DEC 2550 | TIME = 0360 | (0.10 HOURS) |
| 1773 | 46517 | 004766 | DEC 2550 | TIME = 0540 | (0.15 HOURS) |
| 1774 | 46520 | 004766 | DEC 2550 | TIME = 0720 | (0.20 HOURS) |
| 1775 | 46521 | 004766 | DEC 2550 | TIME = 0900 | (0.25 HOURS) |
| 1776 | 46522 | 004766 | DEC 2550 | TIME = 1080 | (0.30 HOURS) |
| 1777 | 46523 | 004766 | DEC 2550 | TIME = 1260 | (0.35 HOURS) |
| 2000 | 46524 | 004766 | DEC 2550 | TIME = 1440 | (0.40 HOURS) |
| 2001 | 46525 | 004742 | DEC 2530 | TIME = 1620 | (0.45 HOURS) |
| 2002 | 46526 | 004653 | DEC 2475 | TIME = 1800 | (0.50 HOURS) |
| 2003 | 46527 | 004540 | DEC 2400 | TIME = 1980 | (0.55 HOURS) |
| 2004 | | | | | |
| 2005 | | | | HCH = 45000 | |
| 2006 | 46530 | 004766 | DEC 2550 | TIME = 0180 | (0.05 HOURS) |
| 2007 | 46531 | 004766 | DEC 2550 | TIME = 0360 | (0.10 HOURS) |
| 2010 | 46532 | 004766 | DEC 2550 | TIME = 0540 | (0.15 HOURS) |
| 2011 | 46533 | 004766 | DEC 2550 | TIME = 0720 | (0.20 HOURS) |
| 2012 | 46534 | 004766 | DEC 2550 | TIME = 0900 | (0.25 HOURS) |
| 2013 | 46535 | 004766 | DEC 2550 | TIME = 1080 | (0.30 HOURS) |
| 2014 | 46536 | 004766 | DEC 2550 | TIME = 1260 | (0.35 HOURS) |
| 2015 | 46537 | 004766 | DEC 2550 | TIME = 1440 | (0.40 HOURS) |
| 2016 | 46540 | 004766 | DEC 2550 | TIME = 1620 | (0.45 HOURS) |
| 2017 | 46541 | 004677 | DEC 2495 | TIME = 1800 | (0.50 HOURS) |
| 2020 | 46542 | 004735 | DEC 2525 | TIME = 1980 | (0.55 HOURS) |
| 2021 | | | | | |
| 2022 | | | | HCH = 50000 | |
| 2023 | 46543 | 004766 | DEC 2550 | TIME = 0180 | (0.05 HOURS) |
| 2024 | 46544 | 004766 | DEC 2550 | TIME = 0360 | 0.10 HOURS) |
| 2025 | 46545 | 004766 | DEC 2550 | TIME = 0540 | 0.15 HOURS) |
| 2026 | 46546 | 004766 | DEC 2550 | TIME = 0720 | 0.20 HOURS) |
| 2027 | 46547 | 004766 | DEC 2550 | TIME = 0900 | 0.25 HOURS) |
| 2030 | 46550 | 004766 | DEC 2550 | TIME = 1080 | 0.30 HOURS) |
| 2031 | 46551 | 004766 | DEC 2550 | TIME = 1260 | 0.35 HOURS) |
| 2032 | 46552 | 004766 | DEC 2550 | TIME = 1440 | 0.40 HOURS) |
| 2033 | 46553 | 004766 | DEC 2550 | TIME = 1620 | 0.45 HOURS) |
| 2034 | 46554 | 004766 | DEC 2550 | TIME = 1800 | 0.50 HOURS) |
| 2035 | 46555 | 004766 | DEC 2550 | TIME = 1980 | 0.55 HOURS) |
| 2036 | | | | | |
| 2037 | | | | | |
| 2040 | | 000022 | BRPT 46600-L | | |
| 2041 | 46556 | 000000 | DEC 0 | | |
| | 46557 | 000000 | | | |
| | 46560 | 000000 | | | |
| | 46561 | 000000 | | | |
| | 46562 | 000000 | | | |
| | 46563 | 000000 | | | |
| | 46564 | 000000 | | | |
| | 46565 | 000000 | | | |

```
            46566   030000
            46567   030000
            46570   030000
            46571   030000
            46572   030000
            46573   030000
            46574   030000
            46575   000000
            46576   000000
            46577   030000
2042                        EJE
2043        031032          DRM CTLDRM+265
2044        046400          LOC TABLOC
2045
2046                        ********* FIGURE 3 DATA FOR 10 INCH SLAB *********
2047
2050
2051                                    HCH = 5000
2052  46400  034766         DEC 2550            TIME = 0180   (0.05 HOURS)
2053  46401  034766         DEC 2550            TIME = 0360   (0.10 HOURS)
2054  46402  034766         DEC 2550            TIME = 0540   (0.15 HOURS)
2055  46403  034754         DEC 2540            TIME = 0720   (0.20 HOURS)
2056  46404  034723         DEC 2515            TIME = 0900   (0.25 HOURS)
2057  46405  034704         DEC 2500            TIME = 1080   (0.30 HOURS)
2060  46406  034641         DEC 2465            TIME = 1260   (0.35 HOURS)
2061  46407  034576         DEC 2430            TIME = 1440   (0.40 HOURS)
2062  46410  034526         DEC 2390            TIME = 1620   (0.45 HOURS)
2063  46411  034463         DEC 2355            TIME = 1800   (0.50 HOURS)
2064  46412  034425         DEC 2325            TIME = 1980   (0.55 HOURS)
2065
2066                                    HCH = 10000
2067  46413  034766         DEC 2550            TIME = 0180   (0.05 HOURS)
2070  46414  034766         DEC 2550            TIME = 0360   (0.10 HOURS)
2071  46415  034766         DEC 2550            TIME = 0540   (0.15 HOURS)
2072  46416  034766         DEC 2550            TIME = 0720   (0.20 HOURS)
2073  46417  034742         DEC 2530            TIME = 0900   (0.25 HOURS)
2074  46420  034730         DEC 2520            TIME = 1080   (0.30 HOURS)
2075  46421  034660         DEC 2480            TIME = 1260   (0.35 HOURS)
2076  46422  034622         DEC 2450            TIME = 1440   (0.40 HOURS)
2077  46423  034564         DEC 2420            TIME = 1620   (0.45 HOURS)
2100  46424  034514         DEC 2380            TIME = 1800   (0.50 HOURS)
2101  46425  034451         DEC 2345            TIME = 1980   (0.55 HOURS)
2102
2103                                    HCH = 15000
2104  46426  034766         DEC 2550            TIME = 0180   (0.05 HOURS)
2105  46427  034766         DEC 2550            TIME = 0360   (0.10 HOURS)
2106  46430  034766         DEC 2550            TIME = 0540   (0.15 HOURS)
2107  46431  034766         DEC 2550            TIME = 0720   (0.20 HOURS)
2110  46432  034766         DEC 2550            TIME = 0900   (0.25 HOURS)
2111  46433  034754         DEC 2540            TIME = 1080   (0.30 HOURS)
2112  46434  034716         DEC 2510            TIME = 1260   (0.35 HOURS)
2113  46435  034653         DEC 2475            TIME = 1440   (0.40 HOURS)
2114  46436  034610         DEC 2440            TIME = 1620   (0.45 HOURS)
2115  46437  034533         DEC 2395            TIME = 1800   (0.50 HOURS)
2116  46440  034475         DEC 2365            TIME = 1980   (0.55 HOURS)
2117
2120                                    HCH = 20000
2121  46441  034766         DEC 2550            TIME = 0180   (0.05 HOURS)
2122  46442  034766         DEC 2550            TIME = 0360   (0.10 HOURS)
2123  46443  034766         DEC 2550            TIME = 0540   (0.15 HOURS)
2124  46444  034766         DEC 2550            TIME = 0720   (0.20 HOURS)
2125  46445  034766         DEC 2550            TIME = 0900   (0.25 HOURS)
2126  46446  034766         DEC 2550            TIME = 1080   (0.30 HOURS)
2127  46447  034735         DEC 2525            TIME = 1260   (0.35 HOURS)
2130  46450  034677         DEC 2495            TIME = 1440   (0.40 HOURS)
2131  46451  034627         DEC 2455            TIME = 1620   (0.45 HOURS)
2132  46452  034564         DEC 2420            TIME = 1800   (0.50 HOURS)
2133  46453  034514         DEC 2380            TIME = 1980   (0.55 HOURS)
2134
2135                                    HCH = 25000
2136  46454  034766         DEC 2550            TIME = 0180   (0.05 HOURS)
2137  46455  034766         DEC 2550            TIME = 0360   (0.10 HOURS)
```

| | | | | | | |
|---|---|---|---|---|---|---|
|2140|46456|034766|DEC 2550| |TIME = 0540|(0.15 HOURS)|
|2141|46457|034766|DEC 2550| |TIME = 0720|(0.20 HOURS)|
|2142|46460|034766|DEC 2550| |TIME = 0900|(0.25 HOURS)|
|2143|46461|034766|DEC 2550| |TIME = 1080|(0.30 HOURS)|
|2144|46462|034766|DEC 2550| |TIME = 1260|(0.35 HOURS)|
|2145|46463|004730|DEC 2520| |TIME = 1440|(0.40 HOURS)|
|2146|46464|034665|DEC 2485| |TIME = 1620|(0.45 HOURS)|
|2147|46465|034615|DEC 2445| |TIME = 1800|(0.50 HOURS)|
|2150|46466|034545|DEC 2405| |TIME = 1980|(0.55 HOURS)|
|2151| | | | | | |
|2152| | | |HCH = 30000| | |
|2153|46467|034766|DEC 2550| |TIME = 0180|(0.05 HOURS)|
|2154|46470|034766|DEC 2550| |TIME = 0360|(0.10 HOURS)|
|2155|46471|034766|DEC 2550| |TIME = 0540|(0.15 HOURS)|
|2156|46472|034766|DEC 2550| |TIME = 0720|(0.20 HOURS)|
|2157|46473|034766|DEC 2550| |TIME = 0900|(0.25 HOURS)|
|2160|46474|034766|DEC 2550| |TIME = 1080|(0.30 HOURS)|
|2161|46475|034766|DEC 2550| |TIME = 1260|(0.35 HOURS)|
|2162|46476|034754|DEC 2540| |TIME = 1440|(0.40 HOURS)|
|2163|46477|034711|DEC 2505| |TIME = 1620|(0.45 HOURS)|
|2164|46500|034641|DEC 2465| |TIME = 1800|(0.50 HOURS)|
|2165|46501|034576|DEC 2430| |TIME = 1980|(0.55 HOURS)|
|2166| | | | | | |
|2167| | | |HCH = 35000| | |
|2170|46502|034766|DEC 2550| |TIME = 0180|(0.05 HOURS)|
|2171|46503|034766|DEC 2550| |TIME = 0360|(0.10 HOURS)|
|2172|46504|034766|DEC 2550| |TIME = 0540|(0.15 HOURS)|
|2173|46505|034766|DEC 2550| |TIME = 0720|(0.20 HOURS)|
|2174|46506|034766|DEC 2550| |TIME = 0900|(0.25 HOURS)|
|2175|46507|034766|DEC 2550| |TIME = 1080|(0.30 HOURS)|
|2176|46510|034766|DEC 2550| |TIME = 1260|(0.35 HOURS)|
|2177|46511|034766|DEC 2550| |TIME = 1440|(0.40 HOURS)|
|2200|46512|034742|DEC 2530| |TIME = 1620|(0.45 HOURS)|
|2201|46513|034665|DEC 2485| |TIME = 1800|(0.50 HOURS)|
|2202|46514|034622|DEC 2450| |TIME = 1980|(0.55 HOURS)|
|2203| | | | | | |
|2204| | | |HCH = 40000| | |
|2205|46515|034766|DEC 2550| |TIME = 0180|(0.05 HOURS)|
|2206|46516|034766|DEC 2550| |TIME = 0360|(0.10 HOURS)|
|2207|46517|034766|DEC 2550| |TIME = 0540|(0.15 HOURS)|
|2210|46520|034766|DEC 2550| |TIME = 0720|(0.20 HOURS)|
|2211|46521|034766|DEC 2550| |TIME = 0900|(0.25 HOURS)|
|2212|46522|034766|DEC 2550| |TIME = 1080|(0.30 HOURS)|
|2213|46523|034766|DEC 2550| |TIME = 1260|(0.35 HOURS)|
|2214|46524|034766|DEC 2550| |TIME = 1440|(0.40 HOURS)|
|2215|46525|034766|DEC 2550| |TIME = 1620|(0.45 HOURS)|
|2216|46526|034723|DEC 2515| |TIME = 1800|(0.50 HOURS)|
|2217|46527|034653|DEC 2475| |TIME = 1980|(0.55 HOURS)|
|2220| | | | | | |
|2221| | | |HCH = 45000| | |
|2222|46530|034766|DEC 2550| |TIME = 0180|(0.05 HOURS)|
|2223|46531|034766|DEC 2550| |TIME = 0360|(0.10 HOURS)|
|2224|46532|034766|DEC 2550| |TIME = 0540|(0.15 HOURS)|
|2225|46533|034766|DEC 2550| |TIME = 0720|(0.20 HOURS)|
|2226|46534|034766|DEC 2550| |TIME = 0900|(0.25 HOURS)|
|2227|46535|034766|DEC 2550| |TIME = 1080|(0.30 HOURS)|
|2230|46536|034766|DEC 2550| |TIME = 1260|(0.35 HOURS)|
|2231|46537|034766|DEC 2550| |TIME = 1440|(0.40 HOURS)|
|2232|46540|034766|DEC 2550| |TIME = 1620|(0.45 HOURS)|
|2233|46541|034754|DEC 2540| |TIME = 1800|(0.50 HOURS)|
|2234|46542|034711|DEC 2505| |TIME = 1980|(0.55 HOURS)|
|2235| | | | | | |
|2236| | | |HCH = 50000| | |
|2237|46543|034766|DEC 2550| |TIME = 0180|(0.05 HOURS)|
|2240|46544|034766|DEC 2550| |TIME = 0360|(0.10 HOURS)|
|2241|46545|034766|DEC 2550| |TIME = 0540|(0.15 HOURS)|
|2242|46546|034766|DEC 2550| |TIME = 0720|(0.20 HOURS)|
|2243|46547|034766|DEC 2550| |TIME = 0900|(0.25 HOURS)|
|2244|46550|034766|DEC 2550| |TIME = 1080|(0.30 HOURS)|
|2245|46551|034766|DEC 2550| |TIME = 1260|(0.35 HOURS)|
|2246|46552|034766|DEC 2550| |TIME = 1440|(0.40 HOURS)|
|2247|46553|034766|DEC 2550| |TIME = 1620|(0.45 HOURS)|

```
2250   46554   034766          DEC 2550              TIME = 1800  (0.50 HOURS)
2251   46555   034735          DEC 2525              TIME = 1980  (0.55 HOURS)
2252
2253
2254           030022          BRPT 46600-L
2255   46556   030000          DEC 0
       46557   030000
       46560   030000
       46561   030000
       46562   030000
       46563   030000
       46564   030000
       46565   030000
       46566   030000
       46567   030000
       46570   030000
       46571   030000
       46572   030000
       46573   030000
       46574   030000
       46575   030000
       46576   030000
       46577   030000
2256                           EJE
2257           031033          DRM CTLDRM+266
2260           046400          LOC TABLOC
2261
2262                    ********** FIGURE 3 DATA FOR 11 INCH SLAB **********
2263
2264
2265                                                 FCH = 5000
2266   46400   035050          DEC 2600              TIME = 0180  (0.05 HOURS)
2267   46401   035050          DEC 2600              TIME = 0360  (0.10 HOURS)
2270   46402   035050          DEC 2600              TIME = 0540  (0.15 HOURS)
2271   46403   035043          DEC 2595              TIME = 0720  (0.20 HOURS)
2272   46404   035012          DEC 2570              TIME = 0900  (0.25 HOURS)
2273   46405   034747          DEC 2535              TIME = 1080  (0.30 HOURS)
2274   46406   034672          DEC 2490              TIME = 1260  (0.35 HOURS)
2275   46407   034641          DEC 2465              TIME = 1440  (0.40 HOURS)
2276   46410   034603          DEC 2435              TIME = 1620  (0.45 HOURS)
2277   46411   034540          DEC 2400              TIME = 1800  (0.50 HOURS)
2300   46412   034507          DEC 2375              TIME = 1980  (0.55 HOURS)
2301
2302                                                 FCH = 10000
2303   46413   035050          DEC 2600              TIME = 0180  (0.05 HOURS)
2304   46414   035050          DEC 2600              TIME = 0360  (0.10 HOURS)
2305   46415   035050          DEC 2600              TIME = 0540  (0.15 HOURS)
2306   46416   035050          DEC 2600              TIME = 0720  (0.20 HOURS)
2307   46417   035024          DEC 2580              TIME = 0900  (0.25 HOURS)
2310   46420   035000          DEC 2560              TIME = 1080  (0.30 HOURS)
2311   46421   034730          DEC 2520              TIME = 1260  (0.35 HOURS)
2312   46422   034665          DEC 2485              TIME = 1440  (0.40 HOURS)
2313   46423   034627          DEC 2455              TIME = 1620  (0.45 HOURS)
2314   46424   034571          DEC 2425              TIME = 1800  (0.50 HOURS)
2315   46425   034526          DEC 2390              TIME = 1980  (0.55 HOURS)
2316
2317                                                 FCH = 15000
2320   46426   035050          DEC 2600              TIME = 0180  (0.05 HOURS)
2321   46427   035050          DEC 2600              TIME = 0360  (0.10 HOURS)
2322   46430   035050          DEC 2600              TIME = 0540  (0.15 HOURS)
2323   46431   035050          DEC 2600              TIME = 0720  (0.20 HOURS)
2324   46432   035050          DEC 2600              TIME = 0900  (0.25 HOURS)
2325   46433   035024          DEC 2580              TIME = 1080  (0.30 HOURS)
2326   46434   034761          DEC 2545              TIME = 1260  (0.35 HOURS)
2327   46435   034716          DEC 2510              TIME = 1440  (0.40 HOURS)
2330   46436   034665          DEC 2485              TIME = 1620  (0.45 HOURS)
2331   46437   034622          DEC 2450              TIME = 1800  (0.50 HOURS)
2332   46440   034571          DEC 2425              TIME = 1980  (0.55 HOURS)
2333
2334                                                 FCH = 20000
2335   46441   035050          DEC 2600              TIME = 0180  (0.05 HOURS)
2336   46442   035050          DEC 2600              TIME = 0360  (0.10 HOURS)
```

```
2337   46443   035050      DEC 2600         TIME = 0540    (0.15 HOURS)
2340   46444   035050      DEC 2600         TIME = 0720    (0.20 HOURS)
2341   46445   035050      DEC 2600         TIME = 0900    (0.25 HOURS)
2342   46446   035050      DEC 2600         TIME = 1080    (0.30 HOURS)
2343   46447   035012      DEC 2570         TIME = 1260    (0.35 HOURS)
2344   46450   034794      DEC 2540         TIME = 1440    (0.40 HOURS)
2345   46451   034877      DEC 2495         TIME = 1620    (0.45 HOURS)
2346   46452   034653      DEC 2475         TIME = 1800    (0.50 HOURS)
2347   46453   034610      DEC 2440         TIME = 1980    (0.55 HOURS)
2350
2351                                    HCH = 25000
2352   46454   035050      DEC 2600         TIME = 0180    (0.05 HOURS)
2353   46455   035050      DEC 2600         TIME = 0360    (0.10 HOURS)
2354   46456   035050      DEC 2600         TIME = 0540    (0.15 HOURS)
2355   46457   035050      DEC 2600         TIME = 0720    (0.20 HOURS)
2356   46460   035050      DEC 2600         TIME = 0900    (0.25 HOURS)
2357   46461   035050      DEC 2600         TIME = 1080    (0.30 HOURS)
2360   46462   035031      DEC 2585         TIME = 1260    (0.35 HOURS)
2361   46463   034773      DEC 2555         TIME = 1440    (0.40 HOURS)
2362   46464   034742      DEC 2530         TIME = 1620    (0.45 HOURS)
2363   46465   034660      DEC 2480         TIME = 1800    (0.50 HOURS)
2364   46466   034641      DEC 2465         TIME = 1980    (0.55 HOURS)
2365
2366                                    HCH = 30000
2367   46467   035050      DEC 2600         TIME = 0180    (0.05 HOURS)
2370   46470   035050      DEC 2600         TIME = 0360    (0.10 HOURS)
2371   46471   035050      DEC 2600         TIME = 0540    (0.15 HOURS)
2372   46472   035050      DEC 2600         TIME = 0720    (0.20 HOURS)
2373   46473   035050      DEC 2600         TIME = 0900    (0.25 HOURS)
2374   46474   035050      DEC 2600         TIME = 1080    (0.30 HOURS)
2375   46475   035050      DEC 2600         TIME = 1260    (0.35 HOURS)
2376   46476   035024      DEC 2580         TIME = 1440    (0.40 HOURS)
2377   46477   034766      DEC 2550         TIME = 1620    (0.45 HOURS)
2400   46500   034723      DEC 2515         TIME = 1800    (0.50 HOURS)
2401   46501   034665      DEC 2485         TIME = 1980    (0.55 HOURS)
2402
2403                                    HCH = 35000
2404   46502   035050      DEC 2600         TIME = 0180    (0.05 HOURS)
2405   46503   035050      DEC 2600         TIME = 0360    (0.10 HOURS)
2406   46504   035050      DEC 2600         TIME = 0540    (0.15 HOURS)
2407   46505   035050      DEC 2600         TIME = 0720    (0.20 HOURS)
2410   46506   035050      DEC 2600         TIME = 0900    (0.25 HOURS)
2411   46507   035050      DEC 2600         TIME = 1080    (0.30 HOURS)
2412   46510   035050      DEC 2600         TIME = 1260    (0.35 HOURS)
2413   46511   035050      DEC 2600         TIME = 1440    (0.40 HOURS)
2414   46512   035024      DEC 2580         TIME = 1620    (0.45 HOURS)
2415   46513   034761      DEC 2545         TIME = 1800    (0.50 HOURS)
2416   46514   034704      DEC 2500         TIME = 1980    (0.55 HOURS)
2417
2420                                    HCH = 40000
2421   46515   035050      DEC 2600         TIME = 0180    (0.05 HOURS)
2422   46516   035050      DEC 2600         TIME = 0360    (0.10 HOURS)
2423   46517   035050      DEC 2600         TIME = 0540    (0.15 HOURS)
2424   46520   035050      DEC 2600         TIME = 0720    (0.20 HOURS)
2425   46521   035050      DEC 2600         TIME = 0900    (0.25 HOURS)
2426   46522   035050      DEC 2600         TIME = 1080    (0.30 HOURS)
2427   46523   035050      DEC 2600         TIME = 1260    (0.35 HOURS)
2430   46524   035050      DEC 2600         TIME = 1440    (0.40 HOURS)
2431   46525   035050      DEC 2600         TIME = 1620    (0.45 HOURS)
2432   46526   035012      DEC 2570         TIME = 1800    (0.50 HOURS)
2433   46527   034742      DEC 2530         TIME = 1980    (0.55 HOURS)
2434
2435                                    HCH = 45000
2436   46530   035050      DEC 2600         TIME = 0180    (0.05 HOURS)
2437   46531   035050      DEC 2600         TIME = 0360    (0.10 HOURS)
2440   46532   035050      DEC 2600         TIME = 0540    (0.15 HOURS)
2441   46533   035050      DEC 2600         TIME = 0720    (0.20 HOURS)
2442   46534   035050      DEC 2600         TIME = 0900    (0.25 HOURS)
2443   46535   035050      DEC 2600         TIME = 1080    (0.30 HOURS)
2444   46536   035050      DEC 2600         TIME = 1260    (0.35 HOURS)
2445   46537   035050      DEC 2600         TIME = 1440    (0.40 HOURS)
```

```
2446    46540   035050      DEC 2600            TIME = 1620   (0.45 HOURS)
2447    46541   035207      DEC 2695            TIME = 1800   (0.50 HOURS)
2450    46542   034773      DEC 2555            TIME = 1980   (0.55 HOURS)
2451
2452                                    HCH = 50000
2453    46543   035050      DEC 2600            TIME = 0180   (0.05 HOURS)
2454    46544   035050      DEC 2600            TIME = 0360   (0.10 HOURS)
2455    46545   035050      DEC 2600            TIME = 0540   (0.15 HOURS)
2456    46546   035050      DEC 2600            TIME = 0720   (0.20 HOURS)
2457    46547   035050      DEC 2600            TIME = 0900   (0.25 HOURS)
2460    46550   035050      DEC 2600            TIME = 1080   (0.30 HOURS)
2461    46551   035050      DEC 2600            TIME = 1260   (0.35 HOURS)
2462    46552   035050      DEC 2600            TIME = 1440   (0.40 HOURS)
2463    46553   035050      DEC 2600            TIME = 1620   (0.45 HOURS)
2464    46554   035050      DEC 2600            TIME = 1800   (0.50 HOURS)
2465    46555   035017      DEC 2575            TIME = 1980   (0.55 HOURS)
2466
2467
2470            000022      BRPT 46600-L
2471    46556   000000      DEC 0
        46557   000000
        46560   000000
        46561   000000
        46562   000000
        46563   000000
        46564   000000
        46565   000000
        46566   000000
        46567   000000
        46570   000000
        46571   000000
        46572   000000
        46573   000000
        46574   000000
        46575   000000
        46576   000000
        46577   000000
2472                        EJE
2473            001034      DRM CTLDRM+267
2474            046400      LOC TABLOC
2475
2476                        ********** FIGURE 4 DATA FOR 06 INCH SLAB ******
2477
2500
2501                                    HH = 1500
2502    46400   034603      DEC 2435            TIME = 0720   (0.2 HOURS)
2503    46401   034540      DEC 2400            TIME = 1440   (0.4 HOURS)
2504    46402   034526      DEC 2390            TIME = 2160   (0.6 HOURS)
2505    46403   034514      DEC 2380            TIME = 2880   (0.8 HOURS)
2506    46404   034502      DEC 2370            TIME = 3600   (1.0 HOURS)
2507    46405   034470      DEC 2360            TIME = 4320   (1.2 HOURS)
2510    46406   034456      DEC 2350            TIME = 5040   (1.4 HOURS)
2511    46407   034444      DEC 2340            TIME = 5760   (1.6 HOURS)
2512    46410   034432      DEC 2330            TIME = 6480   (1.8 HOURS)
2513    46411   034420      DEC 2320            TIME = 7200   (2.0 HOURS)
2514    46412   034406      DEC 2310            TIME = 7920   (2.2 HOURS)
2515
2516                                    HH = 2000
2517    46413   034665      DEC 2485            TIME = 0720   (0.2 HOURS)
2520    46414   034610      DEC 2440            TIME = 1440   (0.4 HOURS)
2521    46415   034576      DEC 2430            TIME = 2160   (0.6 HOURS)
2522    46416   034564      DEC 2420            TIME = 2880   (0.8 HOURS)
2523    46417   034552      DEC 2410            TIME = 3600   (1.0 HOURS)
2524    46420   034540      DEC 2400            TIME = 4320   (1.2 HOURS)
2525    46421   034526      DEC 2390            TIME = 5040   (1.4 HOURS)
2526    46422   034514      DEC 2380            TIME = 5760   (1.6 HOURS)
2527    46423   034502      DEC 2370            TIME = 6480   (1.8 HOURS)
2530    46424   034470      DEC 2360            TIME = 7200   (2.0 HOURS)
2531    46425   034456      DEC 2350            TIME = 7920   (2.2 HOURS)
2532
2533                                    HH = 2500
2534    46426   034677      DEC 2495            TIME = 0720   (0.2 HOURS)
```

| | | | | | | | |
|---|---|---|---|---|---|---|---|
| 2535 | 46427 | 034622 | DEC 2450 | TIME = 1440 | (0.4 HOURS) |
| 2536 | 46430 | 034610 | DEC 2440 | TIME = 2160 | (0.6 HOURS) |
| 2537 | 46431 | 034576 | DEC 2430 | TIME = 2880 | (0.8 HOURS) |
| 2540 | 46432 | 034564 | DEC 2420 | TIME = 3600 | (1.0 HOURS) |
| 2541 | 46433 | 034552 | DEC 2410 | TIME = 4320 | (1.2 HOURS) |
| 2542 | 46434 | 034540 | DEC 2400 | TIME = 5040 | (1.4 HOURS) |
| 2543 | 46435 | 034526 | DEC 2390 | TIME = 5760 | (1.6 HOURS) |
| 2544 | 46436 | 034514 | DEC 2380 | TIME = 6480 | (1.8 HOURS) |
| 2545 | 46437 | 034502 | DEC 2370 | TIME = 7200 | (2.0 HOURS) |
| 2546 | 46440 | 034470 | DEC 2360 | TIME = 7920 | (2.2 HOURS) |
| 2547 | | | | | |
| 2550 | | | MH = 3000 | | |
| 2551 | 46441 | 034700 | DEC 2496 | TIME = 0720 | (0.2 HOURS) |
| 2552 | 46442 | 034627 | DEC 2455 | TIME = 1440 | (0.4 HOURS) |
| 2553 | 46443 | 034615 | DEC 2445 | TIME = 2160 | (0.6 HOURS) |
| 2554 | 46444 | 034603 | DEC 2435 | TIME = 2880 | (0.8 HOURS) |
| 2555 | 46445 | 034571 | DEC 2425 | TIME = 3600 | (1.0 HOURS) |
| 2556 | 46446 | 034557 | DEC 2415 | TIME = 4320 | (1.2 HOURS) |
| 2557 | 46447 | 034545 | DEC 2405 | TIME = 5040 | (1.4 HOURS) |
| 2560 | 46450 | 034533 | DEC 2395 | TIME = 5760 | (1.6 HOURS) |
| 2561 | 46451 | 034521 | DEC 2385 | TIME = 6480 | (1.8 HOURS) |
| 2562 | 46452 | 034507 | DEC 2375 | TIME = 7200 | (2.0 HOURS) |
| 2563 | 46453 | 034475 | DEC 2365 | TIME = 7920 | (2.2 HOURS) |
| 2564 | | | | | |
| 2565 | | | MH = 3500 | | |
| 2566 | 46454 | 034703 | DEC 2499 | TIME = 0720 | (0.2 HOURS) |
| 2567 | 46455 | 034637 | DEC 2463 | TIME = 1440 | (0.4 HOURS) |
| 2570 | 46456 | 034622 | DEC 2450 | TIME = 2160 | (0.6 HOURS) |
| 2571 | 46457 | 034610 | DEC 2440 | TIME = 2880 | (0.8 HOURS) |
| 2572 | 46460 | 034576 | DEC 2430 | TIME = 3600 | (1.0 HOURS) |
| 2573 | 46461 | 034564 | DEC 2420 | TIME = 4320 | (1.2 HOURS) |
| 2574 | 46462 | 034552 | DEC 2410 | TIME = 5040 | (1.4 HOURS) |
| 2575 | 46463 | 034540 | DEC 2400 | TIME = 5760 | (1.6 HOURS) |
| 2576 | 46464 | 034526 | DEC 2390 | TIME = 6480 | (1.8 HOURS) |
| 2577 | 46465 | 034514 | DEC 2380 | TIME = 7200 | (2.0 HOURS) |
| 2600 | 46466 | 034502 | DEC 2370 | TIME = 7920 | (2.2 HOURS) |
| 2601 | | | | | |
| 2602 | | | MH = 4000 | | |
| 2603 | 46467 | 034704 | DEC 2500 | TIME = 0720 | (0.2 HOURS) |
| 2604 | 46470 | 034644 | DEC 2468 | TIME = 1440 | (0.4 HOURS) |
| 2605 | 46471 | 034634 | DEC 2460 | TIME = 2160 | (0.6 HOURS) |
| 2606 | 46472 | 034622 | DEC 2450 | TIME = 2880 | (0.8 HOURS) |
| 2607 | 46473 | 034610 | DEC 2440 | TIME = 3600 | (1.0 HOURS) |
| 2610 | 46474 | 034576 | DEC 2430 | TIME = 4320 | (1.2 HOURS) |
| 2611 | 46475 | 034564 | DEC 2420 | TIME = 5040 | (1.4 HOURS) |
| 2612 | 46476 | 034552 | DEC 2410 | TIME = 5760 | (1.6 HOURS) |
| 2613 | 46477 | 034540 | DEC 2400 | TIME = 6480 | (1.8 HOURS) |
| 2614 | 46500 | 034526 | DEC 2390 | TIME = 7200 | (2.0 HOURS) |
| 2615 | 46501 | 034514 | DEC 2380 | TIME = 7920 | (2.2 HOURS) |
| 2616 | | | | | |
| 2617 | | | MH = 4500 | | |
| 2620 | 46502 | 034704 | DEC 2500 | TIME = 0720 | (0.2 HOURS) |
| 2621 | 46503 | 034653 | DEC 2475 | TIME = 1440 | (0.4 HOURS) |
| 2622 | 46504 | 034641 | DEC 2465 | TIME = 2160 | (0.6 HOURS) |
| 2623 | 46505 | 034627 | DEC 2455 | TIME = 2880 | (0.8 HOURS) |
| 2624 | 46506 | 034615 | DEC 2445 | TIME = 3600 | (1.0 HOURS) |
| 2625 | 46507 | 034603 | DEC 2435 | TIME = 4320 | (1.2 HOURS) |
| 2626 | 46510 | 034571 | DEC 2425 | TIME = 5040 | (1.4 HOURS) |
| 2627 | 46511 | 034557 | DEC 2415 | TIME = 5760 | (1.6 HOURS) |
| 2630 | 46512 | 034545 | DEC 2405 | TIME = 6480 | (1.8 HOURS) |
| 2631 | 46513 | 034533 | DEC 2395 | TIME = 7200 | (2.0 HOURS) |
| 2632 | 46514 | 034521 | DEC 2385 | TIME = 7920 | (2.2 HOURS) |
| 2633 | | | | | |
| 2634 | | | MH = 5000 | | |
| 2635 | 46515 | 034704 | DEC 2500 | TIME = 0720 | (0.2 HOURS) |
| 2636 | 46516 | 034654 | DEC 2476 | TIME = 1440 | (0.4 HOURS) |
| 2637 | 46517 | 034641 | DEC 2465 | TIME = 2160 | (0.6 HOURS) |
| 2640 | 46520 | 034627 | DEC 2455 | TIME = 2880 | (0.8 HOURS) |
| 2641 | 46521 | 034615 | DEC 2445 | TIME = 3600 | (1.0 HOURS) |
| 2642 | 46522 | 034603 | DEC 2435 | TIME = 4320 | (1.2 HOURS) |
| 2643 | 46523 | 034571 | DEC 2425 | TIME = 5040 | (1.4 HOURS) |
| 2644 | 46524 | 034557 | DEC 2415 | TIME = 5760 | (1.6 HOURS) |

```
2645  46525  034545         DEC 2405          TIME = 6480  (1.8 HOURS)
2646  46526  034533         DEC 2395          TIME = 7200  (2.0 HOURS)
2647  46527  034533         DEC 2395          TIME = 7920  (2.2 HOURS)
2650
2651                                  HH = 5500
2652  46530  034704         DEC 2500          TIME = 0720  (0.2 HOURS)
2653  46531  034660         DEC 2480          TIME = 1440  (0.4 HOURS)
2654  46532  034646         DEC 2470          TIME = 2160  (0.6 HOURS)
2655  46533  034634         DEC 2460          TIME = 2880  (0.8 HOURS)
2656  46534  034622         DEC 2450          TIME = 3600  (1.0 HOURS)
2657  46535  034610         DEC 2440          TIME = 4320  (1.2 HOURS)
2660  46536  034576         DEC 2430          TIME = 5040  (1.4 HOURS)
2661  46537  034564         DEC 2420          TIME = 5760  (1.6 HOURS)
2662  46540  034552         DEC 2410          TIME = 6480  (1.8 HOURS)
2663  46541  034540         DEC 2400          TIME = 7200  (2.0 HOURS)
2664  46542  034526         DEC 2390          TIME = 7920  (2.2 HOURS)
2665
2666                                  HH = 6000
2667  46543  034704         DEC 2500          TIME = 0720  (0.2 HOURS)
2670  46544  034662         DEC 2482          TIME = 1440  (0.4 HOURS)
2671  46545  034653         DEC 2475          TIME = 2160  (0.6 HOURS)
2672  46546  034641         DEC 2465          TIME = 2880  (0.8 HOURS)
2673  46547  034627         DEC 2455          TIME = 3600  (1.0 HOURS)
2674  46550  034615         DEC 2445          TIME = 4320  (1.2 HOURS)
2675  46551  034603         DEC 2435          TIME = 5040  (1.4 HOURS)
2676  46552  034571         DEC 2425          TIME = 5760  (1.6 HOURS)
2677  46553  034557         DEC 2415          TIME = 6480  (1.8 HOURS)
2700  46554  034545         DEC 2405          TIME = 7200  (2.0 HOURS)
2701  46555  034533         DEC 2395          TIME = 7920  (2.2 HOURS)
2702
2703
2704         030022         BRPT 46600-L
2705  46556  030000         DEC 0
      46557  030000
      46560  030000
      46561  030000
      46562  030000
      46563  030000
      46564  030000
      46565  030000
      46566  030000
      46567  030000
      46570  030000
      46571  030000
      46572  030000
      46573  030000
      46574  030000
      46575  030000
      46576  030000
      46577  030000
2706                        EJE
2707         001035         DRM CTLDRM+268
2710         046400         LOC TABLOC
2711
2712                 ********** FIGURE 4 DATA FOR 07 INCH SLAB **********
2713
2714
2715                                  HH = 1500
2716  46400  034603         DEC 2435          TIME = 0720  (0.2 HOURS)
2717  46401  034564         DEC 2420          TIME = 1440  (0.4 HOURS)
2720  46402  034552         DEC 2410          TIME = 2160  (0.6 HOURS)
2721  46403  034540         DEC 2400          TIME = 2880  (0.8 HOURS)
2722  46404  034526         DEC 2390          TIME = 3600  (1.0 HOURS)
2723  46405  034514         DEC 2380          TIME = 4320  (1.2 HOURS)
2724  46406  034502         DEC 2370          TIME = 5040  (1.4 HOURS)
2725  46407  034470         DEC 2360          TIME = 5760  (1.6 HOURS)
2726  46410  034456         DEC 2350          TIME = 6480  (1.8 HOURS)
2727  46411  034444         DEC 2340          TIME = 7200  (2.0 HOURS)
2730  46412  034432         DEC 2330          TIME = 7920  (2.2 HOURS)
2731
2732                                  HH = 2000
2733  46413  034665         DEC 2485          TIME = 0720  (0.2 HOURS)
```

| | | | | | | | |
|---|---|---|---|---|---|---|---|
| 2734 | 46414 | 034615 | DEC 2445 | TIME = 1440 | (0.4 HOURS) |
| 2735 | 46415 | 034571 | DEC 2425 | TIME = 2160 | (0.6 HOURS) |
| 2736 | 46416 | 034552 | DEC 2410 | TIME = 2880 | (0.8 HOURS) |
| 2737 | 46417 | 034540 | DEC 2400 | TIME = 3600 | (1.0 HOURS) |
| 2740 | 46420 | 034526 | DEC 2390 | TIME = 4320 | (1.2 HOURS) |
| 2741 | 46421 | 034514 | DEC 2380 | TIME = 5040 | (1.4 HOURS) |
| 2742 | 46422 | 034502 | DEC 2370 | TIME = 5760 | (1.6 HOURS) |
| 2743 | 46423 | 034470 | DEC 2360 | TIME = 6480 | (1.8 HOURS) |
| 2744 | 46424 | 034456 | DEC 2350 | TIME = 7200 | (2.0 HOURS) |
| 2745 | 46425 | 034444 | DEC 2340 | TIME = 7920 | (2.2 HOURS) |
| 2746 | | | | | |
| 2747 | | | | HH = 2500 | |
| 2750 | 46426 | 034675 | DEC 2493 | TIME = 0720 | (0.2 HOURS) |
| 2751 | 46427 | 034627 | DEC 2455 | TIME = 1440 | (0.4 HOURS) |
| 2752 | 46430 | 034615 | DEC 2445 | TIME = 2160 | (0.6 HOURS) |
| 2753 | 46431 | 034603 | DEC 2435 | TIME = 2880 | (0.8 HOURS) |
| 2754 | 46432 | 034571 | DEC 2425 | TIME = 3600 | (1.0 HOURS) |
| 2755 | 46433 | 034557 | DEC 2415 | TIME = 4320 | (1.2 HOURS) |
| 2756 | 46434 | 034545 | DEC 2405 | TIME = 5040 | (1.4 HOURS) |
| 2757 | 46435 | 034540 | DEC 2400 | TIME = 5760 | (1.6 HOURS) |
| 2760 | 46436 | 034533 | DEC 2395 | TIME = 6480 | (1.8 HOURS) |
| 2761 | 46437 | 034526 | DEC 2390 | TIME = 7200 | (2.0 HOURS) |
| 2762 | 46440 | 034521 | DEC 2385 | TIME = 7920 | (2.2 HOURS) |
| 2763 | | | | | |
| 2764 | | | | HH = 3000 | |
| 2765 | 46441 | 034700 | DEC 2496 | TIME = 0720 | (0.2 HOURS) |
| 2766 | 46442 | 034634 | DEC 2460 | TIME = 1440 | (0.4 HOURS) |
| 2767 | 46443 | 034610 | DEC 2440 | TIME = 2160 | (0.6 HOURS) |
| 2770 | 46444 | 034576 | DEC 2430 | TIME = 2880 | (0.8 HOURS) |
| 2771 | 46445 | 034564 | DEC 2420 | TIME = 3600 | (1.0 HOURS) |
| 2772 | 46446 | 034552 | DEC 2410 | TIME = 4320 | (1.2 HOURS) |
| 2773 | 46447 | 034545 | DEC 2405 | TIME = 5040 | (1.4 HOURS) |
| 2774 | 46450 | 034540 | DEC 2400 | TIME = 5760 | (1.6 HOURS) |
| 2775 | 46451 | 034533 | DEC 2395 | TIME = 6480 | (1.8 HOURS) |
| 2776 | 46452 | 034526 | DEC 2390 | TIME = 7200 | (2.0 HOURS) |
| 2777 | 46453 | 034521 | DEC 2385 | TIME = 7920 | (2.2 HOURS) |
| 3000 | | | | | |
| 3001 | | | | HH = 4500 | |
| 3002 | 46454 | 034704 | DEC 2500 | TIME = 0720 | (0.2 HOURS) |
| 3003 | 46455 | 034653 | DEC 2475 | TIME = 1440 | (0.4 HOURS) |
| 3004 | 46456 | 034627 | DEC 2455 | TIME = 2160 | (0.6 HOURS) |
| 3005 | 46457 | 034610 | DEC 2440 | TIME = 2880 | (0.8 HOURS) |
| 3006 | 46460 | 034576 | DEC 2430 | TIME = 3600 | (1.0 HOURS) |
| 3007 | 46461 | 034571 | DEC 2425 | TIME = 4320 | (1.2 HOURS) |
| 3010 | 46462 | 034564 | DEC 2420 | TIME = 5040 | (1.4 HOURS) |
| 3011 | 46463 | 034557 | DEC 2415 | TIME = 5760 | (1.6 HOURS) |
| 3012 | 46464 | 034552 | DEC 2410 | TIME = 6480 | (1.8 HOURS) |
| 3013 | 46465 | 034545 | DEC 2405 | TIME = 7200 | (2.0 HOURS) |
| 3014 | 46466 | 034540 | DEC 2400 | TIME = 7920 | (2.2 HOURS) |
| 3015 | | | | | |
| 3016 | | | | HH = 5000 | |
| 3017 | 46467 | 034704 | DEC 2500 | TIME = 0720 | (0.2 HOURS) |
| 3020 | 46470 | 034660 | DEC 2480 | TIME = 1440 | (0.4 HOURS) |
| 3021 | 46471 | 034622 | DEC 2450 | TIME = 2160 | (0.6 HOURS) |
| 3022 | 46472 | 034576 | DEC 2430 | TIME = 2880 | (0.8 HOURS) |
| 3023 | 46473 | 034571 | DEC 2425 | TIME = 3600 | (1.0 HOURS) |
| 3024 | 46474 | 034564 | DEC 2420 | TIME = 4320 | (1.2 HOURS) |
| 3025 | 46475 | 034557 | DEC 2415 | TIME = 5040 | (1.4 HOURS) |
| 3026 | 46476 | 034552 | DEC 2410 | TIME = 5760 | (1.6 HOURS) |
| 3027 | 46477 | 034550 | DEC 2408 | TIME = 6480 | (1.8 HOURS) |
| 3030 | 46500 | 034546 | DEC 2406 | TIME = 7200 | (2.0 HOURS) |
| 3031 | 46501 | 034542 | DEC 2402 | TIME = 7920 | (2.2 HOURS) |
| 3032 | | | | | |
| 3033 | | | | HH = 5500 | |
| 3034 | 46502 | 034704 | DEC 2500 | TIME = 0720 | (0.2 HOURS) |
| 3035 | 46503 | 034664 | DEC 2484 | TIME = 1440 | (0.4 HOURS) |
| 3036 | 46504 | 034627 | DEC 2455 | TIME = 2160 | (0.6 HOURS) |
| 3037 | 46505 | 034603 | DEC 2435 | TIME = 2880 | (0.8 HOURS) |
| 3040 | 46506 | 034571 | DEC 2425 | TIME = 3600 | (1.0 HOURS) |
| 3041 | 46507 | 034564 | DEC 2420 | TIME = 4320 | (1.2 HOURS) |
| 3042 | 46510 | 034557 | DEC 2415 | TIME = 5040 | (1.4 HOURS) |

| | | | | | | |
|---|---|---|---|---|---|---|
| 3043 | 46511 | 034552 | DEC 2410 | TIME = | 5760 | (1.6 HOURS) |
| 3044 | 46512 | 034551 | DEC 2409 | TIME = | 6480 | (1.8 HOURS) |
| 3045 | 46513 | 034550 | DEC 2408 | TIME = | 7200 | (2.0 HOURS) |
| 3046 | 46514 | 034547 | DEC 2407 | TIME = | 7920 | (2.2 HOURS) |
| 3047 | | | | | | |
| 3050 | | | HM = 6030 | | | |
| 3051 | 46515 | 030000 | DEC | TIME = | 0720 | (0.2 HOURS) |
| 3052 | 46516 | 030000 | DEC | TIME = | 1440 | (0.4 HOURS) |
| 3053 | 46517 | 030000 | DEC | TIME = | 2160 | (0.6 HOURS) |
| 3054 | 46520 | 030000 | DEC | TIME = | 2880 | (0.8 HOURS) |
| 3055 | 46521 | 030000 | DEC | TIME = | 3600 | (1.0 HOURS) |
| 3056 | 46522 | 030000 | DEC | TIME = | 4320 | (1.2 HOURS) |
| 3057 | 46523 | 030000 | DEC | TIME = | 5040 | (1.4 HOURS) |
| 3060 | 46524 | 030000 | DEC | TIME = | 5760 | (1.6 HOURS) |
| 3061 | 46525 | 030000 | DEC | TIME = | 6480 | (1.8 HOURS) |
| 3062 | 46526 | 030000 | DEC | TIME = | 7200 | (2.0 HOURS) |
| 3063 | 46527 | 030000 | DEC | TIME = | 7920 | (2.2 HOURS) |
| 3064 | | | | | | |
| 3065 | | | | | | |
| 3066 | | 030050 | BRPT 46600-L | | | |
| 3067 | 46530 | 030000 | DEC 0 | | | |
| | 46531 | 030000 | | | | |
| | 46532 | 030000 | | | | |
| | 46533 | 030000 | | | | |
| | 46534 | 030000 | | | | |
| | 46535 | 030000 | | | | |
| | 46536 | 030000 | | | | |
| | 46537 | 030000 | | | | |
| | 46540 | 030000 | | | | |
| | 46541 | 030000 | | | | |
| | 46542 | 030000 | | | | |
| | 46543 | 030000 | | | | |
| | 46544 | 030000 | | | | |
| | 46545 | 030000 | | | | |
| | 46546 | 030000 | | | | |
| | 46547 | 030000 | | | | |
| | 46550 | 030000 | | | | |
| | 46551 | 030000 | | | | |
| | 46552 | 030000 | | | | |
| | 46553 | 030000 | | | | |
| | 46554 | 030000 | | | | |
| | 46555 | 030000 | | | | |
| | 46556 | 030000 | | | | |
| | 46557 | 030000 | | | | |
| | 46560 | 030000 | | | | |
| | 46561 | 030000 | | | | |
| | 46562 | 030000 | | | | |
| | 46563 | 030000 | | | | |
| | 46564 | 030000 | | | | |
| | 46565 | 030000 | | | | |
| | 46566 | 030000 | | | | |
| | 46567 | 030000 | | | | |
| | 46570 | 030000 | | | | |
| | 46571 | 030000 | | | | |
| | 46572 | 030000 | | | | |
| | 46573 | 030000 | | | | |
| | 46574 | 030000 | | | | |
| | 46575 | 030000 | | | | |
| | 46576 | 030000 | | | | |
| | 46577 | 030000 | | | | |
| 3070 | | | EJE | | | |
| 3071 | | 031036 | DRM CTLDRM+269 | | | |
| 3072 | | 046400 | LOC TABLOC | | | |
| 3073 | | | ********** FIGURE 4 DATA FOR 08 INCH SLAB ********** | | | |
| 3074 | | | | | | |
| 3075 | | | | | | |
| 3076 | | | HM = 1500 | | | |
| 3077 | | | | | | |
| 3100 | 46400 | 034571 | DEC 2425 | TIME = | 0720 | (0.2 HOURS) |
| 3101 | 46401 | 034540 | DEC 2400 | TIME = | 1440 | (0.4 HOURS) |
| 3102 | 46402 | 034526 | DEC 2390 | TIME = | 2160 | (0.6 HOURS) |
| 3103 | 46403 | 034514 | DEC 2380 | TIME = | 2880 | (0.8 HOURS) |

```
3104   46404   034502           DEC 2370            TIME = 3600   (1.0 HOURS)
3105   46405   034470           DEC 2360            TIME = 4320   (1.2 HOURS)
3106   46406   034456           DEC 2350            TIME = 5040   (1.4 HOURS)
3107   46407   034444           DEC 2340            TIME = 5760   (1.6 HOURS)
3110   46410   034432           DEC 2330            TIME = 6480   (1.8 HOURS)
3111   46411   034420           DEC 2320            TIME = 7200   (2.0 HOURS)
3112   46412   034406           DEC 2310            TIME = 7920   (2.2 HOURS)
3113
3114                                       HH = 2000
3115   46413   034622           DEC 2450            TIME = 0720   (0.2 HOURS)
3116   46414   034571           DEC 2425            TIME = 1440   (0.4 HOURS)
3117   46415   034533           DEC 2395            TIME = 2160   (0.6 HOURS)
3120   46416   034526           DEC 2390            TIME = 2880   (0.8 HOURS)
3121   46417   034514           DEC 2380            TIME = 3600   (1.0 HOURS)
3122   46420   034502           DEC 2370            TIME = 4320   (1.2 HOURS)
3123   46421   034470           DEC 2360            TIME = 5040   (1.4 HOURS)
3124   46422   034456           DEC 2350            TIME = 5760   (1.6 HOURS)
3125   46423   034444           DEC 2340            TIME = 6480   (1.8 HOURS)
3126   46424   034432           DEC 2330            TIME = 7200   (2.0 HOURS)
3127   46425   034420           DEC 2320            TIME = 7920   (2.2 HOURS)
3130
3131                                       HH = 2500
3132   46426   034663           DEC 2483            TIME = 0720   (0.2 HOURS)
3133   46427   034627           DEC 2455            TIME = 1440   (0.4 HOURS)
3134   46430   034576           DEC 2430            TIME = 2160   (0.6 HOURS)
3135   46431   034564           DEC 2420            TIME = 2880   (0.8 HOURS)
3136   46432   034552           DEC 2410            TIME = 3600   (1.0 HOURS)
3137   46433   034540           DEC 2400            TIME = 4320   (1.2 HOURS)
3140   46434   034526           DEC 2390            TIME = 5040   (1.4 HOURS)
3141   46435   034514           DEC 2380            TIME = 5760   (1.6 HOURS)
3142   46436   034502           DEC 2370            TIME = 6480   (1.8 HOURS)
3143   46437   034470           DEC 2360            TIME = 7200   (2.0 HOURS)
3144   46440   034456           DEC 2350            TIME = 7920   (2.2 HOURS)
3145
3146                                       HH = 3000
3147   46441   034672           DEC 2490            TIME = 0720   (0.2 HOURS)
3150   46442   034635           DEC 2461            TIME = 1440   (0.4 HOURS)
3151   46443   034576           DEC 2430            TIME = 2160   (0.6 HOURS)
3152   46444   034571           DEC 2425            TIME = 2880   (0.8 HOURS)
3153   46445   034564           DEC 2420            TIME = 3600   (1.0 HOURS)
3154   46446   034552           DEC 2410            TIME = 4320   (1.2 HOURS)
3155   46447   034540           DEC 2400            TIME = 5040   (1.4 HOURS)
3156   46450   034526           DEC 2390            TIME = 5760   (1.6 HOURS)
3157   46451   034514           DEC 2380            TIME = 6480   (1.8 HOURS)
3160   46452   034502           DEC 2370            TIME = 7200   (2.0 HOURS)
3161   46453   034470           DEC 2360            TIME = 7920   (2.2 HOURS)
3162
3163                                       HH = 3500
3164   46454   034676           DEC 2494            TIME = 0720   (0.2 HOURS)
3165   46455   034646           DEC 2470            TIME = 1440   (0.4 HOURS)
3166   46456   034603           DEC 2435            TIME = 2160   (0.6 HOURS)
3167   46457   034576           DEC 2430            TIME = 2880   (0.8 HOURS)
3170   46460   034571           DEC 2425            TIME = 3600   (1.0 HOURS)
3171   46461   034564           DEC 2420            TIME = 4320   (1.2 HOURS)
3172   46462   034552           DEC 2410            TIME = 5040   (1.4 HOURS)
3173   46463   034540           DEC 2400            TIME = 5760   (1.6 HOURS)
3174   46464   034533           DEC 2395            TIME = 6480   (1.8 HOURS)
3175   46465   034526           DEC 2390            TIME = 7200   (2.0 HOURS)
3176   46466   034521           DEC 2385            TIME = 7920   (2.2 HOURS)
3177
3200                                       HH = 4000
3201   46467   034700           DEC 2496            TIME = 0720   (0.2 HOURS)
3202   46470   034653           DEC 2475            TIME = 1440   (0.4 HOURS)
3203   46471   034610           DEC 2440            TIME = 2160   (0.6 HOURS)
3204   46472   034603           DEC 2435            TIME = 2880   (0.8 HOURS)
3205   46473   034576           DEC 2430            TIME = 3600   (1.0 HOURS)
3206   46474   034571           DEC 2425            TIME = 4320   (1.2 HOURS)
3207   46475   034564           DEC 2420            TIME = 5040   (1.4 HOURS)
3210   46476   034552           DEC 2410            TIME = 5760   (1.6 HOURS)
3211   46477   034540           DEC 2400            TIME = 6480   (1.8 HOURS)
3212   46500   034533           DEC 2395            TIME = 7200   (2.0 HOURS)
3213   46501   034526           DEC 2390            TIME = 7920   (2.2 HOURS)
```

```
3214
3215                                          HH = 4500
3216    46502   034702       DEC 2498          TIME = 0720    (0.2 HOURS)
3217    46503   034660       DEC 2480          TIME = 1440    (0.4 HOURS)
3220    46504   034615       DEC 2445          TIME = 2160    (0.6 HOURS)
3221    46505   034610       DEC 2440          TIME = 2880    (0.8 HOURS)
3222    46506   034603       DEC 2435          TIME = 3600    (1.0 HOURS)
3223    46507   034576       DEC 2430          TIME = 4320    (1.2 HOURS)
3224    46510   034571       DEC 2425          TIME = 5040    (1.4 HOURS)
3225    46511   034564       DEC 2420          TIME = 5760    (1.6 HOURS)
3226    46512   034552       DEC 2410          TIME = 6480    (1.8 HOURS)
3227    46513   034540       DEC 2400          TIME = 7200    (2.0 HOURS)
3230    46514   034533       DEC 2395          TIME = 7920    (2.2 HOURS)
3231
3232                                          HH = 5000
3233    46515   034704       DEC 2500          TIME = 0720    (0.2 HOURS)
3234    46516   034664       DEC 2484          TIME = 1440    (0.4 HOURS)
3235    46517   034622       DEC 2450          TIME = 2160    (0.6 HOURS)
3236    46520   034615       DEC 2445          TIME = 2880    (0.8 HOURS)
3237    46521   034610       DEC 2440          TIME = 3600    (1.0 HOURS)
3240    46522   034603       DEC 2435          TIME = 4320    (1.2 HOURS)
3241    46523   034576       DEC 2430          TIME = 5040    (1.4 HOURS)
3242    46524   034571       DEC 2425          TIME = 5760    (1.6 HOURS)
3243    46525   034564       DEC 2420          TIME = 6480    (1.8 HOURS)
3244    46526   034552       DEC 2410          TIME = 7200    (2.0 HOURS)
3245    46527   034540       DEC 2400          TIME = 7920    (2.2 HOURS)
3246
3247                                          HH = 5500
3250    46530   034704       DEC 2500          TIME = 0720    (0.2 HOURS)
3251    46531   034665       DEC 2485          TIME = 1440    (0.4 HOURS)
3252    46532   034626       DEC 2454          TIME = 2160    (0.6 HOURS)
3253    46533   034615       DEC 2445          TIME = 2880    (0.8 HOURS)
3254    46534   034610       DEC 2440          TIME = 3600    (1.0 HOURS)
3255    46535   034603       DEC 2435          TIME = 4320    (1.2 HOURS)
3256    46536   034576       DEC 2430          TIME = 5040    (1.4 HOURS)
3257    46537   034571       DEC 2425          TIME = 5760    (1.6 HOURS)
3260    46540   034564       DEC 2420          TIME = 6480    (1.8 HOURS)
3261    46541   034557       DEC 2415          TIME = 7200    (2.0 HOURS)
3262    46542   034552       DEC 2410          TIME = 7920    (2.2 HOURS)
3263
3264                                          HH = 6000
3265    46543   034704       DEC 2500          TIME = 0720    (0.2 HOURS)
3266    46544   034670       DEC 2488          TIME = 1440    (0.4 HOURS)
3267    46545   034630       DEC 2456          TIME = 2160    (0.6 HOURS)
3270    46546   034622       DEC 2450          TIME = 2880    (0.8 HOURS)
3271    46547   034615       DEC 2445          TIME = 3600    (1.0 HOURS)
3272    46550   034610       DEC 2440          TIME = 4320    (1.2 HOURS)
3273    46551   034603       DEC 2435          TIME = 5040    (1.4 HOURS)
3274    46552   034576       DEC 2430          TIME = 5760    (1.6 HOURS)
3275    46553   034571       DEC 2425          TIME = 6480    (1.8 HOURS)
3276    46554   034564       DEC 2420          TIME = 7200    (2.0 HOURS)
3277    46555   034557       DEC 2415          TIME = 7920    (2.2 HOURS)
3300
3301
3302            030022       BRPT 46600-L
3303    46556   030000       DEC 0
        46557   030000
        46560   030000
        46561   030000
        46562   030000
        46563   030000
        46564   030000
        46565   030000
        46566   030000
        46567   030000
        46570   030000
        46571   030000
        46572   030000
        46573   030000
        46574   030000
        46575   030000
        46576   030000
        46577   030000
```

```
3304                              EJE
3305              031037          DRM CYLDRM+270
3306              046400          LOC TABLOC
3307
3310                     ********** FIGURE 4 DATA FOR 09 INCH SLAB **********
3311
3312
3313                                        HH = 1500
3314   46400      034634          DEC 2460          TIME = 0720   (0.2 HOURS)
3315   46401      034610          DEC 2440          TIME = 1440   (0.4 HOURS)
3316   46402      034564          DEC 2420          TIME = 2160   (0.6 HOURS)
3317   46403      034540          DEC 2400          TIME = 2880   (0.8 HOURS)
3320   46404      034514          DEC 2380          TIME = 3600   (1.0 HOURS)
3321   46405      034502          DEC 2370          TIME = 4320   (1.2 HOURS)
3322   46406      034470          DEC 2360          TIME = 5040   (1.4 HOURS)
3323   46407      034456          DEC 2350          TIME = 5760   (1.6 HOURS)
3324   46410      034444          DEC 2340          TIME = 6480   (1.8 HOURS)
3325   46411      034437          DEC 2335          TIME = 7200   (2.0 HOURS)
3326   46412      034432          DEC 2330          TIME = 7920   (2.2 HOURS)
3327
3330                                        HH = 2000
3331   46413      034641          DEC 2465          TIME = 0720   (0.2 HOURS)
3332   46414      034622          DEC 2450          TIME = 1440   (0.4 HOURS)
3333   46415      034576          DEC 2430          TIME = 2160   (0.6 HOURS)
3334   46416      034552          DEC 2410          TIME = 2880   (0.8 HOURS)
3335   46417      034526          DEC 2390          TIME = 3600   (1.0 HOURS)
3336   46420      034502          DEC 2370          TIME = 4320   (1.2 HOURS)
3337   46421      034470          DEC 2360          TIME = 5040   (1.4 HOURS)
3340   46422      034456          DEC 2350          TIME = 5760   (1.6 HOURS)
3341   46423      034444          DEC 2340          TIME = 6480   (1.8 HOURS)
3342   46424      034437          DEC 2335          TIME = 7200   (2.0 HOURS)
3343   46425      034432          DEC 2330          TIME = 7920   (2.2 HOURS)
3344
3345                                        HH = 2500
3346   46426      034660          DEC 2480          TIME = 0720   (0.2 HOURS)
3347   46427      034634          DEC 2460          TIME = 1440   (0.4 HOURS)
3350   46430      034576          DEC 2430          TIME = 2160   (0.6 HOURS)
3351   46431      034552          DEC 2410          TIME = 2880   (0.8 HOURS)
3352   46432      034540          DEC 2400          TIME = 3600   (1.0 HOURS)
3353   46433      034526          DEC 2390          TIME = 4320   (1.2 HOURS)
3354   46434      034514          DEC 2380          TIME = 5040   (1.4 HOURS)
3355   46435      034502          DEC 2370          TIME = 5760   (1.6 HOURS)
3356   46436      034470          DEC 2360          TIME = 6480   (1.8 HOURS)
3357   46437      034456          DEC 2350          TIME = 7200   (2.0 HOURS)
3360   46440      034444          DEC 2340          TIME = 7920   (2.2 HOURS)
3361
3362                                        HH = 3000
3363   46441      034665          DEC 2485          TIME = 0720   (0.2 HOURS)
3364   46442      034641          DEC 2465          TIME = 1440   (0.4 HOURS)
3365   46443      034603          DEC 2435          TIME = 2160   (0.6 HOURS)
3366   46444      034564          DEC 2420          TIME = 2880   (0.8 HOURS)
3367   46445      034552          DEC 2410          TIME = 3600   (1.0 HOURS)
3370   46446      034540          DEC 2400          TIME = 4320   (1.2 HOURS)
3371   46447      034526          DEC 2390          TIME = 5040   (1.4 HOURS)
3372   46450      034514          DEC 2380          TIME = 5760   (1.6 HOURS)
3373   46451      034336          DEC 2270          TIME = 6480   (1.8 HOURS)
3374   46452      034470          DEC 2360          TIME = 7200   (2.0 HOURS)
3375   46453      034456          DEC 2350          TIME = 7920   (2.2 HOURS)
3376
3377                                        HH = 3500
3400   46454      034672          DEC 2490          TIME = 0720   (0.2 HOURS)
3401   46455      034653          DEC 2475          TIME = 1440   (0.4 HOURS)
3402   46456      034610          DEC 2440          TIME = 2160   (0.6 HOURS)
3403   46457      034576          DEC 2430          TIME = 2880   (0.8 HOURS)
3404   46460      034571          DEC 2425          TIME = 3600   (1.0 HOURS)
3405   46461      034564          DEC 2420          TIME = 4320   (1.2 HOURS)
3406   46462      034552          DEC 2410          TIME = 5040   (1.4 HOURS)
3407   46463      034545          DEC 2405          TIME = 5760   (1.6 HOURS)
3410   46464      034540          DEC 2400          TIME = 6480   (1.8 HOURS)
3411   46465      034533          DEC 2395          TIME = 7200   (2.0 HOURS)
3412   46466      034526          DEC 2390          TIME = 7920   (2.2 HOURS)
3413
```

```
3414
3415    46467   034677          DEC 2495        HH = 4000
                                                        TIME = 0720    (0.2 HOURS)
3416    46470   034656          DEC 2478                TIME = 1440    (0.4 HOURS)
3417    46471   034615          DEC 2445                TIME = 2160    (0.6 HOURS)
3420    46472   034610          DEC 2440                TIME = 2880    (0.8 HOURS)
3421    46473   034603          DEC 2435                TIME = 3600    (1.0 HOURS)
3422    46474   034576          DEC 2430                TIME = 4320    (1.2 HOURS)
3423    46475   034571          DEC 2425                TIME = 5040    (1.4 HOURS)
3424    46476   034564          DEC 2420                TIME = 5760    (1.6 HOURS)
3425    46477   034557          DEC 2415                TIME = 6480    (1.8 HOURS)
3426    46500   034552          DEC 2410                TIME = 7200    (2.0 HOURS)
3427    46501   034540          DEC 2400                TIME = 7920    (2.2 HOURS)
3430
3431                                            HH = 4500
3432    46502   034701          DEC 2497                TIME = 0720    (0.2 HOURS)
3433    46503   034660          DEC 2480                TIME = 1440    (0.4 HOURS)
3434    46504   034624          DEC 2452                TIME = 2160    (0.6 HOURS)
3435    46505   034615          DEC 2445                TIME = 2880    (0.8 HOURS)
3436    46506   034610          DEC 2440                TIME = 3600    (1.0 HOURS)
3437    46507   034603          DEC 2435                TIME = 4320    (1.2 HOURS)
3440    46510   034576          DEC 2430                TIME = 5040    (1.4 HOURS)
3441    46511   034571          DEC 2425                TIME = 5760    (1.6 HOURS)
3442    46512   034564          DEC 2420                TIME = 6480    (1.8 HOURS)
3443    46513   034557          DEC 2415                TIME = 7200    (2.0 HOURS)
3444
3445                                            HH = 5000
3446    46514   034703          DEC 2499                TIME = 0720    (0.2 HOURS)
3447    46515   034665          DEC 2485                TIME = 1440    (0.4 HOURS)
3450    46516   034627          DEC 2455                TIME = 2160    (0.6 HOURS)
3451    46517   034621          DEC 2449                TIME = 2880    (0.8 HOURS)
3452    46520   034615          DEC 2445                TIME = 3600    (1.0 HOURS)
3453    46521   034610          DEC 2440                TIME = 4320    (1.2 HOURS)
3454    46522   034603          DEC 2435                TIME = 5040    (1.4 HOURS)
3455    46523   034576          DEC 2430                TIME = 5760    (1.6 HOURS)
3456    46524   034571          DEC 2425                TIME = 6480    (1.8 HOURS)
3457    46525   034564          DEC 2420                TIME = 7200    (2.0 HOURS)
3460    46526   034557          DEC 2415                TIME = 7920    (2.2 HOURS)
3461
3462                                            HH = 5500
3463    46527   034704          DEC 2500                TIME = 0720    (0.2 HOURS)
3464    46530   034667          DEC 2487                TIME = 1440    (0.4 HOURS)
3465    46531   034634          DEC 2460                TIME = 2160    (0.6 HOURS)
3466    46532   034627          DEC 2455                TIME = 2880    (0.8 HOURS)
3467    46533   034622          DEC 2450                TIME = 3600    (1.0 HOURS)
3470    46534   034615          DEC 2445                TIME = 4320    (1.2 HOURS)
3471    46535   034610          DEC 2440                TIME = 5040    (1.4 HOURS)
3472    46536   034603          DEC 2435                TIME = 5760    (1.6 HOURS)
3473    46537   034576          DEC 2430                TIME = 6480    (1.8 HOURS)
3474    46540   034571          DEC 2425                TIME = 7200    (2.0 HOURS)
3475    46541   034564          DEC 2420                TIME = 7920    (2.2 HOURS)
3476
3477                                            HH = 6000
3500    46542   034704          DEC 2500                TIME = 0720    (0.2 HOURS)
3501    46543   034673          DEC 2491                TIME = 1440    (0.4 HOURS)
3502    46544   034641          DEC 2465                TIME = 2160    (0.6 HOURS)
3503    46545   034634          DEC 2460                TIME = 2880    (0.8 HOURS)
3504    46546   034627          DEC 2455                TIME = 3600    (1.0 HOURS)
3505    46547   034622          DEC 2450                TIME = 4320    (1.2 HOURS)
3506    46550   034615          DEC 2445                TIME = 5040    (1.4 HOURS)
3507    46551   034610          DEC 2440                TIME = 5760    (1.6 HOURS)
3510    46552   034603          DEC 2435                TIME = 6480    (1.8 HOURS)
3511    46553   034576          DEC 2430                TIME = 7200    (2.0 HOURS)
3512    46554   034571          DEC 2425                TIME = 7920    (2.2 HOURS)
3513
3514
3515            030023          BRPT 46600-L
3516    46555   030000          DEC 0
        46556   030000
        46557   030000
        46560   030000
        46561   030000
        46562   030000
```

```
            46563    030000
            46564    030000
            46565    030000
            46566    030000
            46567    030000
            46570    030000
            46571    030000
            46572    030000
            46573    030000
            46574    030000
            46575    030000
            46576    030000
            46577    030000
3517
3520        031040            DRM  CYLDRM+271
3521        046400            LOC  TABLOC
3522
3523                     ********** FIGURE 4 DATA FOR 10 INCH SLAB **********
3524
3525
3526                                            HH = 1500
3527        46400    034622    DEC  2450           TIME = 0720   (0.2 HOURS)
3530        46401    034615    DEC  2445           TIME = 1440   (0.4 HOURS)
3531        46402    034571    DEC  2425           TIME = 2160   (0.6 HOURS)
3532        46403    034545    DEC  2405           TIME = 2880   (0.8 HOURS)
3533        46404    034540    DEC  2400           TIME = 3600   (1.0 HOURS)
3534        46405    034526    DEC  2390           TIME = 4320   (1.2 HOURS)
3535        46406    034514    DEC  2380           TIME = 5040   (1.4 HOURS)
3536        46407    034502    DEC  2370           TIME = 5760   (1.6 HOURS)
3537        46410    034470    DEC  2360           TIME = 6480   (1.8 HOURS)
3540        46411    034456    DEC  2350           TIME = 7200   (2.0 HOURS)
3541        46412    034444    DEC  2340           TIME = 7920   (2.2 HOURS)
3542
3543                                            HH = 2000
3544        46413    034634    DEC  2460           TIME = 0720   (0.2 HOURS)
3545        46414    034627    DEC  2455           TIME = 1440   (0.4 HOURS)
3546        46415    034576    DEC  2430           TIME = 2160   (0.6 HOURS)
3547        46416    034557    DEC  2415           TIME = 2880   (0.8 HOURS)
3550        46417    034545    DEC  2405           TIME = 3600   (1.0 HOURS)
3551        46420    034533    DEC  2395           TIME = 4320   (1.2 HOURS)
3552        46421    034521    DEC  2385           TIME = 5040   (1.4 HOURS)
3553        46422    034507    DEC  2375           TIME = 5760   (1.6 HOURS)
3554        46423    034475    DEC  2365           TIME = 6480   (1.8 HOURS)
3555        46424    034463    DEC  2355           TIME = 7200   (2.0 HOURS)
3556        46425    034451    DEC  2345           TIME = 7920   (2.2 HOURS)
3557
3560                                            HH = 2500
3561        46426    034653    DEC  2475           TIME = 0720   (0.2 HOURS)
3562        46427    034634    DEC  2460           TIME = 1440   (0.4 HOURS)
3563        46430    034603    DEC  2435           TIME = 2160   (0.6 HOURS)
3564        46431    034567    DEC  2425           TIME = 2880   (0.8 HOURS)
3565        46432    034557    DEC  2415           TIME = 3600   (1.0 HOURS)
3566        46433    034552    DEC  2410           TIME = 4320   (1.2 HOURS)
3567        46434    034540    DEC  2400           TIME = 5040   (1.4 HOURS)
3570        46435    034521    DEC  2385           TIME = 5760   (1.6 HOURS)
3571        46436    034502    DEC  2370           TIME = 6480   (1.8 HOURS)
3572        46437    034470    DEC  2360           TIME = 7200   (2.0 HOURS)
3573        46440    034456    DEC  2350           TIME = 7920   (2.2 HOURS)
3574
3575                                            HH = 3000
3576        46441    034660    DEC  2480           TIME = 0720   (0.2 HOURS)
3577        46442    034646    DEC  2470           TIME = 1440   (0.4 HOURS)
3600        46443    034610    DEC  2440           TIME = 2160   (0.6 HOURS)
3601        46444    034574    DEC  2428           TIME = 2880   (0.8 HOURS)
3602        46445    034564    DEC  2420           TIME = 3600   (1.0 HOURS)
3603        46446    034557    DEC  2415           TIME = 4320   (1.2 HOURS)
3604        46447    034552    DEC  2410           TIME = 5040   (1.4 HOURS)
3605        46450    034533    DEC  2395           TIME = 5760   (1.6 HOURS)
3606        46451    034507    DEC  2375           TIME = 6480   (1.8 HOURS)
3607        46452    034475    DEC  2365           TIME = 7200   (2.0 HOURS)
3610        46453    034470    DEC  2360           TIME = 7920   (2.2 HOURS)
3611
```

| | | | | | | |
|---|---|---|---|---|---|---|
| 3612 | | | | HH = 3500 | | |
| 3613 | 46454 | 034665 | DEC 2485 | TIME = 0720 | (0.2 HOURS) |
| 3614 | 46455 | 034653 | DEC 2475 | TIME = 1440 | (0.4 HOURS) |
| 3615 | 46456 | 034622 | DEC 2450 | TIME = 2160 | (0.6 HOURS) |
| 3616 | 46457 | 034573 | DEC 2427 | TIME = 2880 | (0.8 HOURS) |
| 3617 | 46460 | 034564 | DEC 2420 | TIME = 3600 | (1.0 HOURS) |
| 3620 | 46461 | 034557 | DEC 2415 | TIME = 4320 | (1.2 HOURS) |
| 3621 | 46462 | 034552 | DEC 2410 | TIME = 5040 | (1.4 HOURS) |
| 3622 | 46463 | 034545 | DEC 2405 | TIME = 5760 | (1.6 HOURS) |
| 3623 | 46464 | 034540 | DEC 2400 | TIME = 6480 | (1.8 HOURS) |
| 3624 | 46465 | 034533 | DEC 2395 | TIME = 7200 | (2.0 HOURS) |
| 3625 | 46466 | 034526 | DEC 2390 | TIME = 7920 | (2.2 HOURS) |
| 3626 | | | | | | |
| 3627 | | | | HH = 4000 | | |
| 3630 | 46467 | 034672 | DEC 2490 | TIME = 0720 | (0.2 HOURS) |
| 3631 | 46470 | 034655 | DEC 2477 | TIME = 1440 | (0.4 HOURS) |
| 3632 | 46471 | 034626 | DEC 2454 | TIME = 2160 | (0.6 HOURS) |
| 3633 | 46472 | 034606 | DEC 2438 | TIME = 2880 | (0.8 HOURS) |
| 3634 | 46473 | 034600 | DEC 2432 | TIME = 3600 | (1.0 HOURS) |
| 3635 | 46474 | 034571 | DEC 2425 | TIME = 4320 | (1.2 HOURS) |
| 3636 | 46475 | 034564 | DEC 2420 | TIME = 5040 | (1.4 HOURS) |
| 3637 | 46476 | 034557 | DEC 2415 | TIME = 5760 | (1.6 HOURS) |
| 3640 | 46477 | 034552 | DEC 2410 | TIME = 6480 | (1.8 HOURS) |
| 3641 | 46500 | 034545 | DEC 2405 | TIME = 7200 | (2.0 HOURS) |
| 3642 | 46501 | 034540 | DEC 2400 | TIME = 7920 | (2.2 HOURS) |
| 3643 | | | | | | |
| 3644 | | | | HH = 4500 | | |
| 3645 | 46502 | 034674 | DEC 2492 | TIME = 0720 | (0.2 HOURS) |
| 3646 | 46503 | 034661 | DEC 2481 | TIME = 1440 | (0.4 HOURS) |
| 3647 | 46504 | 034627 | DEC 2455 | TIME = 2160 | (0.6 HOURS) |
| 3650 | 46505 | 034610 | DEC 2440 | TIME = 2880 | (0.8 HOURS) |
| 3651 | 46506 | 034602 | DEC 2434 | TIME = 3600 | (1.0 HOURS) |
| 3652 | 46507 | 034574 | DEC 2428 | TIME = 4320 | (1.2 HOURS) |
| 3653 | 46510 | 034566 | DEC 2422 | TIME = 5040 | (1.4 HOURS) |
| 3654 | 46511 | 034557 | DEC 2415 | TIME = 5760 | (1.6 HOURS) |
| 3655 | 46512 | 034552 | DEC 2410 | TIME = 6480 | (1.8 HOURS) |
| 3656 | 46513 | 034546 | DEC 2406 | TIME = 7200 | (2.0 HOURS) |
| 3657 | 46514 | 034542 | DEC 2402 | TIME = 7920 | (2.2 HOURS) |
| 3660 | | | | | | |
| 3661 | | | | HH = 5000 | | |
| 3662 | 46515 | 034677 | DEC 2495 | TIME = 0720 | (0.2 HOURS) |
| 3663 | 46516 | 034665 | DEC 2485 | TIME = 1440 | (0.4 HOURS) |
| 3664 | 46517 | 034634 | DEC 2460 | TIME = 2160 | (0.6 HOURS) |
| 3665 | 46520 | 034612 | DEC 2442 | TIME = 2880 | (0.8 HOURS) |
| 3666 | 46521 | 034604 | DEC 2436 | TIME = 3600 | (1.0 HOURS) |
| 3667 | 46522 | 034576 | DEC 2430 | TIME = 4320 | (1.2 HOURS) |
| 3670 | 46523 | 034571 | DEC 2425 | TIME = 5040 | (1.4 HOURS) |
| 3671 | 46524 | 034564 | DEC 2420 | TIME = 5760 | (1.6 HOURS) |
| 3672 | 46525 | 034557 | DEC 2415 | TIME = 6480 | (1.8 HOURS) |
| 3673 | 46526 | 034552 | DEC 2410 | TIME = 7200 | (2.0 HOURS) |
| 3674 | 46527 | 034545 | DEC 2405 | TIME = 7920 | (2.2 HOURS) |
| 3675 | | | | | | |
| 3676 | | | | HH = 5500 | | |
| 3677 | 46530 | 034704 | DEC 2500 | TIME = 0720 | (0.2 HOURS) |
| 3700 | 46531 | 034667 | DEC 2487 | TIME = 1440 | (0.4 HOURS) |
| 3701 | 46532 | 034640 | DEC 2464 | TIME = 2160 | (0.6 HOURS) |
| 3702 | 46533 | 034615 | DEC 2445 | TIME = 2880 | (0.8 HOURS) |
| 3703 | 46534 | 034610 | DEC 2440 | TIME = 3600 | (1.0 HOURS) |
| 3704 | 46535 | 034603 | DEC 2435 | TIME = 4320 | (1.2 HOURS) |
| 3705 | 46536 | 034576 | DEC 2430 | TIME = 5040 | (1.4 HOURS) |
| 3706 | 46537 | 034571 | DEC 2425 | TIME = 5760 | (1.6 HOURS) |
| 3707 | 46540 | 034564 | DEC 2420 | TIME = 6480 | (1.8 HOURS) |
| 3710 | 46541 | 034557 | DEC 2415 | TIME = 7200 | (2.0 HOURS) |
| 3711 | 46542 | 034552 | DEC 2410 | TIME = 7920 | (2.2 HOURS) |
| 3712 | | | | | | |
| 3713 | | | | HH = 6000 | | |
| 3714 | 46543 | 034704 | DEC 2500 | TIME = 0720 | (0.2 HOURS) |
| 3715 | 46544 | 034672 | DEC 2490 | TIME = 1440 | (0.4 HOURS) |
| 3716 | 46545 | 034644 | DEC 2468 | TIME = 2160 | (0.6 HOURS) |
| 3717 | 46546 | 034616 | DEC 2446 | TIME = 2880 | (0.8 HOURS) |
| 3720 | 46547 | 034612 | DEC 2442 | TIME = 3600 | (1.0 HOURS) |
| 3721 | 46550 | 034606 | DEC 2438 | TIME = 4320 | (1.2 HOURS) |

```
3722    46551   034660          DEC 2432            TIME = 5040   (1.4 HOURS)
3723    46552   034572          DEC 2426            TIME = 5760   (1.6 HOURS)
3724    46553   034564          DEC 2420            TIME = 6480   (1.8 HOURS)
3725    46554   034557          DEC 2415            TIME = 7200   (2.0 HOURS)
3726    46555   034552          DEC 2410            TIME = 7920   (2.2 HOURS)
3727
3730
3731            000022          BRPT 46600-L
3732    46556   000000          DEC 0
        46557   000000
        46560   000000
        46561   000000
        46562   000000
        46563   000000
        46564   000000
        46565   000000
        46566   000000
        46567   000000
        46570   000000
        46571   000000
        46572   000000
        46573   000000
        46574   000000
        46575   000000
        46576   000000
        46577   000000
3733                            EJE
3734            001041          DRM CYLDRM+272
3735            046400          LOC TABLOC
3736
3737                    ********** FIGURE 4 DATA FOR 11 INCH SLAB **********
3740
3741
3742                                    HH = 1500
3743    46400   034622          DEC 2450            TIME = 0720   (0.2 HOURS)
3744    46401   034620          DEC 2448            TIME = 1440   (0.4 HOURS)
3745    46402   034576          DEC 2430            TIME = 2160   (0.6 HOURS)
3746    46403   034552          DEC 2410            TIME = 2880   (0.8 HOURS)
3747    46404   034540          DEC 2400            TIME = 3600   (1.0 HOURS)
3750    46405   034526          DEC 2390            TIME = 4320   (1.2 HOURS)
3751    46406   034514          DEC 2380            TIME = 5040   (1.4 HOURS)
3752    46407   034502          DEC 2370            TIME = 5760   (1.6 HOURS)
3753    46410   034470          DEC 2360            TIME = 6480   (1.8 HOURS)
3754    46411   034463          DEC 2355            TIME = 7200   (2.0 HOURS)
3755    46412   034456          DEC 2350            TIME = 7920   (2.2 HOURS)
3756
3757                                    HH = 2000
3760    46413   034634          DEC 2460            TIME = 0720   (0.2 HOURS)
3761    46414   034627          DEC 2455            TIME = 1440   (0.4 HOURS)
3762    46415   034603          DEC 2435            TIME = 2160   (0.6 HOURS)
3763    46416   034557          DEC 2415            TIME = 2880   (0.8 HOURS)
3764    46417   034545          DEC 2405            TIME = 3600   (1.0 HOURS)
3765    46420   034533          DEC 2395            TIME = 4320   (1.2 HOURS)
3766    46421   034521          DEC 2385            TIME = 5040   (1.4 HOURS)
3767    46422   034507          DEC 2375            TIME = 5760   (1.6 HOURS)
3770    46423   034475          DEC 2365            TIME = 6480   (1.8 HOURS)
3771    46424   034470          DEC 2360            TIME = 7200   (2.0 HOURS)
3772    46425   034463          DEC 2355            TIME = 7920   (2.2 HOURS)
3773
3774                                    HH = 2500
3775    46426   034641          DEC 2465            TIME = 0720   (0.2 HOURS)
3776    46427   034634          DEC 2460            TIME = 1440   (0.4 HOURS)
3777    46430   034610          DEC 2440            TIME = 2160   (0.6 HOURS)
4000    46431   034567          DEC 2423            TIME = 2880   (0.8 HOURS)
4001    46432   034561          DEC 2417            TIME = 3600   (1.0 HOURS)
4002    46433   034553          DEC 2411            TIME = 4320   (1.2 HOURS)
4003    46434   034545          DEC 2405            TIME = 5040   (1.4 HOURS)
4004    46435   034533          DEC 2395            TIME = 5760   (1.6 HOURS)
4005    46436   034507          DEC 2375            TIME = 6480   (1.8 HOURS)
4006    46437   034502          DEC 2370            TIME = 7200   (2.0 HOURS)
4007    46440   034475          DEC 2365            TIME = 7920   (2.2 HOURS)
```

```
4010
4011                                        HH = 3000
4012    46441    034650    DEC 2472          TIME = 0720    (0.2 HOURS)
4013    46442    034646    DEC 2470          TIME = 1440    (0.4 HOURS)
4014    46443    034622    DEC 2450          TIME = 2160    (0.6 HOURS)
4015    46444    034576    DEC 2430          TIME = 2880    (0.8 HOURS)
4016    46445    034571    DEC 2425          TIME = 3600    (1.0 HOURS)
4017    46446    034557    DEC 2415          TIME = 4320    (1.2 HOURS)
4020    46447    034552    DEC 2410          TIME = 5040    (1.4 HOURS)
4021    46450    034545    DEC 2405          TIME = 5760    (1.6 HOURS)
4022    46451    034540    DEC 2400          TIME = 6480    (1.8 HOURS)
4023    46452    034533    DEC 2395          TIME = 7200    (2.0 HOURS)
4024    46453    034521    DEC 2385          TIME = 7920    (2.2 HOURS)
4025
4026                                        HH = 3500
4027    46454    034660    DEC 2480          TIME = 0720    (0.2 HOURS)
4030    46455    034655    DEC 2477          TIME = 1440    (0.4 HOURS)
4031    46456    034630    DEC 2456          TIME = 2160    (0.6 HOURS)
4032    46457    034605    DEC 2437          TIME = 2880    (0.8 HOURS)
4033    46460    034565    DEC 2421          TIME = 3600    (1.0 HOURS)
4034    46461    034557    DEC 2415          TIME = 4320    (1.2 HOURS)
4035    46462    034552    DEC 2410          TIME = 5040    (1.4 HOURS)
4036    46463    034545    DEC 2405          TIME = 5760    (1.6 HOURS)
4037    46464    034540    DEC 2400          TIME = 6480    (1.8 HOURS)
4040    46465    034533    DEC 2395          TIME = 7200    (2.0 HOURS)
4041    46466    034526    DEC 2390          TIME = 7920    (2.2 HOURS)
4042
4043                                        HH = 4000
4044    46467    034665    DEC 2485          TIME = 0720    (0.2 HOURS)
4045    46470    034660    DEC 2480          TIME = 1440    (0.4 HOURS)
4046    46471    034632    DEC 2458          TIME = 2160    (0.6 HOURS)
4047    46472    034610    DEC 2440          TIME = 2880    (0.8 HOURS)
4050    46473    034571    DEC 2425          TIME = 3600    (1.0 HOURS)
4051    46474    034564    DEC 2420          TIME = 4320    (1.2 HOURS)
4052    46475    034557    DEC 2415          TIME = 5040    (1.4 HOURS)
4053    46476    034552    DEC 2410          TIME = 5760    (1.6 HOURS)
4054    46477    034545    DEC 2405          TIME = 6480    (1.8 HOURS)
4055    46500    034540    DEC 2400          TIME = 7200    (2.0 HOURS)
4056    46501    034533    DEC 2395          TIME = 7920    (2.2 HOURS)
4057
4060                                        HH = 4500
4061    46502    034672    DEC 2490          TIME = 0720    (0.2 HOURS)
4062    46503    034665    DEC 2485          TIME = 1440    (0.4 HOURS)
4063    46504    034637    DEC 2463          TIME = 2160    (0.6 HOURS)
4064    46505    034610    DEC 2440          TIME = 2880    (0.8 HOURS)
4065    46506    034574    DEC 2428          TIME = 3600    (1.0 HOURS)
4066    46507    034570    DEC 2424          TIME = 4320    (1.2 HOURS)
4067    46510    034564    DEC 2420          TIME = 5040    (1.4 HOURS)
4070    46511    034557    DEC 2415          TIME = 5760    (1.6 HOURS)
4071    46512    034552    DEC 2410          TIME = 6480    (1.8 HOURS)
4072    46513    034545    DEC 2405          TIME = 7200    (2.0 HOURS)
4073    46514    034540    DEC 2400          TIME = 7920    (2.2 HOURS)
4074
4075                                        HH = 5000
4076    46515    034675    DEC 2493          TIME = 0720    (0.2 HOURS)
4077    46516    034667    DEC 2487          TIME = 1440    (0.4 HOURS)
4100    46517    034644    DEC 2468          TIME = 2160    (0.6 HOURS)
4101    46520    034614    DEC 2444          TIME = 2880    (0.8 HOURS)
4102    46521    034600    DEC 2432          TIME = 3600    (1.0 HOURS)
4103    46522    034574    DEC 2428          TIME = 4320    (1.2 HOURS)
4104    46523    034571    DEC 2425          TIME = 5040    (1.4 HOURS)
4105    46524    034564    DEC 2420          TIME = 5760    (1.6 HOURS)
4106    46525    034557    DEC 2415          TIME = 6480    (1.8 HOURS)
4107    46526    034552    DEC 2410          TIME = 7200    (2.0 HOURS)
4110    46527    034545    DEC 2405          TIME = 7920    (2.2 HOURS)
4111
4112                                        HH = 5500
4113    46530    034677    DEC 2495          TIME = 0720    (0.2 HOURS)
4114    46531    034671    DEC 2489          TIME = 1440    (0.4 HOURS)
4115    46532    034646    DEC 2470          TIME = 2160    (0.6 HOURS)
4116    46533    034616    DEC 2446          TIME = 2880    (0.8 HOURS)
4117    46534    034603    DEC 2435          TIME = 3600    (1.0 HOURS)
```

```
4120   46535   034576         DEC 2430              TIME = 4320   (1.2 HOURS)
4121   46536   034571         DEC 2425              TIME = 5040   (1.4 HOURS)
4122   46537   034564         DEC 2420              TIME = 5760   (1.6 HOURS)
4123   46540   034557         DEC 2415              TIME = 6480   (1.8 HOURS)
4124   46541   034552         DEC 2410              TIME = 7200   (2.0 HOURS)
4125   46542   034545         DEC 2405              TIME = 7920   (2.2 HOURS)
4126
4127                                        HM = 600)
4130   46543   034702         DEC 2498              TIME = 0720   (0.2 HOURS)
4131   46544   034675         DEC 2493              TIME = 1440   (0.4 HOURS)
4132   46545   034651         DEC 2473              TIME = 2160   (0.6 HOURS)
4133   46546   034622         DEC 2450              TIME = 2880   (0.8 HOURS)
4134   46547   034610         DEC 2440              TIME = 3600   (1.0 HOURS)
4135   46550   034603         DEC 2435              TIME = 4320   (1.2 HOURS)
4136   46551   034576         DEC 2430              TIME = 5040   (1.4 HOURS)
4137   46552   034571         DEC 2425              TIME = 5760   (1.6 HOURS)
4140   46553   034564         DEC 2420              TIME = 6480   (1.8 HOURS)
4141   46554   034557         DEC 2415              TIME = 7200   (2.0 HOURS)
4142   46555   034552         DEC 2410              TIME = 7920   (2.2 HOURS)
4143
4144
4145           030022         BRPT 46600-L
4146   46556   030000         DEC 0
       46557   030000
       46560   030000
       46561   030000
       46562   030000
       46563   030000
       46564   030000
       46565   030000
       46566   030000
       46567   030000
       46570   030000
       46571   030000
       46572   030000
       46573   030000
       46574   030000
       46575   030000
       46576   030000
       46577   030000
4147   46600   00 0000              E E
4150           030000                END
                              THE FOLLOWING SYMBOLS ARE UNDEFINED:
                                    E
```

We claim:

1. The method of controlling the heat content of workpieces traveling through a heating furnace operative with an associated workpiece processing device, with said furnace having at least one heating zone in which at least one workpiece is positioned within a predetermined control area located in said heating zone, said method being operative after predicting the remaining travel time of said one workpiece through said one heating zone, the steps of said method comprising, generating a signal indicative of the effective temperature of said one heating zone, determining the actual heat content supplied to said workpiece by said heating zone in relation to said generated signal indicative of said effective temperature, establishing the remaining heat content to be supplied to said one workpiece by said one heating zone in accordance with a predetermined relationship with said determined actual heat content, modifying the predicted remaining travel time of said one workpiece through the heating zone in accordance with the operation of the associated workpiece processing device, and controlling said furnace to provide an effective temperature in accordance with a predetermined relationship with said modified predicted remaining travel time and said established remaining heat content.

2. The method of claim 1, with said one workpiece being a representative workpiece in accordance with all of the workpieces in said control area.

3. The method of claim 1, with said one workpiece being an average workpiece in relation to a predetermined characteristic of each workpiece actually positioned within said control area.

4. The method of claim 1, with said step of controlling said furnace to provide an effective temperature of said one heating zone being operative to provide a predetermined heat content to at least said one workpiece before that one workpiece leaves said one heating zone.

5. The method of claim 1, with said one workpiece being a representative workpiece in accordance with the thickness and the width of each workpiece positioned in said control area.

6. The method of claim 1, with the step of controlling said furnace to provide an effective temperature being in relation to the location of said control area in said heating zone.

7. The method of claim 1, with the step of controlling said furnace to provide an effective temperature being in relation to a temperature setpoint signal established in accordance with said predetermined relationship.

8. The method of claim 1, with said furnace including a second heating zone in addition to said one heating zone, said method including the steps of establishing the additional heat content to be supplied to said one workpiece by said second heating zone, and establishing said remaining heat content to be supplied by said one heating zone in relation to said additional heat content to be supplied by said second heating zone.

9. The method of claim 1, with said furnace including a second heating zone subsequent to said one heating zone, said method including the step of establishing a desired relationship between a first heat content to be supplied by said one heating zone to said one workpiece and a second heat content to be supplied by said second heating zone to said one workpiece.

10. The method of claim 9, with said desired relationship being in accordance with a relationship including the total content to be supplied by said furnace to said one workpiece, a first heat content supplied by said one heating zone and a second heat content supplied by the second heating zone.

11. In apparatus for controlling the operation of a furnace for heating workpieces traveling through said furnace and including a heating zone having an effective temperature and having a predetermined control area in which at least one workpiece is positioned, with said furnace being operative in relation to an associated rolling mill, the combination of first means for providing a signal indicative of the effective temperature of said heating zone, second means for determining the remaining time period said one workpiece will be positioned in said heating zone and during which said one workpiece will travel from said control area to the end of said heating zone, for determining the remaining heat content to be supplied to said one workpiece during said time period in response to the provided signal indicative of said effective temperature of said heating zone, and for determining a temperature control setpoint for said heating zone in accordance with a predetermined relationship between said determined remaining time period and said determined remaining heat content, third means for modifying said determined temperature control setpoint in accordance with the operation of the associated rolling mill, and fourth means for controlling the operation of said heating zone to provide an effective temperature of said heating zone in accordance with said modified determined temperature control setpoint.

12. The apparatus of claim 11, with said one workpiece being representative of all the workpieces positioned in said control area.

13. The apparatus of claim 11, with said one workpiece having an average thickness in relation to the actual thickness of each workpiece positioned in said control area.

14. The apparatus of claim 11, with said third means for modifying the determined temperature control setpoint providing a gap time increment to modify said determined remaining time period in accordance with the operation of said associated rolling mill.

15. The apparatus of claim 11, with said remaining time period being in relation to the known location of said control area in said heating zone.

16. The apparatus of claim 11, with said second means for determining said temperature control setpoint being operative in relation to said provided signal indicative of the effective temperature of said heating zone.

17. The apparatus of claim 11, with said furnace having another heating zone, and with said second means being operative for determining a second travel time period for said one workpiece to travel through said another heating zone, and for determining the remaining heat content in relation to said determined second travel time period.

18. A control system for a workpiece furnace having at least one heating zone through which individual workpieces travel in succession for providing a predetermined heat content into each of said workpieces when the latter workpiece leaves said heating zone, with said heating zone including a predetermined control area, said control system comprising, first means for providing a control signal representative of the actual effective temperature of said control area, second means for determining the time period remaining for a representative workpiece in said control area to travel to the end of said heating zone, for determining in response to said control signal the remaining heat content to be provided into said representative workpiece during said time period, and for determining an output signal to provide a desired temperature setpoint for said control area in accordance with said time period and said remaining heat content, third means for modifying said output signal by a predetermined gap time increment, and fourth means responsive to said modified output signal for controlling said effective temperature of said control area in relation to said temperature setpoint.

19. The control system of claim 18, with said second means determining the actual heat content already provided into said representative workpiece by said heating zone such that said remaining heat content is determined in relation to said actual heat content.

20. The control system of claim 18, with said remaining heat content being determined in accordance with a relationship including said predetermined heat content, the actual heat content already provided into said representative workpiece by said heating zone and said remaining heat content to be provided.

21. The control system of claim 18, with said control area having a width dimension large enough to include a plurality of the individual workpieces traveling through said heating zone.

22. A control system as set forth in claim 18, with said remaining heat content being determined in relation to said effective temperature of said control area.

23. The control system of claim 18 with said furnace including a second heating zone, said control system including said second means being operative for determining the travel time of said representative workpiece through said second heating zone,
with said remaining heat content being determined in relation to said travel time.

24. The control system of claim 18, with said furnace including a second heating zone, said control system including
said second means establishing a desired relationship between a first heat content supplied to said representative workpiece by said one heating zone and a second heat content supplied to said representative workpiece by said second heating zone.

25. The control system of claim 18, with said control system including
means for providing communication between and operator for said furnace and said second means such that said operator can modify said time period remaining.

26. An automated method of controlling the total heat content supplied to at least one workpiece passing through a heating furnace operative with an associated workpiece processing device and having a first heating zone and a second heating zone, with said first heat zone having a predetermined control area, said method being operative after predicting the travel time of said one workpiece through said second heating zone, said method including the steps of
measuring a first effective temperature of said first heating zone and a second effective temperature of said second heating zone,
determining a first heat content to be supplied to said one workpiece by said first heating zone in relation to said measured first effective temperature and a second heat content to be supplied to said one workpiece by said second heating zone in relation to said measured second effective temperature and said predicted travel time,
determining the needed heat content to be supplied by said first heating zone to said one workpiece in relation to said first heat content and said second heat content when said one workpiece is positioned in said predetermined control area,
determining a modified remaining time period for said one workpiece to be positioned in said first heating zone in accordance with the operation of the associated workpiece processing device, and
controlling the operation of said first heating zone to provide an effective temperature of said first heating zone in relation to said determined needed heat content and said determined modified remaining time period.

27. The method of claim 26 with said predicted travel time being in relation to the known demand for heated workpieces to be discharged from said furnace.

28. The method of claim 26, with said step of determining a first heat content and a second heat content being in accordance with a relationship including said total heat content, said first heat content and said second heat content.

29. The method of claim 26, with said determination of the needed heat content being in accordance with said one workpiece representing the actual workpieces positioned in said first heating zone.

30. The method of claim 26, with said determination of the remaining time being in relation to the known location of said control area in said first heating zone.

31. The method of claim 26, including the steps of
determining the surface temperature of said one workpiece in relation to said measured first effective temperature and the known time interval that said one workpiece has been positioned in said first heating zone and
determining said needed heat content in relation to said surface temperature of said one workpiece.

32. The method of claim 26, with said second heating zone having a second predetermined control area, said method including the step of
determining a second needed heat content to be supplied by said second heating zone to a second workpiece in relation to the heat content to be supplied to said second workpiece when said second workpiece is positioned in said second control area of the second heating zone.

33. The method of claim 32, including the steps of
determining a modified remaining time period in accordance with the operation of the associated workpiece processing device for said second workpiece to be positioned in said second heating zone, and controlling the operation of said second heating zone to provide an effective temperature of said second heating zone in relation to the second needed heat content and the modified remaining time period for the second workpiece to be positioned in said second heating zone.

34. The method of claim 26, with said one workpiece being a representative workpiece in relation to an average predetermined heating characteristic of all the workpieces in said control area.

35. The method of claim 26, with said one workpiece being an average workpiece in relation to the thickness and the surface width of each workpiece in said control area.

36. The method of claim 26, with said step of controlling the operation of said first heating zone to provide an effective temperature of said first heating zone being operative to provide said first heat content to at least said one workpiece before that one workpiece leaves said first heating zone.

37. The method of claim 26, with said step of determining a modified remaining time period being in relation to the location of said control area in said first heating zone.

38. The method of claim 26, with said step of controlling the operation of said first heating zone to provide an effective temperature of said first heating zone being in accordance with a temperature setpoint established in accordance with said needed heat content and said modified remaining time period in relation to said one workpiece.

39. A control system for determining the heat content of at least one slab passing through a slab heating furnace operative with an associated rolling mill and having a first heating zone and a second heating zone, with each of said heating zones including a control location in which said slab is successively positioned, said control system comprising
first means for providing a first control signal representative of the effective temperature of said first heating zone,
second means for providing a second control signal representative of the effective temperature of said second heating zone,
third means for establishing a modified first time period remaining for said slab to leave said first heating zone when said slab is positioned in said control location of said first heating zone and for establishing a modified second time period remaining for said slab to leave said second heating zone when said slab is positioned in said control location of said second heating zone, with said third means being responsive to a gap time increment in accordance with the operation of the associated workpiece processing device to modify said first and second time periods, means responsive to said first control signal for controlling the first heat content supplied to said slab by said first heating zone in relation to said modified first time period remaining, and means responsive to said second control signal for controlling the second heat content supplied to said slab by said second heating zone in relation to said modified second time period remaining.

40. The control system of claim 39, with said third means periodically establishing the heat content of every slab positioned in said first heating zone and the heat content of every slab positioned in said second heating zone.

41. The control system of claim 39, with said third means providing a first temperature setpoint output signal operative with said means for controlling the first heat content and providing a second temperature setpoint output signal operative with said means for controlling the second heat content.

42. An automated method of determining the heat content of workpieces traveling through a heating furnace operative with a workpiece processing device and being operative after predicting the remaining travel time of said representative workpiece through said one heating zone in relation to the location of said control area in said heating zone, with said furnace having at least one heating zone in which a representative workpiece is positioned within a predetermined control area located in said heating zone, said method including the steps:

generating a signal representative of the effective temperature of at least said one heating zone, establishing the remaining heat content to be supplied to said representative workpiece by at least said one heating zone in accordance with a predetermined relationship with said generated signal representative of said effective temperature, modifying the predicted remaining travel time of said representative workpiece through the one heating zone in accordance with the actual operation of the workpiece processing device, and controlling the operation of said furnace to provide an effective temperature in accordance with a predetermined relationship between said modified predicted remaining travel time and said established remaining heat content to be supplied to said representative workpiece.

43. In apparatus for controlling the operation of a furnace for heating a representative workpiece traveling through said furnace and including at least one workpiece heating zone having a predetermined control area in which said representative workpiece is positioned and after a determination has been made of the remaining time period said representative workpiece will be positioned in said heating zone in relation to the travel of said representative workpiece from said control area to the end of said heating zone, with said furnace being operative in relation to an associated rolling mill, the combination of means for providing a signal indicative of the actual effective temperature of said heating zone in relation to said representative workpiece positioned in said control area, means for modifying the determined remaining time period in relation to the actual operation of the rolling mill, means for determining the heat content to be supplied to said representative workpiece during said modified determined remaining time period, and for determining an output signal representative of a desired temperature control setpoint for said heating zone in accordance with a predetermined relationship between said modified remaining time period and said determined heat content, and means operative with said furnace in response to said output signal for controlling said effective temperature in accordance with said desired temperature control setpoint.

* * * * *